United States Patent [19]

Rast et al.

[11] Patent Number: 4,754,426

[45] Date of Patent: Jun. 28, 1988

[54] SYSTEM FOR CONTROLLING COMMUNICATIONS ON A CABLE TELEVISION NETWORK

[75] Inventors: Robert M. Rast; David Wreford-Howard, both of Englewood, Colo.

[73] Assignee: American Television & Communications Corporation, Englewood, Colo.

[21] Appl. No.: 79,228

[22] Filed: Jul. 29, 1987

Related U.S. Application Data

[63] Continuation of Ser. No. 615,957, May 31, 1984, Pat. No. 4,684,980.

[51] Int. Cl.⁴ .......................... H04N 7/10; H04N 7/14

[52] U.S. Cl. .......................................... 358/86; 455/5

[58] Field of Search ...................... 358/86, 349; 455/4, 455/5

[56] References Cited

U.S. PATENT DOCUMENTS

| | | | |
|---|---|---|---|
| 2,465,976 | 3/1949 | Goldsmith | 235/50 |
| 3,050,712 | 8/1962 | Bruck | 358/84 X |
| 3,230,302 | 1/1966 | Bruck | 358/84 |
| 3,786,424 | 1/1974 | McVoy et al. | 358/86 |
| 3,803,491 | 4/1974 | Osborn | 358/86 |
| 3,805,234 | 4/1974 | Masters . | |
| 3,859,596 | 1/1975 | Jannery et al. | 455/5 |
| 4,030,072 | 6/1977 | Bjornsson . | |
| 4,343,042 | 8/1982 | Schrock et al. | 455/5 |
| 4,351,059 | 9/1982 | Gregoire et al. | 375/10 |
| 4,361,903 | 11/1982 | Ohta | 455/5 X |
| 4,450,481 | 5/1984 | Dickinson | 358/86 X |
| 4,466,001 | 8/1984 | Moore et al. | 340/825.08 |
| 4,475,123 | 10/1984 | Dumbauld et al. | 358/86 X |
| 4,484,218 | 11/1984 | Boland et al. | 358/86 |
| 4,530,008 | 7/1985 | McVoy | 358/86 X |
| 4,533,948 | 8/1985 | McNamara et al. | 358/86 X |
| 4,574,305 | 3/1986 | Campbell et al. | 358/86 |
| 4,641,363 | 2/1987 | Hasegawa | 358/86 X |
| 4,673,976 | 6/1987 | Howard | 358/86 X |
| 4,686,564 | 8/1987 | Masuko et al. | 358/86 |

FOREIGN PATENT DOCUMENTS

| | | | |
|---|---|---|---|
| 0019287 | 11/1980 | European Pat. Off. . | |
| 0103438 | 3/1984 | European Pat. Off. | 358/86 |

OTHER PUBLICATIONS

Baran, "Packetcable: A New Interactive Cable System Technology", *31st Annual NCTA Convention Official Transcript,* 1982.

DeltaKabel bv, "Application Note: DeltaKabel Star-network Coaxial Version", May 1980.

DeltaKabel bv, "Cable-Television in Broadband Systems", copy dated Aug. 18, 1981.

DeltaKabel bv, "Mini-Star Network with Selection Facilities and Computer Control".

Hiratsuka et al., "High-Speed Polling Systems for Multi-Purpose CATV", *Japan Telecommunications Review,* Jan. 1977, pp. 20-28.

Mesiya et al., "Mini-Hub Addressable Distribution System for Hi-Rise Application", *First Annual Phoenix Conference on Computers and Communications,* Phoenix, Arizona, 9-12, May 1982, IEEE, pp. 346-351.

Preschutti et al., "Scat Series 10 Converter Off-Premises Addressable Control: Second Generation", May 1983, C-$C_{or}$Electronics.

*Primary Examiner*—Keith E. George

*Attorney, Agent, or Firm*—Laurence S. Rogers; Jeffrey H. Ingerman

[57] ABSTRACT

A system for controlling a cable television network includes a head end, a plurality of addressable external control units having subscriber converters located off the subscriber's premises, and one or more subscriber devices located on the subscriber premises for communicating with associated external control units. The head end can selectively and rapidly poll the external control units for information on a general or on a priority basis. Information is transmitted to the head end from the external control units on any of a plurality of reverse communication channels under control of the head end. External control units use a two-part polling scheme to poll a plurality of associated drop cables, and individual subscriber devices attached to the drop cables. The polling rapidly identifies subscriber devices desiring to communicate with the external control unit.

7 Claims, 43 Drawing Sheets

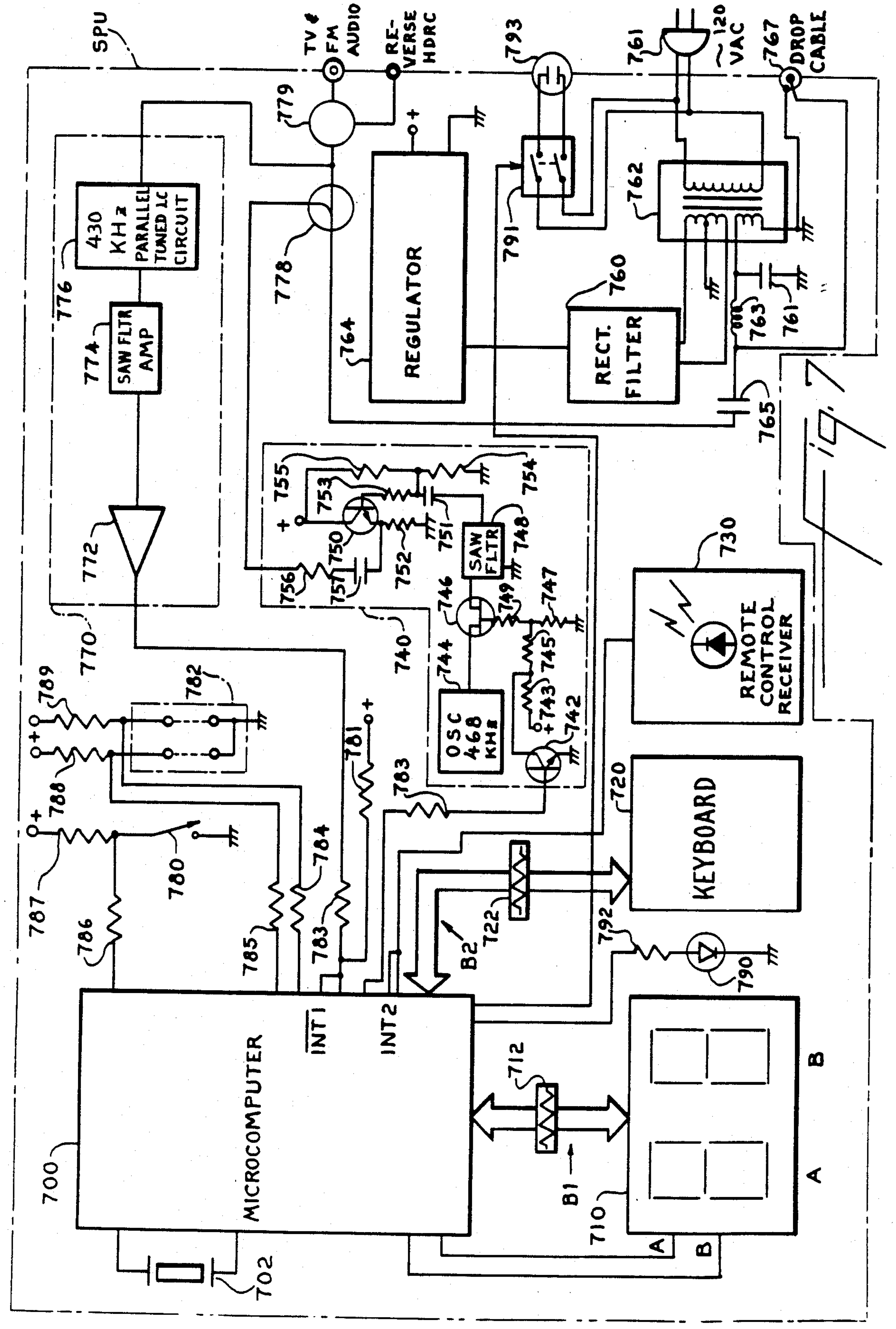
SPU
TV & FM AUDIO
REVERSE HDRC
120 VAC
DROP CABLE
430 KHz PARALLEL TUNED LC CIRCUIT
SAW FLTR AMP
REGULATOR
RECT. FILTER
SAW FLTR
OSC 468 KHz
REMOTE CONTROL RECEIVER
KEYBOARD
MICROCOMPUTER
INT1
INT2
A
B
B1
B2
700
702
710
712
720
722
730
740
742
743
744
745
746
747
748
749
750
751
752
753
754
755
756
757
760
761
762
763
764
765
767
770
772
774
776
778
779
780
781
782
783
784
785
786
787
788
789
790
791
792
793

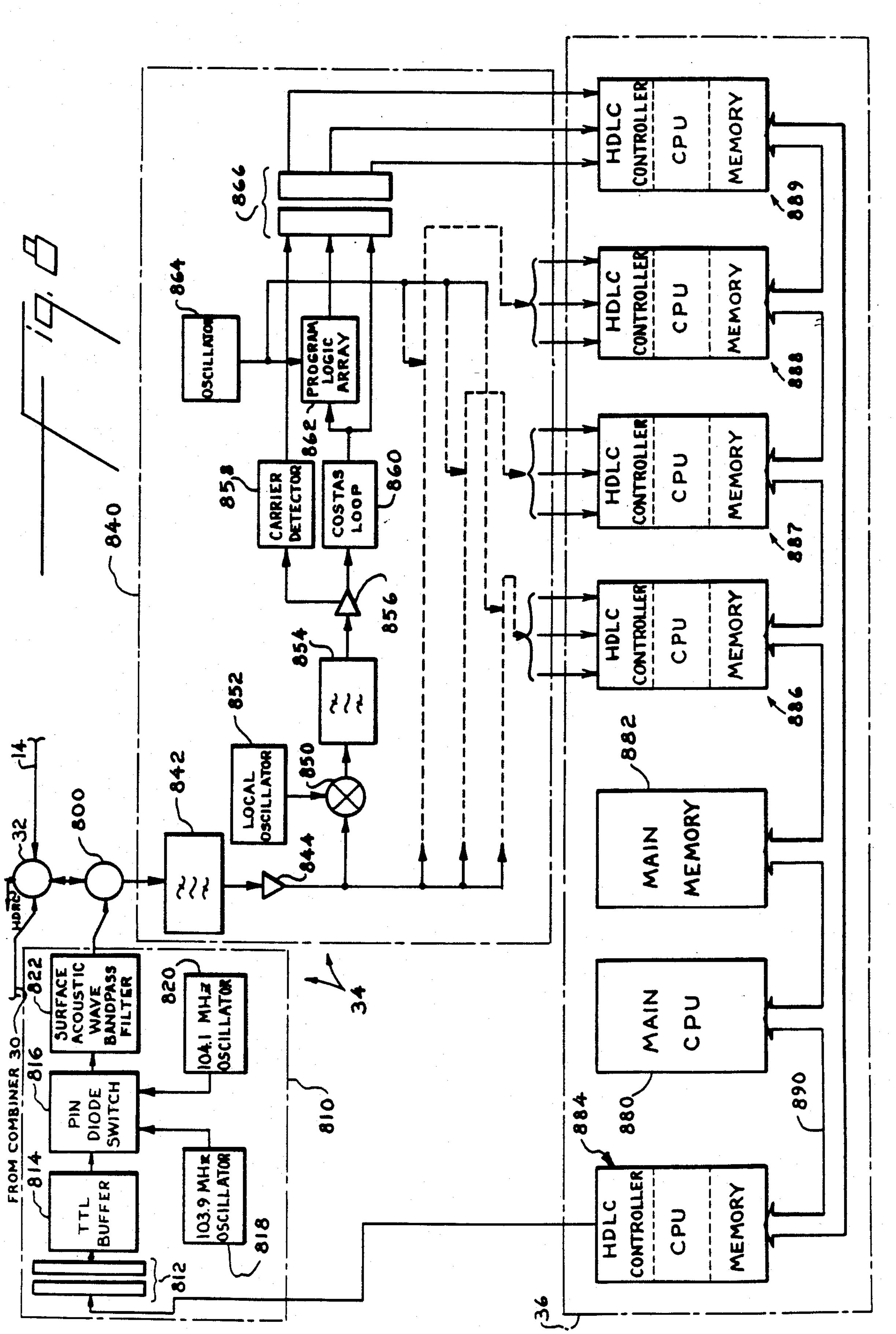
HDLC CONTROLLER
CPU
MEMORY
MAIN MEMORY
MAIN CPU
OSCILLATOR
PROGRAM LOGIC ARRAY
CARRIER DETECTOR
COSTAS LOOP
LOCAL OSCILLATOR
SURFACE ACOUSTIC WAVE BANDPASS FILTER
104.1 MHz OSCILLATOR
103.9 MHz OSCILLATOR
PIN DIODE SWITCH
TTL BUFFER
FROM COMBINER 30
HDR
14
32
34
36
800
810
812
814
816
818
820
822
840
842
844
850
852
854
856
858
860
862
864
866
880
882
884
886
887
888
889
890

| | | | | | | | | | | | | |
|---|---|---|---|---|---|---|---|---|---|---|---|---|
| FLAG | ADH | ADL | N | CMD FC | NN | MADL | MADH | DATA (NN BYTES) | CRH | CRL | FLAG |

Fig. 12

| | | | | | | | | | | | |
|---|---|---|---|---|---|---|---|---|---|---|---|
| FLAG | ADH | ADL | N | CMD F8-FB | NN | MADL | MADH | CRH | CRL | FLAG |

Fig. 13a

| | | | | | | | | | |
|---|---|---|---|---|---|---|---|---|---|
| FLAG | ADH | ADL | N | CMD F8-FB | NN | DATA (NN BYTES) | CRH | CRL | FLAG |

Fig. 13b

| | | | | | | | | | |
|---|---|---|---|---|---|---|---|---|---|
| FLAG | ADH | ADL | N | CMD F0-F3 | NN | DATA (NN BYTES) | CRH | CRL | FLAG |

Fig. 14

| | | | | | | | | | | |
|---|---|---|---|---|---|---|---|---|---|---|
| FLAG | ADH | ADL | N | CMD F4 | NN | SU | LC | CRH | CRL | FLAG |

Fig. 15

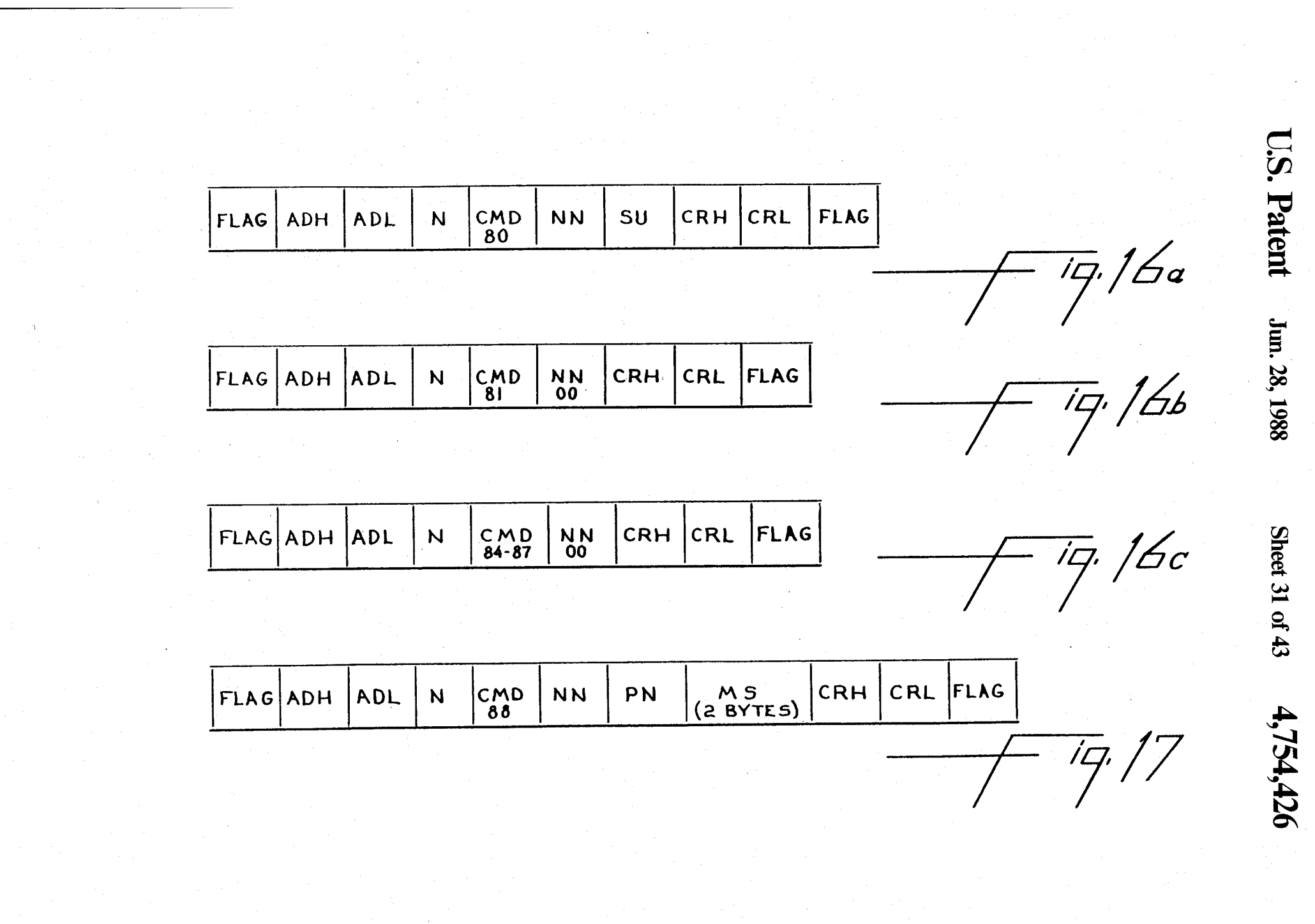

| | | | | | | | | | |
|---|---|---|---|---|---|---|---|---|---|
| FLAG | ADH | ADL | N | CMD 80 | NN | SU | CRH | CRL | FLAG |

Fig. 16a

| | | | | | | | | |
|---|---|---|---|---|---|---|---|---|
| FLAG | ADH | ADL | N | CMD 81 | NN 00 | CRH | CRL | FLAG |

Fig. 16b

| | | | | | | | | |
|---|---|---|---|---|---|---|---|---|
| FLAG | ADH | ADL | N | CMD 84-87 | NN 00 | CRH | CRL | FLAG |

Fig. 16c

| | | | | | | | | | | |
|---|---|---|---|---|---|---|---|---|---|---|
| FLAG | ADH | ADL | N | CMD 88 | NN | PN | MS (2 BYTES) | CRH | CRL | FLAG |

| | | | | | | |
|---|---|---|---|---|---|---|
| FLAG | SEND CNTL 08 | CTL | LVL | CRH | CRL | FLAG |

Fig. 21b

| | | | | | | |
|---|---|---|---|---|---|---|
| FLAG | SEND CNTL 00-03 | ADL | ADH | CRH | CRL | FLAG |

| | | | | | | |
|---|---|---|---|---|---|---|
| FLAG | SEND CNTL 09 | CTL | LVL | CRH | CRL | FLAG |

Fig. 22a

| | | | | | | |
|---|---|---|---|---|---|---|
| FLAG | SEND CNTL 04-07 | ADL | ADH | CRH | CRL | FLAG |

Fig. 22b

| | | | | | | |
|---|---|---|---|---|---|---|
| FLAG | REC CNTL 00 | LVL | CTL | Dn (1-6 BYTES) | CRH | CRL | FLAG |

Fig. 22c

SYSTEM FOR CONTROLLING COMMUNICATIONS ON A CABLE TELEVISION NETWORK

CROSS REFERENCE TO RELATED APPLICATION

This application is a contiunation of copending U.S. Pat. application Ser. No. 615,957, filed May 31, 1984, now U.S. Pat. No. 4,684,980.

This application is related to the following monly assigned applications: Ser. No. 616,411, filed May 31, 1984, now abandoned; and Ser. No. 4,850, filed Jan. 13, 1987, which is a continuation of Ser. No. 616,412, filed May 31, 1984, now abandoned.

BACKGROUND OF THE INVENTION

This invention relates to cable television systems, and more particularly to cable television systems in which the converter for converting portions of the television signal on the cable network to the television signal which is applied to the subscriber's television receiver is located outside the subscriber's premises.

There is increasing interest in cable television systems in which the converter for converting the portion of the cable television signal which the subscriber desires to receive to a signal suitable for application to the subscriber's television set is located outside the subscriber's premises, for example, on or adjacent to a neighboring utility or telephone pole. This is of interest because it reduces the risk of unauthorized tampering with the converter, accidental or intentional misappropriation of or damage to the converter, and the like.

On the other hand, locating the converter outside the subscriber's premises increases the complexity and cost of the system because apparatus must then be included in the system to enable the subscriber to remotely control the converter. This consideration has tended to discourage the development of cable television systems with off-premises converters.

It is therefore an object of this invention to improve, simplify and reduce the cost of cable television systems with off-premises converters.

SUMMARY OF THE INVENTION

This and other objects of the invention are accomplished in accordance with the principles of the invention by providing a cable television system and method in which the off-premises converters of several adjacent subscribers are at least partially controlled by common signal processing circuitry associated with those converters. The common signal processing circuitry and all the associated converters are preferably located in a common facility, for example, a housing mounted on or adjacent to a utility pole neighboring the premises of the associated subscribers. This apparatus is referred to herein as an external control unit or "ECU". The ECU preferably includes only a single tap for each network cable serving the ECU. The signals derived from this tap are distributed appropriately to the components of the ECU. A drop cable extends from the ECU to each subscriber's premises.

Inside the subscriber's premises the drop cable is connected to a subscriber processing unit or "SPU" which is typically located adjacent to the subscriber's television receiver. The SPU applies the television signal on the drop cable to the television receiver and also applies subscriber-originated control signals to the drop cable for transmission back to the ECU. Other devices located in the subscriber's premises, such as burglar, fire and other alarm or monitoring equipment capable of applying control signals to the drop cable for transmission back to the ECU, can also be connected to the drop cable.

The ECU processes the control signals originated by all of the associated subscribers to satisfy, if appropriate, the service requests indicated by those control signals. In particular, the common signal processing circuitry in the ECU is used as extensively as possible to process the subscriber-originated control signals to minimize the amount of separate ECU circuitry which must be provided for each subscriber.

The ECU is also capable of receiving and responding to control signals from the so-called "head end" of the cable network. For example, these control signals may include channel authorization data identifying which channels on the cable network a particular subscriber is authorized to receive and view. These head-end-originated control signals are preferably transmitted via the cable network, and the common signal processing circuitry in each ECU is again used as extensively as possible to process these signals. Because each ECU typically serves several subscribers, all of those subscribers can be serviced from the head end by control signals addressed to the ECU rather than to each subscriber individually. This greatly facilitates control of the system from the head end.

Further features of the invention, its nature and various advantages will be more apparent from the accompanying drawing and the following detailed description of the invention.

BRIEF DESCRIPTION OF THE DRAWING

FIGS. 5*a*–5*s* are sometimes collectively referred to as FIG. 5.

FIG. 7 is a schematic block diagram of the "SPU" in the apparatus of FIG. 1.

FIG. 8 is a block diagram of the central control computer ("CCC") and modem of the headend in the apparatus of FIG. 1.

FIG. 12–17 are diagrams of various messages sent between the CCC and an ECU in an embodiment of the invention.

FIGS. 21*a–23d* are diagrams of messages sent between the CCC and an ECU in another embodiment of the invention.

DETAILED DESCRIPTION OF THE INVENTION

I. Overview of the System

Figure 1:
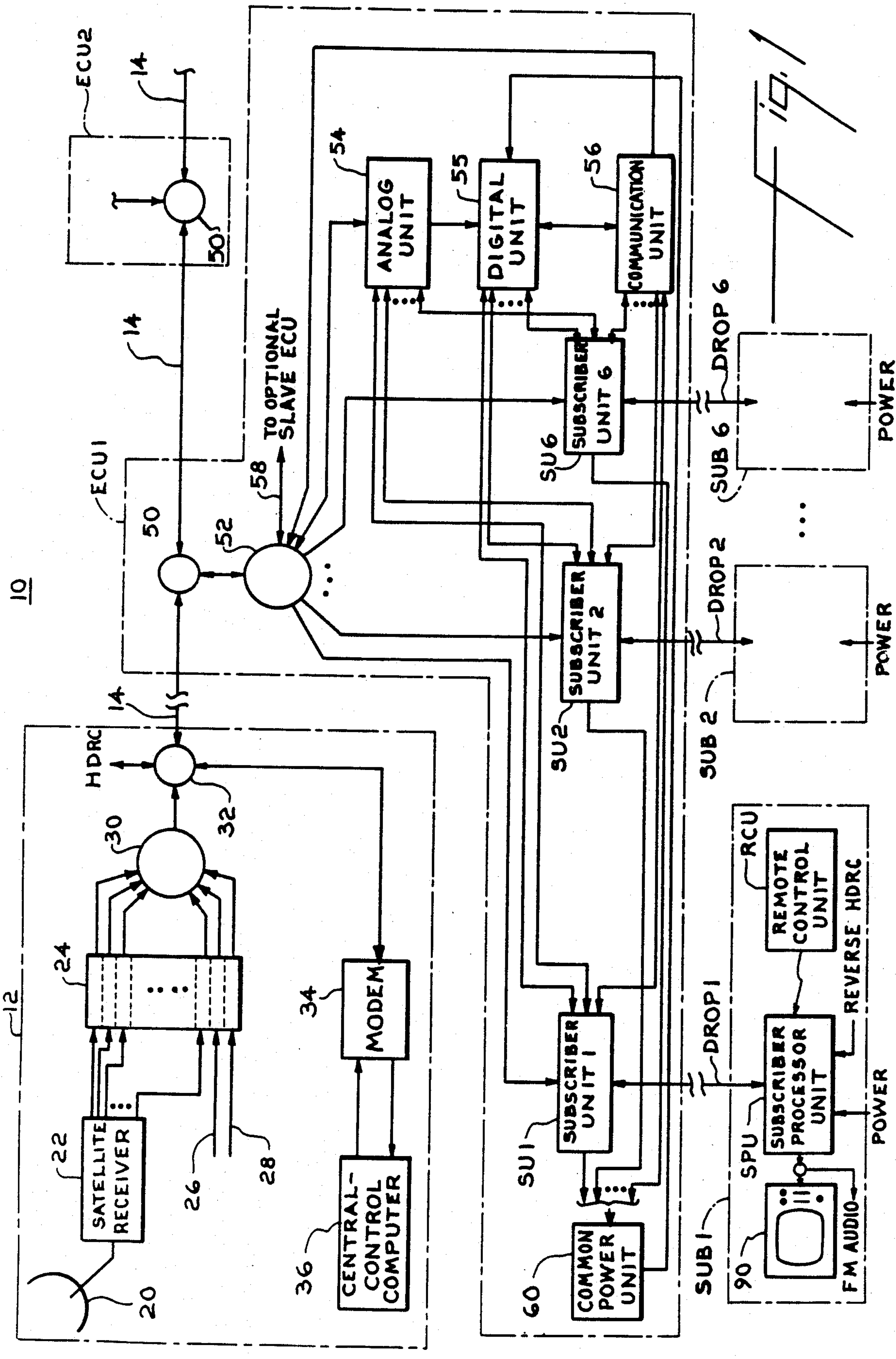
FIG. 1 is a block diagram of a cable television system constructed in accordance with the invention.

As shown in FIG. 1, an illustrative embodiment of the cable television system 10 of this invention includes head end apparatus 12; cable network 14; a plurality of external control units ECU1, ECU2, etc., connected to cable network 14 at locations which are typically remote from one another and from head end 12; and a plurality of subscriber premises SUB1, SUB2, etc., each of which is connected to an associated ECU by a drop cable DROP1, DROP2, etc. In the particular embodiment shown in the drawing, each ECU can be connected to as many as six subscribers, but this number is arbitrary and the maximum number of subscribers per ECU can be larger or smaller than six as desired.

Head end 12 typically includes one or more sources of television signal information such as conventional satellite antenna 20. Conventional satellite receiver 22 separates the television signal information received via antenna 20 into a plurality of base band television signals, each of which represents one base band television channel. Conventional modulator 24 modulates each of these television signals so that each base band channel is shifted to a predetermined frequency or "physical" cable channel for distribution via cable network 14. Additional base band television and other signals (e.g., television signals from studio cameras or video recorders, FM audio signals, etc.) may also be applied to modulator 24 via leads 26, 28, etc., and shifted to predetermined physical cable channels by the modulator.

All of the output signals of modulator 24 are applied to conventional combiner 30 which combines them for application to cable network 14 via conventional combiner 32. Combiner 32 also adds control and data signals to the signal applied to cable network 14. These control and data signals may be of two types: (1) a so-called "forward data" signal which represents information generated at head end 12 for controlling the ECUs in the network, and (2) a forward high data rate channel ("HDRC") signal which is typically included in the FM band and which allows the cable network to be used for such purposes as distributing non-television signal data (e.g., general purpose computer programs and data) to the subscribers. Because the forward HDRC signal is typically included in the FM band, the term "FM audio signal" as used herein includes the forward HDRC signal if such a signal is employed in the system.

In addition to adding forward data and forward HDRC signals to the signal applied to cable network 14, combiner 32 also conducts so-called "reverse data" signals in the opposite direction from cable network 14 to modem 34. The reverse data signals are control signals generated by the ECUs as described below for transmission to head end 12 for use in controlling the cable television network. In the illustrative embodiment shown and described herein, four channels are available for reverse data communication. Modem 34 converts (modulates) forward data signals produced by central control computer ("CCC") 36 to signals suitable for transmission via cable network 14. Modem 34 also converts (demodulates) reverse data signals received from cable network 14 to signals suitable for processing by central control computer 36.

Combiner 32 also extracts from the signal on cable network 14 a reverse HDRC signal which allows the cable network to be used for such purposes as transmitting non-television signal data (e.g., fire and burglary alarm signals) from the subscribers to a central location such as head end 12. The reverse HDRC signal is typically in a frequency band (e.g., 25 MHz) which is independent from all other frequency bands employed in the system. The use of a reverse HDRC frequency band in the present invention enables direct two-way communication between the head end and the subscribers, and minimizes noise and other signal degradation problems affecting other communication signals on the CATV cable and inherent in conventional two-way CATV systems.

Each ECU includes a conventional tap off device 50 for applying the signals which appear on cable network 14 to the circuitry of the ECU and for applying to cable network 14 the reverse data originating at the ECU and the reverse HDRC signals originating at the associated subscribers. Each ECU is typically located outside the premises of the subscribers served by the ECU. Typically, all the circuitry of the ECU is located in a common housing which may be adapted for mounting on a utility pole or other suitable structure adjacent to the premises of the subscribers served by the ECU.

Tap off device 50 is connected to conventional splitter-combiner network 52. Splitter-combiner combiner network 52 distributes the signals received from cable network 14 to a plurality of subscriber units SU1, SU2, etc. within the ECU, each of which is associated with a respective one of the subscribers served by the ECU. Although each SU includes additional apparatus described in detail below, for the moment it will be sufficient to think of each SU as a digitally controlled converter for performing the television signal frequency conversion function performed by the converter located adjacent the subscriber's television receiver in conventional cable network systems.

Splitter-combiner network 52 also distributes the signals received from cable network 14 to analog unit 54, described in greater detail below. In general, analog unit 54 separates the FM audio and forward data signals from the other signals received from cable network 14. Analog unit 54 applies the FM audio signal to each SU for transmission to the subscribers. Analog unit 54 also demodulates the forward data signal and applies the resulting data signal to digital unit 55. Analog unit 54 applies reverse HDRC signals received from the SUs to splitter-combiner network 52, and splitter-combiner network 52 applies those reverse HDRC signals to tap off device 50 and thereby to cable network 14.

Splitter-combiner network 52 also applies reverse data signals from communication unit 56 to tap off device 50. In addition, if a so-called "slave" ECU (not shown in FIG. 1) is associated with "master" ECU1 as described in detail below, splitter-combiner network 52 conveys signals in both directions via lead 58 between tap off device 50 and the splitter-combiner network of the slave ECU.

As mentioned above, each SU receives the entire cable network signal from splitter-combiner network 52. In response to control signals received from digital unit 55, each SU (1) selects from the cable network signal the portion of that signal representing the television channel which the associated subscriber wishes to view, and (2) converts that signal portion to a television signal on a predetermined channel (e.g., channel 3) to which the associated subscriber's television receiver 90 is tuned. This television signal is applied to the SU's associated drop cable DROP1, DROP2, etc., which runs from the SU to the associated subscriber's premises SUB1, SUB2, etc. Each SU also receives the FM audio signal from analog unit 54 and combines that signal with the television signal applied to the associated subscriber's drop cable.

The ECU communicates via each SU with the associated subscriber's apparatus (in particular, the SPU of the associated subscriber) by means of so-called very low frequency ("VLF") data signals on the associated drop cable. Also, when a subscriber operates his or her SPU to make a television channel selection, the SPU applies to the associated drop cable for transmission to the ECU VLF data signals representative of the desired channel selection. Each SU conveys these VLF data signals in both directions between the associated subscriber drop cable and communication unit 56 which includes a modem for conveying these VLF data signals to and from digital unit 55. Each SU also conveys reverse HDRC signals from the associated subscriber drop cable to analog unit 54.

The power required to operate each ECU is supplied by the subscribers served by that ECU. Each subscriber has an SPU which applies an alternating current ("AC") power signal to the associated drop cable. The associated SU conveys that power signal to common power unit 60 in the ECU. Common power unit 60 combines all of the applied power signals and derives from the combined signal the currents and voltages needed to power the various components of the ECU. In this way, all of the subscribers served by the ECU share the power requirements of the ECU. In the event of a general AC power failure, common power unit 60 applies a control signal to digital unit 55 which causes the digital unit to shut down in such a way that important data is not lost.

Digital unit 55 controls the operation of the ECU. Digital unit 55 receives and processes forward data applied to the digital unit via analog unit 54. Digital unit 55 also generates reverse data and applies that data to communication unit 56 for transmission to head end 12. Digital unit 55 receives and processes demodulated VLF signals applied to the digital unit via communication unit 56 from all of the SUs in the ECU. Digital unit 55 also generates other signals for transmission back to the subscribers via communication unit 56 and the SUs. Digital unit 55 also controls various functions of the SUs. For example, when a subscriber wishes to view a particular television channel, digital unit 55 receives VLF signals generated by the subscriber indicating the desired channel selection, determines whether or not the subscriber is authorized to receive that channel based upon channel authorization data previously provided by head end 12, and, if the subscriber is authorized to receive the desired channel, controls the subscriber's SU to cause it to apply the desired channel signal to the subscriber's drop cable.

Each subscriber has at least one SPU, at least one conventional television receiver 90 connected to the SPU, and (optionally) a conventional remote control unit ("RCU") for remotely controlling the SPU by infrared or other signals. The SPU is connected to the drop cable and applies the received drop cable signal to the associated television receiver 90. The received drop cable signal may also be applied to the subscriber's (optional) FM audio receiver equipment (not shown) and to the subscriber's (optional) forward HDRC utilization equipment (also not shown). The SPU has a conventional keypad (not shown in FIG. 1) for allowing the subscriber to enter data such as the number of the television channel the subscriber wishes to receive. Alternatively, this data can be entered via the subscriber's RCU. The SPU converts data entered by the subscriber to VLF data signals which are transmitted to the associated ECU via the subscriber's drop cable. The SPU also typically has data display elements such as seven-segment light emitting diode ("LED") displays. These displays can be controlled by VLF data sent to the SPU from the associated ECU. The SPU also applies the reverse HDRC signal originated by the subscriber to the associated drop cable.

The following Table A summarizes the allocation of carrier signal frequencies in the illustrative embodiment of the invention shown and described herein:

TABLE A

| Type of Signal | Approximate Frequency |
|---|---|
| 1. AC Power | 60 Hz |
| 2. VLF Data (ECU to SPU) | 430 KHz |
| 3. VLF Data (SPU to ECU) | 468 KHz |
| 4. Reverse Data | |
| a. Channel 0 | 19.125 MHz |
| b. Channel 1 | 19.375 MHz |
| c. Channel 2 | 19.625 MHz |
| d. Channel 3 | 19.875 MHz |
| 5. Reverse HDRC Data | 25 MHz |
| 6. Television | 50–88 MHz<br>108–450 MHz |
| 7. FM Audio (Includes Forward HDRC Data) | 88–108 MHz |
| 8. Forward Data | 104 MHz |

It will be understood that the frequencies shown in Table A are merely illustrative and that other frequencies can be employed if desired. For convenience herein, the television and FM audio signals on cable network 14 (items 6 and 7 in Table A, above) are sometimes hereafter referred to collectively as CATV signals.

Although cable network 14 has only a single feeder cable in the embodiment shown in FIG. 1, two feeder cables can be employed if desired to increase the number of television channels available for distribution to subscribers. For example, if two cables were provided, elements such as 24, 30, 32, 50, and 52 would be substantially duplicated to serve the second cable. Each SU would receive input CATV signals from each cable. To select between the two cables, each SU would also include a switch controlled by digital unit 55 for switching between the two applied cable signals. This is discussed in greater detail below in relation to the SUs. In a multi-cable system, the FM audio, reverse HDRC, forward data, and reverse data signals are preferably transmitted by only one cable, designated the primary cable, thereby allowing some simplification of the apparatus associated with the other cable or cables. Thus, elements such as 34, 36, 54, 55, 56, and 60 do not have to be duplicated or even significantly altered to provide a multi-cable system.

It is also possible for each subscriber to have more than one television receiver 90. The additional television receiver or receivers can be attached to one SPU, in which case all of the television receivers receive the same television signal. Alternatively, the additional television receiver or receivers can be served by a second SPU to enable the subscriber to simultaneously select and receive two different television channels. If a subscriber has two SPUs, both of the SPUs can be connected to a single drop cable. In such a case, one SPU will be configured as a "master" SPU, and the other will be configured as a "slave" SPU. At the ECU, a subscriber with a master and slave SPU is served by two SUs. Each SU is associated with a different SPU. The signals from both SUs are multiplexed onto the single drop cable. The television signal from the first or "primary" SU is converted by the SU to, and applied to the drop cable as, a first or lower drop cable channel. The television signal from the other or "secondary" SU is converted to, and applied to the drop cable as, a second or higher drop cable channel. The television receiver associated with each SPU is tuned to a respective one of the two drop cable channels.

Thus, each subsoriber has at least one primary SU in the ECU associated with a master SPU. If a subscriber has two SPUs, that subscriber may also have a secondary SU in the ECU associated with the slave SPU. In any event, the total number of SUs which can be included in an ECU in the particular embodiment shown and described herein is six.

If additional subscriber service is needed at the location of an ECU which is operating at capacity, then a second or "slave" ECU containing six more SUs can be connected to the splitter-combiner network 52 of the "master" ECU via lead 58 as mentioned above. In this way, additional subscriber service can be provided without the necessity of cutting into the cable network 14 to insert an additional tap 50.

II. Subscriber Unit

Figure 2:
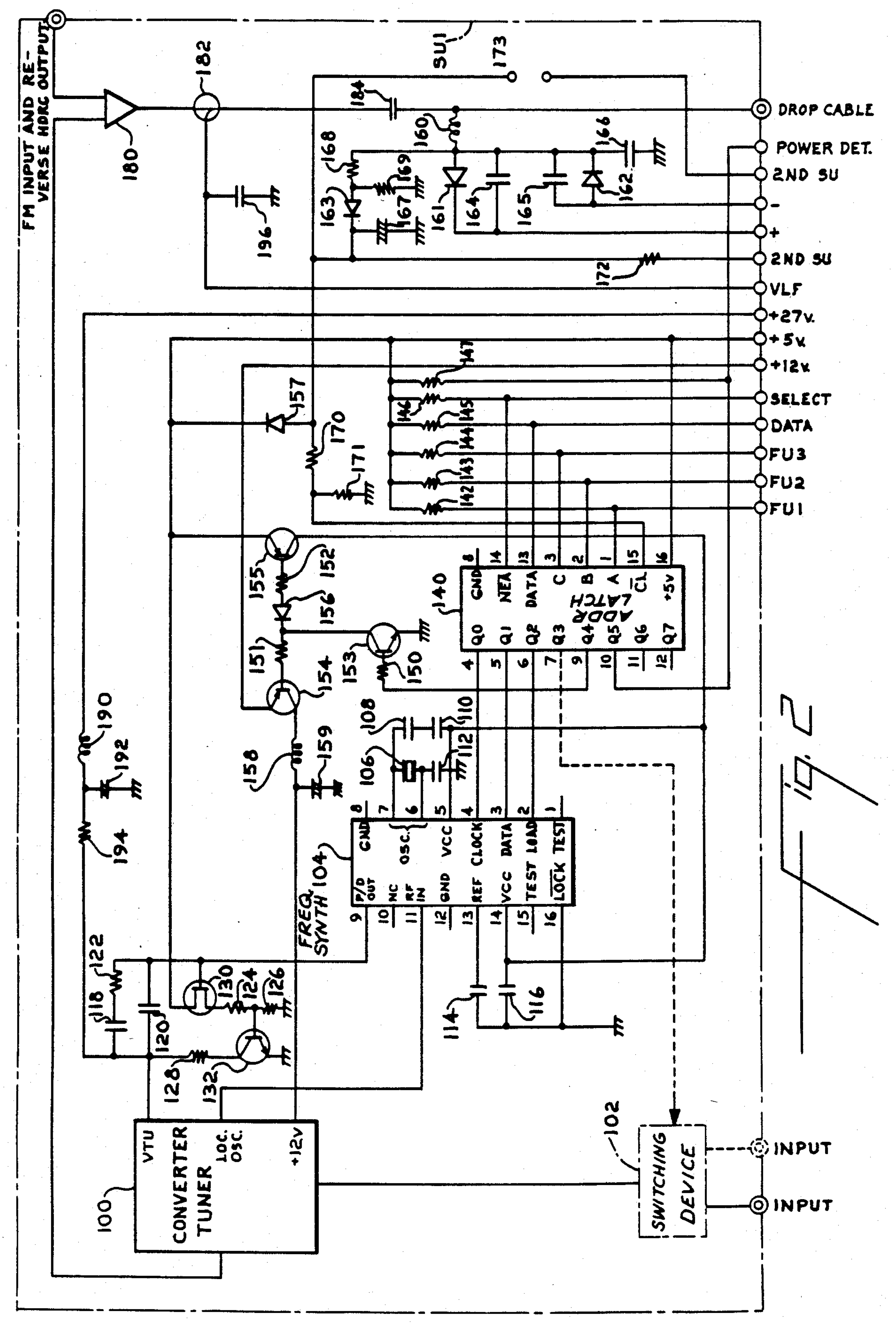
FIG. 2 is a schematic diagram of a typical subscriber unit ("SU") in the apparatus of FIG. 1.

FIG. 2 shows a typical subscriber unit SU1 in greater detail. The cable network signal from splitter-combiner network 52 (FIG. 1) in applied to conventional converter tuner 100 via the INPUT terminal and optional switching device 102. If the system had two cables rather than one as shown in FIG. 1, each SU would have two INPUT terminals, each connected to a respective one of the two cables. Switching device 102, which can include a conventional RF switching relay such as part number G4Y-152P available from Tateishi Electric Co. ("Omron") of Tokyo, Japan, would then be used to apply one or the other of the two cable signals to converter tuner 100. Switching device 102 would be controlled to select signals from one or the other CATV feeder cable by a conventional transistor switch (part of switching device 102) responsive to the state of the Q3 output on pin 7 of conventional addressable latch 140.

Converter tuner 100, together with conventional frequency synthesizer 104 and the circuits including crystal 106, capacitors 108, 110, 112, 114, 116, 118, 120, resistors 122, 124, 126, 128, and transistors 130 and 132, selects the portion of the cable television signal which the associated subscriber wishes to receive, converts that signal portion to a television signal on the channel to which the subscriber's television receiver 90 is tuned, and applies that signal to the DROP CABLE output terminal of the SU via conventional FM adder device 180, directional coupler 182, and capacitor 184. In one embodiment, converter tuner 100 may be part number CVA 213A (channel 3) or CVA 215A (channel 5) available from Toshiba Corporation of Tokyo, Japan (hereinafter "Toshiba"), or an equivalent device to convert the CATV signals to the same or other channels or frequencies. Frequency synthesizer 104 may be Toshiba part number TD6352P or an equivalent device.

The converter circuitry operates as follows. Via its DATA input lead, frequency synthesizer 104 receives a ten-bit main channel conversion coefficient ("MCCC") and a five-bit "swallow" conversion coefficient ("SCC"). The bits of these two coefficients, which are sometimes collectively referred to as the main and swallow ("MS") coefficients, are shifted into frequency synthesizer 104 at the clock rate established by its CLOCK input. When all the bits of the MS coefficients have been shifted into frequency synthesizer 104, they are latched into the synthesizer in response to a signal applied to the LOAD input terminal. Frequency synthesizer 104 then uses the MS coefficients in a known manner to (1) scale down the frequency of the voltage controlled LOCAL OSCILLATOR ("LOC. OSC.") output signal of converter tuner 100, (2) perform a phase detection comparison between the scaled down LOC. OSC. signal frequency and the reference OSCILLATOR ("OSC.") signal frequency provided in part by crystal 106, and (3) produce an error signal at the PHASE DETECTOR OUTPUT ("P/D OUT") terminal. The error signal produced by frequency synthesizer 104 is used to control the voltage controlled oscillator in converter tuner 100 to cause that oscillator to produce the demodulation signal frequency needed to convert the desired cable channel to the channel to which the subscriber's television receiver 90 is tuned.

Addressable latch 140, which may be Toshiba part number TC40H259 or an equivalent device, receives control and data signals from digital unit 55, stores that data, and outputs it to frequency synthesizer 104. In particular, addressable latch 140 receives data via its DATA input lead and processes that data in accordance with the function control signals applied to its A, B, and C input leads. The addressable latch in a particular SU is selected and thereby enabled by an appropriate signal applied to the NOT ENABLE ("NEA") input terminal of the addressable latch to be selected. (In general, the logical polarity of signals and signal names appearing in the drawings will be ignored in this specification. Thus, for example, whereas the signal at pin 14 of addressable latch 140 is actually an inverse enable signal, that signal is simply referred to in this specification by its functional name "NEA" without regard for its logical polarity.) Resistors 142–147 are pull-up resistors conventionally associated with selected inputs and outputs of addressable latch 140.

Addressable latch 140 also monitors whether or not the associated subscriber is supplying his or her share of the AC power needed to operate the ECU. This function is performed in response to the signal applied to the CLEAR ("CL") input terminal of addressable latch 140. If the associated subscriber is not providing AC power to the ECU via the subscriber's drop cable, the Q4 output signal of addressable latch 140 controls the circuit including resistors 150–152, transistors 153–155, diode 156, inductor 158, and capacitor 159 to shut off power to associated converter tuner 100. This prevents any subscriber who is not supplying AC power to the ECU from receiving television signals from the ECU. The Q5 output signal of addressable latch 140 also indicates whether or not the associated subscriber is supplying AC power. This Q5 output signal is applied to the POWER DETECT output terminal of the SU for use by digital unit 55.

Each primary SU such as SU1 has a power section which includes filtering inductor 160, diodes 161–163, capacitors 164–167, and resistors 168–169. Inductor 160 blocks VLF and CATV signals. Diodes 161 and 162 respectively produce half-wave rectified power signals ("+" and "−") from a 60 volt or less AC power signal on the associated drop cable. The + and − signals are respectively connected to and summed with other + and − power signals from other subscribers and SUs (i.e., SU2–SU6) in the ECU. The summed power signals then are applied to common power unit 60 which is described in detail below. Circuit elements 163 and 167–169 constitute another half-wave rectifier circuit which produces a DC output signal (which is clamped to approximately +5V by diode 157) as long as the associated subscriber is supplying AC power via the drop cable. This DC output signal is applied to the CL input terminal of addressable latch 140 via voltage dividing resistors 170–171 for the purpose described above.

If a secondary SU (e.g., SU2) is associated with SU1 to enable the subscriber to select and receive two multiplexed channels via the drop cable, then the DC output signal produced by elements. 163 and 167–169 is also applied to the secondary SU via resistor 172 in the primary SU and jumper 173 in the secondary SU. Jumper 173 is a completed connection only in the secondary SU. Power supply elements 160–169 are omitted from the secondary SU, as is capacitor 184. Also in the secondary SU, the terminal corresponding to the DROP CABLE terminal in FIG. 2 is connected to the FM INPUT AND REVERSE HDRC OUTPUT terminal of the associated primary SU. Thus, the secondary SU selects one television channel, adds the FM signal to the first television channel signal, and applies the resulting signal to the FM INPUT AND REVERSE HDRC OUTPUT terminal of the associated primary SU. The primary SU selects the second television channel, adds that signal to the signal received from the secondary SU, and applies the resulting signal to the subscriber's drop cable. In this way each subscriber can receive as many as two television channels multiplexed on a single drop cable. As mentioned above, each of the subscriber's television receivers is tuned to view one or the other of the two channels on the drop cable. The only other differences between the primary and secondary SUs are (1) the use of different local oscillator frequencies so that the primary and secondary SUs place the selected cable channels on different drop cable channels, and (2) the omission in the secondary SU of what would otherwise be a redundant VLF input/output.

The remaining elements in the SU are (1) a power filtering circuit including inductor 190 to block high-frequency signals from entering the +27 V power line, and capacitor 192 and resistor 194 to remove high-frequency ripple from the +27 V power line, and (2) capacitor 196 which is connected between the VLF input-/output lead and ground. Directional coupler 182 conveys VLF signals in both directions between the drop cable and the VLF input/output terminal.

III. Analog Unit

Figure 3:
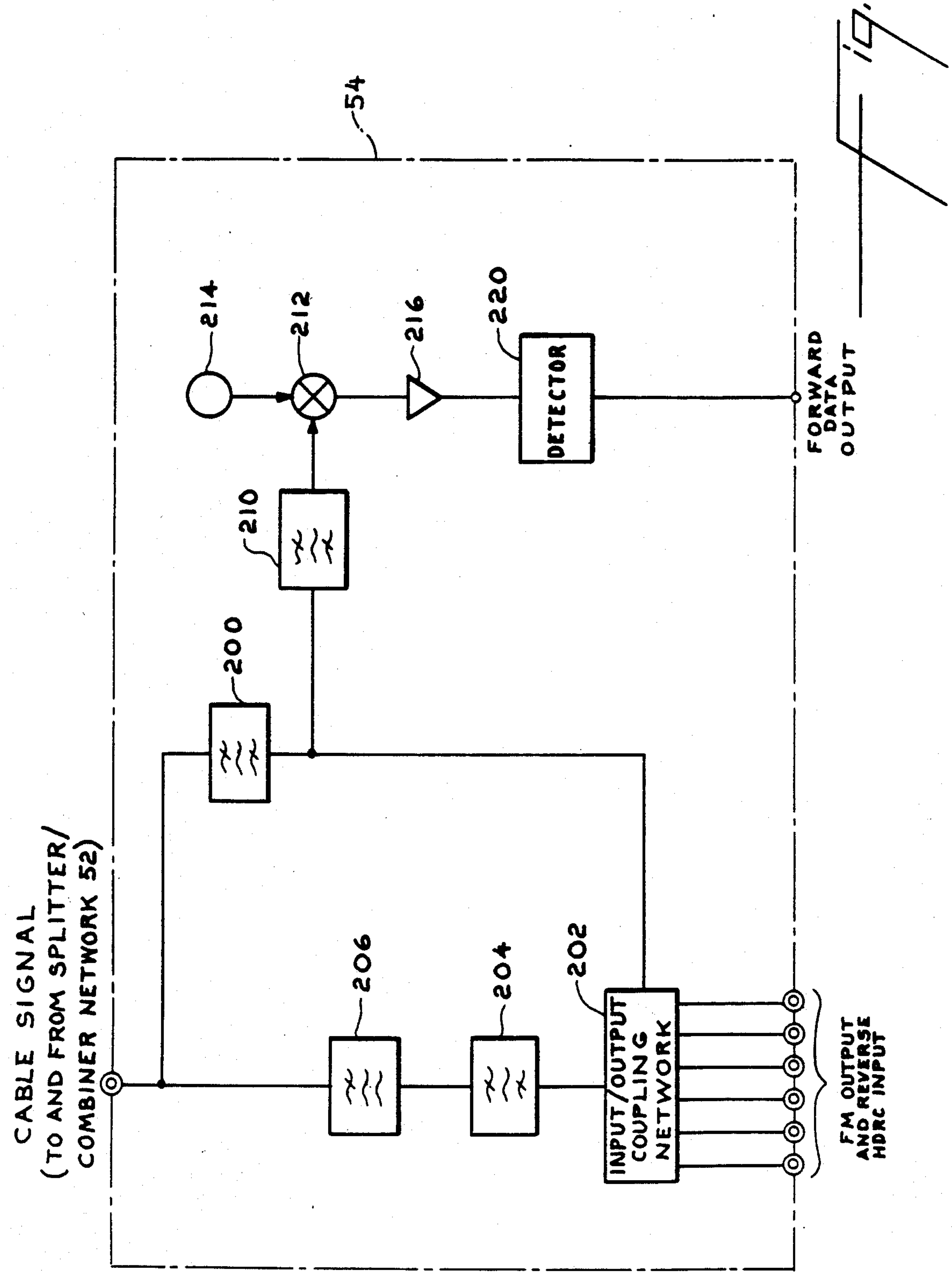
FIG. 3 is a block diagram of the analog unit in the apparatus of FIG. 1.

As shown in FIG. 3, analog unit 54 includes bandpass filter 200 for extracting the FM audio (approximately 88–108 MHz) and forward data (104 MHz plus or minus 100 KHz) signals from the CABLE SIGNAL. The FM signal is applied to each of the FM OUTPUT AND REVERSE HDRC INPUT terminals of analog unit 54 via input/output coupling network 202. Each FM OUTPUT AND REVERSE INPUT HDRC terminal of analog unit 54 is connected to the FM INPUT AND REVERSE HDRC OUTPUT terminal of a respective one of the SUs.

Input/output coupling network 202, bandpass filter 204, and lowpass filter 206 convey reverse HDRC signals (25 MHz plus or minus 0.5 MHz) from the FM OUTPUT AND REVERSE HDRC INPUT terminals to the CABLE SIGNAL terminal. Thus, filters 204 and 206 allow reverse HDRC signals to pass from subscriber premises SUB1, SUB2, etc. (FIG. 1) through the ECU and directly to cable network 14, thereby providing a data signal path for direct communication via cable network 14 between the subscribers and head end 12. However, filters 204 and 206 block other signals from directly passing from the subscribers and drop cables to cable network 14. In particular, filters 204 and 206 prevent signals, such as citizen band and other two-way radio signals, from entering cable network 14 and interfering with or degrading the reverse data signals sent from the ECUs to head end 12. In contrast, in a conventional two-way cable television system, such interfering signals typically are picked up at various poorly or loosely connected or dirty or corroded drop cable connections and cracked cable shields in the CATV system. The use of an HDRC channel and elements 204 and 206 in the CATV system of the present invention thus allows for reliable, high-speed, direct two-way communication between subscribers and head end 12 by isolating cable network 14, and the reverse data transmitted thereon, from interfering signals picked up by numerous drop cable connections.

Conventional bandpass filter 210 extracts the forward data signal from the output signal of bandpass filter 200. The forward data output signal of bandpass filter 210 is applied to mixer 212 for mixing with the 108.5 MHz output signal of local oscillator 214. The resulting 4.5 MHz output signal is amplified by conventional intermediate frequency amplifier 216 and applied to conventional detector 220. Detector 220 converts the frequency-modulated ("FM") forward data signal to a base band forward data signal which is applied to the FORWARD DATA OUTPUT terminal of analog unit 54 for application to digital unit 55.

IV. Communication Unit

Figure 4:
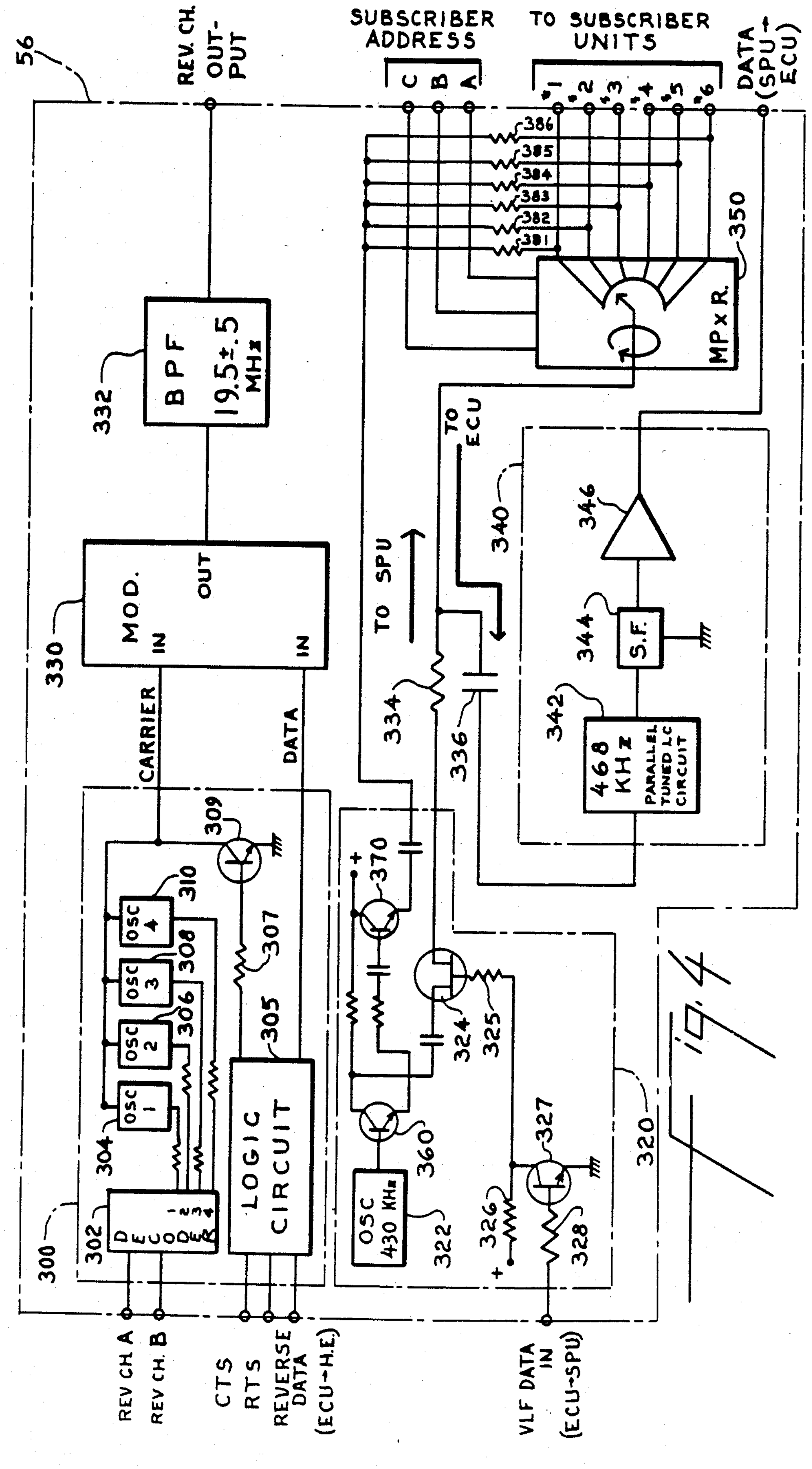
FIG. 4 is a schematic block diagram of the communication unit in the apparatus of FIG. 1.

FIG. 4 shows communication unit 56 in greater detail. Communication unit 56 is controlled by digital unit 55 and facilitates communication of (1) reverse data from the ECU to the CCC of head end 12, and (2) VLF data to and from the ECU and each associated subscriber's SPU.

For communicating information from the ECU to head end 12, communication unit 56 includes reverse channel selector 300, conventional modulator 330, and conventional bandpass filter 332. Channel selector 300, on command from digital unit 55, selects any one of four available reverse channels for transmission of ECU reverse data to head end 12. A two-bit reverse channel selection signal ("REV. CH. A" and "REV. CH. B") is applied from digital unit 55 to conventional binary decoder 302. Depending on the bit combination present on the A and B inputs of decoder 302 (i.e., 00, 01, 10, or 11), one of the four outputs of decoder 302 will be low and all other outputs will be high. The outputs of decoder 302, each of which is connected to a respective one of four crystal-controlled oscillators 304, 306, 308, and 310, in turn cause one of the four oscillators to be operative. Each oscillator 304, 306, 308, and 310 is tuned to oscillate at a different frequency corresponding to one of the frequencies of the four channels available for reverse data communication. In one embodiment, oscillators 304, 306, 308, and 310 operate at 19.125 MHz, 19.375 MHz, 19.625 MHz, and 19.875 MHz, respectively. It will, of course, be appreciated that other frequencies and a different number of reverse channels can be used if desired.

The output of the particular oscillator selected by decoder 302 is applied to modulator 330 as a carrier frequency for modulation by the reverse data to be transmitted to head end 12. Modulator 330 can be any conventional modulator for modulating digital signals onto an analog carrier. In a preferred embodiment, modulator 330 is a binary phase-shift keyed ("BPSK") modulator, such as part number MC 1496 available from Motorola Corporation of Phoenix, Arizona (hereinafter "Motorola"). Data is modulated for transmission on each reverse channel at a data rate of 50 Kbps.

Channel selector 300 also includes conventional logic circuit 305 (comprised, for example, of conventional NOR and NAND gates) for receiving and enabling the transmission of digital reverse data from digital unit 55 to head end 12, and for receiving a request-to-send ("RTS") signal from and providing a clear-to-send ("CTS") signal to digital unit 55. If digital unit 55 is not sending data to head end 12, digital unit 55 maintains the RTS lead to logic circuit 305 in a logical "0" state. This causes logic circuit 305 to apply a signal to transistor 309 through current-limiting resistor 307, thus shorting the output of oscillators 304, 306, 308, and 310 to ground and preventing the application of carrier to modulator 330. In addition, logic circuit 305 (1) maintains the CTS lead in a logical "1" state, thus signaling to digital unit 55 that it is not clear to send data, and (2) disables transmission of data signals to modulator 330. If digital unit 55 desires to send data to head end 12, it raises the RTS lead. This causes logic circuit 305, after a short delay, to (1) remove the signal from transistor 309 to allow a carrier signal to be applied to modulator 330, (2) present a logical "0" state on the CTS lead to signal digital unit 55 that it is clear to send data, and (3) enable the passage of data signals to modulator 330. Digital unit 55 may transmit data only while CTS is in a logical "0" state.

Modulator 330 modulates the reverse data presented at its data input line onto the carrier signal presented at its carrier input line. The output of modulator 330 is a modulated signal having a selected one of four carrier frequencies which is applied to bandpass filter 332. Bandpass filter 332 has a 1 MHz passband centered at 19.5 MHz. The output of bandpass filter 332 is reverse channel output, which is applied to splitter-combiner network 52 (FIG. 1) for transmission via cable network 14 to head end 12.

For enabling communications between the ECU and each associated subscriber SUB1, SUB2 . . . etc., communication unit 56 includes bi-directional multiplexer 350 for connecting a first input/output line to any one of a plurality of second input/output lines as a function of a binary code appearing on subscriber address lines A, B, and C. Subscriber address lines A, B, and C are connected to digital unit 55 to enable digital unit 55 to selectively connect any one of the plurality of second input/output lines to the first input/output line. In a preferred embodiment, multiplexer 350 is a 1-to-8 multiplexer, such as Toshiba part number TC4051BP, having 8 second input/output lines, only 6 of which are used (one for each of up to six SUs). Each of the second input/output lines is connected to the VLF input/output terminal of a respective one of subscriber units SU1, SU2 . . . etc. (see FIG. 2). By presenting different code combinations on address lines A, B, and C (i.e., 000, 001, 010, 011, 100, or 101), digital unit 55 can select a particular drop cable to enable a particular subscriber to communicate with the ECU.

For receiving communications from subscribers, the first input/output line of multiplexer 350 is connected through DC-blocking capacitor 336 to the input of very low frequency ("VLF") demodulator 340. VLF demodulator 340 receives VLF-modulated analog signals transmitted from the SPUs at a data rate of 1200 bps (or any other convenient rate) and demodulates those signals into serial digital data for processing by digital unit 55. In one embodiment, the VLF signals received from the SPUs are on/off amplitude-shift keyed ("ASK") modulated signals having a carrier frequency of 468 KHz. A logical "1" (mark) is represented by 100% carrier, and a logical "0" (space) is represented by 0% carrier. Demodulator 340 includes a conventional parallel tuned LC circuit 342 tuned to produce an output in response to the receipt at its input of a signal having a frequency of 468 KHz. The output of circuit 342 is applied to surface acoustic wave ("saw") filter 344 also tuned to 468 KHz. The output of saw filter 344 in turn is connected to conventional amplifier 346 which produces a mark and space data output in response to the presence and absence of carrier. This data output is applied to digital unit 55 for processing as data received from the SPUs.

For communication from the ECU to the SPUs, data from digital unit 55 is applied to the data input connection of VLF modulator 320. In one embodiment, VLF modulator 320 modulates digital data signals at a data rate of 1200 bps (or any other convenient rate) from digital unit 55 into an on/off ASK analog VLF signal having a carrier frequency of 430 KHz. Data from digital unit 55 turns on and off transistor 327 (via current-limiting resistor 328). Transistor 327 in turn controls on and off FET transistor switch 324 via resistors 325 and 326. The 430 KHz carrier signal produced by conventional crystal-controlled oscillator 322 is applied to the base of transistor 360 which is connected in such a way that the carrier signal appears at the transistor's collector shifted 180° relative to the carrier signal appearing at the transistor's emitter. The collector carrier signal is switched on and off by transistor switch 324 in accordance with the VLF data to be transmitted to an SPU. This switched carrier signal is applied to the first input-/output line of multiplexer 350 via resistor 334 for transmission to one of the plurality of subscriber SPUs. The continuous carrier signal appearing at the emitter of transistor 360 is applied to all of the second input/output lines of multiplexer 350 via transistor 370 and resistors 381–386 In this way, there is constant 430 KHz carrier on all of the second input/output lines of multiplexer 350 except when the carrier on one of those lines is cancelled by the switched carrier from transistor switch 324.

V. Digital Unit

As shown in FIG. 5, digital unit 55 has two major subparts. Those subparts are (1) signal processing portion 55*a* (shown in FIGS. 5*a*–*5f*), and (2) memory portion 55*b* (shown in FIGS. 5*g*–*5i*). These two portions of digital unit 55 are interconnected by means of the terminals represented by rectangles and numbered 01–40. For example, the terminal numbered 01 in FIG. 5*f* is connected to the correspondingly numbered terminal in FIG. 5*g*.

Digital unit 55 includes conventional universal synchronous or asynchronous receiver/transmitter ("USART") 400, such as part number 8274 available from Intel Corporation of Santa Clara, California (hereinafter "Intel"). USART 400 converts HDLC-formatted serial forward data received from head end 12 into parallel data for processing by the remainder of digital unit 55. USART 400 also converts parallel reverse data generated by other elements in digital unit 55 into HDLC-formatted serial data for transmission back to head end 12. The operation of USART 400 is augmented by gate array 402, shown in detail in FIGS. 5*k*–*5s*, which performs various functions such as converting non-return to zero inverted ("NRZI") forward data from head end 12 on the FORWARD DATA lead to non-return to zero ("NRZ") "receive" data on the RXD lead. Gate array 402 also converts NRZ "transmit" data on the TXD lead to NRZI reverse data on the REVERSE
ATA lead.

Figure 6:
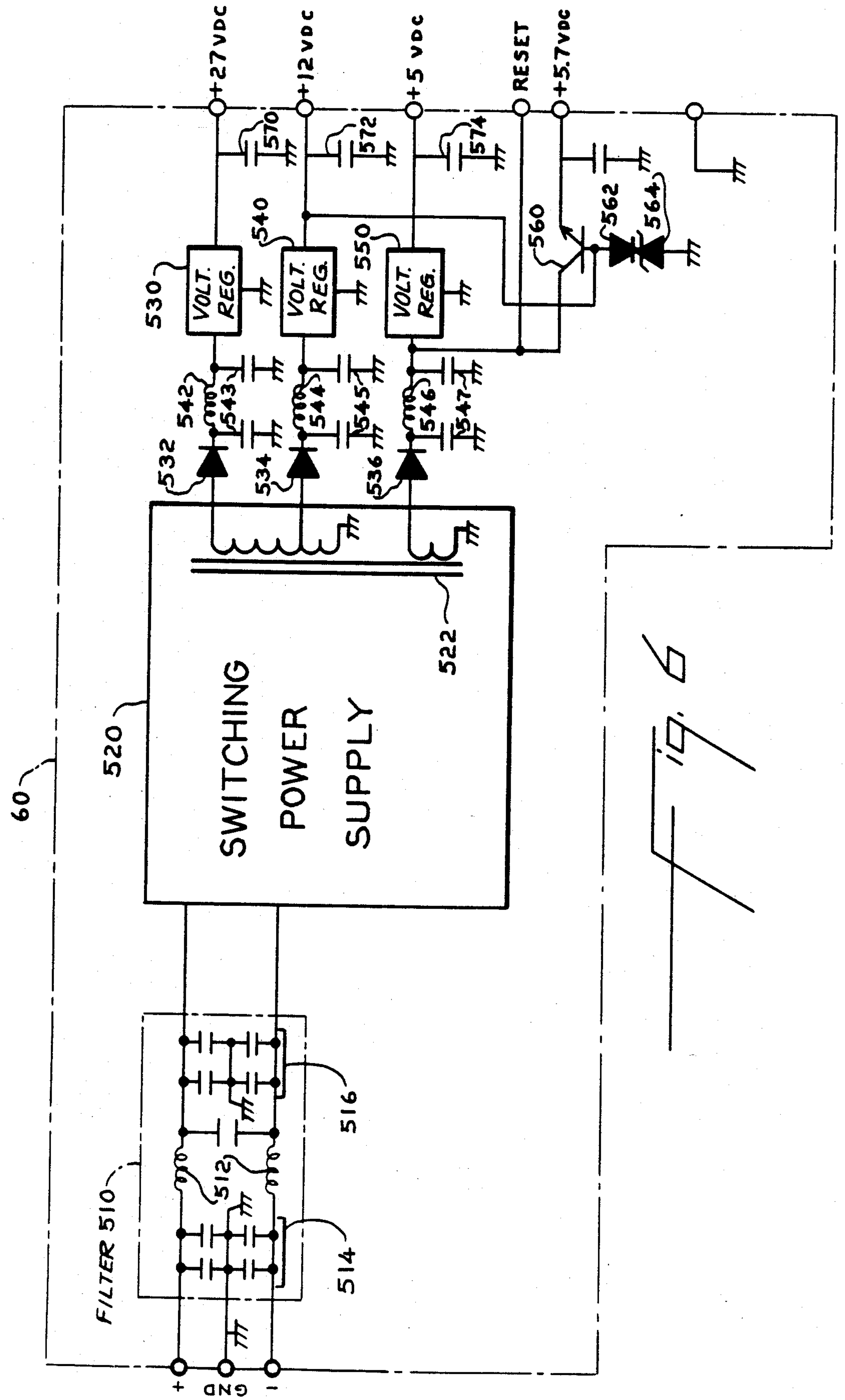
FIG. 6 is a schematic diagram of the common power unit in the apparatus of FIG. 1.

USART 400 and gate array 402 are also interconnected by INTERRUPT ("INT"), CLOCK ("CLK"), RXC, TXC, READ ("RD"), WRITE ("WR"), and RESET ("RES") leads. The INT signal is generated by USART 400, is inverted by gate array 402, and is applied to the INT0 terminal of microprocessor 420. This signal is used to alert microprocessor 420 to the occurrence of an important event in USART 400 (e.g., the fact that a character has been received or transmitted via the FORWARD or REVERSE DATA leads). The CLK3 output signal of gate array 402 is derived from the CLKOUT output signal of microprocessor 420. In particular, the 6 MHz CLKOUT signal is divided by two by gate array 402 to produce the 3 MHz CLK3 output signal which is applied to USART 400. The RXC output signal of gate array 402 is a clock signal derived by gate array 402 from the NRZI forward data signal. The TXC input signal of gate array 402 is a clock signal produced by microprocessor 420 to control the rate at which reverse data is transmitted back to head end 12. The source of the RD and WR signals is microprocessor 420. These signals respectively cause other devices in digital unit 55 to output data so that microprocessor 420 can read it, or cause other devices in digital unit 55 to input data from microprocessor 420. The ultimate source of the RESET or RES signals is power detect circuit 480. The POWER DETECT input terminal of digital unit 55 is connected to the RESET output terminal of common power unit 60 (FIG. 6). Power detect circuit 480 produces an output signal for resetting microprocessor 420 when power is restored following a power outage. Microprocessor 420 responds to this RES input signal by producing a RESET output signal which is applied to the RESET input terminal of gate array 402. Gate array 402 applies an inverted RESET signal to USART 400, microcomputer 50, and hex inverting buffer 465.

Figure 5D:
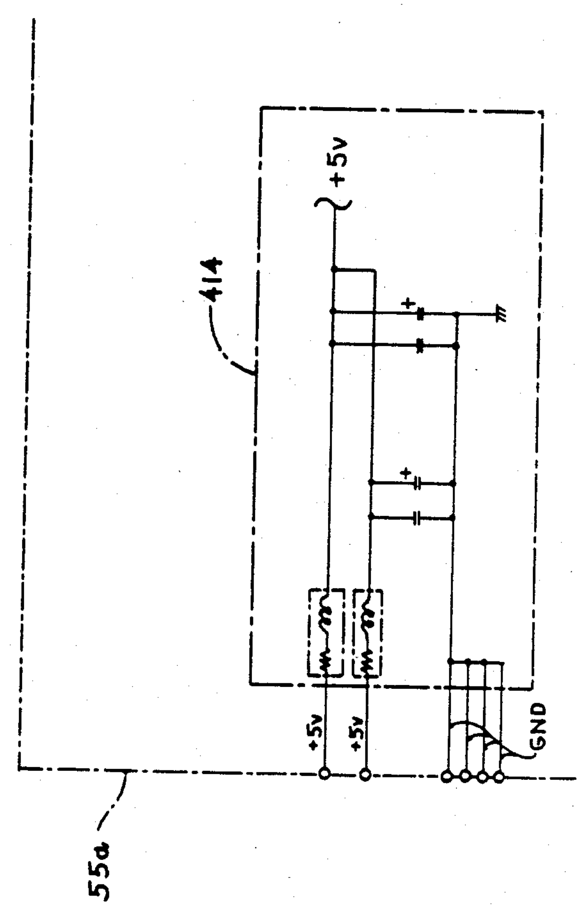
FIG. 5*a*–5*i* , which are connected together as shown in FIG. 5*j*, are collectively a schematic block diagram of the digital unit in the apparatus of FIG. 1.
Figure 5B:
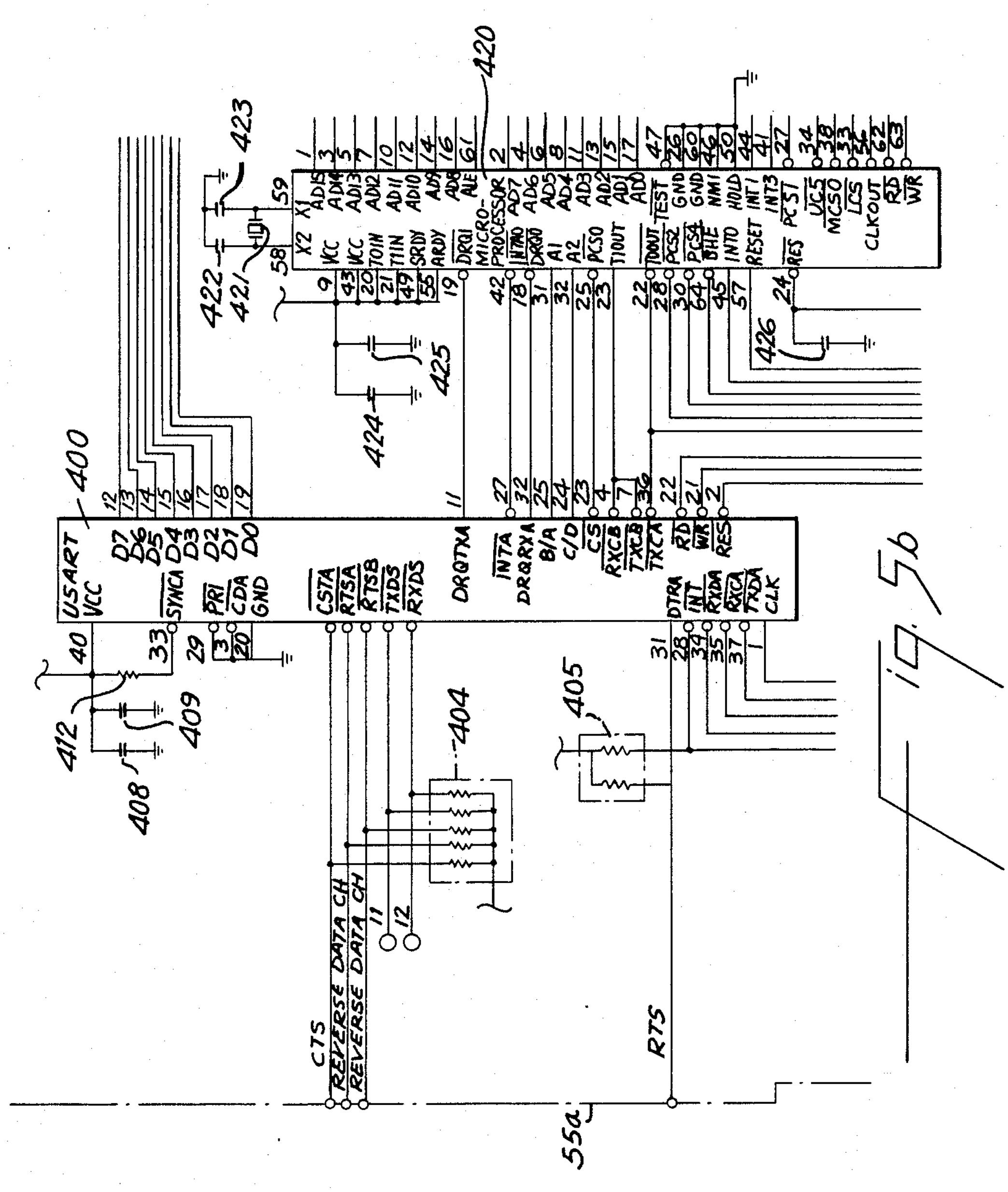
Figure 5C:
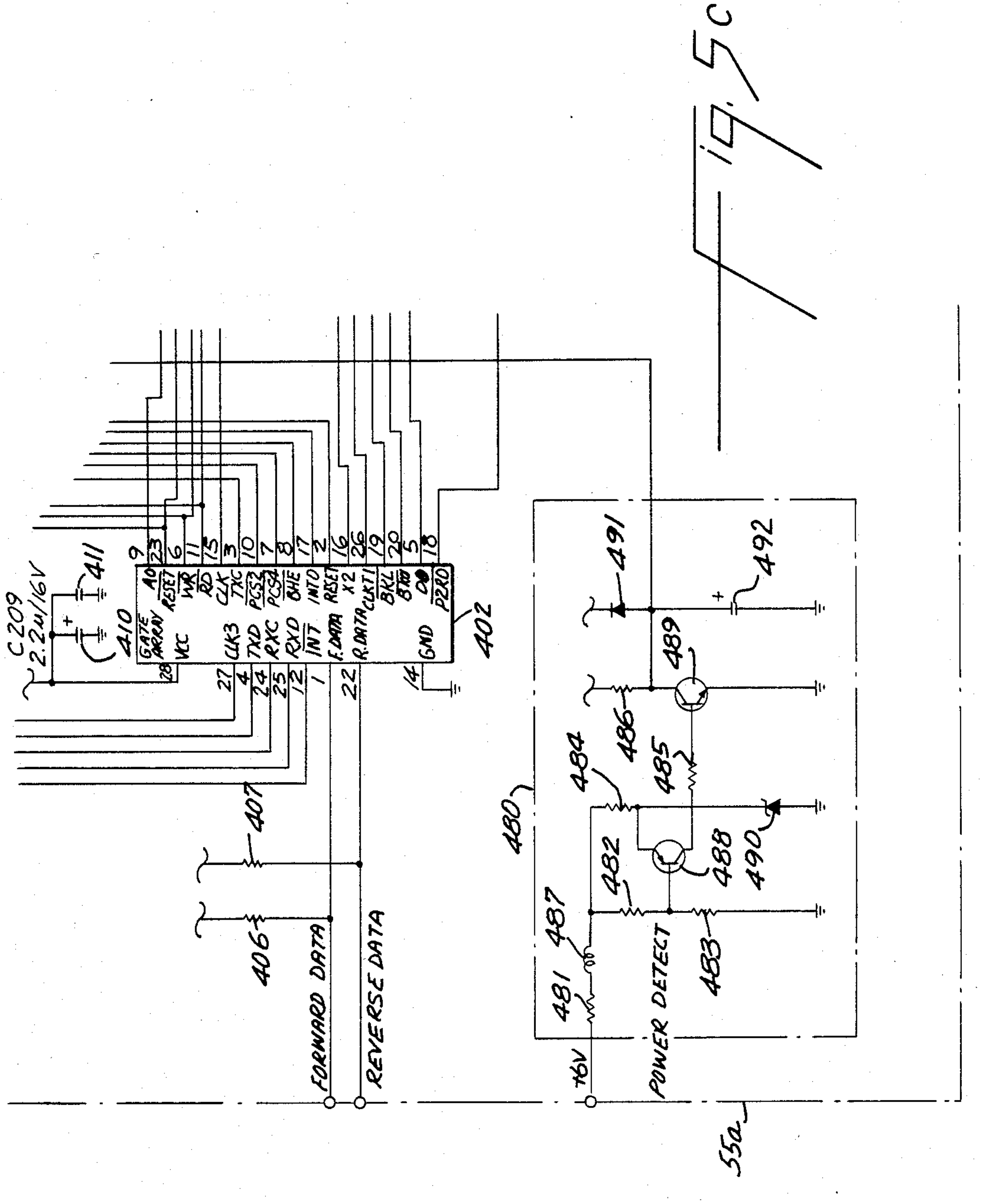
Figure 5D:
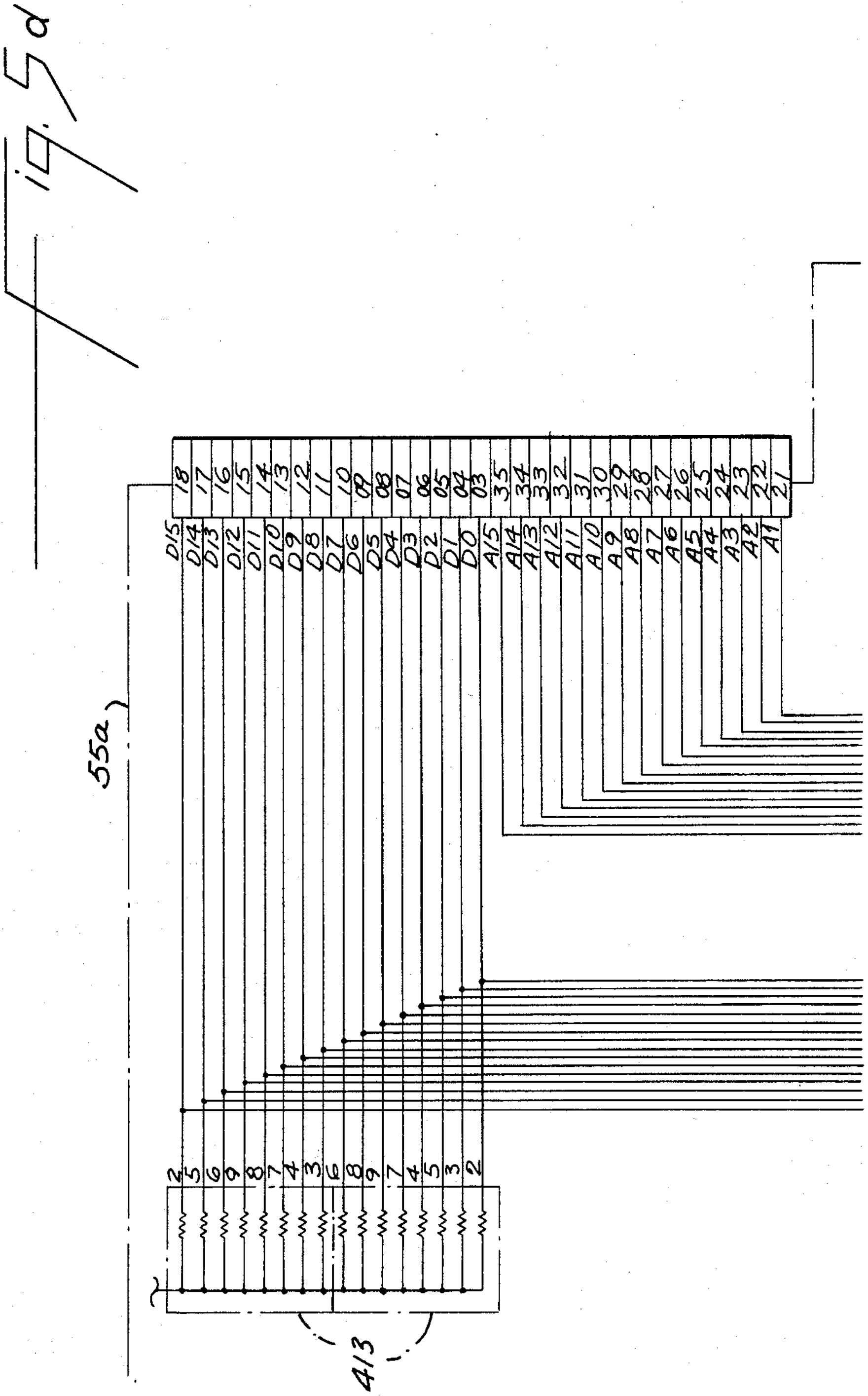
Figure 5E:
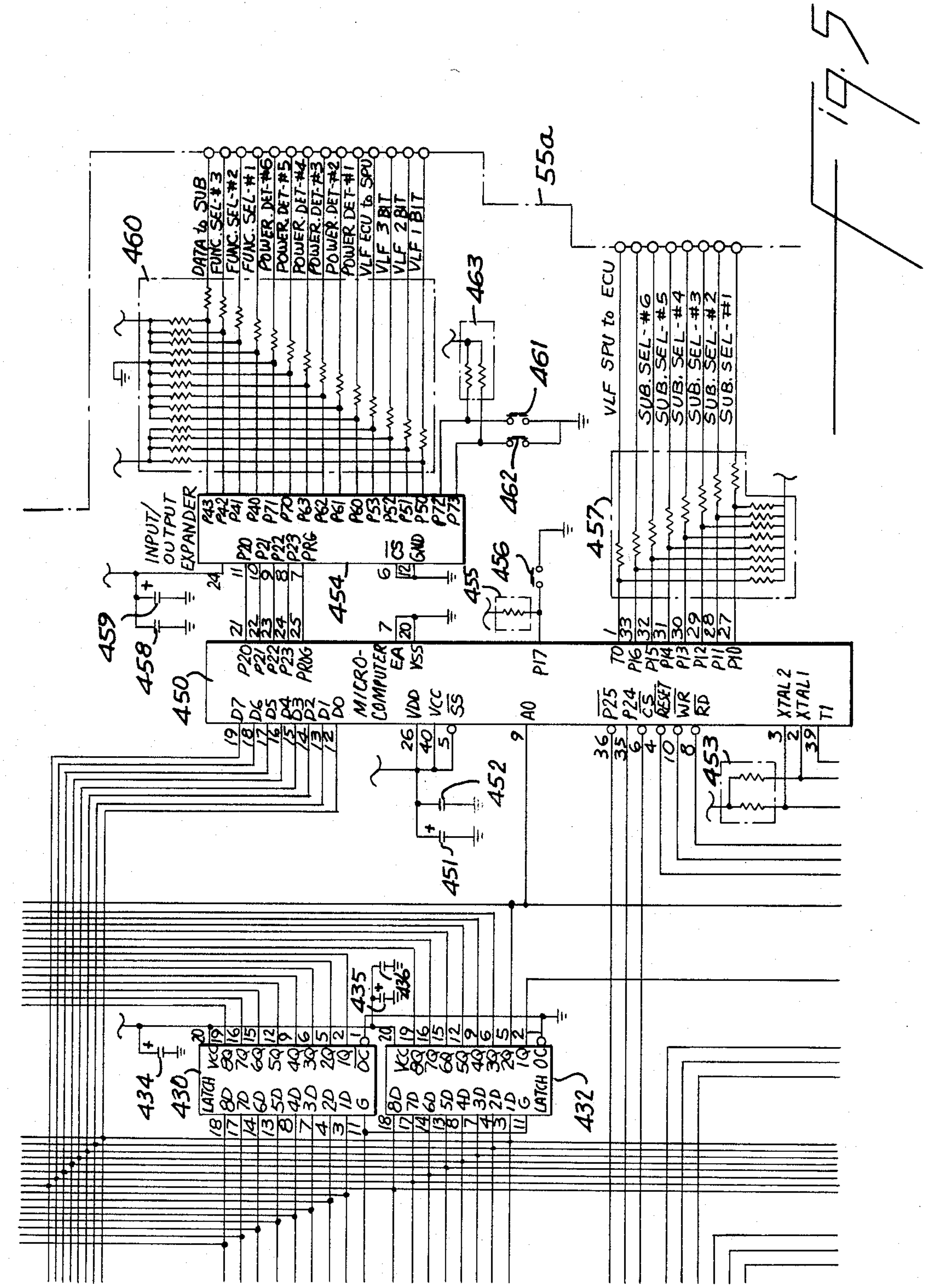
Figure 5F:
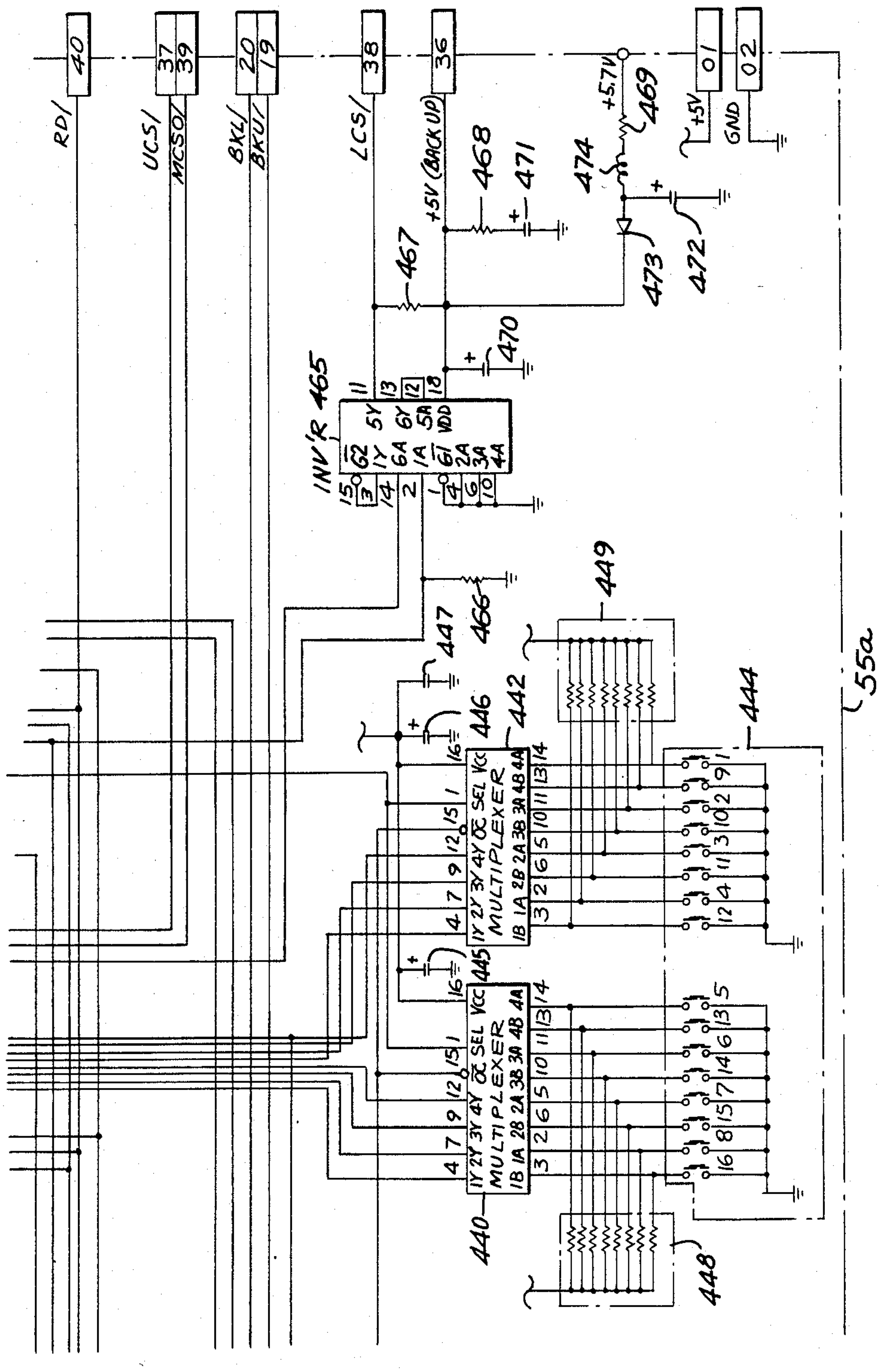
Figure 59:
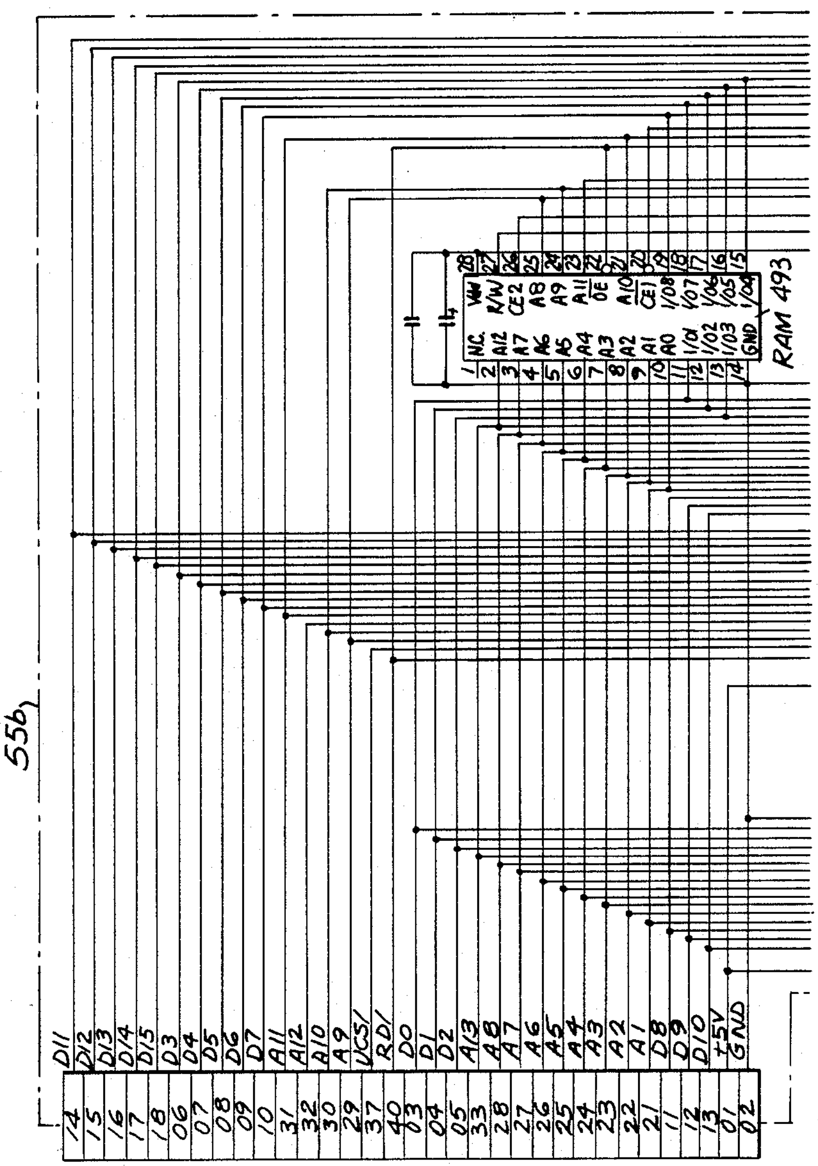
Figure 5H:
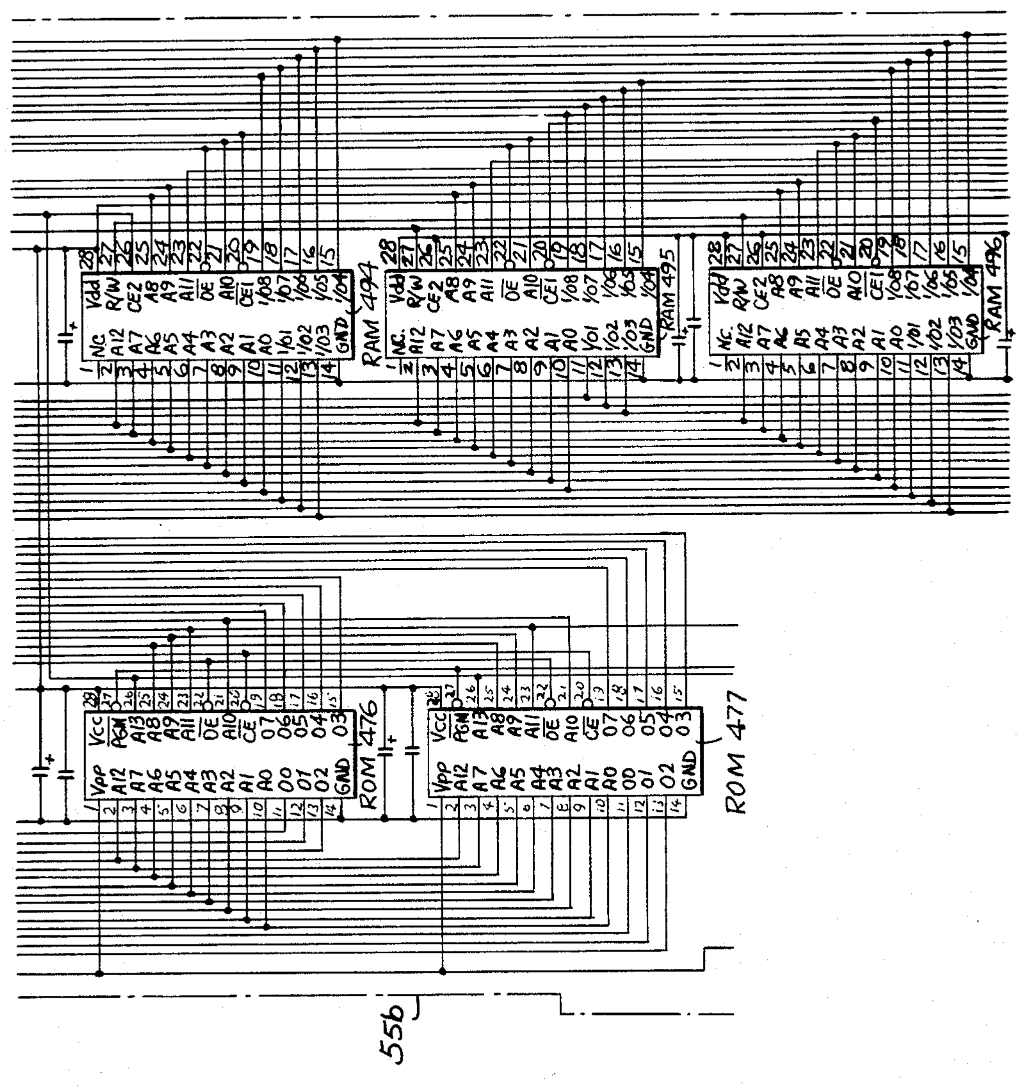
Figure 5I:
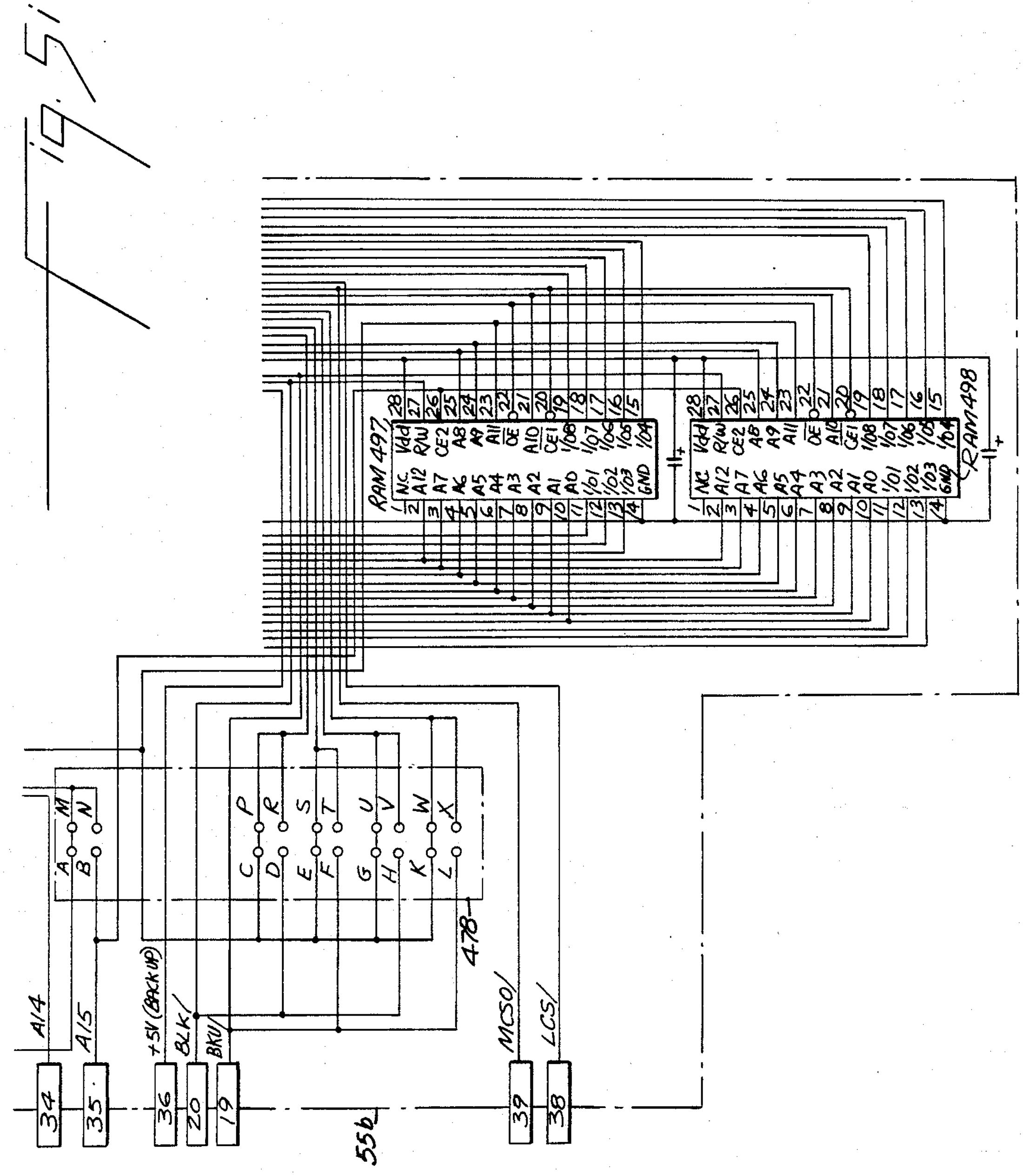
Figure 5J:
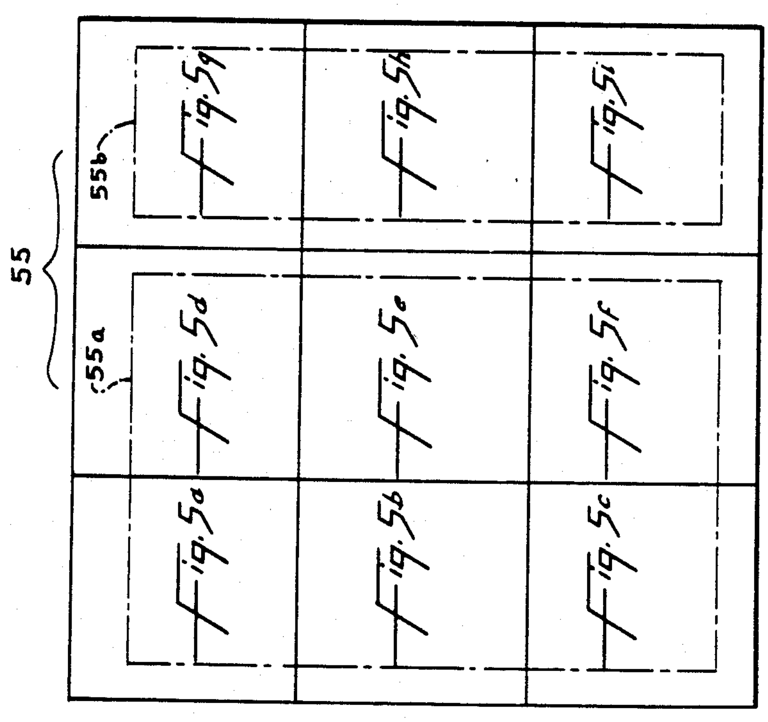
FIGS. 5*k*–5*s* are collectively a schematic diagram of the gate array shown in FIG. 5*c*.
Figure 5K:
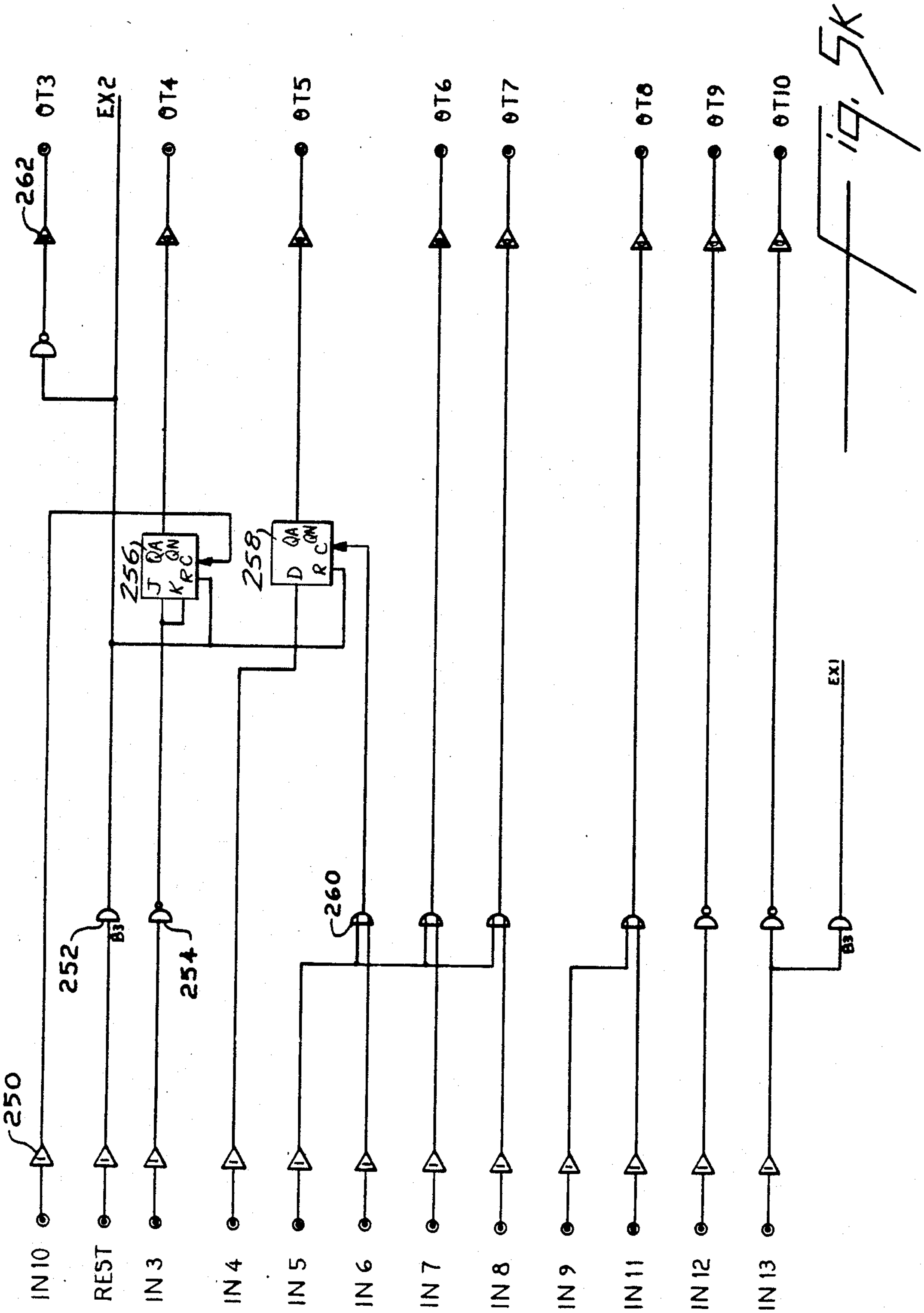

Gate array 402 is shown in detail in FIGS. 5*k*–*5s*. In FIG. 5*k*, reference number 250 denotes a typical input buffer; reference number 252 denotes a typical AND gate; reference number 254 denotes a typical NAND gate; reference number 256 denotes a typical J-K flip-flop; reference number 258 denotes a typical D-type flip-flop; reference number 260 denotes a typical OR gate; and reference number 262 denotes a typical output buffer. In FIG. 5*s*, reference number 254 denotes a typical latch. The following Table B correlates the gate array 102 pin numbers shown in FIG. 5*c* with the lead labels used in FIGS. 5K–5*s*:

TABLE B

| FIG. 5c Pin Number | Lead Label in FIGS. 5k-5s |
|---|---|
| 1 | IN1 |
| 2 | REST |
| 3 | IN10 |
| 4 | IN3 |
| 5 | IN4 |
| 6 | IN5 |
| 7 | IN6 |
| 8 | IN7 |
| 9 | IN8 |
| 10 | IN9 |
| 11 | IN11 |
| 12 | IN12 |
| 13 | — |
| 14 | GND |
| 15 | IN13 |
| 16 | OT10 |
| 17 | OT9 |
| 18 | OT8 |
| 19 | OT7 |
| 20 | OT6 |
| 21 | OT5 |
| 22 | OT4 |
| 23 | OT3 |
| 24 | OT2 |
| 25 | OT1 |
| 26 | OT12 |
| 27 | OT11 |
| 28 | VCC |

Figure 5M:
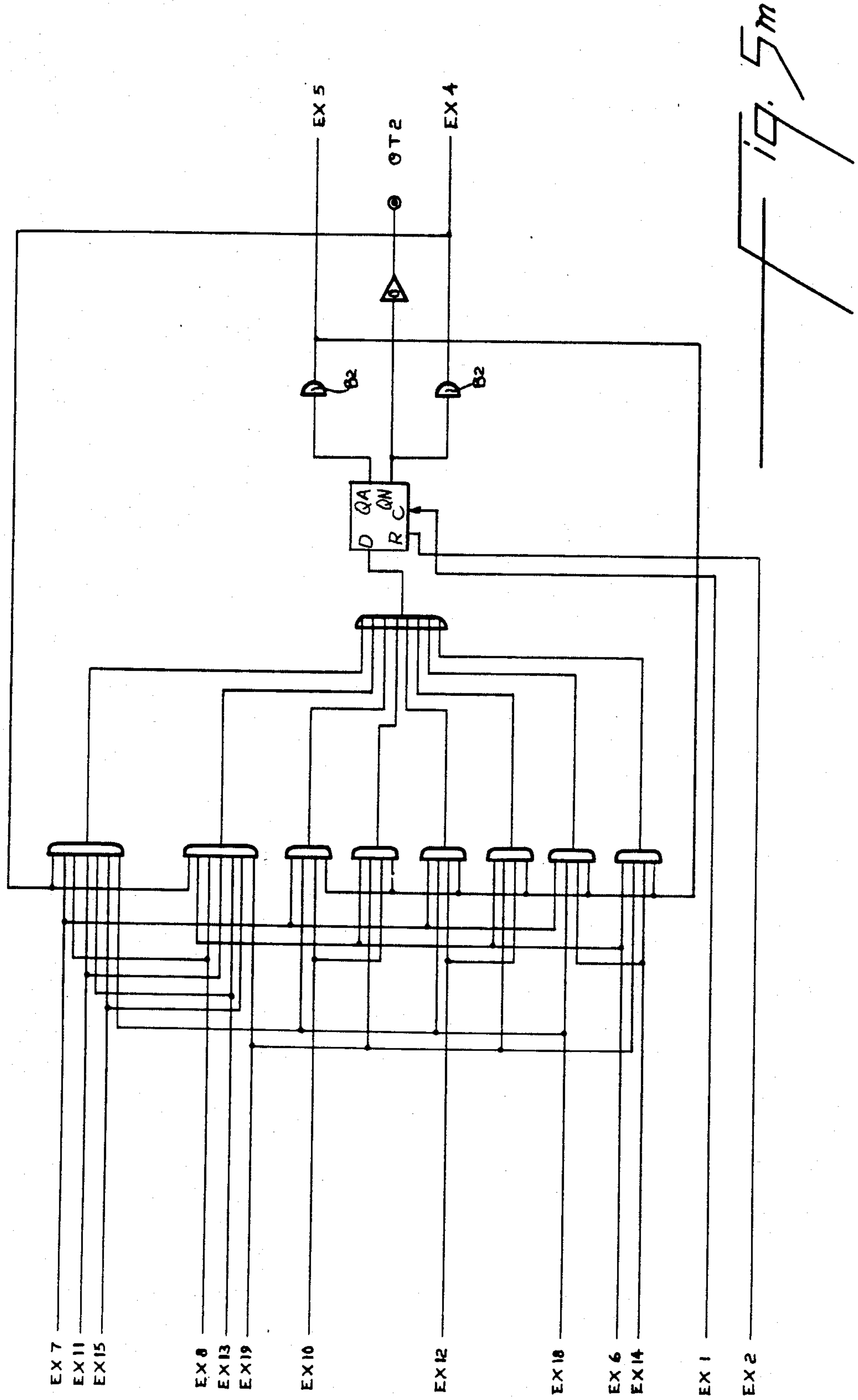
Figure 5N:
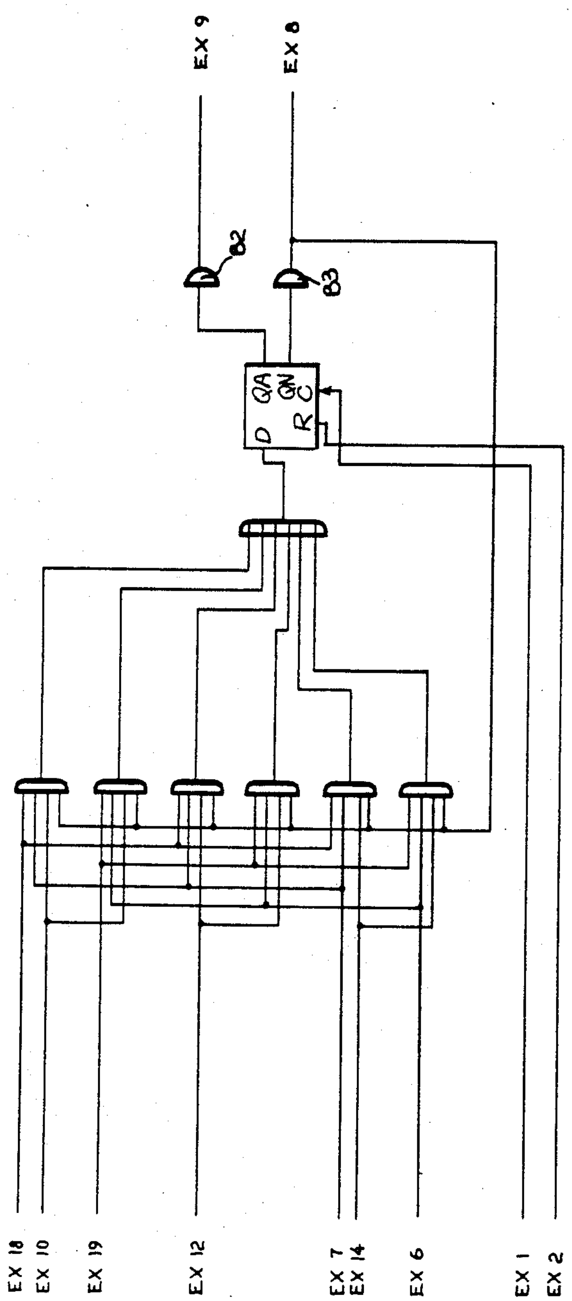
Figure 50:
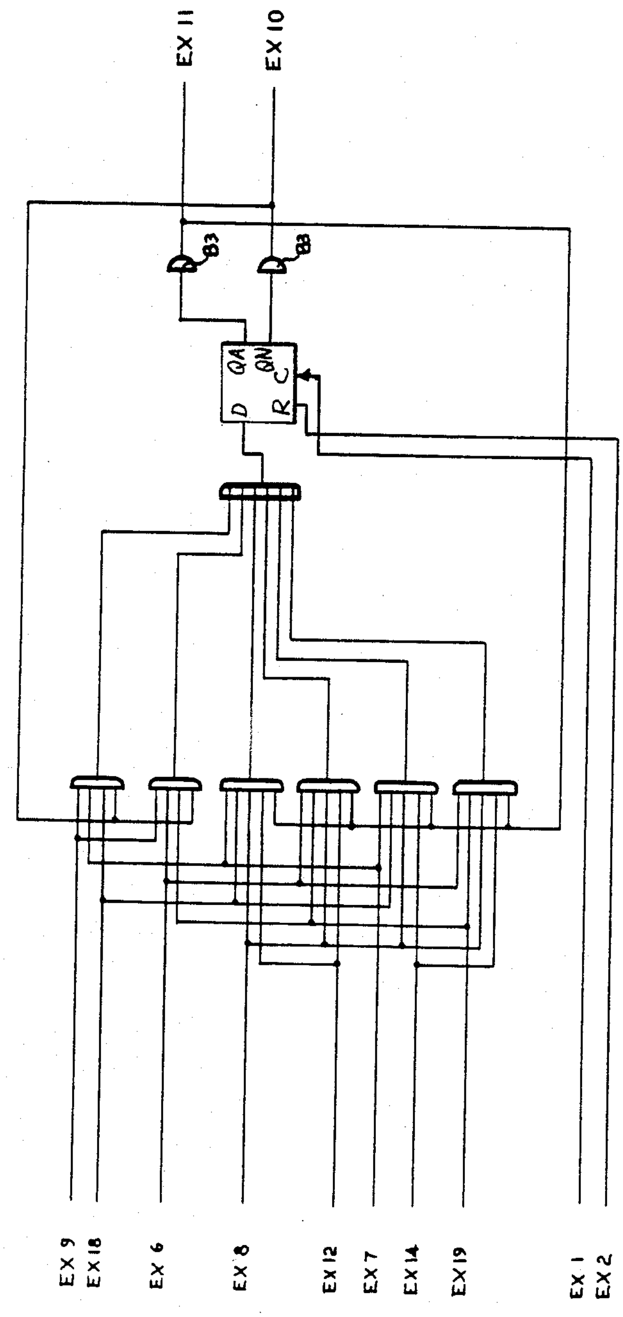
Figure 5P:
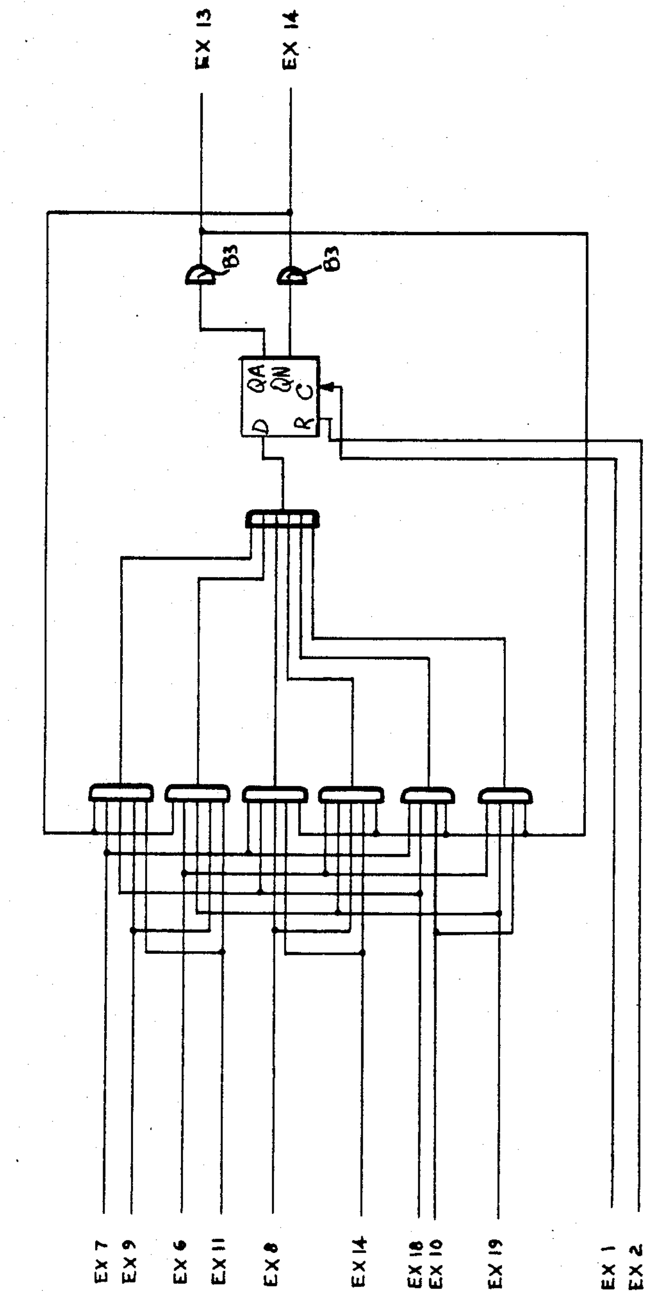
Figure 5G:
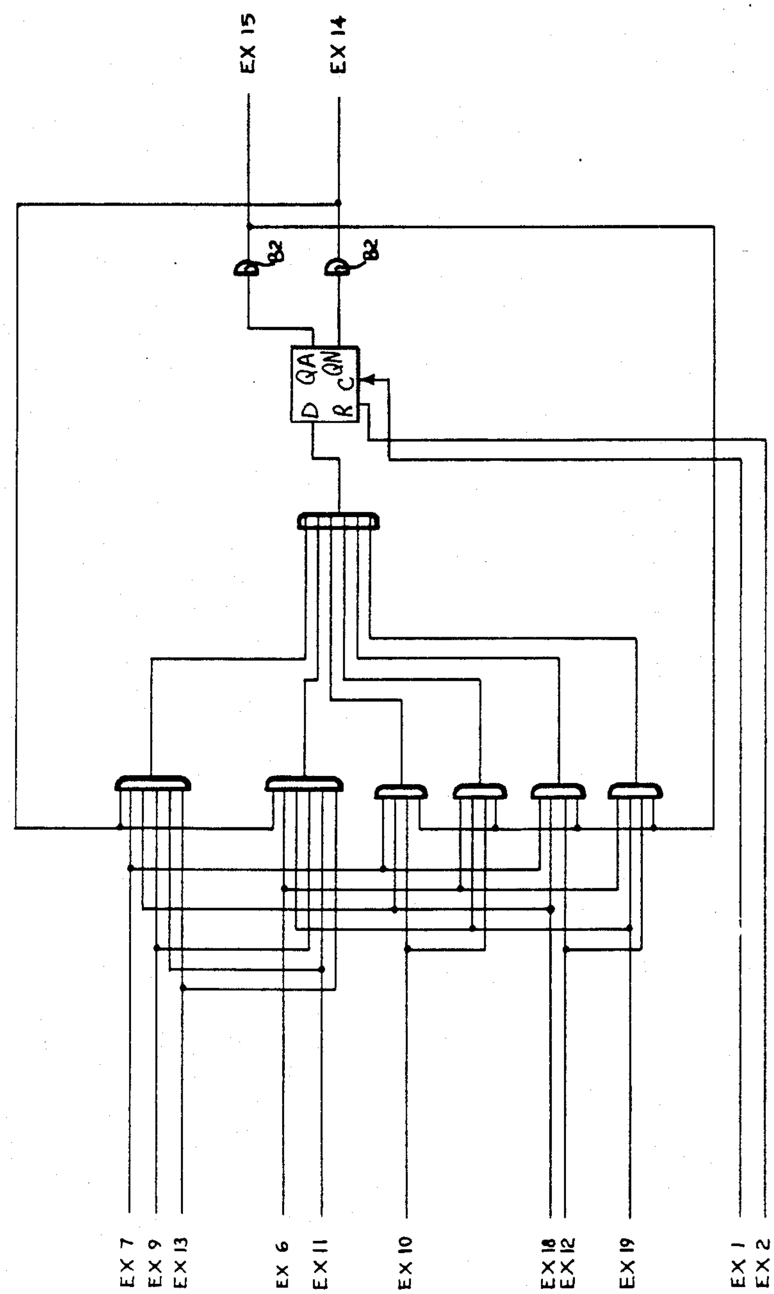
Figure 5R:
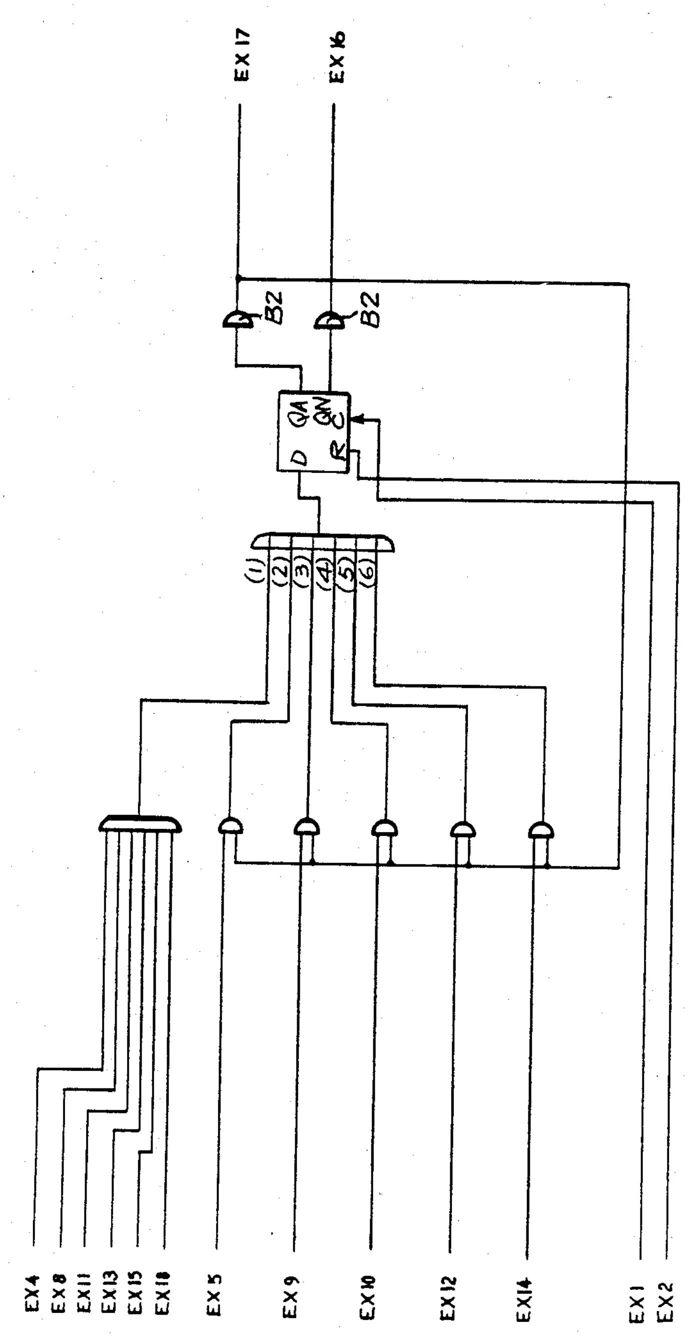
Figure 55:
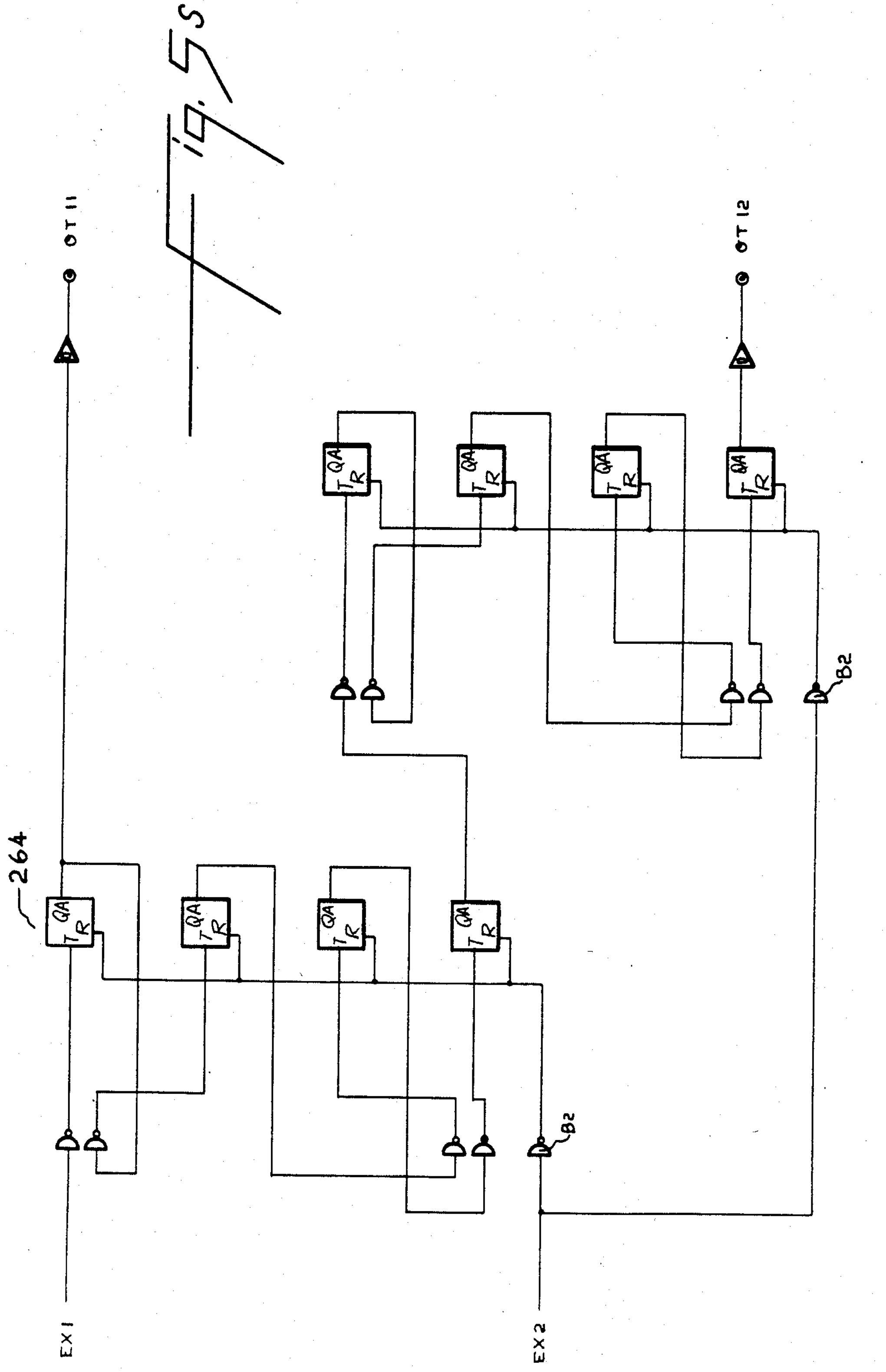

In addition, leads with EX labels in FIGS. 5*k*–5*s* are connected to similarly labelled leads in FIGS. 5*k*–5*s*. For example, the output lead labelled EX4 in FIG. 5*m* is connected to the input lead labelled EX4 in FIG. 51. The detailed operation of the gate array circuits shown in FIGS. 5*k*–5*s* will be readily apparent to those skilled in the art from the circuits themselves and from the preceding and following functional description of gate array 402 in relation to the other components of digital unit 55.

USART 400 has a REQUEST T0 SEND ("RTS" or "DTRA") lead by which it interrogates communication unit 56 to ensure that the communication unit is ready to transmit reverse data to head end 12. If communication unit 56 is ready to transmit reverse data, the communication unit sends an appropriate signal to USART 400 on the CLEAR TO SEND ("CTS" or "CTSA") lead. USART 400 selects the reverse data channel to be used by means of signals on the REVERSE DATA CHANNEL SELECT A and B ("RTSA" and "RTSB") leads, which are also connected to communication unit 56.

Pull-up resistor networks 404–407 are connected in the conventional way between +5 V power supply circuit 414 and the CTS, RTSA, RTSB, RTS, INTERRUPT, FORWARD DATA, and REVERSE DATA leads, as well as to the TXDB and RXDB leads which are not used. Power supply circuit 414 is configured conventionally to provide noise protection for the +5 V power signal used throughout digital unit 55. The VCC terminal of USART 400 is also conventionally connected to +5 V power supply 414 in parallel with capacitors 408 and 409. The VCC terminal of gate array 402 is similarly connected to the +5 V power supply in parallel with capacitors 410 and 411. The SYNCA terminal of USART 400 is clamped to the +5 V supply via resistor 412. The PRI, CDA, and GROUND ("GND") leads of USART 400 and the GROUND ("GND") lead of gate array 402 are all connected to ground.

USART 400 applies parallel forward data to the data bus of digital unit 55 via terminals D0–D7. USART 400 also receives parallel reverse data from the data bus via terminals D0–D7. The data bus distributes data among USART 400, microprocessor 420, latches 430 and 432, multiplexers 440 and 442, microcomputer 450, and memory unit 475. Pull-up resistor network 413 is connected in the conventional way between the +5 V power supply and the data bus leads.

Microprocessor 420, which can be a conventional microprocessor such as Intel part number 80186, performs such functions as (1) communicating with head end 12, (2) processing subscriber requests (e.g., channel selection), and (3) communicating with microcomputer 450. In addition to the data bus connections, microprocessor 420 communicates with USART 400 via its DRQ1, INTA0, DRQ0, A1, A2, PCS0, T1OUT, and T0OUT leads. When USART 400 is to read data directly from the memory portion **55*b* of digital unit 55, USART 400 requests direct memory access ("DMA") for reading by applying a DRQ1 signal to microprocessor 420. Microprocessor 420 acknowledges receipt of an INT0 signal from USART 400 via gate array 402 as described above by means of an INTAO output signal. When USART 400 is to write data directly to the memory portion 55*b* of digital unit 55, USART 400 requests direct memory access ("DMA") for writing by applying a DRQ0 signal to micropressor 420. The A1 output signal of microprocessor 420 is applied to USART 400 to select one of two register sets in USART 400 for connection to the data bus. The A2 output signal of microprocessor 420 is applied to USART 400 to one of two register types (i.e., control "C" or data "D") within the USART register set selected by the A1 signal. The PCSO (programmable chip select 0) output signal of microprocessor 420 is used to select USART 400 for reading data from (WR) or writing data to (RD) microprocessor 420. The T0OUT output signal of microprocessor 420 is a timer signal which controls the rate at which forward and reverse data are transmitted. The T1OUT output signal of microprocessor 420** is similar to the T0OUT signal, but controls the data rate on unused channel TXDB/RXDB.

Microprocessor 420 also communicates with gate array 402 via its T0OUT, PCS2, PCS4, BHE, INT0, RESET, CLOCK OUT ("CLKOUT"), READ ("RD"), and WRITE ("WR") leads. The T0OUT output signal of microprocessor 420 is described above. The PCS2 and PCS4 (programmable chip select 2 and 4) output signals of microprocessor 420 are similar to the PCSO signal described above. The BHE (byte high enable) output signal of microprocessor 420 is used to allow the 16-bit data bus to be used as an 8-bit data bus The INT0 input signal of microprocessor 420 is described above in connection with USART 400 and gate array 402. The RESET, CLKOUT, RD, and WR output signals of microprocessor 420 are also described above.

Microprocessor 420 applies data and address signal information to the data bus and receives such information from the data bus via its AD0–AD15 leads. Microprocessor 420 communicates directly with microcomputer 450 via its INT1, INT3; and PCSl leads. Microprocessor 420 applies additional control signals to memory unit 475 via its UPPER CHIP SELECT ("UCS"), MIDDLE CHIP SELECT ("MCSO"), and LOWER CHIP SELECT ("LCS") leads. The operating frequency of microprocessor 420 is established in the usual way by the circuit including crystal 421 and capacitors 422 and 423. The VCC, T0IN, T1IN, SRDY, and ARDY leads are connected to the +5 V power supply in parallel with capacitors 424 and 425. The TEST, GROUND ("GND"), NMI, and HOLD leads are connected to ground. As mentioned above, the RES terminal of microprocessor 420 is connected via power detect circuit 480 (including resistors 481–486, inductor 487, transistors 488–489, Zener diode 490, diode 491, and capacitor 492) to the POWER DETECT input terminal of digital unit 55. The POWER DETECT terminal is connected the RESET output terminal of common power supply 60 and is used to detect an AC power failure. When AC power is restored following a power interruption, power detect circuit 480 holds microprocessor 420 in the reset condition until sufficient time has elapsed to allow the microprocessor to re-initialize itself properly. For this purpose, the output signal of power detect circuit 480 is connected to the RESET ("RES") terminal of microprocessor 420 in parallel with capacitor 426.

Latches 430 and 432 are used to store address signal information produced by microprocessor 420 at terminals AD0–AD15 while associated data signals are transmitted or received via those same microprocessor terminals. The 1Q–8Q output leads of latches 430 and 432 collectively comprise an address bus which is connected to memory unit 475. Latches 430 and 432 are enabled by the ADDRESS LATCH ENABLE ("ALE") signal produced by microprocessor 420 and applied to the G input terminal of each latch. Power (+5 V) is applied to the VCC input terminal of each latch 430 and 432 in parallel with capacitors 434–436. The OC terminals of both latches are connected to ground.

Multiplexers 440 and 442 act as an interface between 16 manually positioned switches 444, which specify the address of the ECU, and microprocessor 420 to enable the information represented by switches 444 to be read by the microprocessor in two successive 8-bit bytes. The signal for selecting ("SEL") multiplexers 440 and 442 comes from latch 432. The multiplexers are advanced or stepped by the signal applied to their OC terminals from gate array 402. Power (+5 V) is supplied to the VCC terminals of multiplexers 440 and 442 in parallel with capacitors 445–447. Pull-up resistor networks 448–449 are conventionally connected between the +5 V power supply and the data input leads of the multiplexers.

Microcomputer 450, which can be a conventional microcomputer such as Intel part number 8472, performs such functions as (1) controlling communications with the subscribers via the drop cables, (2) controlling the tuner/converters in the SUs, and (3) communicating with microprocessor 420. Microcomputer 450 is connected to the data bus via its D0–D7 leads. The VDD, VCC, and SS leads of microcomputer 450 are connected to the +5 V power supply in parallel with capacitors 451 and 452. The AO lead is connected to the SEL input terminals of multiplexers 440 and 442. The P25, P24, and CS leads are connected directly to microprocessor 420 as mentioned above. The RESET, WRITE ("WR"), READ ("RD"), XTAL2, XTAL1 and T1 leads are connected to gate array 402. The RD lead is also connected to memory unit **55*b*. The signals on the XTAL1 and XTAL2 leads determine the operating frequency of microcomputer 450. Pull-up resistor network 453** is connected between these leads and the +5 V power supply.

The P20–P23 and PROG terminals of microcomputer 450 are connected to conventional input/output expander 454 which may be Intel part number TMP82C43P. Expander 454 allows a small number of microcomputer input/output terminals to be connected to a larger number of input/output leads. The EA and VSS leads of microcomputer 450 are connected to ground. In a development configuration, the P17 lead of microcomputer 450 is connected via pull-up resistor 455 to the +5 V power supply, and via manually operated switch 456 to ground.

Microcomputer 450 receives VLF data from communication unit 56 via its T0 lead. The P16 lead is not used. Six SUBSCRIBER SELECT signals are produced by microcomputer 450 and applied to leads P10–P15. Each of these signals is applied to a respective one of the six SUs in this ECU in order to select the one or more of the SUs which is to respond to the DATA and FUNCTION SELECT signals mentioned below. The signals on leads T0 and P10–P16 pass through conventional buffering and pull-up resistor network 457, which is also connected to the +5 V power supply.

The +5 V power supply is connected to input/output expander 454 in parallel with capacitors 458 and 459. The CHIP SELECT ("CS") and GROUND ("GND") leads are connected to ground. The signal on lead P43 is serial DATA for use by the SU or SUs selected by the SUBSCRIBER SELECT output signals of microcomputer 450. For example, this DATA signal may be the MS coefficients used by the SUs as described above in relation to the SUs. The signals on leads P40–P42 are the three FUNCTION SELECT signals which are applied to the SUs to control their processing of the above-mentioned DATA signal. The on the P60–P63, P70, and P71 leads are respectively the six POWER DETECT signals produced by the SUs as described above. As mentioned above, each of these signals indicates whether or not the associated subscriber is supplying his or her share of the total AC power required for operation of the ECU. The signal on the P53 lead is the VLF data signal to be transmitted from the ECU to a selected subscriber's SPU via communication unit 56. The signals on the P50–P52 leads are also applied to communication unit 56 where they are used to control multiplexer 450 which selects the SPU that is to send or receive VLF data. The signals on leads P40–P43, P50–P53, P60–P63, and P70–P71 pass through conventional buffering and pull-up or clamping resistor network 460. Leads P72 and P73 are respectively connected to ground via manually operated switches 461 and 462 and to the +5 V power supply via pull-up resistor network 463. Switches 461 and 462 allow the ECUs in the system to be grouped in up to four different addressable banks.

Back-up power supply 454 operates during a total AC power failure to prevent loss of data in an essential portion of memory unit **55*b*, i.e., the portion of the memory unit selected by the LOWER CHIP SELECT ("LCS") signal. A back-up power supply includes conventional hex inverting buffer 465, resistors 466–469, capacitors 470–472, diode 473, and inductor 474. Buffer 455 may be Toshiba part number TC40H368P or an equivalent device. The back-up power is actually derived from capacitor 471 which is a relatively large storage capacitor. While the AC power is on, capacitor 471 is charged from the +5.7 volt power supply via the circuit including elements 468, 469, and 472–474. During an AC power interruption (as indicated by the reset signal applied to the 1A input terminal of buffer 465), capacitor 471 supplies +5 V back-up power to energize buffer 465, to provide an LCS signal and to provide +5 V power to the portion of memory unit 475** selected by the LCS signal.

Memory unit **55*b* includes two conventional 16K-byte read only memories ("ROMs") 476 and 477 which store the operating program instructions for microprocessor 420. Each of ROMs 476 and 477 may be Intel part number 27128, or an equivalent device. Memory unit 55*b* also includes six conventional 8K-byte random access memories ("RAMs") 493–498 which store the data needed for control of the ECU. Each of RAMs 493–498 may be Toshiba part number TC5565PL-15 or an equivalent device. The connection of the various elements of memory unit 55*b* to the remainder of digital unit 55, as well as the inter-connection of the memory unit elements, is entirely conventional and will be readily apparent to those skilled in the art. The UCS, MCSO, and LCS signals are used to extend the 16-bit address information to allow use of more memory than can be accessed using only 16 bits. The UPPER BANK SELECT ("BKU") and LOWER BANK SELECT ("BKL") signals produced by gate array 402 are used in combination with jumper network 478 to allow the relative amounts of ROM and RAM to be changed if desired. RAMs 495 and 496 are the memory unit elements energized by back-up power supply 464** in the event of an AC power outage as described above.

VI. Common Power Supply

To reduce the amount of power required to be supplied by the CATV system operator, the power required to operate each ECU is supplied by the subscribers served by that ECU. This is accomplished by having each master SPU apply a 60-volt AC power signal to the SPU's associated drop cable. As earlier described, the AC power signals from each subscriber are converted by each subscriber's associated SU into + and − half-wave rectified DC power signals. The + and − signals are respectively summed and applied to common power unit 60.

FIG. 6 shows common power unit 60 in greater detail is shown in FIG. 6, the combined + and − power obtained from the SUs is applied to a filter/smoothing circuit 510. Filter/smoothing circuit 510 includes a plurality of filtering capacitors 514 and 516 to further remove AC ripple from the input power. A pair of series-inductances 512 remove any CATV or VLF communication signals still present with the power signal.

The output of filter/smoothing circuit 510 is a well-filtered but unregulated DC voltage. This DC voltage output is applied to the input of a conventional switching power supply 520. Switching power supply 520 includes a step-down transformer 522 for producing as an output three AC power signals. These AC power signals are each half-wave rectified by rectifying diodes 532, 534, and 536, respectively. The outputs of diodes 532, 534, and 536 are smoothed and filtered by capacitances 543, 545, and 547 and inductances 542, 544, and 546. The outputs of the capacitance/inductance smoother/filter circuits are each applied as inputs to conventional voltage regulator circuits 530, 540, and 550, respectively. Voltage regulator circuits 530, 540, and 550 regulate the voltage appearing at their inputs to DC voltage levels of 27 volts, 12 volts, and 5 volts, respectively. These output voltages are each further filtered by output capacitors 570, 572, and 574. A fourth regulated output of 5.7 volts is obtained from the circuit comprising series-pass transistor 560, diode 562, and Zener diode 564. The output signal of inductor 546 is also used as a RESET signal for indicating an AC power failure. This RESET signal is applied to the POWER DETECT input terminal of digital unit 55 as described above.

The regulated DC output voltages of common power supply 60 are used to power the circuitry of the associated ECU. Thus, +5 V, +12 V, and +27 V signals are applied from common power supply 60 to each subscriber unit (FIG. 2), as well as to analog unit 54 (FIG. 3), communication unit 56 (FIG. 4), and digital unit 55 (FIG. 5). To ensure that each subscriber equitably shares in providing power to operate the ECU associated with that subscriber, each SU includes power detection circuitry, earlier described, to turn the SU off in the event that AC power is not being received from the drop cable associated with the SU.

VII. Subscriber Processing Unit

Subscriber processing units (SPUs) are located within subscriber residences. Each SPU is designed to (1) accept and transmit to its associated ECU subscriber-entered data, such as channel tuning requests, pay-per-view requests, parental control requests, and other functions normally associated with the television viewer, and (2) receive data and commands from the ECU to display information to a subscriber and control on and off the operation of the subscriber's television receiver. In addition, each SPU may serve as a data input terminal to accommodate audience response, shop-at-home, and other occasional two-way activities. FIG. 7 shows a typical master SPU in detail.

As shown in FIG. 7, a typical master SPU is connected via plug 761 to a source of subscriber-supplied 120-volt AC power. Transformer 762 steps down this power for use by the SPU. Conventional rectifier and smoothing network 760 rectifies the AC power for application to conventional voltage regulator circuit 764. Voltage regulator circuit 764 supplies as an output ("+") all necessary regulated DC voltages required to operate the circuitry of the SPU.

In addition to supplying AC power to rectifier/filter 760, transformer 762 provides as an output a source of 60 volt, 60 Hz AC power for application to the drop cable connecting the SPU to its associated ECU. For this purpose, transformer 762 includes a separate secondary winding connected to capacitor 761 and inductor 763. Inductor 763 presents a high impedance to the relatively high frequency CATV, VLF, and reverse HDRC signals, but presents a low impedance to the lower frequency AC power signals. AC power signals are tapped off from inductor 763 and applied to terminal 767 to which is connected the drop cable. Thus, each subscriber, via the master SPU in the subscriber's residence, provides a share of the total power required to operate the ECU to which the subscriber's SPU is connected. If the SPU of FIG. 7 were a slave SPU, inductor 763 would be removed so that only the subscriber's master SPU would supply power to the drop cable.

Drop cable terminal 767 is also connected to one terminal of conventional directional coupler 778 through capacitor 765. Capacitor 765 presents a high impedance to 60 Hz AC power signals, but a low impedance to the higher frequency CATV, VLF, and reverse HDRC signals. Another terminal of directional coupler 778 is connected via combiner 779 to a terminal ("TV") to which the subscriber's television receiver 90 (FIG. 1), optional FM audio receiver equipment, and optional forward HDRC utilization equipment are attached. In this way, CATV signals (including television, FM audio, and forward HDRC signals) received from the ECU are transmitted to the devices which utilize those signals. Combiner 779 adds the reverse HDRC signal for application to the drop cable. Although in the preferred embodiment, a subscriber's television, FM audio and HDRC equipment are connected to the drop cable via connection to the SPU, it will of course be appreciated that such equipment may instead be connected to the drop cable without direct connection to the SPU by utilizing a conventional directional coupler and capacitor. Thus, the present invention provides subscribers with great flexibility in variously locating the SPU and the subscribers' television apparatus and other equipment within the subscribers' premises.

The terminal of directional coupler 778 connected to the TV and FM audio terminal is also connected to the input of conventional VLF demodulator 770. Demodulator 770 receives signals transmitted from the ECU, including CATV and VLF communication signals. As already described with respect to an embodiment of the ECU, ECU-to-SPU VLF communication signals are ASK-modulated signals having a carrier frequency of 430 KHz. This carrier signal is on continuously except when data is being transmitted. Demodulator 770 demodulates the applied ECU-to-SPU VLF signals to produce serial digital data as an output. This is accomplished in one embodiment by parallel tuned LC circuit 776 which is tuned to 430 KHz. Conventional amplifier/filter circuit 774, which in one embodiment uses a surface acoustic wave ("saw") filter as the filtering element, receives the output of circuit 776 to provide an output only when 430 KHz carrier is detected. The output from circuit 774 is then applied to operational amplifier 772 which produces an output that is high or low in response to the presence or absence, respectively, of a signal from amplifier/filter 774. Operational amplifier 772 thus produces a digital data output representative of the information transmitted to the SPU from the ECU via the VLF signal.

The digital data output of demodulator 770 is applied to a data input line and to an interrupt input line of conventional microcomputer 700. Microcomputer 700 may be any suitable commercially available microprocessor or microcomputer such as Toshiba part No. TMP 4740P, which is 4-bit microcomputer having 4k bytes of on-board ROM and 256 bytes of on-board RAM memory. An object and source code computer program listing which will be readily understood by those skilled in the art suitable for controlling the operations of microcomputer 700 is annexed hereto at Appendix A.

Microcomputer 700 utilizes data received from the ECU to display information on conventional 7-segment display 710. In one embodiment, display 710 is capable of displaying two decimal digits representative, for example, of the television channel to which the associated SU in the ECU is tuned. Microcomputer 700 drives display 710 in a conventional manner by multiplexing display data onto a common seven-line bus B1 and alternately enabling two return lines A and B. Resistor-pack 712 includes seven resistors, each resistor being in series with a line of bus B1 to provide current limiting for display 710.

Microcomputer 700 also utilizes data received from the ECU to illuminate a so-called order event lamp. In one embodiment, the order event lamp is a conventional light emitting diode (LED) 790 connected to microcomputer 700 via current limiting resistor 792. As described in greater detail below, the order event lamp may be utlized to inform the subscriber that the subscriber is viewing a program for which the subscriber will be charged an additional fee.

Another circuit element controlled by microcomputer 700 is television power relay 791. Television power relay 791 is a normally-open relay which controls the application of 120-volt AC power to power outlet 793, into which the associated television receiver 90 is plugged. Relay 791 is controlled on and off on command from the ECU.

Also connected to microcomputer 700 is keyboard 720 for use by the subscriber, for example, in entering channel selection requests. In one embodiment, keyboard 720 is a conventional membrane matrix keyboard having four columns and four rows. A common bus B2 having eight lines connects the keyboard's row and column outputs via resistor pack 722 to corresponding inputs of microcomputer 700. In addition to keyboard 720, an optional remote control unit ("RCU") may be used to enable a subscriber to remotely enter data into the SPU (see FIG. 1). Such an RCU may be of any type, wired or not. In one embodiment, the RCU is a conventional wireless device which communicates with the SPU by transmitting coded infra-red light. In the SPU, conventional remote control receiver 730 having a photo-diode sensitive to infra-red light receives these coded signals and converts them into serial digital data. This data is then provided to microcomputer 700.

Microcomputer 700 communicates subscriber-entered channel and other requests to the attached ECU by sending digital data to VLF modulator 740. The digital data turns transistor 742 on and off via current-limiting resistor 783. In turn, transistor 742 turns on and off FET transistor 746 via resistors 743, 745, 747, and 749. FET transistor 746 controls on and off the output of continuously operating 468 KHz oscillator 744 to ASK modulate a 468 KHz signal. Saw filter 748 provides bandpass limiting for the modulated output of modulator 740. The output of saw filter 748 is applied to an emitter-follower circuit comprising transistor 750 and resistors 752–755. Capacitor 751 blocks DC voltage. The output of the emitter-follower circuit is applied through capacitor 757 and resistor 756 to a terminal of directional coupler 778. The VLF modulated signal is then applied from directional coupler 778 to the drop cable for transmission to the attached ECU on the SPU-to-ECU communication channel.

For enabling each of a plurality of SPUs (i.e., a master SPU and one or more slave SPUs) connected to a drop cable to selectively communicate with the ECU, each SPU is given a unique address at the time the SPU is installed in the subscriber's residence. This is accomplished by placing appropriate jumper wires in jumper block 782. Jumper block 782 has 2 jumper connections, each representing one bit of a 2-bit address. By selectively jumping the terminals in jumper block 782, each SPU attached to an ECU may be assigned any of 4 different addresses. In addition, switch 780 serves to identify the SPU depending on whether the switch is opened or closed as either a master SPU associated with a primary SU in the ECU, or a slave SPU associated with a secondary SU in the ECU. Typically, the master SPUs are assigned binary address 00 in jumper block 782, and slave SPUs are assigned any address 01, 10, or 11 in jumper block 782.

Communication betweeh the ECU and its associated SPUs is via separate transmit and receive channels over the drop cable. As mentioned above, the first channel, the ECU-to-SPU channel, is a VLF channel having a carrier frequency of 430 KHz. The second channel, the SPU-to-ECU channel, is a VLF channel having a carrier frequency of 468 KHz. Both channels carry data at a rate of 1200 bps, although other convenient data rates may be used. Each SPU associated with an ECU transmits data to the ECU on the common SPU-to-ECU channel. Similarly, the ECU transmits data to each associated SPU on the common ECU-to-SPU channel.

VIII. Head End

Elements 34 and 36 of head end 12 are shown in greater detail in FIG. 8. The forward and reverse data signals on' cable network 14 are coupled to combiner 800 by combiner 32. Combiner 800 applies the forward data signal from the modulator portion 810 of modem 34 to combiner 32, and applies the reverse data signal from combiner 32 to the demodulator portion 840 of the modem.

Central control computer 36, which may be any suitable computer such as a conventional Intel 330 computer, includes conventional main central processing unit ("CPU") 880, conventional main memory 882, conventional output buffer unit 884, and four conventional main input buffer units 886–889. All of elements 880, 882, 884, and 886–889 are conventionally interconnected via communications bus 890. Depending on the data rates and the speed of operation of buffer units 884 and 886–889, it may be possible to combine the functions of units 884 and 886–889 into a smaller number of buffer units. Main CPU 880 includes or is coupled to conventional input/output devices (not shown) for use by the operators of the system to control the system.

Each of buffer units 884 and 886–889 includes a conventional high level data link ("HDLC") controller portion, a conventional CPU portion, and a conventional memory portion. The HDLC controller portion of output buffer unit 884 converts parallel forward data originated by main CPU 880 to a serial NRZI forward data signal. This forward data signal is applied to conventional EIA RS 422 interface device 812 in the modulator portion 810 of modem 34. Interface device 812 applies the forward data signal to conventional TTL buffer 814. TTL buffer 814 applies the forward data to PIN diode switch 816 which frequency modulates the forward data signal by switching back and forth between 103.9 MHz and 104.1 MHz oscillators 818 and 820 in accordance with the applied data signal. The frequency modulated forward data signal is applied to surface acoustic wave bandpass filter 822 and then to combiner 800 for application to cable network 14 via combiner 32.

Considering now the elements which receive, demodulate, and process the reverse data signals, it will be recalled that there are four reverse data channels having frequencies of 19.125 MHz, 19.375 MHz, 19.625 MHz, and 19.875 MHz, respectively, and that the reverse data is in NRZI protocol. All of these reverse data signals are passed through conventional bandpass filter 842 and conventional preamplifier 844. The output signal of preamplifier 844 is applied to four similar demodulator circuit paths, only one of which is shown in detail in FIG. 8. Each of these circuit paths demodulates the reverse data signal in a respective one of the reverse data channels.

In each of the above-mentioned circuit paths, the reverse data signal is mixed by mixer 850 with the output signal of local oscillator 852 having a frequency selected such that the associated reverse data channel signal frequency minus the local oscillator frequency equals 10.7 MHz. Mixer 850 therefore shifts the associated reverse data channel signal to 10.7 MHz. The output signal of mixer 850 is applied to bandpass filter 854 which eliminates all signals other than the 10.7 MHz modulated signal. The output signal of bandpass filter 854 is applied to conventional intemediate frequency ("IF") amplifier 856. IF amplifier 856 is augmented by conventional carrier detector device 858 which applies a request to send ("RTS") output signal to conventional EIA RS 422 interface device 866 whenever a 10.7 MHz signal is detected. Conventional Costas loop device 860 converts the 10.7 MHz data signal to a baseband data signal whicn is applied to interface device 866. The baseband data signal is also applied to program logic array 862 which uses the data signal and the higher frequency output signal of oscillator 854 to produce a clock signal pulse during each bit interval in the associated NRZI data signal. This clock signal is also applied to interface device 866.

Interface device 866 applies the carrier detect, clock, and NRZI data signals to the associated input buffer device 886–889. The HDLC controller portion of the buffer device converts the serial NRZI data to parallel data suitable for further processing by central control computer 36.

IX. ECU Operation

Microprocessor 420 (hereafter sometimes the "Data Processor") is responsible for controlling the overall operation of the ECU. This responsibility includes communicating with the CCC at head end 12, initiating, implementing and coordinating various operations within the ECU, and communicating with the SPUs. The Data Processor is aided in its functions by microcomputer 450 (hereafter sometimes the "Drop Processor"). The Drop Processor is responsible for transmitting to associated SPUs messages originated by the Data Processor, and for transmitting to the Data Processor messages originated by the SPUs. In addition, the Drop Processor on command from the Data Processor controls various functions associated with the SUs of the ECU. The operations of the Data Processor and Drop Processor in communicating with the CCC at head end 12 and with associated SPUs, and in implementing and controlling various ECU functions, will now be described.

A. ECU/SPU Communication Protocol

The communication protocol between an ECU and its associated SPUs must allow for the prompt detection and servicing of channel selection, pay-per-view requests and other subscriber-originated requests from any of a plurality of SPUs (both master and slave) associated with any of up to six drop cables. Moreover, the communication protocol must be capable of detecting requests which are sporadic and infrequent.

1. ECU/SPU Polling

To ensure the prompt servicing and processing of subscriber-entered SPU requests, communication access to the ECU is controlled by the ECU's digital unit 55 using a two-level polling scheme. The first level is called "drop polling", and permits a very rapid polling or sensing of each drop associated with the ECU to identify a drop which has an SPU in need of service (i.e., having information to transmit to the ECU). Drop polling is accomplished without transmitting or receiving any data over the relatively low-speed (in one embodiment, 1200 bps) ECU/SPU data link.

Once a particular drop has been identified by the ECU and requiring service, and if necessary because of the existence of more than one SPU attached to the drop, the ECU uses a second level of polling, called "device polling", to differentiate between SPUs. In this event, the communication link is used to specifically address each SPU attached to the drop to determine which SPUs require service. The ECU maintains maps in its memory of each drop, and of each device on each drop. The data of each map is in a predetermined order so as to optimize response times or to give priority to certain SPUs.

Drop Polling

Drop polling is controlled by microcomputer 450 in ECU digital unit 55 (FIG. 5*e*) and multiplexer 350 in communication unit 56 (FIG. 4). If an SPU requires service (e.g., a subscriber has entered a channel request into the SPU's keyboard), SPU microcomputer 700 causes VLF modulator 740 to transmit a continuous 468 KHz carrier signal to the ECU. This continuous carrier signal is called a "cry" or "Service Request" signal. At the ECU, microcomputer 450 selects a drop by sending a drop address code to multiplexer 350 via the multiplexer's address lines A, B and C (FIG. 4) to selectively connect the ECU's VLF modulator 320 and demodulator 340 to a particular one of the six drops. Once connected to a drop via multiplexer 350, ECU digital unit 55 listens for the presence of carrier signal (a Service Request) on the drop. If carrier signal is present on the drop and detected by the ECU, this is interpreted by the ECU to mean that an SPU on the drop required service. If no carrier signal is detected on the drop, the ECU interprets this to mean that no SPUs on the drop require service. In this latter event, the ECU (via multiplexer 350) selects another drop in a predetermined sequence, and listens for the presence of carrier on that drop. If carrier is present, then an SPU attached to the drop requires service.

It should be noted that SPUs on the several drops request service simply by activating carrier on the SPU-to-ECU drop cable communication channel. It is not necessary for an SPU to transmit to the ECU any data or special commands to obtain service, thus allowing for very fast polling. To prevent any interference with communications already taking place on the drop, each SPU connected to the drop continuously monitors the ECU-to-SPU channel for the presence or absence of data. An SPU will activate carrier to transmit a Service Request only after the SPU has detected a predetermined number of (e.g., twelve) bit times of a continuous mark condition on the ECU-to-SPU channel. This verifies to the SPU that there is no other communication on the drop cable.

Device Polling

Device polling is also controlled by microcomputer 450 in the ECU. As described above, if more than one SPU is attached to a drop on which a Service Request is detected, the ECU must individually poll the SPUs on the drop to determine which SPU has requested to communicate with the ECU. Irrespective of which SPU on the drop first requested device polling will occur in a predetermined order established by the ECU.

The ECU initiates device polling by transmitting conditional poll commands on the selected drop. All SPUs and other devices connected to the selected drop sense tnese commands and cease any activity (i.e., carrier transmissions) on the SPU-to-ECU link. The particular SPU being polled responds to the ECU with a single mark bit if the SPU does not require service. If the polled SPU requires service, the SPU responds by transmitting to the ECU an acknowledgement (a space bit) followed by data.

2. ECU/SPU Message Formats

The communication of messages between an ECU and its associated SPUs is asynchronous with uniform bit timings and non-uniform, indeterminate character timings. The ECU-to-SPU link completely controls data transfers on the SPU-to-ECU link. Each character transmitted to the SPU by the ECU is acknowledged by the SPU with a one-bit acknowledged/not acknowledged ("ACK/NAK") handshake. This bit is also used for a poll response, as earlier described. Each character is preceeded by at least one bit time of mark state. A mark-to-space transition resulting in a start bit in a space state initiates the character. The next bit is a message framing bit, then eight data bits (transmitted low-order bit first), a parity bit, and at least one bit time of mark condition as an ending. The ending bit time of mark condition also serves as a lead-in to a possible subsequent character.

Character Framing

Character framing is established by the SPU sensing in the ECU-to-SPU link at least a predetermined number (e.g., twelve) bit times of a continuous mark condition followed by a mark-to-space transition resulting in a start bit. If an SFU loses character framing it will not recognize any commands until character framing is re-established by the ECU. The ECU periodically allows a given drop the opportunity to re-establish character framing by enforcing periods of continuous mark condition.

Message Framing

The manner in which a message character (data) is to be interpreted by an SFU is determined by the state (mark or space) of the message framing bit. The beginning of a message is indicated by a space condition (logical zero) in the message framing bit. A logical zero message framing bit means that the data field (8 bits) represents a command which all SPUs on the drop must interpret. On the other hand, if the message framing bit is in a mark condition (a logical one), then the data field is interpreted as containing subsequent information to a previous command. Any number of message characters can occur between command bytes. The incorporation of the message framing bit, although adding 1/11ths overhead to each message character, increases framing integrity and permits increased through-put when long data streams are encountered. Without the message framing bit, the transmission of long data streams to or from an SPU would be curtailed or precluded in view of the need for the ECU to be able to rapidly poll and service up to 6 drops, each drop potentially having a plurality of SPUs. By utilizing the expedient of a message framing bit, the ECU may perform drop polling or even service other SPUs on other drops during the interstices between character transmissions to a specific SPU on a particular drop.

ACK/NAK and Poll Responses

The bit time immediately following the parity bit is used as an ACK/NAK window on the SPU-to-ECU link. Each character transmitted by the ECU is acknowledged by the SPU during the ACK/NAK window. This ACK/NAK window is also used in a special manner to respond to polls.

SPUs respond to the ECU during the ACK/NAK window as follows. Upon the receipt of an initial message start bit, all SPUs on the drop turn off carrier on the SPU-to-ECU link. Upon receipt of the message framing bit, if the bit is a space, all SPUs input the data bits (which represent a command) to check for the presence of their address. If the message framing bit was a mark, then only the previously addressed SPU on the drop inputs the data bits.

Upon receipt of the last data bit, the addressed SPU turns on its carrier on the SPU-to-ECU link. Upon receipt of the parity bit, if the parity bit indicates an error in transmission, then the SPU leaves its carrier on during the next bit time as a NAK signal to the ECU. If the parity bit indicates correct transmission, then the SPU turns its carrier off and maintains the carrier off during the next bit time as an ACK signal to the ECU.

If the data is a correctly transmitted poll, then the polled SPU after receipt of the parity bit turns its carrier off by transmitting the start bit of the information it has to transmit to the ECU. Otherwise, carrier is maintained on during the ACK/NAK window. One bit time after receipt of the parity bit (i.e., after the ACK/NAK window), all SPUs turn carrier off in preparation for another transmission to or from the ECU.

B. ECU/SPU Messages

Communications from the Data Processor to the Drop Processor are in the form of variable length messages representing commands which the Drop Processor executes. Execution by the Drop Processor of a Data Processor command normally follows a handshaking sequence requiring the Drop Processor to return a command response to the Data Processor. This command response may be a single byte acknowledgment, or a multiple byte response if the Data Processor command requires a return of data. However, if the Data Processor command requires the Drop Processor to send a message to a device attached to a drop cable, as described below, a command response may not be required.

In addition to command responses, information may be passed to the Data Processor from the Drop Processor without any commands having been issued by the Data Processor. Such a transfer would occur, as further described below, in the event that a device attached to a drop cable transmits a Service Request to the ECU. In such an event, the Drop Processor will read data from the device requesting service and pass the information to the Data Processor as an Unsolicited Data Response.

The following table sets forth the Data Processor/-Drop Processor communication commands utilized in one embodiment of the invention. Commands having an asterick are sent from the Drop Processor. The other commands are sent from the Data Processor.

TABLE C

| COMMAND (HEX) | FUNCTION |
|---|---|
| 00 | Reset drop processor. |
| 01 | Read power detect and bank address. |
| 03 | Change tuner frequency (channel select). |
| 04 | Send message to attached device. |
| 05 | Turn converter on/off and select cable A or cable B. |
| 07 | Define drop poll sequence. |
| 08 | Define device poll sequence. |
| 84* | Unsolicited Data Response from attached device. |

Briefly, the commands set forth in Table C operate as follows:

Command 00. This is a one-byte command message used by the Data Processor to reset the Drop Processor and to initialize its registers and pointers. All polling activities are discontinued. The Drop Processor acknowledges receipt of this command by returning to the Data Processor a single command response byte equal to 00.

Command 01. This is a one-byte command message used by the Data Processor to cause the Drop Processor to read the state of the six power detect lines (POWER DET, FIG. 2) from the subscriber units SU1, SU2, etc., and to read the bank to which the ECU's address is assigned. The response sent by the Drop Processor to this command comprises two bytes. The first byte echoes the command byte (01). The second byte is a data byte which specifies the state of each of the POWER DET lines and the ECU's bank address. For each of the POWER DET lines of the six subscriber units, corresponding bits 0–5 of the response byte are set to 1 or 0 depending respectively on whether or not power is being supplied to the drop cable by the subscriber connected to that subscriber unit. Bits 6 and 7 of the response data byte specify to which one of four banks the ECU's address is assigned.

Command 03. This is a four-byte command message used by the Data Processor to cause the Drop Processor to tune any of the ECU's six associated SUs to a specified physical channel. The first byte is the command byte (03). Next are three bytes of data. The first byte specifies in bits 0–2 which one of the six SUs is to be tuned. The next two bytes specify the two MS numbers, earlier described, which are required by the circuitry of the SU's tuner/converter to tune to a particular physical television channel. The Drop Processor sends a two-byte command response to the Data Processor upon receipt of the command echoing the first two bytes of the command message.

Command 04. This command message (hereafter the "04 Command") is used by the Data Processor to cause the Drop Processor to send an addressed message to a device attached to a drop cable. In one embodiment, the device may be an SPU having an address equal to 2, 3, 4 or 5, or the device may be some other type of apparatus attached to the drop cable and capable of communicating with the ECU. Examples of such other devices are medical monitoring equipment, fire alarms, smoke alarms, burglary alarms, and so forth. Such other devices may have addresses equal to 0, 1, 6 or 7.

The 04 Command message to the Drop Processor includes at least four bytes, as follows: (1) in the first byte, the command code (04), (2) in the second byte, the drop number (bits 0–2) and the device address from 0–7 (bits 3–7), (3) in the third byte, the number of bytes contained in the message, and (4) in the fourth byte, a device command. Folllowing the device command byte are one or more data bytes. The device command and data bytes together comprise the message. The device command byte includes a 3-bit device address (bits 0–2) and a 5-bit function code (bits 3–7). The function code is used to command a particular operation in the addressed device. The following table sets forth the function codes used to control SPU or device operation in one embodiment of the invention:

TABLE D

| FUNCTION CODE (HEX) | DEVICE OPERATION |
|---|---|
| 00 | Read internal status, and return a response message to the ECU. |
| 01 | Turn on or off the order event lamp. |
| 02 | Set the order-event lamp to flashing or non-flashing mode. |
| 03 | Enable or disable data input to the device. |
| 04 | Enable or disable data output from a device. |
| 05 | Turn the television power relay on or off. |
| 06 | Blank the display. |
| 07 | Set the display to flashing or non-flashing mode. |
| 08 | Display a character in the right-most position of the display. |
| 09 | Transmit a number of characters to the ECU as specified by the byte count of the 04 Command mesage. |
| 0A | Display a character at a specified position of the display. |
| 0B | Conditional poll to determine the identity of the device |

TABLE D-continued

| FUNCTION CODE (HEX) | DEVICE OPERATION |
|---|---|
| | sending a Service Request. The device returns its data. |

If the device message requires the device to return a response to the ECU (e.g., in response to function codes 00, 09, or 0B), a command response (hereafter the "04 Response") is returned from the Drop Processor to the Data Processor. This response includes a three-byte response header followed by one or more data bytes. The response header includes: (1) in the first byte, a command response code (hex 04), (2) in the second byte, an echo of the drop and device address byte originally sent by the Data Processor, and (3) in the third byte, the number of bytes of data in the response message. Assuming no transmission errors occurred, following the response header are one or more response data bytes. The data byte of an error-free 04 Response to a conditional poll, for example, may identify the key which the subscriber has depressed. Or, in the case of an error-free 04 Response to a status request message, the data byte may specify by its bit settings the device status as follows: the device is a master or slave SPU (bit 7), the order event lamp is flashing (bit 5), the order event lamp is on (bit 4), the television power relay is on (bit 3) there has been recent power on (bit 2), a key has been recently depressed (bit 1), and a new character is available (bit 0). If a transmission error occurred, the byte count is 00. In this event, a single data byte follows the byte count to specify an error code. The error code may be 01 (indicating an ECU-to-device transmission (parity) error), 02 (indicating a device-to-ECU transmission (parity) error), or 03 (indicating an invalid device response). Error codes are sent to the Data Processor only after the occurrence of five consecutive link transmission errors.

Command 05. This command is used by the Data Processor to cause the Drop Processor to turn on or off a particular SU and, in a two-cable system, to cause the SU to select either cable A or cable B. The command message includes two bytes. The first byte is the command code byte (hex 05). The second byte specifies (1) the SU (bits 0–2), (2) the selected cable (bit 6 is set to 0 or 1 to select cable A or B, respectively), and (3) whether to turn the SU unit on or off (bit 7 is set to "0" or "1", respectively). A two-byte command response is returned to the Data Processor by the Drop Processor. The first byte echoes the command byte (05). The second byte includes in bits 0–2 the SU address contained in the command message.

Command 07. This command is used by the Data Processor to load a drop polling map into the Drop Processor to define the drop polling sequence. The command message includes five bytes. The first byte is a command code byte (hex 07). Bytes two through four specify the drop polling sequence. Each of these bytes is divided into two nibbles of four-bits per nibble. The value of each nibble is set from 0–5 to specify in each nibble a particular drop. Drops are sequentially polled in the order specified by the nibbles as received by the Drop Processor from the Data Processor. A value of hex F in a nibble indicates the end of the polling map. If all nibbles contain hex F, drop polling is disabled. The fifth byte would include an F in its high order nibble to indicate the end of a polling map for six drops. A one-byte command response (07) is sent by the Drop Processor to the Data Processor echoing the command code byte.

Command 08. This command is used by the Data Processor to load a device polling map into the Drop Processor to define the device polling sequence. This command message includes seven bytes. The first byte is the command byte (hex 08). The second byte specifies the drop in bits 0–2. Bytes three through six specify in each of eight nibbles a device address. Devices on the specified drop are sequentially polled in the order specified by the device address nibbles as received by the Drop Processor from the Data Processor. A value of hex F in a nibble indicates the end of the device polling map. If all entries in the device polling map are set to hex F, device polling is disabled. The seventh byte would include an F in its high order nibble indicating the end of a device polling nap for eight devices. A two-byte command response is sent by the Drop Processor to the Data Processor echoing the first two bytes of the Data Processor's command message.

Command 84. This command (hereafter the "84 Command") is sent from the Drop Processor to the Data Processor indicating the receipt by the Drop Processor of unsolicited data from a device attached to a drop cable. The 84 Command is used by the Drop Processor to transmit to the Data Processor data received from a device which has transmitted a Service Request to the ECU (e.g., a subscriber has entered a channel selection request via SPU keyboard). This command message includes at least four-bytes. The first byte contains the command code (hex 84). The second byte specifies the drop address (bits 0–2) and the device address (bits 3–7) to identify the particular drop and device sending the Unsolicited Data Response. The third byte specifies the number of data bytes being sent by the device. Finally, the fourth byte is a data byte. If the byte count is 00, an error has occurred. In such a case, an additional byte follows the data count byte specifying an error code. An error code of 01 indicates an ECU-to-SPU transmission (parity) error An error code of 02 indicates an SPU-to-ECU transmission (parity) error.

C. Drop Processor Operation

FIGS. *9a*–*9b* illustrate flow charts of a computer program utilized in one embodiment of the invention for controlling the operations of the Drop Processor. An object and source code computer program listing which will be readily understood by those skilled in the art for controlling the operations of the Drop Processor in accordance with the flow charts of FIGS. *9a*–*9b* is annexed as Appendix B.

The program controlling the Drop Processor includes a Main Routine (FIG. *9a*) and a Timer Interrupt Routine (FIG. *9b*). Each of the two routines runs independently of the other. The Main Routine is periodically interrupted by the Timer Interrupt Routine, in a conventional manner, after a predetermined time period has elapsed as determined by the timing out of an interrupt timer. The function of the Drop Processor Main Routine is to (1) receive data from the Timer Interrupt Routine (e.g., a message from an SPU to the ECU) and send it to the Data Processor and (2) to send data from the Data Processor to the Timer Interrupt Routine for, ultimately, transmission to SPUs. The function of the Timer Interrupt Routine is to (1) implement drop and device polling, (2) transmit messages to and receive messages from SPUs attached to the drops, and (3) send signals to and receive signals from the SUs.

1. Main Routine

Figure 9A:
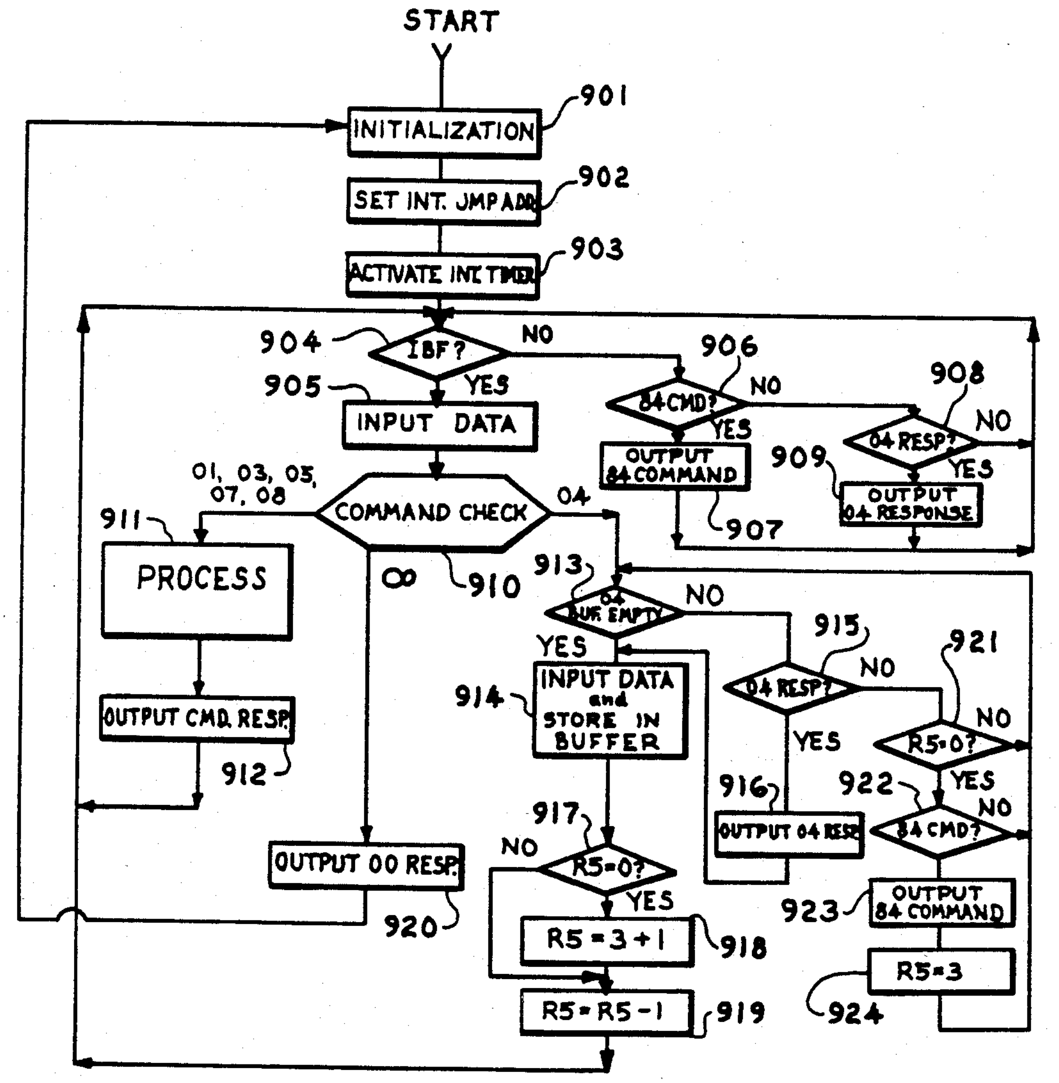
FIGS. 9*a*–*b* are flow charts illustrating the flow of a program controlling the operation of the so-called Drop Processor of the ECU.

As shown in FIG. 9*a*, the program flow of the Main Routine begins at step 901 where various buffers, counters, flags and ports are initialized. Also at step 901, drop polling and device polling are initialized, and register R5 (described in more detail below) is set to three. At steps 902 and 903, the address for jumping to the Timer Interrupt Routine is set and the interrupt timer is activated.

Initialization is complete when the program flow advances to step 904. At step 904, the Main Routine interrogates the state of an Input Buffer Full ("IBF") flag. This flag is associated with a Drop Processor buffer which receives data passed to the Drop Processor from the Data Processor. If the IBF flag indicates that the input buffer is full, the program flow advances to step 905. Otherwise, the program flow branches to step 906.

Assuming first that the IBF buffer is not full the program advances to step 906, where the Drop Processor checks a buffer (the 84 Buffer) to determine whether or not a device attached to a drop has sent an Unsolicited Data Response (i.e., an 84 Command). If so, the program advances to step 907 to pass the 84 Command to the Data Processor. Otherwise, the program advances to step 908 where the Drop Processor determines if a device has sent an 04 Response. If "no", the program loops to step 904 to again check the IBF flag as earlier described. If "yes", the program advances to step 909 to pass the 04 Response to the Data Processor. From step 909 (or step 907 if the program advanced to that step), the program loops to step 904.

If at step 904 the IBF flag indicates that the input buffer is now full, the program advances to step 905 where the contents of the buffer are input and the IBF flag is cleared. The program flow then advances to step 910 where the Drop Processor determines what type of command (earlier described) was included in the message sent by the Data Processor. Depending upon the command, the program at step 910 may branch in any of three directions.

If command 00 (reset) was sent, the program flow advances to step 920, where the Drop Processor sends a 00 command response message to the Data Processor via an output buffer associated with the Drop Processor. The program flow then loops to step 901 to re-initialize the Drop Processor as previously described.

If at step 910 any of commands 00, 03, 05, 07 or 08 was sent by the Data Processor, the program flow advances to step 911. At step 911, the Drop Processor processes the particular command as earlier described. The program flow then advances to step 912, where the Drop Processor sends to the Data Processor an appropriate command response. From step 912, the program flow loops to step 904.

Finally, if step 910 determines that an 04 Command message was sent by the Data Processor, the program flow branches to step 913. At step 913, the Main Routine interrogates a flag indicating the state (empty or full) of an "04 Buffer" associated with the Drop Processor. The 04 Buffer contains data to be sent by the Drop Processor to a device attached to a drop. If the 04 Buffer is empty, the program branches to step 914. Otherwise, the program branches to step 915.

If the program at step 913 advances to step 914 (i.e., the 04 Buffer is empty), step 914 places data received from the Data Processor into the the 04 Buffer. The program flow then advances to step 917, where register R5 is checked. If the contents of register R5 are not equal to 0, the program branches to step 919 to decrement the contents of register R5 by one. Otherwise, the program advances to (1) step 918, where the contents of register R5 are initialized to a value of three and incremented by one, and (2) step 919 where the contents of register R5 are decremented by one. From step 919, the program flow loops to step 904 to again check the input buffer.

Returning now to step 913, if the 04 Buffer is not empty the program branches to step 915. At step 915, the Main Routine determines whether or not the 04 Buffer contains an 04 Response from an attached device. If "yes", the program advances to step 916 to pass that 04 Response data to the Data Processor. From step 916, the flow advances to step 914 to input the data received from the Data Processor. On the other hand, if "no" at step 915, the program advances to step 921 where the contents of register R5 are checked. If the contents of register R5 are not equal to 0, the program loops to step 913 to again interrogate the state (empty or full) of the 04 Buffer. Otherwise, the program from step 921 advances to step 922 to check the state of the 84 Buffer. If the 84 Buffer is empty, the program immediately loops to step 913. However, if the 84 Buffer contains data at step 922, the program advances to (1) step 923 to pass the data to the Data Processor as an 84 Command, (2) step 924 to reset. the R5 register to a count of three. The program then loops to step 913.

2. Timer Interrupt Routine

Figure 9B:
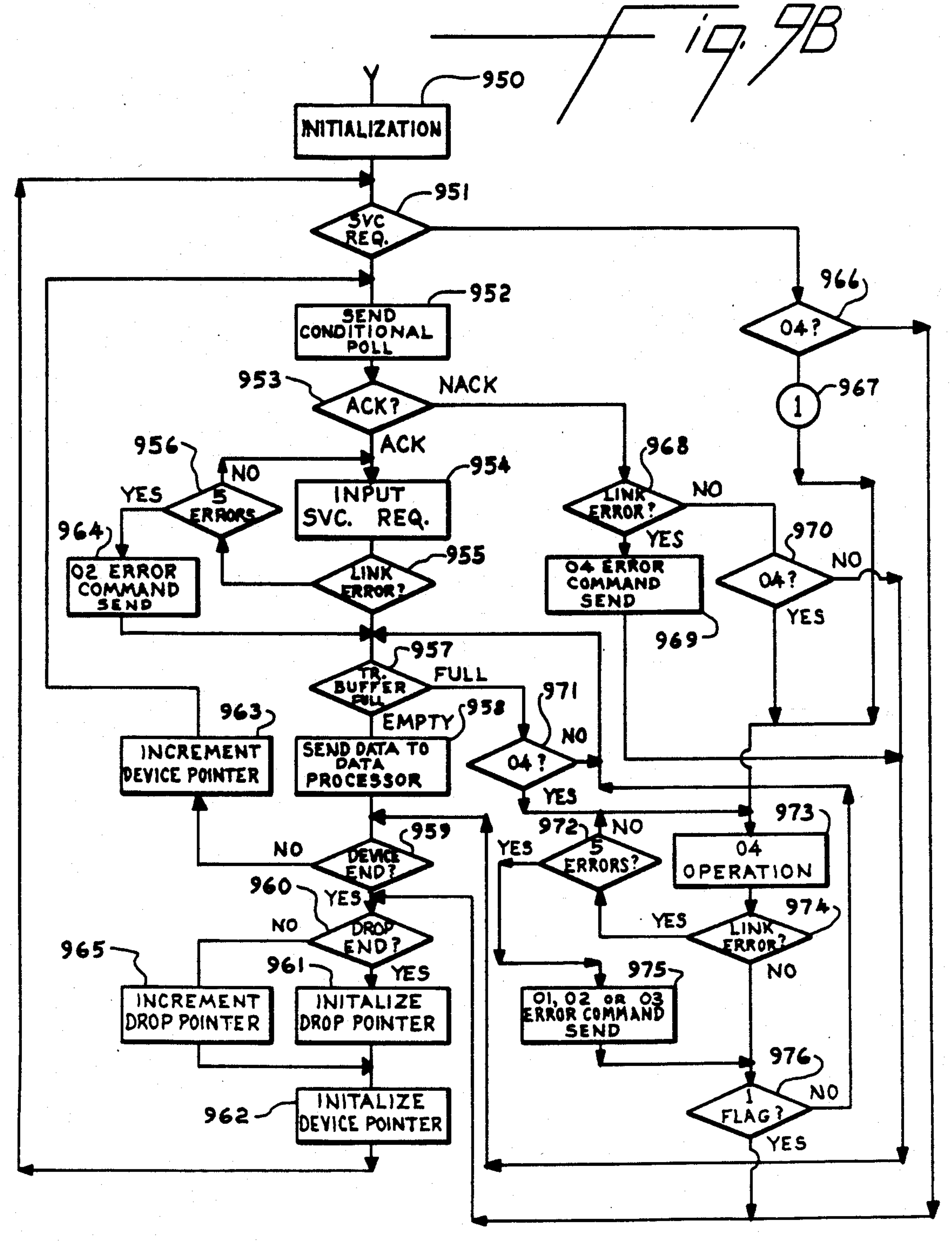

A flow chart of the Timer Interrupt Routine is illustrated in FIG. 9*b*. As shown in FIG. 9*b*, the Timer Interrupt Routine starts at step 950 to initialize the drop and device maps and clear various flags and buffers. The program then advances to step 951, where a determination is made as to whether ("yes") or not ("no") a Service Request exists on the drop to which the Drop Processor is connected via multiplexer 350 (FIG. 4).

Assuming first that no Service Request is detected at step 951, the program branches to step 966 where the 04 Buffer is checked to determine whether or not the Drop Processor has received an 04 Command from the Data Processor for transmission to a device attached to a drop cable. If not, the program advances to step 960 to update the drop polling map pointer. If the pointer is not pointing to the end of the drop map, the program increments the drop map pointer in step 965, initializes the device map pointer to the beginning of the device map, and loops to step 951 to listen for the presence of a Service Request on another drop. On the other hand, if at step 960 the program determines that the drop pointer is at the end of the drop map, the program advances to step 961 to reset the drop map pointer to the beginning of the drop map prior to advancing to step 962 and then to step 951 as described above.

Returning to step 966, if the 04 Buffer contains an 04 Command to send to a device, the program flow advances to step 973 after setting a flag ("1") in step 967. At step 973, the Drop Processor transmits the 04 Command message to the appropriate device. The program then advances to step 974 to determine whether or not a transmission error occurred. If an error occurred, the program branches to step 972. If less than five errors have occurred, the program advances from step 972 to step 973 to re-transmit the 04 Command. On the fifth error, however, the program branches from step 972 to step 975 where an 04 Response containing an appropriate error code is transmitted from the Drop Processor to the Data Processor as earlier described. From step 975 in the event of an error, or step 974 in the event of no error, the program advances to step 976 to check the state of the "1" flag. Because the program advanced from step 967, the "1" flag will earlier have been set. Accordingly, the program from step 976 advances to step 960 to increment or initialize the drop map pointer as previously described.

Assuming now that a Service Request is detected at step 951, the program advances to step 952 where a conditional poll command (earlier described) is transmitted on the drop on which the Service Request was detected. At step 953, the Drop Processor determines whether an ACK or a NACK (earlier described) is returned in response to the poll. Assuming first that a NACK is returned, the program branches to step 968 to determine whether or not a transmission error occurred. If "yes", the program advances to step 969 to return an appropriate error code to the Data Processor. Otherwise, the program advances to step 970 to determine whether or not an 04 Command has been received from the Data Processor for transmission to a device. If "yes", the program advances to step 973 to transmit the 04 Command as previously described. Otherwise, the program advances to step 959 to determine whether dr not the device map pointer is at the end of the device poll map. If the program is not at the end of the device map, the device map pointer is incremented at step 963 and a conditional poll command to the next device is sent at step 952. If the program is at the end of the device map, the program advances from step 959 to step 960 to update the drop map pointer and loop as previously described.

Assuming now that an ACK is detected at step 953 (signifying that the polled device has an Unsolicited Data Response to transmit to the ECU), the program advances to step 954 to input the unsolicited data. Steps 955, 956 and 964 determine as previously described with respect to steps 972, 974 and 975 whether or not five transmission errors occurred. In the event of five errors, an appropriate error code is sent to the Data Processor at step 964. From step 964 or step 955, the program advances to step 957 to check an output buffer full ("OBF") flag indicating whether the Drop Processor's output buffer to the Data Processor is full or empty. If the buffer is empty, the program advances to step 958 where the unsolicited data is sent to the Data Processor as an 84 Command via the Drop Processor's output buffer. The program then advances to step 959 to update the drop and device map pointers as previously described. Alternatively, if the output buffer is full at step 957, the program advances to step 971 to determine whether or not the Data Processor has sent an 04 Command to the Drop Processor for a device attached to a drop cable. If there is no 04 Command to send at step 971, the program loops to step 957. On the other hand, if there is an 04 Command to transmit, the program advances to step 973 to transmit the 04 Command as previously described. At step 976, because the "1" flag this time is not set, the program loops back to step 957.

D. CCC/ECU Communication Protocol

1. Message Format

A typical data message format used in one embodiment of the invention for communicating information between the central control computer (CCC) at head end 12 and the plurality of ECUs connected to cable network 14 will now be described with reference to FIGS. 10 and 11.

Figure 10A:
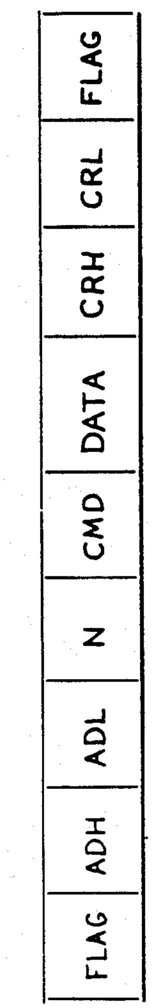
FIGS. 10*a*–*b* are diagrams of basic message formats used in an embodiment of the invention for data communication in the forward direction from the CCC to an ECU.

A basic message format for data communication in the forward direction (i.e., from the CCC to an ECU) is illustrated in FIG. 10*a*. As shown in FIG. 10*a*, each message is of a predetermined format comprising: a FLAG byte, two ADDRESS bytes specifying an ECU address, a BYTE COUNT byte ("N"), a COMMAND byte ("CMD"), a plurality of DATA bytes, two CYCLIC REDUNDANCY CHECK ("CRC") bytes, and another FLAG byte. Each byte is comprised of 8 bits.

The FLAG bytes identify the beginning and end of a message. Each FLAG byte has a unique bit pattern ("01111110"). At the end of a message, if there are no more messages available for transmission by the CCC, the CCC transmits repetitive FLAG bytes to maintain synchronization on the communications link. Otherwise, the end FLAG byte serves as the start FLAG byte of the next message.

The two ADDRESS bytes typically specify the address of a particular ECU from 0001 (hex) through FFFE (hex). The use of two ADDRESS bytes in this matter to specify an ECU address allows the CCC to uniquely address a message to any particular one of 65,534 ECUs. The first address byte (ADH) specifies the high-order part of the address, and the second byte (ADL) specifies the low-order part. Two addresses have special meanings. Address FFFF (hex) is a global or broadcast address. All ECUs respond to a message containing the broadcast address. Address 0000 is a "mask" address, described in detail below.

The BYTE COUNT byte (N) specifies the number of bytes following in the message, exclusive of CRC and FLAG bytes. Following the BYTE COUNT byte is a COMMAND byte (CMD). As discussed in detail below, the COMMAND byte specifies the type of message being transmitted and the manner in which subsequent DATA bytes should be interpreted.

The CRC bytes (CRH and CRL) are two bytes which together form a conventional 16-bit CRC number. These two bytes are derived from a mathematical manipulation of all bits (exclusive of the FLAG bits) preceding the CRC bytes, and serve as a check that the message was accurately transmitted to and received by the ECU. The derivation of the CRC bytes is accomplished in a conventional manner in accordance with standards promulgated by international standards organizations, such as the CCITT.

Figure 10B:
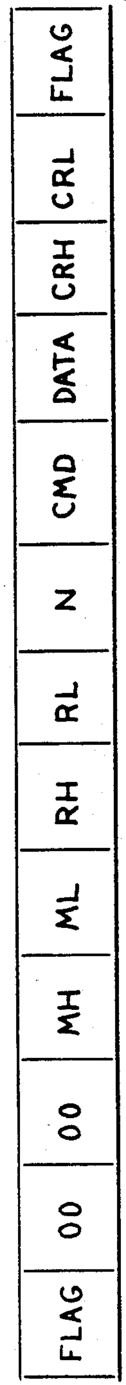

The use of ADDRESS 0000 (the mask address) enables a message to be directed to any particular ECU or group of ECUs. The basic format of a message having an address of 0000 is illustrated in FIG. 10*b*. As shown in FIG. 10*b*, a message having a mask address equal to 0000 differs from a basic message (FIG. 10*a*) by the inclusion of four additional bytes following the ADDRESS bytes. These four bytes are two MASK bytes ("MH" and "ML") followed by two REFERENCE bytes ("RH" and "RL"). Any ECU receiving a message having a 0000 mask address will logically AND the ECU's unique address with the values of the MASK bytes. If the result of this logical operation equals the values set forth in the REFERENCE bytes, the ECU will recognize the message as addressed to it and respond accordingly. Otherwise. the ECU will ignore the message. As will be readily apparent to those skilled in the art, the use of the mask address in this manner allows a single message to be transmitted to any one or a selected group of ECUs. For example, if the MASK bytes are 0001, and if the REFERENCE bytes also are 0001, then all ECUs having odd addresses will respond to the message. On the other hand, if the REFERENCE bytes are changed to 0000, then all ECUs having even addresses will respond to the message.

Figure 11:
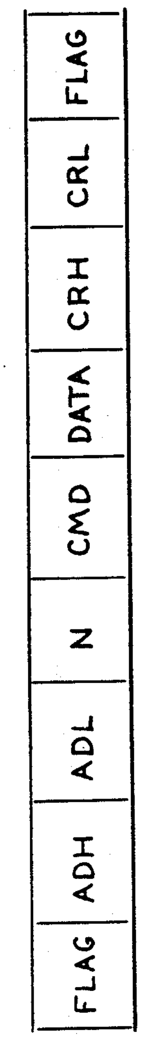
FIG. 11 is a diagram of a basic message format used in an embodiment of the invention for data communication in the reverse direction from an ECU to the CCC.

A basic message format in the reverse direction (i.e., from the ECUs to the CCC) is shown in FIG. 11, and is similar to the format for forward communication shown in FIG. 10*a*. Thus, unique FLAG ("01111110") bytes are used to identify the beginning and end of a message. Following the beginning FLAG byte are two ADDRESS bytes which specify the address of the particular ECU sending the message. Next follow a BYTE COUNT byte (N), a COMMAND byte (CMD), and DATA bytes. Two conventionally derived CRC bytes follow the last DATA byte as earlier described.

Referring now to FIGS. 12 through 17, there are shown illustrative examples of several typical messages sent between the CCC and an ECU in one embodiment of the invention. The messages of FIGS. 12 through 17 are formatted in accordance with the basic message formats of FIGS. 10–11.

FIG. 12 illustrates a WRITE message sent from the CCC to an ECU. The WRITE message may be used to write a program or data to any one or a plurality of ECUs commencing at a specified address in the ECU's memory. The use of the WRITE message in this way enables the cable system operator to add new functions and services to the ECU, or to modify existing ones. Thus, the operation of the cable system may be readily enhanced or modified without having to replace or modify the ECU or SPU hardware.

The WRITE message may be used to implement a variety of functions in an ECU. For example, the WRITE message may be used to download a Channel Authorization Map in an ECU specifying which television channels each associated subscriber is authorized to view. In one embodiment, the Channel Authorization Map comprises a string of 128 bytes of data stored in the ECU's memory, each byte associated with a different one of 128 so-called logical channels. A logical channel is that channel which a subscriber requests by entering a channel number into the SPU. Each of the first six bits of each byte in the Channel Authorization Map is associated with a different one of six SUs. A bit is set to "1" or to "0" depending respectively on whether or not the subscriber associated with that bit and SU is authorized to view the television channel associated with that byte. To transmit a Channel Authorization Map to an ECU, a WRITE command may be used specifying the start address of the map in the ECU's memory and the 128 bytes of logical channel data. The use of the WRITE command to transmit a new or replacement Channel Authorization Map enables the cable operator to add or delete authorized channels for particular subscribers as a function, e.g., of whether or not the subscriber has paid his or her bill, whether the subscriber has requested to subscribe to view additional or fewer channels, and so forth.

As another example, the WRITE command may be used to transmit to an ECU a so-called Channelization Map specifying a correlation between logical channels and physical channels. As earlier described, physical channels are the channels carried on the CATV feeder cable to which the converter/tuner in the SU tunes in response to subscriber requests to view a particular logical channel. For example, the Channelization Map might correlate logical channel 7 with physical channel 52, logical channel 9 with physical channel 15, and so on. In one embodiment having a single feeder cable, the Channelization Map in each ECU includes 128 bytes of data (in a two cable system, the Channelization Map would include 256 bytes of data). The data are grouped in pairs such that each pair of bytes is associated with a different one of 64 (or 128 in a two cable system) logical channels. Thus, the first byte pair is associated with logical channel 0, the second byte pair with logical channel 1, and so on. Each pair of bytes specifies the two MS numbers, earlier described, which are the tuning information required by the converter/tuner of each SU to tune to a particular physical channel. By changing the values of the MS numbers in the Channelization Map using the WRITE message, the CCC can dynamically (i.e., on any given day and at any given time) re-define the logical channel/physical channel correlation. This allows the cable system operator to transmit a television program on any available physical cable channel while allowing the subscriber to always view that program by selecting the same logical channel. This is important in situations of large amounts of noise on a particular physical channel which degrades the television signal. In such an event, the system operator can transmit a new Channelization Map to redefine the physical channel/logical channel correlation to associate a less noisy physical channel with the logical channel, and transmit the program on the less noisy channel. The subscriber, however, will still access the channel carrying the program the subscriber desires to view by keying into the SPU the same logical channel number.

As shown in FIG. 12, a WRITE message includes the usual two ADDRESS bytes (ADH and ADL) specifying the particular ECU to which the message is directed, and a BYTE COUNT byte (N) specifying. the number of bytes following in the message. Next appears a COMMAND byte equal to hex FC ("11111100"). This COMMAND byte identifies the message as a WRITE message. After the COMMAND byte is a DATA COUNT byte (NN) specifying the number of bytes of data contained in the WRITE message to be written to the ECU's memory. Next, two bytes ("MDL" and "MDH") specify in low and high order parts, respectively, the specific ECU memory address at which the write operation should commence. Finally, there follow NN bytes of data to be written to the ECU's memory.

Another message sent from the CCC to an ECU is a READ message, illustrated in FIG. 13*a*. A READ message enables the CCC to obtain one or more bytes of data from an ECU commencing at a specified address of the ECU's memory. The READ message may be used for a variety of purposes. For example, the READ message may be used to determine which subscribers are authorized to view which channels, which subscribers should be charged a fee for viewing pay-per-view programs, and so forth. Also, the READ message may be used to examine various portions of an ECU's data or program memory to diagnose faulty or failing ECUs.

As shown in FIG. 13*a*, a READ message includes the usual ADDRESS (ADL and ADH) and BYTE COUNT (N) bytes. After these bytes is a COMMAND byte which may be any value equal to hex F8, F9, FA or FB (11111000, 11111001, 11111010 or 11111011). Each COMMAND byte F8 through FB specifies that the message is a READ message. However, each COMMAND byte also specifies by the values of the two least significant bits on which one of the four available reverse channels the ECU should return data to the CCC. Thus, COMMAND bytes F8, F9, FA and FB specify that the ECU should return data to the CCC on reverse channel 00, 01, 02 and 03, respectively. Following the COMMAND byte is (1) a DATA COUNT byte (NN) specifying how many data bytes to return to the CCC, and (2) two memory address bytes (MADL and MADH) specifying in low and high order parts the ECU memory address at which the data READ operation should commence.

In response to a READ message, the ECU returns to the CCC on the specified reverse channel a message as shown in FIG. 13*b* which includes the data requested by the READ message. The returned message includes the usual ADDRESS and BYTE COUNT bytes, followed by a COMMAND byte set to the value of the read command to which the return message is responsive. Next follow a DATA COUNT byte (NN) specifying the number of bytes of returned data, and the NN bytes of data requested by the READ message.

Still another message sent from the CCC to an ECU is an ECHO BACK message, illustrated in FIG. 14. An ECHO BACK message causes an addressed ECU to return to the CCC on a specified reverse channel a message which is identical to that received by the ECU. The ECHO BACK message may be used to test the cable network for signal degradation and transmission errors, and may also be used to locate non-operating ECUs.

As shown in FIG. 14, an ECHO BACK message includes the usual ADDRESS (ADL and ADH) and BYTE COUNT (N) bytes. Next is a COMMAND byte which may be any value equal to hex FO, F1, F2 or F3 (11110000, 11110001, 111100010 or 11110011). As previously described with respect to the READ message, the last two bits of the COMMAND byte specify on which one of the four reverse channels the ECU should echo back the CCC's message. After the COMMAND byte is a DATA COUNT byte (NN) followed by NN bytes of data.

In response to the receipt of an ECHO BACK message, the addressed ECU returns a message to the CCC as shown in FIG. 14*b* on the specified-reverse channel. Irrespective of the manner in which the message was addressed to the ECU (i.e, using a global, mask or specific address), the ECU's message includes the responding ECU's unique address in the ADH and ADL bytes, followed by a BYTE COUNT byte (N). Thereafter, the returned message is (assuming no transmission errors) identical to that originally sent from the CCC.

Figure 15:
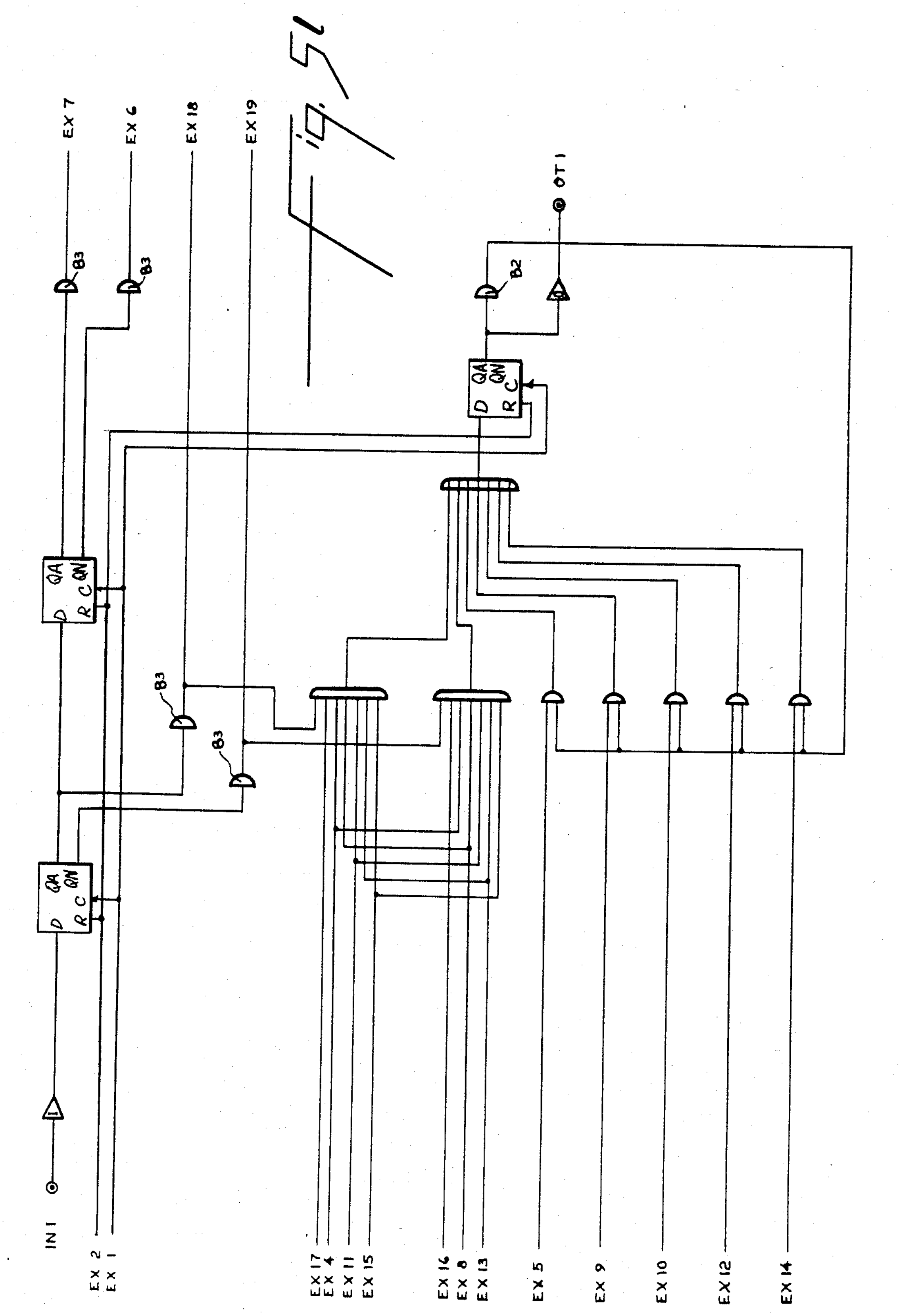

Yet another message sent from the CCC to an ECU is a FORCE TUNE message, illustrated in FIG. 15. This message is used to cause an addressed ECU to force tune any drop associated with that ECU to any channel. Force tuning may be used, for example, to cause all subscriber television sets connected to the CATV system to tune to a channel on which instructions and news may be communicated to subscribers in the event of a civil emergency. Also, this message may be used to automatically tune a subscriber's television set at the appropriate date and time to a channel carrying a pay-per-view program (such as a boxing match) which the subscriber requested to view.

As shown in FIG. 15, a typical FORCE TUNE message includes the usual ADDRESS (ADL and ADH) and BYTE COUNT (N) bytes. Next follow a COMMAND (CMD) byte equal to hex F4 (11110100) to identify the message as a FORCE TUNE message, and a DATA COUNT byte (NN) equal to 2. Thereafter, a SUBSCRIBER UNIT (SU) byte specifies the particular subscriber unit to be force tuned. In one embodiment, the SU byte specifies any one converter using the byte's three least significant bits. This requires a FORCE TUNE message to be transmitted for each converter to be force tuned. Alternatively, each bit of the SU byte may be associated with a different one of six converters such that a single message to an ECU can force tune more than one converter associated with the ECU. Finally, a logical channel (LC) byte specifies the logical channel number to which the specified converter should be force tuned. If the SU byte is associated with more than one converter, there would be a plurality of LC bytes, one for each converter being force tuned.

Another series of messages sent from the CCC to an ECU are SEND FUNCTION messages. These messages are used to cause an ECU to return to the CCC so-called send function data accumulated by the ECU from the ECU's associated subscribers. Send function data is data keyed into SPUs by subscribers in response to requests for such data from the CCC at head end 12. For example, send function data may represent voting or shop-at-home data keyed in by subscribers in connection with interactive viewer preference or shop-at-home services offered by the cable operator. In one embodiment, each ECU maintains in its memory a plurality of so-called send function bytes arranged in pairs. Each pair of send function bytes is associated with a different one of up to six subscribers. The first byte specifies the subscriber with which the byte pair is associated. The second byte contains the send function data. In addition to the byte pairs, the ECU maintains in its memory a send function count byte specifying the number of send function bytes in the ECU's memory. If the ECU's memory contains no send function data (e g., no associated subscriber has entered send function data), the value of the send function count byte is zero.

In one embodiment of the invention there are six SEND FUNCTION messages. These messages are illustrated in FIGS. 16*a* through 16*c*. The first message is the SEND FUNCTION ENABLE message, shown in FIG. 16*a*. In addition to the usual ADDRESS and BYTE COUNT bytes, this message has a command byte equal to hex 80, a DATA COUNT byte (NN), and a single DATA byte (SU). Each bit 0–5 of the (SU) byte is associated with a different one of six SUs..The SEND FUNCTION ENABLE message is used by the CCC to enable or disable the send function in an ECU with respect to particular SUs associated with that ECU. The send function with respect to a particular SU is enabled or disabled depending respectively on whether the setting of the bit of the SU byte associated with that SU is set to "1" or to "0".

The second message is the SEND FUNCTION CLEAR message, shown in FIG. 16*b*. This message includes a COMMAND byte equal to hex 81, and a DATA COUNT byte (NN) equal to 0. In response to the receipt of this message, the addressed ECU clears the send function data in its memory.

The third message is the SEND FUNCTION DATA message, shown in FIG. 16c. This message includes a COMMAND byte which may have any value equal to hex 84, 85, 86 or 87 (10000100, 10000101, 10000110 or 10000111). Upon receipt of this message, an addressed ECU will return to the CCC the send function data in its memory only if the ECU has any send function data to send to the CCC (as determined by the value of the ECU's send function count byte). As previously described with respect to the READ message, the data will be returned by the ECU on the reverse channel (00, 01, 02 or 03) specified by the values of the two least significant bits of the SEND FUNCTION DATA message's COMMAND byte. In response to a SEND FUNCTION DATA message, the ECU sends a message to the CCC which includes one or more pairs of data bytes, each pair associated with a different SU. The first byte of the pair specifies an SU (from 0-5), and the second byte is the send data for that SU.

Yet another message available to be sent from the CCC to an ECU is a PAY-PER-VIEW message. This message is used to (a) force tune an SU to a pay-per-view event requested by the subscriber, and (b) turn on the subscriber's television apparatus via the subscriber's SPU power relay.

The PAY-PER-VIEW message used in one embodiment of the invention is shown in FIG. 17 as including a COMMAND byte equal to hex 88. Next follows a DATA COUNT byte (NN). A PROGRAM NUMBER (PN) byte specifies the so-called program number, described in more detail below, to which the message relates. Finally, two MS bytes specify the MS numbers, earlier described, required to tune the converter/tuner circuitry contained in the SUs to the particular physical channel carrying the pay-per-view event specified by the PROGRAM NUMBER byte.

The PAY-PER-VIEW message in one embodiment of the invention operates as follows. Each ECU includes an Event View byte in its memory. Each of bits 0-5 of this byte is associated with a different one of up to six SUs. When a subscriber tunes to a pay-per-view event, a bit of the Event View byte associated with the SU tuned to the pay-per-view event is set to "1". That bit is reset to "0" when the SU is tuned to a channel not associated with a pay-per-view event, or when the subscriber via the SPU turns off his or her television receiver. The Event View byte is used, as later described, to control the incrementing of a timer.

In addition to the foregoing, each ECU has a Program Event Map in its memory comprised of 128 pairs of bytes. Each byte pair of this map is associated with a different one of 128 program numbers. Each program number is associated with a different pay-per-view program event. Thus the first byte pair of the Program Event Map is associated with program number or event 0, the second pair with program number or event 1, and so on. The byte pairs contain the MS numbers conveyed by the PAY-PER-VIEW message.

In addition to the Program Event Map, each ECU includes in its memory a Program Authorization Map. This map includes 768 bytes arranged in six groups of 128 bytes per group. Each group of 128 bytes is associated with a different SU, and each byte of each group is associated with a different one of 128 pay-per-view events. If a subscriber associated with a particular SU is authorized to view pay-per-view programs, and requests via the subscriber's SPU to view a particular pay-perview program, the three least significant bits of the byte associated with that program and SU are set to the address of the SPU from which the pay-per-view request was received. The five most significant bits of the byte, each initially zero, are used as a preview timer as later described.

To order a desired pay-per-view event, a subscriber enters the program number associated with the pay-per-view event into the keyboard of the subscriber's SPU. If the subscriber is authorized to view pay-per-view events, the address of the SPU from which the request was received is placed in the appropriate byte of the Program Authorization Map as described above. When the event begins, the CCC transmits a PAY-PER-VIEW message specifying the program number and the MS tuning data required by the converter/tuners of the SUs to tune to the program. If a subscriber has requested to view the pay-per-view program specified in the PAY-PER-VIEW message, the ECU force tunes the SU associated with that subscriber to the channel carrying the pay-per-view event. In addition, the ECU sends a command to the SPU to cause the SPU to (1) flash the SPU's eventorder LED to signify that the subscriber is viewing a pay-for-view event during the preview period, and (2) turn on the SPU's television relay to supply power to the subscriber's television set. Thus, at the appropriate date and time, the ECU will turn on and force tune the subscriber's television set to the requested pay-per-view event. Also, the ECU will initiate operation of a preview period timer. During the preview period, a subscriber may view the pay-per-view event free of charge. If the subscriber views more than a predetermined number of minutes of the pay-per-view program, the preview timer will time out and the ECU will send a command to the SPU to cause the event-order LED to glow continuously to signify that the subscriber will be charged a fee for viewing the event.

The preview timer operates as follows. Upon the timing out of a pay-per-view event timer, the ECU checks the state of the bit flags in the Event View byte. If the bit associated with an SU is set to "1", then a bit of the preview timer associated with the SU and program to which the SU is tuned (described above) is set to "1". Each of the five bits of the preview timers in the Program Authorization Map represents a fraction (i.e., onefifth) of the preview period. Each time that the pay-per-view event timer times out, and if the associated bit of the Event View byte is set to "1", another one of the five bits of the appropriate preview timer is set by the ECU. When all five bits of the preview timer have been set, the preview period is over and the subscriber will be charged for the pay-per-view event. The CCC periodically collects the preview timer information contained in the Program Authorization Map using READ messages to determine which subscribers should be charged for viewing which pay-per-view events.

Although several messages have been described in detail with respect to an embodiment of the invention, it will be apparent to those skilled in the art that the message format utilized in the present invention can accommodate numerous other messages sent between the CCC and the ECUs. It will also be apparent to those skilled in the art that the basic format of the CCC/ECU messages may be changed.

E. Data Processor Operation

The operation of the Data Processor will now be described for an embodiment of the invention using the message formats and messages illustrated in FIGS. 10–17. A source and object code computer program listing which will be readily understood by those skilled in the art for controlling the operation of the Data Processor is annexed at Appendix C.

Figure 18A:
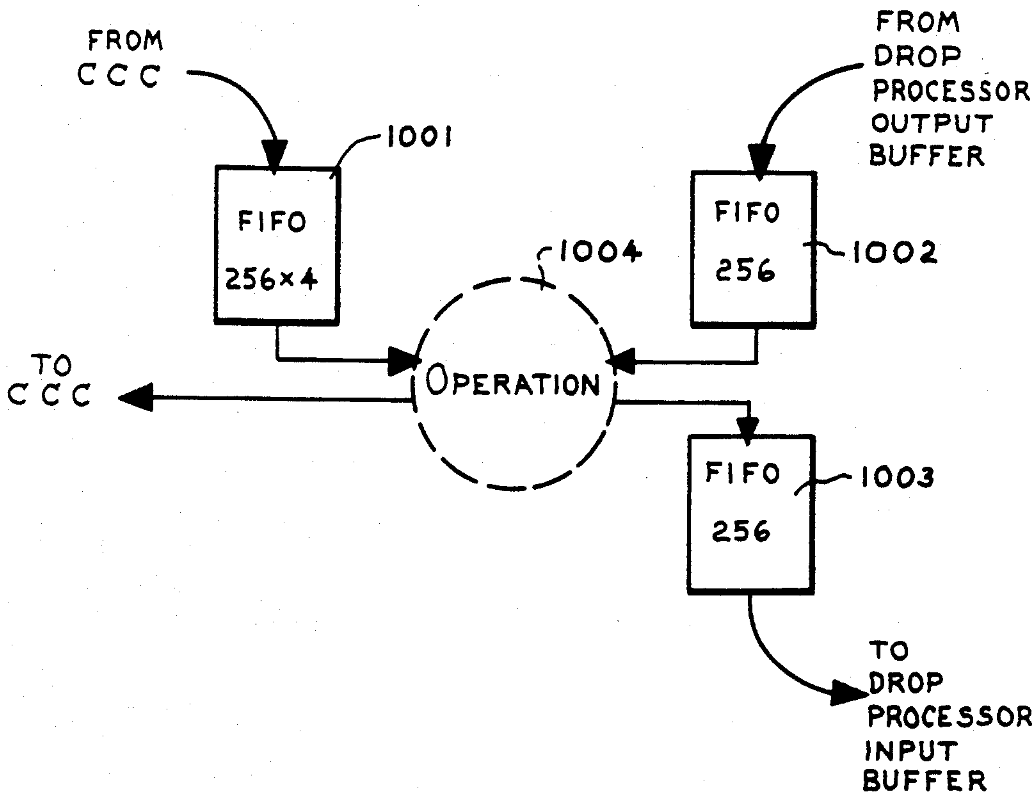
FIGS. 18*a–h* are flow charts illustrating the flow of a program controlling the operations of the so-called Data Processor of the ECU in an embodiment of the invention.

FIG. 18*a* illustrates the overall programmed operation of the Data Processor. As shown in FIG. 18*a*, data received from the CCC is placed by USART 400 of digital unit 55 (FIG. 5) in FIFO receive buffer 1001. This buffer is organized as a 256×4 byte buffer such that it can hold up to four 256-byte CCC messages at any one time. A buffer counter associated with the Data Processor points to the next empty buffer in the FIFO. Two other buffers shown in FIG. 18*a* are FIFO output buffer 1002 and FIFO input buffer 1003. Data received by the Data Processor from the Drop Processor is placed in output buffer 1002. Similarly, data passed to the Drop Processor from the Data Processor is placed in FIFO input buffer 1003. Each of these buffers contains 256 bytes and may buffer up to 25 10-byte messages. A buffer counter associated with each buffer points to the next empty buffer. The Data Processor receives data from FIFO buffers 1001 and 1002, operates on the data (FIG. 18*a*, item 1004), and sends data to FIFO buffer 1003 or to the CCC.

Figure 18B:
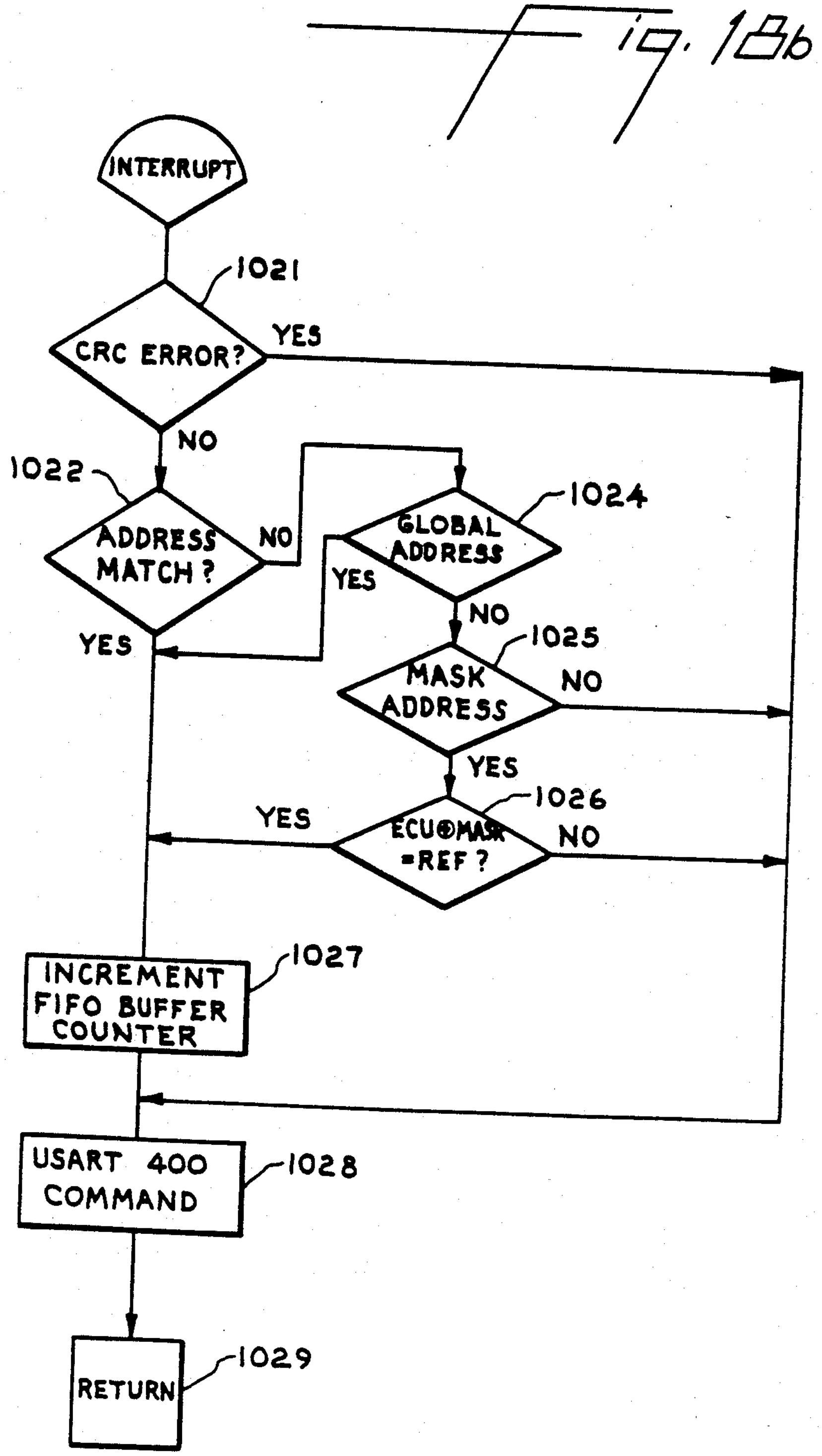

FIG. 18*b* illustrates a flow chart of a routine by which the Data Processor determines whether or not a message has been received from the CCC and, if so, whether or not the message is for that ECU. The routine of FIG. 18*b* is called whenever the Data Processor is interrupted by USART 400 (FIG. 5) to signify that a message has been received from the CCC.

The routine of FIG. 18*b* commences at step 1021, where the routine inhibits further input from USART 400 and determines from the CRC bytes of the received message whether or not a transmission error occurred. If an error occurred, the routine branches to step 1028 where input from USART 400 is again enabled. After step 1028, the interrupt service routine advances to step 1029 and returns to the calling program.

Alternatively at step 1021, if no transmission error occurred, the routine advances to step 1022 where the Data Processor checks the address bytes of the received message. If the address bytes match the ECU's address, the routine advances to step 1027 where the buffer counter associated with FIFO buffer 1001 (FIG. 18*a*) is incremented by one. The routine then advances to step 1028 where USART 400 is enabled as earlier described. Because the buffer counter value was incremented at step 1027, a subsequent CCC message received by USART 400 will be written into the next buffer and will not overwrite the contents of the buffer containing the previously received CCC message.

Returning to step 1022, if the address bytes of the received message do not match the ECU's address, the routine branches to step 1024, where the address bytes are checked for the presence of the global or broadcast address (hex FFFF). If this address is present, the message is for the ECU and the routine advances to step 1027 as previously described. Otherwise, the routine advances to step 1025 where the Data Processor checks for the mask address (hex 0000) in the CCC's message. If this address is not present, the message is not for the ECU and the routine branches to step 1028. Otherwise, the routine advances to step 1026 where the mask operation is performed as earlier described. The routine then branches to step 1027 or to step 1028 depending respectively on whether or not the result of the mask operation performed at step 1026 indicates that the message is for the ECU.

The operating program of the Data Processor will now be described with reference to FIGS. 18*c* through 18*h*. This program is comprised of two major parts: (1) a main routine, and (2) a collection of application programs to implement various functions within the ECU. The main routine is a task-driven program which branches to one or another application program depending upon the task to be performed. The application program performs its task (e.g., inputting keypress data from an SPU such as subscriber-entered channel requests, pay-per-view requests, send function data, etc.) and returns to the main routine. Because of the need to service a plurality of SPUs on a plurality of drop cables, it may occur that an application program must return to the main routine before the application program has completed its particular task. For example, if a subscriber enters a two-digit channel request into an SPU keyboard, the application program associated with that function may input the first digit and return to the main routine prior to the subscriber entering the second digit. In this event, the application program prior to returning to the main routine sets a time out value in a time table and a jump address in a jump address table. As more fully described below, the time out and jump address values enable the main routine to jump back to the application program at the appropriate time to continue at the point the application program left off.

Figure 18C:
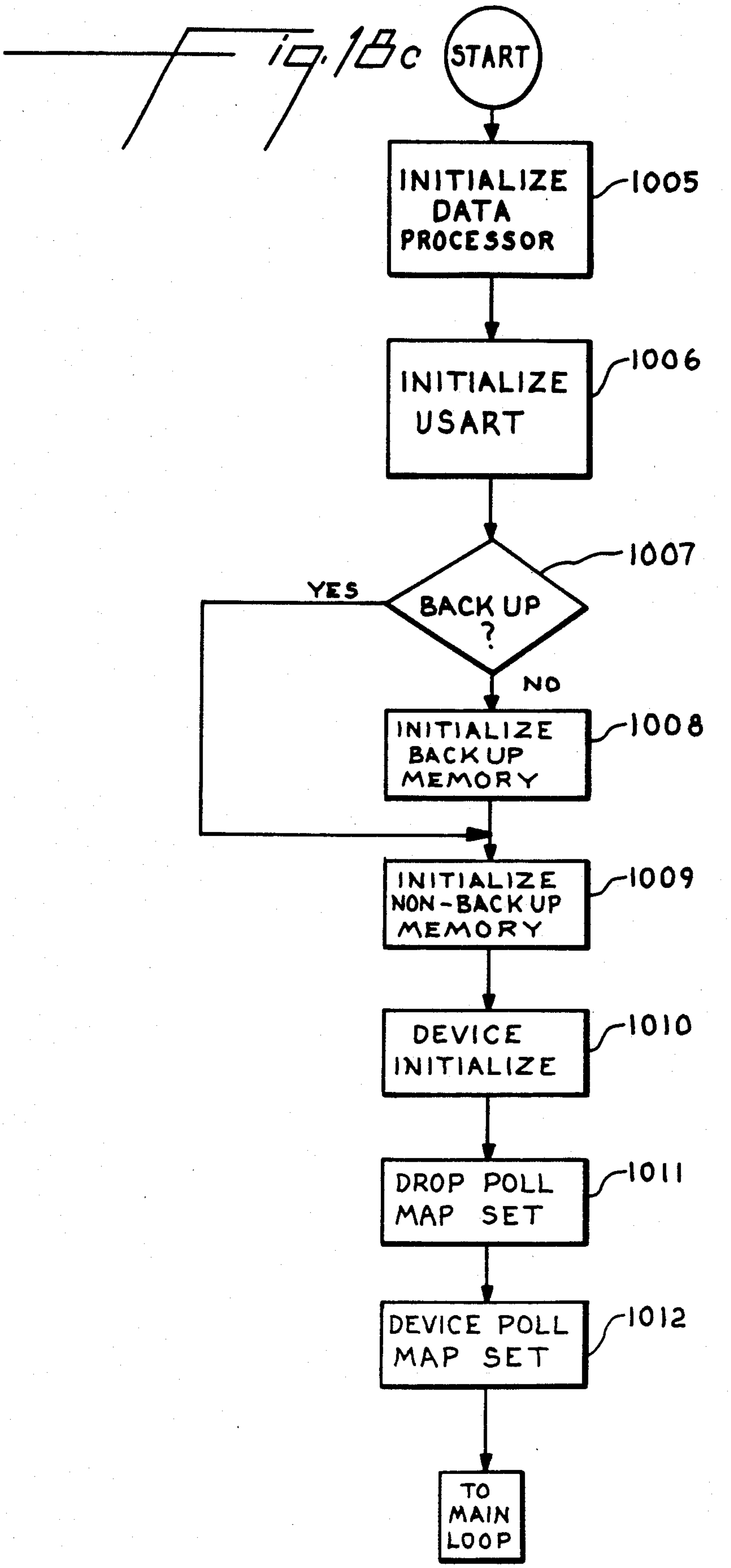

FIG. 18*c* illustrates a flow chart generally illustrating the operation of the main routine. As shown in FIG. 18*c*, the main routine begins at step 1005 upon ECU power up. At step 1005, the Data Processor initializes I/0 and memory maps, an interrupt timer, direct memory access, and various registers and counters. The program then advances to step 1006, where the Data Processor initializes USART 400. At step 1007, the Data Processor 420 checks whether or not its back up memory requires initializing. If so, the program advances to step 1008 to initialize the back up memory. Otherwise, or after completing the back up memory initilization in step 1008, the program advances to step 1009 where other memory locations are initialized. Generally, steps 1008 and 1009 initialize such items as the Channel Authorization Map, Channelization Map, parental control codes, Program Event Map, Program Authorization Map, and so forth. In steps 1010, 1011 and 1012, the Data Processor initializes the drop and device polling maps and pointers.

Figure 18D:
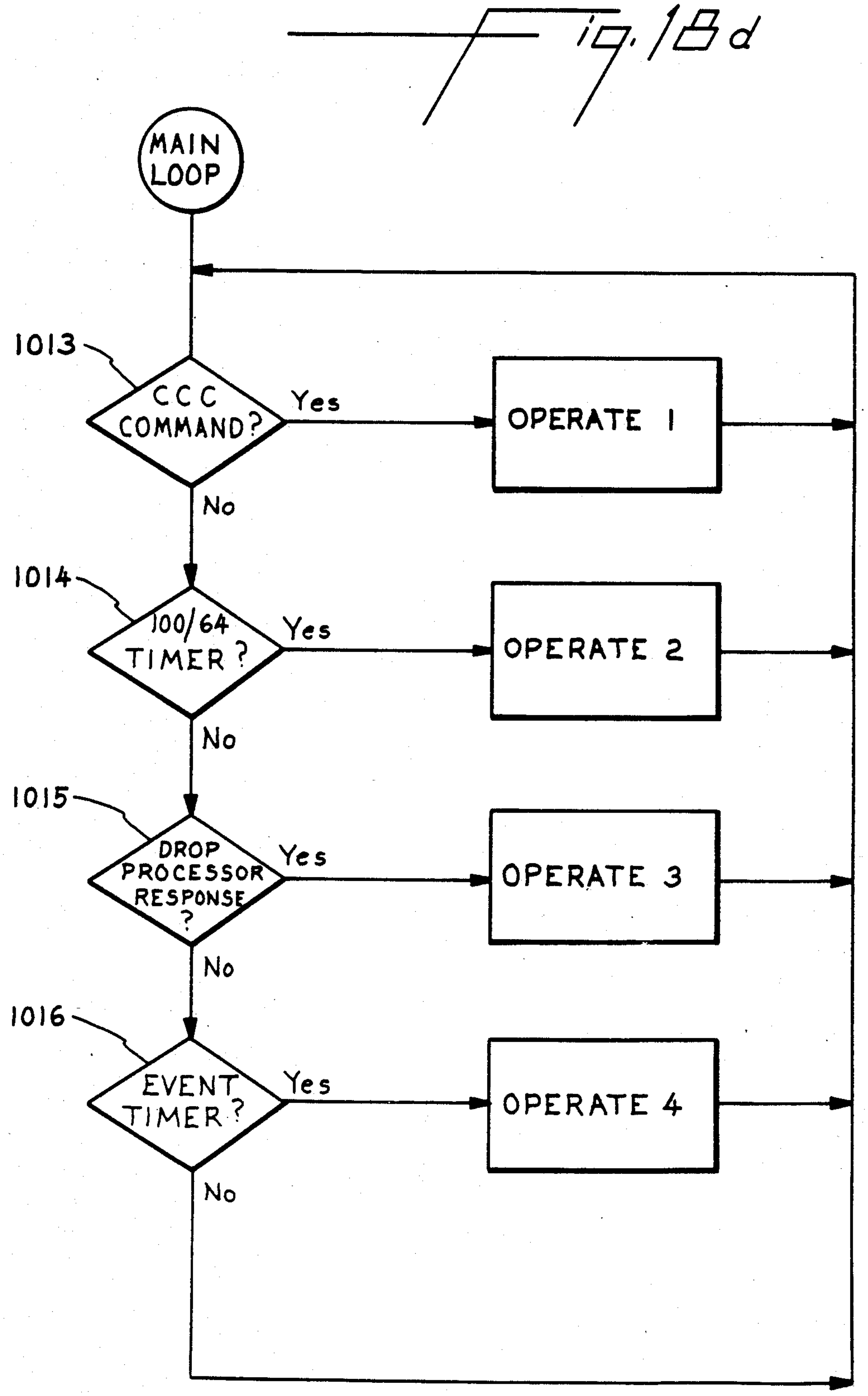

After initialization, the Drop Processor enters a main loop. The main loop is illustrated.in the flow chart of FIG. 18*d*. As shown in FIG. 18*d*, the Data Processor in the main loop sequentially determines whether or not any of four events have occurred, viz., whether or not (1) the Data Processor has received a message from the CCC (step 1013), (2) a 100/64 millisecond pay-per-view eevent timer has timed out (step 1014), (3) the Drop Processor output buffer contains data for the Data Processor (step 1015), and (4) a pay-for-view event timer has timed out (step 1016). If any of the foregoing events have occurred, the Data Processor at the appropriate step 1013, 1014, 1015 or 1016 branches to an associated operation routine shown in FIG. 18*d* as Operate 1, Operate 2, Operate 3 and Operate 4, respectively. Otherwise, the program advances to the next numbered step in FIG. 18*d*. After step 1016, or after an operation routine, the program flow loops to step 1013.

The operation routines of FIG. 18*d* will now be described with reference to FIGS. 18*e*–18*h*.

Operate 1 Routine

Figure 18E:
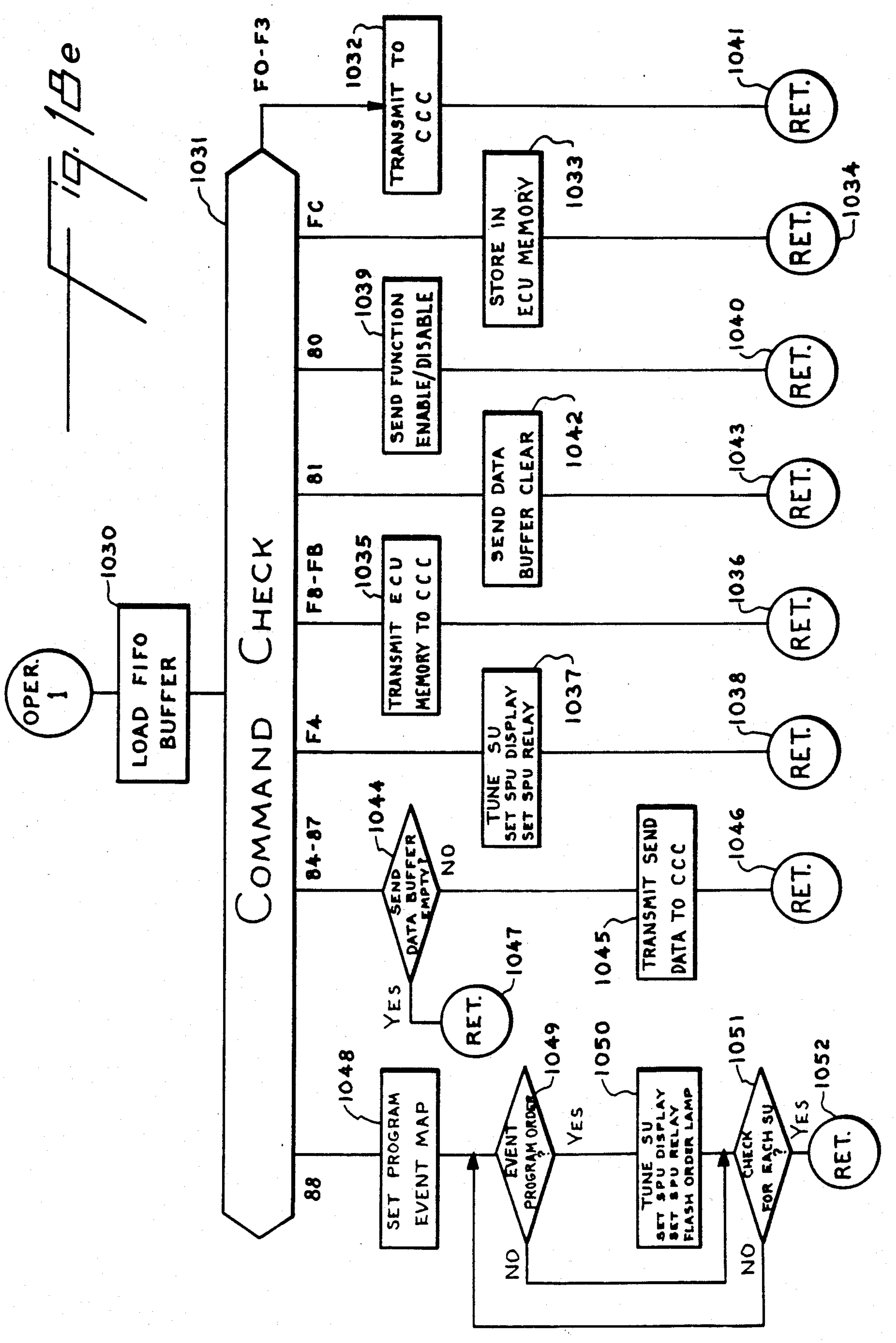

If the main routine detects at step 1013 (FIG. 18*d*) that a message addressed to the ECU has been received from the CCC, the program branches to the Operate 1 routine, shown in FIG. 18*e*, to respond to the CCC message.

The Operate 1 routine commences at step 1030, where the Data Processor loads a CCC message from buffer 1001 (FIG. 18*a*) into working memory: The program then advances to step 1031, where the COMMAND byte of the CCC message is checked to determine what action the Data Processor should take.

At step 1031, if the COMMAND byte of the CCC message is hex F0–F3 (ECHO BACK), the program advances to step 1032 to transmit (echo) the received message back to the CCC. After transmitting the message, the program advances to step 1041 and returns to the main loop as earlier described.

If the COMMAND byte at step 1031 is hex FC (WRITE), the program advances to step 1033 to store the data contained in the WRITE message commencing at the location of the ECU's memory. From step 1033, the program advances to step 1034 and returns to the main loop as earlier described.

If the COMMAND byte at step 1031 is hex F8-FB (READ), the program advances to step 1035 to transmit to the CCC data from the ECU's memory specified in the WRITE message. From step 1035, the program advances to step 1043 and returns to the main loop as earlier described.

If the COMMAND byte at step 1031 is hex F4 (FORCE TUNE), the program advances to step 1037 where the converter of the specified SU is tuned to the specified channel, the SPU seven-segment display is set to display the logical channel to which the SU is being force tuned, and the power relay of the SPU associated with the SU is activated to turn on the subscriber's television. The program then advances to step 1038 and returns to the main loop as earlier described.

If the COMMAND byte at step 1031 is hex 80 (SEND FUNCTION ENABLE) or hex 81 (SEND FUNCTION CLEAR), the program advances respectively to step 1039 to enable/disable the send function in the SPU's or to step 1042 to clear the send function data buffer in the ECU. From steps 1039 or 1042, the program advances respectively to step 1040 or step 1043 and returns to to the main loop as earlier described.

If the COMMAND byte at step 1031 is hex 84–87 (SEND FUNCTION DATA), the program advances to step 1044 where the Data Processor checks the value of the send function data count byte to determine whether or not the ECU has any send function data to return to the CCC. If the ECU has no send function data, the program branches from step 1044 to step 1047 and returns to the main loop as earlier described. Otherwise, the program advances to step 1045 where the ECU's send function data is transmitted to the CCC. The program then advances to step 1046 and returns to the main loop as earlier described.

Finally, if the COMMAND byte at step 1031 is hex 88 (PAY-PER-VIEW), the program branches to step 1048 where the MS tuning data contained in the PAY-PER-VIEW message is stored in the ECU's Program Event Map. The program then advances to step 1049 where the Data Processor checks the Program Authorization Map to determine for a first subscriber whether or not the subscriber has ordered to view the pay-per-view program. If a subscriber has requested to view the pay-per-view event, the program advances to step 1050 where the SU associated with that subscriber is force tuned to the pay-per-view program, the associated five-minute preview timer is started, the event-order LED on the subscriber's SPU is set to flashing, and the SPU's power relay is activated to turn on the subscriber's television. The program then advances to step 1051 which causes the program to loop back to step 1049 for each of up to six subscribers. After looping for all subscribers, the program from step 1051 advances to step 1052 and returns to the main loop as earlier described.

Operate 2 Routine

Figure 18F:
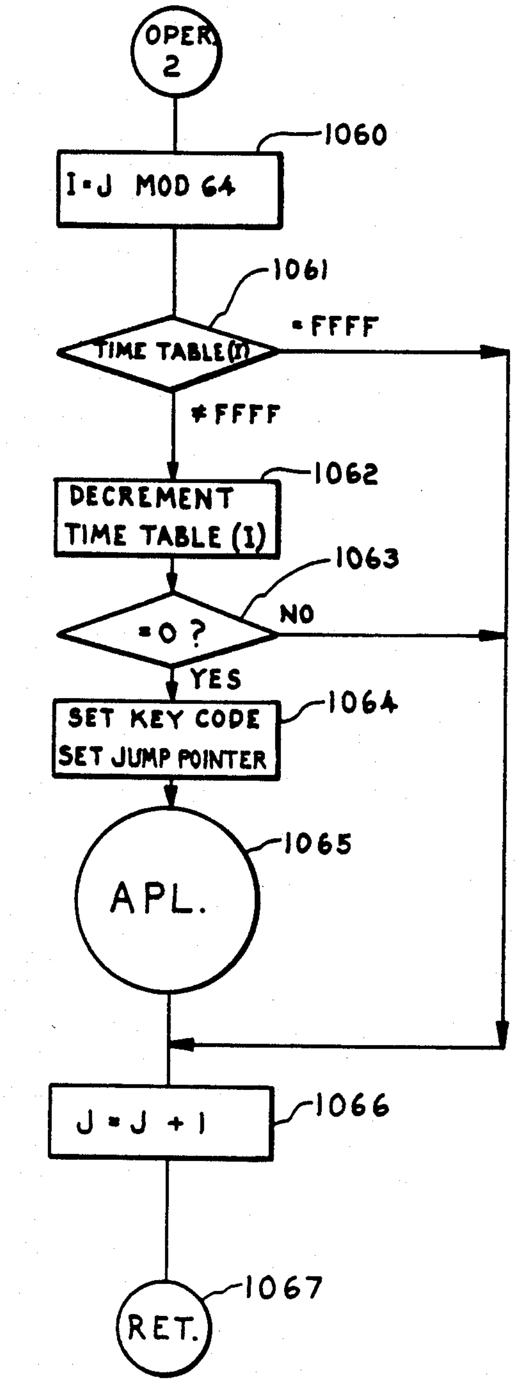

If the main routine detects at step 1014 (FIG. 18*d*) that the 100/64-second timer has timed out, the program branches to the Operate 2 routine, shown in FIG. 18*f*. The Operate 2 routine functions to transfer control of the Data Processor to any of a plurality of application programs. As earlier described, application programs implement a variety of functions, such as responding to SPU key presses and implementing the requested operation (e.g., channel selection pay-per-view, parental control), activating the SPU's power relay, activating (flashing or non-flashing) and deactivating the SPU order event LED, clearing the SPU seven-segment display, sending data (e.g., program or channel information) to the SPU display, and so forth.

The Operate 2 program operates as follows. The Data Processor maintains in memory a time table having a pluraliity of two-byte entries for each of up to 8 devices on each of up to 6 different drops associated with the ECU. In one embodiment, the time table has 64 entries (0–63), although in the described embodiment there may be no more than 6 drops with no more than 8 devices (up to 4 SPUs and up to 4 other devices) on each drop associated with each ECU. The entries in the time table are sequentially arranged by drop and device, such that entries 0–7 are associated with devices having addresses 0–7 on drop 0, entries 8–15 are associated with devices having addresses 0–7 on drop 1, and so on. As previously described, the entries in the time table are set by the various application programs as a time out value prior to a return to the main routine from the application program.

Upon entry into the Operate 2 routine, a time table pointer (I) is set to a value from 0–63 (step 1060) as a function of the value of a time table counter (J). The routine then advances to step 1061, where the I pointer is used to read the $I^{th}$ entry (associated with a particular device on a particular drop as described above) from the time table. If the value of that entry is hex FFFF (signifying that the timer is off), the routine branches to step 1066 where the time table counter J is incremented by one in preparation for the next pass through the Operate 2 routine. If the entry is other than hex FFFF, the routine advances to step 1062 where the time table entry is decremented by one. If the time table value after decrementing is not equal to zero (step 1063), the routine branches to step 1066 where the J counter is incremented as previously described.

On the other hand, if the timer entry is equal to zero, the timer has timed out and the routine advances to step 1064 where a zero is placed in a memory location (Key Code), and the value of the I pointer is used to interrogate a jump table. The jump table is a table maintained in the ECU's memory which is similar in organization to the time table. However, the jump table entries specify the memory location in an application program to which the program should jump. These values may point to the start of an application program, or to a point within an application program if the application program had previously returned to the main routine prior to completing the application program's task. Based upon the entry contained in the jump table, the Operate 2 routine then advances to step 1065, where the routine jumps to the point in an application program ("APL") specified by the jump table. When the application program returns to the Operate 2 routine, the Operate 2 routine advances to step 1066 where the J counter is incremented as earlier described. The routine then advances to step 1067 to return to the main loop.

Operate 3 Routine

Figure 18G:
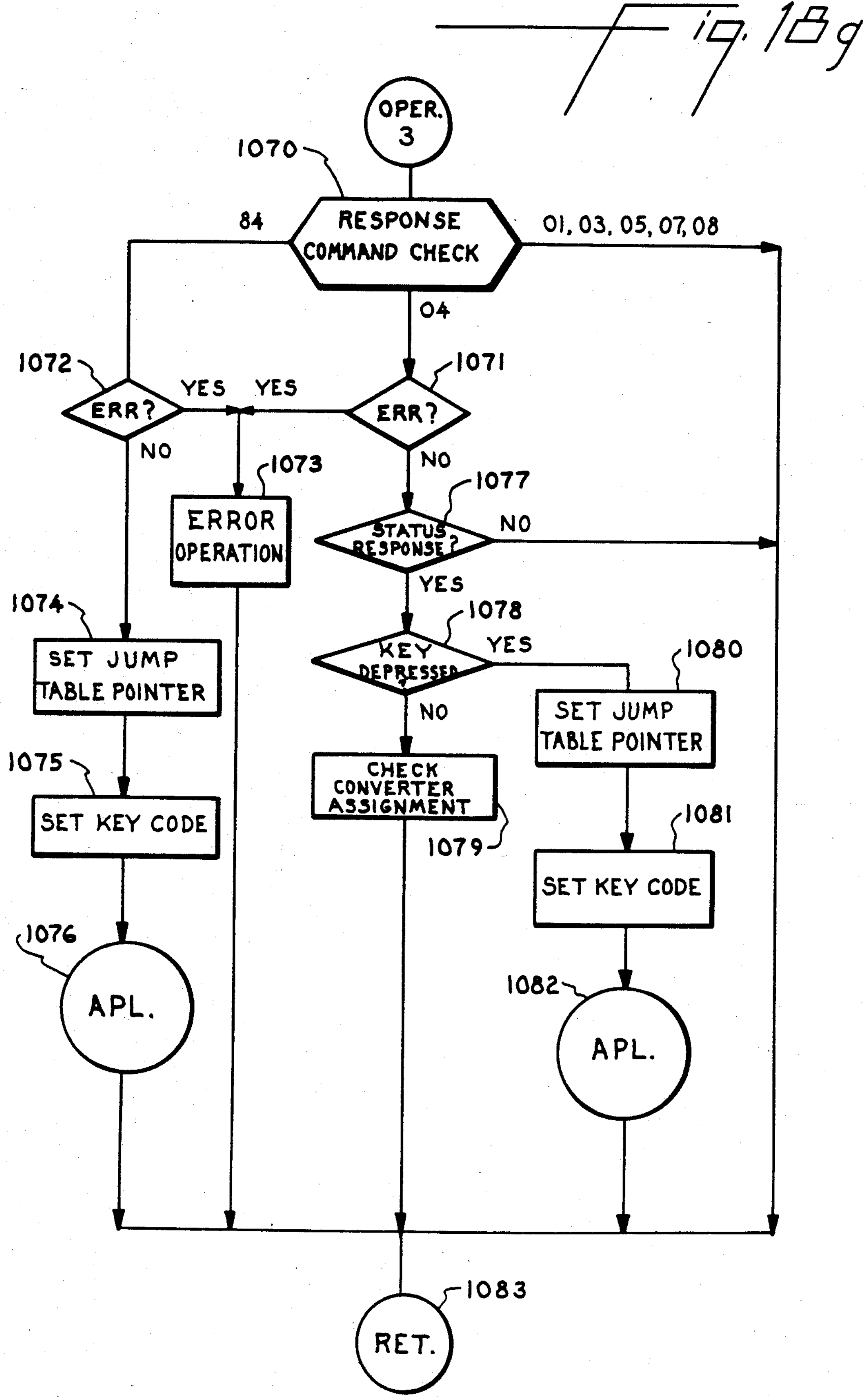

If the main routine determines at step 1015 (FIG. 18*d*) that the Drop Processor has data for the Data Processor, the program branches to the Operate 3 routine, shown in FIG. 18*g*. The Operate 3 routine functions to appropriately respond to data received from the Drop Processor. Such data may include 84 Commands (Unsolicited Data Responses), and 04 Responses received from associated SPUs.

As shown in FIG. 18*g*, the Operate 3 routine at step 1070 first determines what type of message is being sent from the Drop processor. If the message is an 01, 03, 05, 07 or 08 command response (earlier described), no action is required and the Operate 3 routine advances to step 1083 to return to the main routine as earlier described. Although in the flow chart of FIG. 18*g* no action is taken in response to an 01, 03, 05, 07 or 08 response, it will be apparent to those skilled in the art that various modifications may readily be made to the program flow to cause the Data Processor to respond to any or all of these command responses. For example, the program may be modified to cause the Data Processor upon detecting in an 01 response that power is not being received from a particular drop to notify the system operator of this fact.

If an 84 Command is detected at step 1070, the Operate 3 program branches to step 1072 to determine if an error has occurred. If "yes", the program branches to step 1073 where a device error counter is incremented in an error operation subroutine. If the counter reaches a predetermined value (e.g., 2), the error subroutine causes a re-initialization of pointers and jump table entries associated with the SPU or device sending the 84 Command. The program then advances to step 1083 to return to the main loop as earlier described. On the other hand, if no error is detected at step 1072, the program advances to (1) step 1074, where the jump table pointer is set, (2) step 1075, where the received data is placed in a memory location (Key Code), and (3) step 1076, where the program jumps via the jump table to the appropriate application program (APL). When the application program returns to the Operate 3 routine, the Operate 3 routine advances to step 1083 and returns to the main loop.

Finally, if an 04 Response is detected at step 1070, the Operate 3 routine advances to step 1071 to check for a transmission error. If an error has occurred, the routine branches to step 1073. Otherwise, the routine advances to step 1077 where the Data Processor determines if the 04 Response is a status response. If the 04 Response is not a status response, the program branches from step 1077 to step 1083 to return to the main loop as earlier described. Otherwise, the program advances to step 1078. At step 1078, if the status response indicates that a key has been recently depressed on the device keyboard, the routine branches to steps 1080, 1081 and 1082 to respond to the key press as described above with respect to steps 1074–1076. If the status response indicates that no key has been recently depressed, the program advances from step 1078 to step 1079 where the status byte is checked to determine the state of bit 7. As earlier described, bit 7 indicates as a function of the setting of SPU switch 780 (FIG. 7) whether the responding device is a master or slave SPU and, thus, to which converter (primary or secondary) the SPU is assigned. After step 1079, the program advances to step 1083 to return to the main loop as earlier described.

Operate 4 Routine

Figure 18H:
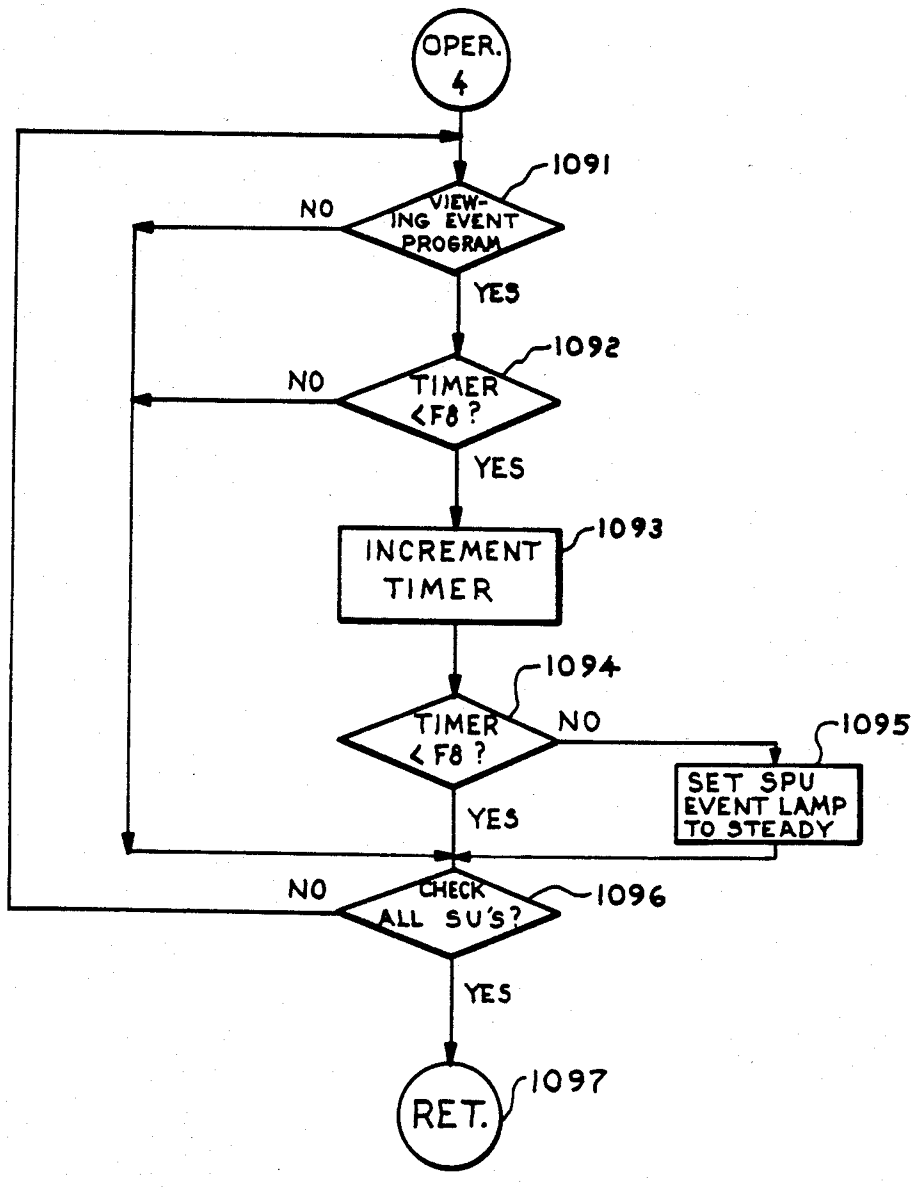

Lastly, if the main routine at step 1016 (FIG. 18*d*) determines that the pay-per-view timer has timed out, the program branches to the Operate 4 routine shown in FIG. 18*h*. This routine starts by entering a loop at step 1091 to determine for each subscriber whether or not the subscriber is viewing a pay-per-view program. If the subscriber is not viewing a pay-per-view program at step 1091, the routine branches to step 1096 where the routine loops back to step 1091 to make the foregoing determination for the next subscriber. If at step 1091 a pay-per-view event is being viewed by a subscriber, the routine advances to step 1092 to check the associated 5-bit preview timer in the appropriate byte of the Program Authorization Map. If the value of the byte is greater than or equal to F8, indicating that the byte's five most significant bits (i.e., the timer bits) are all set to "1" and the preview period has expired, the program branches to step 1096. However. if the value of the byte is less than hex F8, indicating that at least one of bits 3–7 of the byte is equal to zero and the preview period has not expired, then the program advances to step 1093 where the 5-minute timer is incremented by setting a timer bit to "1". The routine then advances to step 1094, where the value of the byte is again checked. If the five timer bits are now all set to "1", then the preview period has expired and the program branches to step 1095 to cause the order-event LED on the subscriber's SPU to glow steadily to indicate that the subscriber will be charged for the pay-per-view event. Otherwise, the program branches to step 1096. Step 1096 causes the routine to loop to setp 1091 to check for each subscriber whether or not a pay-for-view event is being viewed. At step 1096, after the routine has determined for each subscriber whether or not the subscriber is reviewing a pay-per-view event, the routine advances to step 1097 and returns to the main loop as earlier described.

F. Polling and Handshaking

In the above-described system, an ECU transmits a message to the CCC only if the ECU receives a CCC message which requires a return message (e.g., READ, ECHO BACK or SEND FUNCTION DATA messages). Otherwise, ECUs do not transmit messages to the CCC.

Thus, in the above-described system, it is possible for an ECU to have important information to send to the CCC (e.g., information received from a subscriber requesting additional services, or information from a medical monitoring device attached to the drop cable of an ECU), but be unable to notify the CCC of this fact. Also, because ECUs in the above-described system do not ordinarily respond to the CCC upon receipt of a CCC message, the CCC might not become alerted to an inoperative ECU or transmission link until a message requiring a response (e.g., READ) was addressed to the ECU and the responsive message was not received by the CCC.

To enable ECUs to send important information to the CCC in a timely fashion, and to provide for a check that ECUs are operative, a polling and handshaking communication protocol may be used. In view of the potential for a large number of ECUs (up to 65,536 on each of up to 4 banks) on the cable network of the present invention, an important consideration in designing such a protocol is to minimize the time required to poll and handshake with individual ECUs.

The present invention therefore provides for a handshaking scheme which informs the CCC of inoperative ECUs but which does not require the transmission of relatively lengthy formatted messages. In addition, the present invention provides for a polling scheme which allows an ECU to notify the CCC that the ECU has information for the CCC, but does not require the transmission of lengthy information messages to the CCC in response to the receipt by an ECU of a poll message. The polling scheme enables the CCC to gather information from the ECUs via two independently operating mechanisms. A first or "general" polling scheme allows the CCC to poll each ECU to determine if the ECU has information to send to the CCC. The general polling scheme allows for the detection in less than 20 seconds of all operative ECUs which require service. A second or "priority" polling scheme allows for the detection in less than 20 milliseconds of any one ECU having so-called priority information for the CCC. For both polling schemes, the response "level" is established by the CCC in advance of the poll to identify and obtain responses from only those ECUs having information falling within a predetermined level or threshold of importance. The level of information may be a function, e.g., of the value or timeliness of the information.

1. Message Format

The polling and handshaking protocols are described below with respect to an alternative basic message format from that earlier described and shown in FIGS. 10–11. This alternative basic message format is illustrated in FIGS. 19–20.

Figure 19:
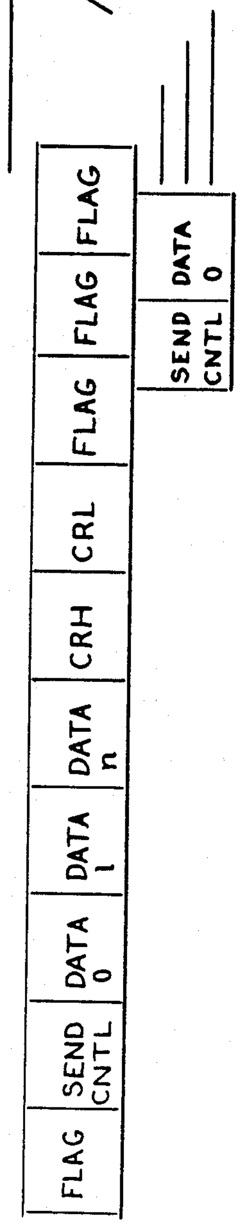
FIG. 19 is a diagram of a basic message format used in another embodiment of the invention for data communication in the forward direction from the CCC to an ECU.
Figure 20:
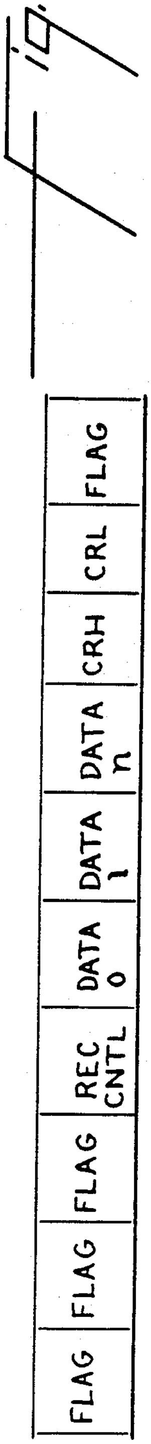
FIG. 20 is a diagram of a basic message format used in another embodiment of the invention for data communication in the reverse direction from an ECU to the CCC.

FIG. 19 shows an alternative basic message format for data communication in the forward direction (i.e., from the CCC to an ECU). Each message is of a predetermined format, comprising: a FLAG byte, a SEND CONTROL ("SEND CNTL") byte, a plurality of DATA bytes, two CYCLIC REDUNDANCY CHECK ("CRC") bytes, and another FLAG byte. Each byte is comprised of 8 bits. The FLAG and CRC bytes are identical to and serve the same function as the FLAG and CRC bytes previously described.

The SEND CNTL byte in the message of FIG. 19 is used to define any of 256 unique commands. As described in greater detail below, SEND CNTL commands may cause an ECU to return information to the CCC, or may cause the ECU to perform a specified operation.

The DATA bytes may comprise from 0 to 255 bytes per message. The SEND CNTL byte specifies how the DATA bytes are to be interpreted by the ECU. If a message is transmitted to a particular ECU, the first two DATA bytes typically specify the ECU address from 0–65536. The first address byte ("ADL") specifies the low-order part of the address, and the second byte ("ADH") specifies the high-order part. Also, typically, the third DATA byte of a message addressed to a particular ECU is a CONTROL ("CTL") byte. The CTL byte may specify the ECU drop, if any, for which the message is designated, the particular reverse channel that the ECU should use to respond to the CCC, etc.

An alternative basic message format in the reverse direction (i.e., from the ECUs to the CCC) is shown in FIG. 20, and is similar to the format for forward communication. Thus, FLAG bytes are used to identify the beginning and end of a message. Following the beginning FLAG byte is a RECEIVE CONTROL ("REC CNTL") byte. The REC CNTL byte, which need not be identical to the SEND CNTL byte, specifies how subsequent DATA bytes, if any, contained in the message are to be interpreted by the CCC. Two CRC bytes, earlier described, follow the last DATA byte.

In addition to the foregoing basic messages, special ECU poll response bytes are utilized. These poll response bytes are comprised of one or two bytetimes of carrier from an ECU. As described below, these poll response bytes are used as a handshake in response to polling and informational messages sent from the CCC.

2. General Level Polling Protocol

The first polling method is the so-called General Level Request ("GLR") poll. This mechanism is used to sequentially address a poll message to each ECU in the system to determine whether or not the ECU requires service (i.e., whether or not the ECU has information for the CCC). Prior to the poll, the CCC establishes the "level" at which the ECUs will respond to the poll. Once the CCC has established the poll level, an ECU responds to a GLR poll only if the ECU (a) requires service, and (b) has information to transmit to the head end 12 which is at a level equal to or less (i.e., more important) than the level previously established by the CCC. The addressed ECU upon receipt of a GLR poll responds by sending to the CCC one or two General Poll Response ("GPR") bytes. Each GPR byte consists of one byte-time of carrier from the ECU, or "11111111". If the CCC fails to detect a GPR byte from the polled ECU within a predetermined time interval (e.g., 350 microseconds), the CCC presumes the ECU to be inoperative. After a predetermined number of (e.g., five) unsuccessful attempts to contact the ECU, the CCC prints an appropriate error message to the head end operator.

If the addressed ECU transmits to the CCC a single GPR byte in response to a GLR poll, the CCC interprets this to mean that the ECU is operative and does not require servicing. The CCC then polls the ECU having the next sequential address. However, if the ECU returns two GPR bytes, the CCC interprets the response as a service request from an operative ECU. Using the GLR poll, the CCC periodically cycles through all active ECUs and constructs a Service Request table in memory. The CCC subsequently uses this table to selectively retrieve, using a Priority Information Request message later described, information from only those ECUs requiring service. At a forward data transmission rate of 200 Kbps, a complete general poll request cycle of 65,536 ECUs typically takes less than 20 seconds.

The GLR poll is implemented by the CCC as follows. First, the CCC transmits a General Level Request Threshold ("GLRT") message. A typical GLRT message is shown in FIG. 21*a* in accordance with the basic message format of FIG. 19. The GLRT message has a SEND CNTL byte equal to 08 and is used by the CCC to establish the response threshold level for the GLR poll, as earlier described. The response threshold is established by a level ("LVL") byte contained within the GLRT message. The first two bits of the CTL byte of the GLRT message specify how the ECU should interpret the LVL byte. If the first two bits of the CTL byte are "01", this is interpreted by the ECU to mean that the ECU should respond positively (i.e., with two GPR bytes) to subsequent poll messages only if the level of the ECU's information is equal to the level set forth in the LVL byte. If the first two CTL byte bits are "10", this means the the ECU should respond positively to poll messages if the level of information to be sent to the CCC is equal to or less than the LVL value.

After sending the GLRT message to establish the poll level, the CCC transmits one or more General Level Request Poll ("GLRP") messages. A typical GLRP message is illustrated in FIG. 21*b* in accordance with the basic message format of FIG. 19. As shown in FIG. 21*b*, the SEND CNTL byte of a GLRP message may be any value equal to 0, 1, 2, or 3. The SEND CNTL byte of the message specifies to the addressed ECU that the message is a GLRP message, and further specifies on which reverse channel (0, 1, 2, or 3) the ECU should send GPR response bytes. If an ECU responds to the GLRP message with two GPR bytes on the specified reverse channel, this is interpreted by the CCC as a service request from an operative ECU as earlier described. If one GPR byte is returned, this is interpreted by the CCC as a response from an operative ECU not requiring service. If no GPR bytes are received, the CCC presumes the ECU to be inoperative.

3. Priority Polling Protocol

The second or priority polling method is the so-called Priority Information Window ("PIW") poll. This second method establishes a priority "window" on the cable network such that any ECU having information to send to the head end which falls within the pre-established priority window will alert the head end of this fact on a predetermined priority service request channel in response to the receipt of any general polling request addressed to any ECU.

Priority polling is enabled by a Priority Information Request Window Control ("PIRWC") message sent from the CCC. The PIRWC message, illustrated in FIG. 22*a* in accordance with the format of FIG. 19, is used by the CCC to set the ECU priority response threshold level. As shown in FIG. 22*a*, a PIRWC message has a SEND CNTL byte equal to 9. A LVL byte of the PIRWC message specifies the priority response threshold level. The ECU interprets the LVL byte in a manner determined by the value of the bits in a control ("CTL") byte. Bits 0 and 1 of the CTL byte specify whether the ECU should respond if the level of its information is equal to the value of the LVL byte, or whether the ECU should respond if its level of information is equal to or less than the LVL value. In addition, bit 2 of the CTL byte specifies whether to turn the PIW function in the ECU on or off. Finally, bits 3 and 4 of the CTL byte specify on which of the four reverse channels the ECU should return a priority response. The values and functions of the bits of the CTL byte in one embodiment of the PIRWC message are set forth below:

TABLE E

| | | PIRC CTL BYTE Function |
|---|---|---|
| B1 | B0 | |
| 0 | 1 | The ECU should respond to a priority poll only if the level of its information equals the value of LVL. |
| 1 | 0 | The ECU should respond to a priority poll only if the level of its information is equal to or less than the value of LVL. |
| B2 | | |
| 0 | | Set PIW in ECU off. |
| 1 | | Set PIW in ECU on. |
| B4 | B3 | |
| 0 | 0 | Return priority response on reverse channel 0. |
| 0 | 1 | Return priority response on reverse channel 1. |

After a PIRWC message is transmitted to and received by the ECUs, any ECU with priority information corresponding to the threshold level established by the PIRWC message will transmit to the CCC on the specified priority reverse channel a general poll response (GPR) byte after reception of any general level poll message. The reception by the CCC on the priority reverse channel of a GPR byte (there may be more than one response from a plurality of ECUs) alerts the CCC that an ECU (the identity of which is as yet unknown to the CCC) has priority information to send. Upon receipt of such a proiority response, the CCC transmits a series of messages, described below, to disable the priority "window" and to locate within 20 milliseconds an ECU sending the priority poll response.

Assuming for the moment that the CCC has identified an ECU returning a priority response (or requesting service in response to the earlier described GLR poll), the CCC obtains the information from the identified ECU by addressing a Priority Information Request ("PIR") message to the ECU. There are four PIR messages: PIRO, PIRI PIR2, and PIR3, having SEND CNTL bytes equal to 4, 5, 6 and 7 respectively (FIG. 22*b*). The PIRO, PIRl, PIR2 and PIR3 messages cause the ECU to send its priority information to the CCC on reverse channels 0, 1, 2, or 3, respectively.

In response to a PIR message, the addressed ECU transmits its priority information to the CCC using a Priority Information Request Response ("PIRR") message. The PIRR message allows an ECU to send to the CCC any of 256 different messages or values of numeric data for each drop associated with the ECU. A typical PIRR message is illustrated in FIG. 22*c* in accordance with the format of FIG. 20.

As shown in FIG. 22*c*, a PIRR message includes a REC CNTL byte equal to 0. A LEVEL ("LVL") byte specifies the threshold level assigned to the priority information which the ECU is transmitting to the CCC (the LVL byte will either match the level previously established, or be numerically less than that level, depending upon the information contained in the previously sent PIRWC message). Following the LVL byte is a CONTROL ("CTL") byte. The CTL byte specifies by the setting of bits 0–5 the drop or drops to which the priority information contained in the message relates. Each bit position 0–5 in the CTL byte is associated with a different ECU drop. For each drop as to which the ECU is sending priority information, the ECU sets to "1" the corresponding bit in the CTL byte. Following the CTL byte are up to 6 bytes of data (Dn), each byte representing a predetermined or "canned" priority message or numeric value with respect to a different one of the 6 drops associated with the ECU and specified in the CTL byte. The message concludes with the usual CRC and FLAG bytes.

Various divisions and definitions may be used for establishing the different levels of ECU priority information. For example, levels 0–7 may be associated with medical information obtained from medical monitoring devices attached to an ECU drop cable. Similarly, levels 16–23 may be associated with security information obtained from security devices attached to an ECU drop. Lower levels, such as levels 32–39, may be used by an ECU to inform the CCC of syntax or other errors contained in CCC messages received by the ECU. Similarly, information such as ECU status information, subscriber requests for additional services, subscriber responses to interactive two-way services, and other information may be associated with other priority levels.

The manner in which the CCC identifies an unknown ECU responding with a priority service request will now be described.

The CCC identifies an unknown ECU having priority information for the CCC using a binary sort method. The binary sort method involves dividing the population of ECUs having sequential addresses in the range of 0 to n into first and second groups of ECUs having respectively a first group address range from 0 to n/2, and a second group address range from n/2+1 to n. The CCC then transmits a message to the first group to determine whether or not any ECUs in the first group have priority information. If the first group includes an ECU (still unknown) having priority information, the CCC subdivides the first group into third and fourth groups in the manner earlier described, and sends a message directed now to the third group to determine whether or not any ECUs in the third group have priority information to send. If the third group includes an ECU having priority information, the CCC subdivides the third group into fifth and sixth groups and repeats the foregoing process. If the CCC at any time determines that the group (first, third, fifth, etc.) with which it is working does not have priority information, the CCC knows that the other respective group (second, fourth, sixth, etc.) must contain the ECU having the priority information. The CCC then transmits messages to and repetitively subdivides that group until, eventually, the CCC subdivides a group to a single ECU having priority information. As will be apparent to those skilled in the art, the foregoing binary sort method in the case of 65,536 ($2^{16}$) ECUs requires no more than 16 iterations to locate an ECU having priority information.

The messages used by the CCC in implementation of the binary sort method in an embodiment of the invention are shown in FIGS. 23*a–d.*

Figure 23A:
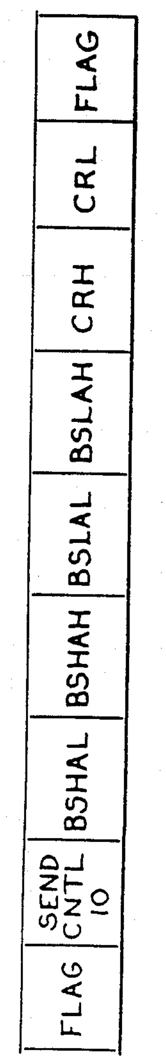

The CCC initiates a search for an unknown ECU having priority information using a Binary Sort Initialization ("BSI") message, shown in FIG. 23*a*. The BSI message has a SEND CNTL byte equal to 10, followed by two bytes specifying (in low and high order parts) a binary sort high address ("BSHAL" and "BSHAH") and two bytes specifying (in low and high order parts) a binary sort low address ("BSLAL" and "BSLAH"). The BSI message is sent by the CCC following receipt of a GPR byte on the priority information reverse channel. The BSI message is used by the CCC to turn the priority information window off, to specify the binary sort group high address, and to specify the binary sort group low address. No response to the BSI message is expected from any ECU.

After the binary sort is initialized with the BSI message, the CCC transmits a series of binary sort poll messages to locate an ECU having priority information to send. Each binary sort poll message turns the priority information window off and specifies a binary sort group address range. Upon receipt of a binary sort poll message, any ECU having priority information within the priority information threshold level and an address within the specified group address range responds by transmitting to the CCC a GPR byte on the priority information channel previously established by the CCC. Three binary sort poll messages, shown in FIGS. 23*b–*23*d,* are utilized in one embodiment of the invention to define the binary sort group range.

Figure 23B:
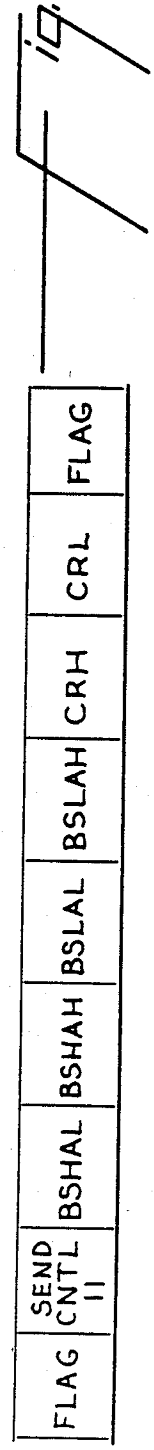

FIG. 23*b* shows a Binary Sort Poll High and Low ("BSPHL") message. This message is used by the CCC to specify a binary sort group address range bounded between a low address and a high address. The BSPHL message has a SEND CNTL byte equal to 11. Following the SEND CNTL byte are two bytes specifying the binary sort high address ("BSHAL" and "BSHAH"), and two bytes specifying the binary sort low address ("BSLAL" and "BSLAH"). Any ECU having priority information within the priority information threshold level and having an address within the low and high group address range specified in the BSPHL message responds to the CCC by transmitting a GPR byte on the priority information reverse channel.

Figure 23C:
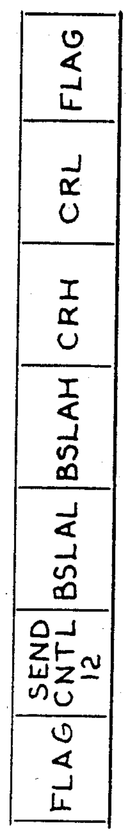

FIG. 23*c* shows a Binary Sort Poll Low ("BSPL") message. The BSPL message, having a SEND CNTL byte equal to 12, is similar to the BSPHL message except that the BSPL message specifies only a binary sort low group address ("BSLAL" and "BSLAH"). This message is used by the CCC to subdivide a group address range by modifying only the low address of the group range. The BSPL thus enables the CCC to subdivide a group address range without having to send both the low and high addresses of the range. Any ECU having priority information within the priority information threshold level and having an address which is greater than or equal to the specified group low address of the BSPL message and less than or equal to the previously specified high group address responds to the CCC by transmitting a GPR byte on the priority information reverse channel.

Figure 23D:
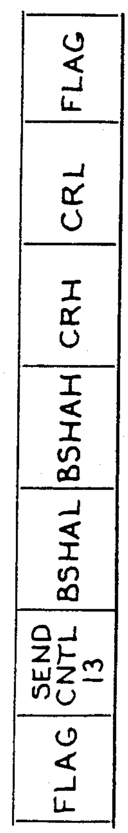

Finally, FIG. 23*d* shows a Binary Sort Poll High ("BSPH") message. The BSPH message includes a SEND CNTL byte equal to 13. In this message, two bytes specify a binary sort group high address ("BSHAL" and "BSHAH"). This message is used similarly to the BSPL message to subdivide a group by modifying only one (i.e., the high) group address. Any ECU having priority information within the priority information threshold level and having an address which is less than or equal to the group high address of the BSPH message and greater than or equal to the previously specified low group address responds to the CCC by transmitting a GPR byte on the priority information reverse channel.

4. Information Protocol

When information rather than a poll or status request, is transmitted from the CCC to an ECU, an informational protocol including a handshaking sequence is used to provide the CCC with positive feedback that (a) the ECU received the message, (b) the message syntax was proper, (c) there were no transmission errors, and (d) the ECUs are operative. The handshaking sequence does not require the transmission of lengthy formatted messages, thus minimizing the amount of time required to handshake with the CCC.

The handshaking response to informational messages is a General Poll Response Verification ("GPRV"), comprising one or two bytes of "11111111". If no GPRV is detected by the CCC, the CCC interprets this to mean that the ECU is inoperative. If a single byte is received, the CCC interprets this to mean that the message was not accepted by the ECU. If two bytes are received, the CCC interprets this to mean that the message was received by the ECU without error and that processing will occur. If a two-byte response is not received, the CCC will try a predetermined number of times (e.g., five) before logging and notifying the operator of an error.

While preferred embodiments of the invention have been set forth for purposes of the disclosure, modification to the disclosed embodiments may occur to those skilled in the art. Accordingly, the appended claims are intended to cover all embodiments of the invention and modifications to the disclosed embodiments which do not depart from the spirit and scope of the invention.

APPENDIX A

```
LOC  OBJ      LINE     SOURCE STATEMENT

                   ;-----------------------------------------------------------;
                   ;                                                  7.1983.  ;
                   ;        main.asm         V1.0                              ;
                   ;                                  (TMP4740P)               ;
                   ;                                                           ;
                   ;                main     routine                           ;
                   ;                                                           ;
                   ;                                                           ;
                   ;-----------------------------------------------------------;

                   $nolist

                   $list

                   ;

ROM PAGE NO.15

03E0                          org      h'3e0
                   ;
                   ;
                   ; initialize
                   ;
03E0 3680          main:      diclr    il,0
                   ;
                   ; ram clear
                   ;
03E2 C0                       ld       h,£h'0
03E3 E0                       ld       l,£h'0
03E4 f0                       mov      h,a
                   ;
03E5 1A            mai0:      st       a,@hl+
03E6 A5                       b        mai0
                   ;
03E7 38C1                     add      h,£h'1
03E9 A5                       b        mai0
                   ;
                   ; in / out port initialize
                   ;
03EA 3A89                     out      a,%op19        ; devider reset
03EC 3A8C                     out      a,%op1c        ; counter1 reset
03EE 3A8D                     out      a,%op1d        ; counter2 reset
                   ;
03F0 4F                       ld       a,£h'f
03F1 3AA1                     out      a,%op01        ; led display
03F3 3AA2                     out      a,%op02        ; led display
03F5 3AA4                     out      a,%op04        ; relay,keyscan out
03F7 3AA5                     out      a,%op05        ; keyscan out
```

```
03F9 3AA6          out     a,%op06        ; led driver,vlfout
03FB 3AA7          out     a,%op07        ; keyscan in
03FD 3AA8          out     a,%op08        ; interrupts
03FF 3AA9          out     a,%op09        ; no use
              ;
              ; stack pointer word initialize
              ;

ROM PAGE NO.16 *

0401 4C            ld      a,£h'c
0402 3FFF          st      a,spw
              ;
0404 4A            ld      a,£h'a
0405 3FCA          st      a,rwrpch       ; address h'a00
              ;
              ; led data set
              ;
0407 4F            ld      a,£h'f
0408 3F35          st      a,ldatm1
040A 3F39          st      a,ldasm1
              ;
040C 4B            ld      a,£h'b
040D 3F36          st      a,ldatm2
040F 3F3A          st      a,ldasm2
              ;
0411 4F            ld      a,£h'f
0412 3F37          st      a,ldatl1
0414 3F3B          st      a,ldasl1
              ;
0416 4B            ld      a,£h'b
0417 3F38          st      a,ldatl2
0419 3F3C          st      a,ldasl2
              ;
041B 4F            ld      a,£h'f
041C 3F8D          st      a,lecotl
041E 3F8E          st      a,lecotm
0420 3F8F          st      a,lecoth
              ;
              ; key data set
              ;
0422 4F            ld      a,£h'f
0423 3F2B          st      a,keyod
0425 3F42          st      a,kest0l
0427 3F43          st      a,kest0h
              ;
              ; interrupts register intialize
              ;
0429 47            ld      a,£h'7
              ;
042A 3A89          out     a,%op19        ; devider start
              ;
042C 3F1C          st      a,eirb
042E 13            xch     a,eir          ; isio inhibit
              ;
              ;
              ; framing error bit on
              ;
042F 3931          set     spuvum,3       ; framing error
              ;
              ; timer on 11 bit time
              ;
0431 3B44          clr     %op04,0        ; timer clock start
              ;
0433 4F            ld      a,£h'f
0434 3FF6          st      a,timrhn
0436 47            ld      a,£h'7
0437 3FF5          st      a,timrmn
0439 4C            ld      a,£h'c
043A 3FF4          st      a,timrln
              ;
043C 44            ld      a,£h'4
043D 3A8C          out     a,%op1c        ; start
              ;
              ;
```

```
                ; enable interrupts
                ;
043F 3640                 eiclr   i1,0
                ;
                ;
                ; recent power on
                ;         & converter selection
                ;

ROM PAGE NO.17 *

0441 3922                 set     spusl,2          ; spu status hi
                ;
0443 391F                 set     servrc,1         ; service request
                ;
0445 3BA4                 test    %op04,2
0447 8B                   b       mai00
                ;
0448 3933                 set     spush,3          ; hi channel converter
044A 8D                   b       mai1
                ;
044B 3973       mai00:    clr     spush,3          ; lo channel converter
                ;
                ;
                ;  10 sec bit 'on' ?
                ;
                ;
044D 39E4       mai1:     testp   spuvdm,2
044F 8D                   b       mai1             ; 10 sec bit on
                ;
                ;
                ;  command execute bit 'on'
                ;
                ;
0450 39F4       mai20:    testp   spuvdm,3
0452 A9                   b       mai2             ; execute 'command'
                ;
                ;
                ;  keyscan ?
                ;
                ;
0453 39E5       mai4:     testp   spuvsl,2
0455 65DD                 b       mai3.            ; keyscan ready
                ;
                ;
                ;  cry enable ?
                ;
                ;
0457 39F1       mai5:     testp   spuvum,3
0459 A0                   b       mai61
                ;
045A 3984                 test    spuvdm,0
045C 8D                   b       mai1             ; cry enable
                ;
045D 2E0F                 cmpr    servrc,£h'0
045F A3                   b       mai62
                ;
0460 3B36       mai61:    set     %op06,3
0462 8D                   b       mai1
                ;
0463 3B76       mai62:    clr     %op06,3
                ;
0465 3984                 test    spuvdm,0
0467 A0                   b       mai61
                ;
0468 8D                   b       mai1
                ;
                ;
                ;
                ; command execute
                ;
                ;
0469 3C15       mai2:     ld      a,commah
046B D2                   cmpr    a,£h'2
046C 65D9                 b       core                    ; not implied comma
nd
```

```
                ;
046E 3C14               ld      a,comma1
                ;
0470 5F                 test    a,3
0471 64F5               b       coex0
                ;
                ; command '08' - '0f'
                ;
0473 D9                 cmpr    a,£1001b
0474 0E                 testp   zf
0475 649E               b       coe900              ; read device data
                ;
0477 DA                 cmpr    a,£1010b
0478 0E                 testp   zf
0479 64A4               b       coea00              ; display character
at specified
                ;                                           position
047B DB                 cmpr    a,£1011b
047C 0E                 testp   zf
047D 64ED               b       coeb00              ; conditional poll
                ;
047F D8                 cmpr    a,£1000b

ROM PAGE NO.18

0480 65D9               b       core                ; not implied comma
nd
                ;
                ;
                ; insert character on device display
                ;
                ;
0482 3C37               ld      a,ldatl1
0484 3F35               st      a,ldatm1
0486 3C38               ld      a,ldatl2
0488 3F36               st      a,ldatm2
                ;
048A 3C81               ld      a,data0h
048C 30                 xch     a,h
048D 3C80               ld      a,data01
048F 31                 xch     a,l
                ;
0490 2310               call    ledd
                ;
0492 30                 xch     a,h
0493 3F38               st      a,ldatl2
                ;
0495 31                 xch     a,l
0496 3F37               st      a,ldatl1
                ;
0498 2350               call    flash
                ;
049A 65D9               b       core
049C 65D9               b       core
                ;
                ;
                ; read device data
                ;
                ;
049E 2050       coe900: call    rkce
                ;
04A0 65D9               b       core
04A2 65D9               b       core
                ;
                ;
                ; display character at specified position
                ;
                ;
04A4 3C83       coea00: ld      a,data1h
04A6 30                 xch     a,h
04A7 3C82               ld      a,data1l
04A9 31                 xch     a,l
                ;
04AA 2310               call    ledd
                ;
```

```
04AC 3C80               ld      a,data0l
04AE 3833               and     a,£0011b
                  ;
04B0 5C                 test    a,0
04B1 64CC               b       coea10              ; lsd   change
                  ;
04B3 30                 xch     a,h
04B4 3F36               st      a,ldatm2
                  ;
04B6 31                 xch     a,l
04B7 3F35               st      a,ldatm1
                  ;
04B9 3C81               ld      a,data0h
04BB 3838               and     a,£1000b
04BD 0E                 testp   zf
04BE 64DF               b       coea02
                  ;
                  ; msd flashing
                  ;

ROM PAGE NO. 19

04C0 3C33               ld      a,displw
04C2 3821               or      a,£0001b
04C4 3F33               st      a,displw
                  ;
04C6 2350         coea01: call  flash
                  ;
04C8 65D9               b       core
04CA 65D9               b       core
                  ;
                  ;
04CC 30           coea10: xch   a,h
04CD 3F38               st      a,ldatl2
                  ;
04CF 31                 xch     a,l
04D0 3F37               st      a,ldatl1            ; lsd change
                  ;
04D2 3C81               ld      a,data0h
04D4 3838               and     a,£1000b
04D6 0E                 testp   zf
04D7 A6                 b       coea03
                  ;
                  ; lsd flashing
                  ;
04D8 3C33               ld      a,displw
04DA 3822               or      a,£0010b
04DC 3F33               st      a,displw
                  ;
04DE 86                 b       coea01
                  ;
04DF 3C33         coea02: ld    a,displw
04E1 383E               and     a,£1110b
04E3 3F33               st      a,displw            ; msd steady
                  ;
04E5 86                 b       coea01
                  ;
04E6 3C33         coea03: ld    a,displw
04E8 383D               and     a,£1101b
04EA 3F33               st      a,displw            ; lsd steady
                  ;
04EC 86                 b       coea01
                  ;
                  ;
                  ; conditional poll
                  ;
                  ;
04ED 395F         coeb00: clr   servrc,1
                  ;
04EF 2050               call    rkce
                  ;
04F1 65D9               b       core
04F3 65D9               b       core
                  ;
                  ;
                  ; command '00' - '07'
```

```
                ;
                ;
04F5 D1         coex0:  cmpr    a,£0001b
04F6 0E                 testp   zf
04F7 651B               b       coe100                    ; indicator power c
ontrol
                ;
04F9 D2                 cmpr    a,£0010b
04FA 0E                 testp   zf
04FB 6534               b       coe200                    ; indicator mode se
lect
                ;
04FD D3                 cmpr    a,£0011b
04FE 0E                 testp   zf
04FF 654E               b       coe300                    ; device input cont
rol
                ;

ROM PAGE NO.20 *

0501 D4                 cmpr    a,£0100b
0502 0E                 testp   zf
0503 6563               b       coe400                    ; device output con
trol
                ;
0505 D5                 cmpr    a,£0101b
0506 0E                 testp   zf
0507 6592               b       coe500                    ; power relay contr
ol
                ;
0509 D6                 cmpr    a,£0110b
050A 0E                 testp   zf
050B 65A2               b       coe600                    ; clear device disp
lay
                ;
050D D7                 cmpr    a,£0111b
050E 0E                 testp   zf
050F 65C4               b       coe700                    ; divice display co
ntrol
                ; read device status
                ;
                ;
0511 39A2               test    spusl,2
0513 65D9               b       core
                ;
                ;
0515 3962       rds000: clr     spusl,2
                ;
0517 395F               clr     servrc,1                  ;
                ;
0519 65A2               b       coe600
                ;
                ;
                ;
                ; indicator power control
                ;
                ;
051B 3C80       coe100: ld      a,data01
051D 0E                 testp   zf
051E AB                 b       coe110
                ;
                ; indicator 'on'
                ;
051F 3C34               ld      a,dispiw
0521 3822               or      a,£0010b
0523 3F34               st      a,dispiw
                ;
0525 3903               set     spush,0                   ; indicator current
ly on
                ;
0527 2358       coe120: call    flash
                ;
0529 65D9               b       core
                ;
                ; indicator 'off'
                ;
```

```
0528 3C34     coe110: ld       a,dispiw
052D 383D             and      a,£1101b
052F 3F34             st       a,dispiw
                ;
0531 3943             clr      spush,0                 ; indicator current
ly off
                ;
0533 A7               b        coe120
                ;
                ;
                ; indicator mode select
                ;
                ;
0534 3C80     coe200: ld       a,data0l
0536 0E               testp    zf
0537 6545             b        coe210
                ;
0539 3C34             ld       a,dispiw
053B 3821             or       a,£0001b
053D 3F34             st       a,dispiw
                ;
053F 3913             set      spush,1                 ; indicator current
ly flashing
                ;

ROM PAGE NO.21 *

0541 2350     coe220: call     flash
                ;
0543 65D9             b        core
                ;
0545 3C34     coe210: ld       a,dispiw
0547 383E             and      a,£1110b
0549 3F34             st       a,dispiw
                ;
054B 3953             clr      spush,1                 ; indicator currntl
y non-flashing
                ;
054D 81               b        coe220
                ;
                ;
                ; device input control
                ;
                ;
054E 3C81     coe300: ld       a,data0h
0550 5F               test     a,3
0551 94               b        coe310
                ;
0552 65D9             b        core
                ;
0554 3680     coe310: diclr    il,h'00
0556 40               ld       a,£h'0
0557 3A8C             out      a,%op1c
                ;
0559 3935             set      spuvsl,3
                ;
055B 3846             clr      %op06,0
                ;
055D 3836             set      %op06,3                 ; port set
                ;
055F 3640             eiclr    il,h'00
                ;
0561 65D9             b        core
                ;
                ;
                ; device output control
                ;
                ;
0563 3C81     coe400: ld       a,data0h
0565 5F               test     a,3
0566 6585             b        coe411                       ; vlf outpu
t disable
                ;
0568 3955             clr      spuvsl,1                     ; key board
enable
```

```
                  ;
056A 3C80         coe410: ld      a,data01
056C 5C                   test    a,0
056D B8                   b       coe420
                  ;
056E 36AA                 diclr   il,101010b
0570 47                   ld      a,£0111b
0571 3F1C                 st      a,eirb
0573 13                   xch     a,eir
0574 366A                 eiclr   il,101010b                    ; remote co
ntrol enable
                  ;
0576 65D9                 b       core
                  ;
0578 36AA         coe420: diclr   il,101010b
057A 46                   ld      a,£0110b
057B 3F1C                 st      a,eirb
057D 13                   xch     a,eir
057E 40                   ld      a,£0000b
057F 3A8D                 out     a,%op1d                       ; timer 2 s
top

 ROM PAGE NO.22 *

0581 366A                 eiclr   il,101010b                    ; remote co
ntrol disable
                  ;
0583 65D9                 b       core
                  ;
0585 36AA         coe411: diclr   il,101010b
0587 3915                 set     spuvsl,1                      ; key board
 disable
0589 41                   ld      a,£h'1
058A 3F23                 st      a,spusk
058C 3F24                 st      a,spucp
                  ;
058E 2050                 call    rkce
                  ;
0590 6578                 b       coe420
                  ;
                  ;
                  ; power relay control
                  ;
                  ;
0592 3C80         coe500: ld      a,data01
0594 0E                   testp   zf
0595 9C                   b       coe501
                  ;
0596 3B54                 clr     %op04,1               ; power relay on
                  ;
0598 3932                 set     spusl,3               ; power relay curre
ntly on
                  ;
059A 65D9                 b       core
                  ;
059C 3B14         coe501: set     %op04,1               ; power relay off
                  ;
059E 3972                 clr     spusl,3               ; power relay curre
ntly off
                  ;
05A0 65D9                 b       core
                  ;
                  ;
                  ; clear device display
                  ;
                  ;
05A2 4F           coe600: ld      a,£h'f
05A3 3F35                 st      a,ldatm1
05A5 3F37                 st      a,ldatl1
05A7 3F39                 st      a,ldasm1
05A9 3F3B                 st      a,ldasl1
                  ;
05AB 3C36                 ld      a,ldatm2
05AD 3827                 or      a,£0111b
05AF 3F36                 st      a,ldatm2
                  ;
```

```
05B1 3C38          ld      a,ldatl2
05B3 3827          or      a,£0111b
05B5 3F38          st      a,ldatl2
                ;
05B7 3C3A          ld      a,ldasm2
05B9 3827          or      a,£0111b
05BB 3F3A          st      a,ldasm2
                ;
05BD 3C3C          ld      a,ldasl2
05BF 3827          or      a,£0111b

ROM PAGE NO.23 *

05C1 3F3C          st      a,ldasl2
                ;
05C3 99            b       core
                ;
                ;
                ; device display control
                ;
                ;
05C4 3C80       coe700: ld      a,data01
05C6 0E            testp   zf
05C7 92            b       coe701               ; display steady
                ;
05C8 3C33          ld      a,displw
05CA 3823          or      a,£0011b
05CC 3F33          st      a,displw             ; display flashing
                ;
05CE 2350       coe703: call    flash
                ;
05D0 99            b       core
05D1 99            b       core
                ;
05D2 3C33       coe701: ld      a,displw
05D4 383C          and     a,£1100b
05D6 3F33          st      a,displw             ; display steady
                ;
05D8 8E            b       coe703
                ;
                ;
                ; return
                ;
                ;
05D9 3974       core:   clr     spuvdm,3         ; clear 'command ex
ecute '
                ;
05DB 6453          b       mai4
                ;
                ;
                ;
                ; keyscan
                ;
                ;
05DD 3995       mai3:   test    spuvsl,1
05DF A4            b       mai30
                ;
05E0 3965          clr     spuvsl,2
                ;
05E2 6457          b       mai5
                ;
05E4 2100       mai30:  call    keys
                ;
05E6 3965          clr     spuvsl,2
                ;
05E8 6457          b       mai5
                ;
                   end

ASSEMBLY COMPLETE,       0 PROGRAM ERROR(S)
                  SYMBOL TABLE

COE100  051B     COE110  052B     COE120  0527     COE200  0534
COE210  0545     COE220  0541     COE300  054E     COE310  0554
COE400  0563   * COE410  056A     COE411  0585     COE420  0570
```

```
  COE500   0592     COE501   059C     COE600   05A2     COE700   05C4
  COE701   05D2     COE703   05CE     COE900   049E     COEA00   04A4
  COEA01   04C6     COEA02   04DF     COEA03   04E6     COEA10   04CC
  COEB00   04ED     COEX0    04F5   * COMMAD   0013     COMMAH   0015
  COMMAL   0014     CORE     05D9     DATA0H   0081     DATA0L   0080
  DATA1H   0083     DATA1L   0082   * DATA2H   0085   * DATA2L   0084
* DATA3H   0087   * DATA3L   0086   * DATA4H   0089   * DATA4L   0088
* DATACT   0200   * DCH      00FE   * DCL      00FC   * DISPA    0032
* DISPH    0031     DISPIW   0034   * DISPL    0030     DISPLW   0033
  EIRB     001C     FLASH    0350   * INCOTH   008C   * INCOTL   008A
* INCOTM   008B   * KEST     0022     KEST0H   0043     KEST0L   0042
* KEST1H   0045   * KEST1L   0044   * KEST2H   0047   * KEST2L   0046
* KEST3H   0049   * KEST3L   0048   * KEST4H   004B   * KEST4L   004A
* KEST5H   004D   * KEST5L   004C   * KESTBH   0021   * KESTBL   0020
* KEYND    0029   * KEYNN    002A     KEYOD    002B   * KEYON    002C
  KEYS     0100   * KEYSB    0250   * KEYSC    000E   * KEYT     0300
* KEYTB    00CB   * LCICOT   000D     LDASL1   003B     LDASL2   003C
  LDASM1   0039     LDASM2   003A     LDATL1   0037     LDATL2   0038
  LDATM1   0035     LDATM2   0036   * LDISP    0B00     LECOTH   008F
  LECOTL   008D     LECOTM   008E     LEDD     0310   * LIOVF1   0600
* LIOVF2   0D00   * LREMO    0E00   * LVLFEX   0C00     MAI0     03E5
  MAI00    044B     MAI1     044D     MAI2     0469   * MAI20    0450
  MAI3     05DD     MAI30    05E4     MAI4     0453     MAI5     0457
  MAI61    0460     MAI62    0463   * MAIN     03E0   * OVER2A   0072
* OVER2H   0071   * OVER2L   0070   * OVERA1   0012   * OVERH1   0011
* OVERL1   0010   * PARITT   000C   * PARITY   000B   * RDS000   0515
* READC    0028   * READN    0027   * REMD0    0060   * REMD1    0061
* REMD2    0062   * REMD3    0063   * REMD4    0064   * REMD5    0065
* REMD6    0066   * REMD7    0067   * REMOA    006A   * REMOH    0069
* REMOL    0068     RKCE     0050   * RNH      006B   * RNL      006D
* RNM      006C     RWRPCH   00CA   * RWRPCL   00C8   * RWRPCM   00C9
  SERVRC   000F     SPUCP    0024     SPUSH    0003     SPUSK    0023
  SPUSL    0002   * SPUTT    0018     SPUVDM   0004   * SPUVSH   0000
  SPUVSL   0005     SPUVUM   0001     SPW      00FF   * SPWB     00C7
* TABLE    0000   * TIMR2H   00FA   * TIMR2L   00F8   * TIMR2M   00F9
  TIMRHN   00F6   * TIMRHO   001B     TIMRLN   00F4   * TIMRLO   0019
  TIMRMN   00F5   * TIMRMO   001A   * VLFC     000A   * VLFEC    0016
* VLFRB    0009   * VLFTB    0008   * VLFTH    0007   * VLFTL    0006
* VLFXA    0052   * VLFXH    0051   * VLFXL    0050   * WARPCL   00C4
* WARPCM   00C5   * WRITEH   0026   * WRITEN   0025

DEFINED    171 USER SYMBOL(S)

LOC  OBJ       LINE        SOURCE STATEMENT

                     ;---------------------------------------------------------;
                     ;                                                  7.1983. ;
                     ;       liovf1.asm        V1.0                             ;
                     ;                                 (TMP4740P)               ;
                     ;                                                          ;
                     ;            vlf communication     routine                 ;
                     ;                                                          ;
                     ;                                                          ;
                     ;---------------------------------------------------------;

                     $nolist

                     $list

                     ;;
ROM PAGE NO. 0

0010                         org     h'010                 ; routine table
0010
                     ;
0010 66B2                    b       r0                    ; start bit detect
                     ;
0012 66FC                    b       rmi                   ; mi bit detect.
                     ;
0014 6719                    b       rca                   ; address detect
                     ;
0016 673E                    b       rcf                   ; command detect
```

```
          ;
0018 67D4              b       rcp                      ; parity in
          ;
001A 67EE              b       tra                      ; 'ack' or 'nack'
          ;
001C 67FA              b       rcstn                    ; stop bit in
          ;
001E 6834              b       rstd                     ; damy to rcstab
          ;
0020 6838              b       rcstab                   ; stop bit in
          ;
0022 6841              b       rdd                      ; data in
          ;
0024 6871              b       rdp                      ; parity in
          ;
0026 687F              b       tdack                    ; 'ack' or 'nack'
          ;
0028 6885              b       rdast
          ;
          ;;;;
          ;
002A 68C2              b       t0                       ; transmit
          ;
002C 68EB              b       td1                      ; data out
          ;
002E 68F1              b       trmi                     ; detect 'mi'
          ;
0030 6909              b       rdamy                    ; damy to rca
          ;
0032 6912              b       tdo                      ; data out
          ;
0034 6930              b       tp                       ; parity out
          ;
0036 693E              b       tlci                     ; 'lci' bit out
          ;
0038 6944              b       rtack                    ; receive 'ack'
          ;
003A 6983              b       tst                      ; out 'stop'
          ;
003C 6989              b       rst                      ; receive 'stop'
          ;
          ;;;;;;;;;;;;;;;;;;;;;;;;;;;;;;;;;;;;;;;;;;;;;;;;;;
          ;

ROM PAGE NO.24

0600                   org     h'600
          ;
          ;------------------------------------------------;
          ;            register push                       ;
          ;------------------------------------------------;
0600 3B06              set     %op06,0
0602 3F12 iovf1:       st      a,overal                 ;
0604 2910              xch     hl,overl1                ;
          ;------------------------------------------------;
          ;            timer1.start                        ;
          ;------------------------------------------------;
0606 3C1B              ld      a,timrho                 ;
0608 3FF6              st      a,timrhn                 ;
060A 3C1A              ld      a,timrmo                 ;
060C 3FF5              st      a,timrmn                 ;
060E 3C19              ld      a,timrlo                 ;
0610 3FF4              st      a,timrln                 ;
          ;------------------------------------------------;
          ;            check mode                          ;
          ;                    ( normal or not )           ;
          ;------------------------------------------------;
0612 3980              test    spuvsh,0
0614 B5                b       vlf001                   ;routine for abnorm
al
          ;                                             ;                  mod
e
          ;------------------------------------------------;
          ;            check mode                          ;
          ;                    ( transmit or not )         ;
          ;------------------------------------------------;
```

```
0615 39D0               testp   spuvsh,1                ;
0617 A3                 b       vlf010                  ;routine for transmit mode
                ;
0618 3BC0               testp   %ip00,0                 ;
061A 9E                 b       vlf100                  ;data ='1'
                ;
061B 3979               clr     vlfrb,3                 ;
061D AD                 b       vlf200                  ;to warp
                ;
061E 2F1B       vlf100: add     parity,£h'1             ;parity counter inc
0620 3939               set     vlfrb,3                 ;
0622 AD                 b       vlf200                  ;to warp
                ;
                ;-------------------------------------------------;
                ;       data out          ( vlf010 )              ;
                ;-------------------------------------------------;
0623 3988       vlf010: test    vlftb,0
0625 AB                 b       vlf011
                ;
0626 2F1C               add     paritt,£h'1             ; parity count
                ;
0628 3B76               clr     %op06,3                 ; vlf output data '1'
062A AD                 b       vlf200                  ; to warp
                ;
062B 3B36       vlf011: set     %op06,3                 ; vlf output data '0'
                ;
                ;-------------------------------------------------;
                ;       warp routine      ( vlf200 )              ;
                ;-------------------------------------------------;
062D 3CFF       vlf200: ld      a,spw                   ;
062F 3FC7               st      a,spwb                  ;
                ;
0631 40                 ld      a,£h'0                  ;
0632 3FFF               st      a,spw                   ; spw changing
                ;
0634 2A                 ret                             ; warp
                ;
                ;-------------------------------------------------;
                ;       routine for abnormal mode                 ;
                ;                         ( vlf000 )              ;
                ;-------------------------------------------------;
0635 39D4       vlf001: testp   spuvdm,1                ; 1200 bit time counting ?
0637 6647               b       vlf002                  ; branch on ' yes'
                ;
0639 39E4               testp   spuvdm,2                ; 10sec couting ?
063B 6654               b       vlf003                  ; branch on 'yes'
                ;
063D 39F1               testp   spuvum,3                ; framing error ?
063F AE                 b       vlf004                  ; branch on 'yes'
                ;

ROM PAGE NO.25

0640 3904       vlf005: set     spuvdm,0                ; cry enable on
0642 40                 ld      a,£h'0
0643 3A8C               out     a,%op1c                 ; timer stop
0645 66AD               b       vlf300                  ; to return routine
                ;
                ;----------1200 bit counted ----------------------;
                ;
0647 3954       vlf002: clr     spuvdm,1                ; clear '1200 bit counting'
0649 3941               clr     spuvum,0                ; clear 'previous
                ;                                       ;   command needs data'
064B 3951               clr     spuvum,1                ; clear 'previous
                ;                                       ;   command requires data'
064D 3921               set     spuvum,2                ; 'command inhibit' on
```

```
064F 3900            set    spuvsh,0          ; set normal mode
0651 3950            clr    spuvsh,1          ; set receive mode
                 ;
0653 80              b      v1f005            ; branch on
                 ;                            ;   'set cry enable'
                 ;
                 ;---------- 10sec counted ---------------;
                 ;
0654 3931   v1f003:  set    spuvum,3          ; set framing error
0656 3964            clr    spuvdm,2          ; clear '10sec counting'
                 ;
0658 3C23            ld     a,spusk
065A 3F24            st     a,spucp
                 ;
065C 2050            call   rkce
                 ;
065E 4F              ld     a,£h'f
065F 3FF6            st     a,timrhn
0661 47              ld     a,£h'7
0662 3FF5            st     a,timrmn
0664 4C              ld     a,£h'c
0665 3FF4            st     a,timrln
                 ;
0667 44              ld     a,£h'4
0668 3A8C            out    a,%oplc           ; 11bit timer setting
                 ;
066A 3975            clr    spuvsl,3          ; 1'st intr. enable
                 ;
066C 66AD            b      v1f300            ; to return routine
                 ;
                 ;------ framing error bit on ------------;
066E 3C18   v1f004:  ld     a,sputt
0670 D0              cmpr   a,£h'0
0671 66A3            b      v10040
                 ;
0673 3C53            ld     a,frame
0675 DF              cmpr   a,£h'f
0676 6689            b      v10060
                 ;
0678 3B80            test   %ip00,0
067A 6698            b      v10050
                 ;
067C 40              ld     a,£h'0
067D 3F53            st     a,frame
                 ;
067F 4F              ld     a,£h'f
0680 3FF6            st     a,timrhn
0682 47              ld     a,£h'7
0683 3FF5            st     a,timrmn
0685 4C              ld     a,£h'c
0686 3FF4            st     a,timrln
                 ;
0688 AD              b      v1f300
                 ;
0689 3B80   v10060:  test   %ip00,0
068B 98              b      v10050
                 ;
068C 3971            clr    spuvum,3          ; clear 'framing error'
068E 3921            set    spuvum,2          ; set 'command inhibit'
0690 3951            clr    spuvum,1          ; clear 'previous command
                 ;                            ;  requires an answer'
                 ;           clr    spuvum,0  ; clear 'previous command
                 ;                            ;  needs data'
0692 3950            clr    spuvsh,1          ; set receive mode
0694 3900            set    spuvsh,0          ; set normal mode
                 ;
0696 6640            b      v1f005            ; to 'set cry enable'
```

```
                ;
0698 4F         v10050: ld      a,£h'f
0699 3FF6               st      a,timrnn
069B 3FF5               st      a,timrmn
                ;
069D 3F53               st      a,frame
                ;
069F 4A                 ld      a,£h'a
06A0 3FF4               st      a,timrln
                ;
06A2 AD                 b       vlf300
                ;
06A3 40         v10040: ld      a,£h'0
06A4 3F18               st      a,sputt
                ;
06A6 3BC0               testp   %ip00,0
06A8 AD                 b       vlf300
                ;
06A9 4F                 ld      a,£h'f
06AA 3F53               st      a,frame
                ;
06AC 98                 b       v10050
                ;
                ;-----------------------------------------------;
                ;       return routine   ( vlf300 )             ;
                ;-----------------------------------------------;
06AD 3C12       vlf300: ld      a,overal                        ;
06AF 2910               xch     hl,overll                       ; pop register
                ;
06B1 2B                 reti
                ;
                ;-----------------------------------------------;
                ;        R0 routine                             ;
                ;               ( in start bit )                ;
                ;-----------------------------------------------;
                ;--------       start bit               --------;
                ;
06B2 3BC0       r0:     testp   %ip00,0                         ;
06B4 66C2               b       r00000                          ; it was not 'start
                ;
06B6 3935               set     spuvsl,3                        ; external intr.
                                                                         inhibit
                ;
                ;
06B8 3961               clr     spuvum,2                        ; clear 'command in
hibit'
                ;
06BA 3944               clr     spuvdm,0                        ; clear 'cry enable
06BC 3B36               set     %op06,3                         ; port set
                ;
                ;--------       next intr.              --------;
                ;
06BE C1                 ld      h,£h'1
06BF E2                 ld      l,£h'2                          ; to Rmi routine
                ;

ROM PAGE NO.27

06C0 41                 ld      a,£h'1                          ; next intr. 1 bit
time
                ;
                ;--------       re-warp                 --------;
                ;
06C1 2A         r00001: ret
                ;
                ;--------    start bit not found        --------;
                ;
06C2 3984       r00000: test    spuvdm,0
06C4 89                 b       r01000                          ; cry enable ?
                ;
06C5 40                 ld      a,£h'0
06C6 3A8C               out     a,%op1c                         ; timer1 stop
                ;
06C8 81                 b       r00001                          ; to re-warp
                ;
```

```
06C9 3940     r01000: clr     spuvsh,0                      ; to abnormal mode
              ;
06CB 3994             test    spuvdm,1
              ;
06CD AA               b       r01110                        ; must detect 'cry
enable'
              ;
              ;
              ; 1200 bit counting
              ;
06CE 3C8C     r01100: ld      a,incoth
06D0 3FF6             st      a,timrhn
06D2 3C8B             ld      a,incotm
06D4 3FF5             st      a,timrmn
06D6 3C8A             ld      a,incotl
06D8 3FF4             st      a,timrln
              ;
06DA 48               ld      a,£h'8
06DB 3A8C             out     a,%op1c
              ;
06DD 3B36             set     %op06,3
              ;
              ; return
              ;
06DF 3CC7     r01111: ld      a,spwb
06E1 3FFF             st      a,spw
              ;
06E3 3C12             ld      a,overal
06E5 2910             xch     hl,overll
              ;
06E7 3B46             clr     %op06,0
              ;
06E9 2B               reti
              ;
06EA 3C8C     r01110: ld      a,incoth
06EC 3FF6             st      a,timrhn
06EE 3C8B             ld      a,incotm
06F0 3FF5             st      a,timrmn
06F2 3C8A             ld      a,incotl
06F4 3FF4             st      a,timrln
              ;
06F6 44               ld      a,£h'4
06F7 3A8C             out     a,%op1c
              ;
06F9 3B36             set     %op06,3
              ;
06FB 9F               b       r01111
              ;
              ;;;;;;;;;;;;;;;;;;;;;;;;;;;;;;;;;;;;;;;;;;;;;;;;;
              ;;;;;;;;;;;;;;;;;;;;;;;;;;;;;;;;;;;;;;;;;;;;;;;;;
              ;
              ;-------------------------------------------------;
              ;               Rmi routine                       ;
              ;                  ( in mi bit )                  ;
              ;-------------------------------------------------;
              ;
              ;
06FC 39F9     rmi:    testp   vlfrb,3                       ;
06FE 670F             b       rmi000                        ; 'data' from ECU
              ;
              ;------- 'command' from ECU          ------------;
              ;

ROM PAGE NO.28

0700 C1               ld      h,£h'1                        ;
0701 E4               ld      l,£h'4                        ; to Rca routine
              ;
0702 40               ld      a,£h'0
0703 3F16             st      a,vlfec                       ; vlf error counter
clear
              ;
0705 3941             clr     spuvum,0                      ; 'previous command
              ;                                               needs data'
0707 3951             clr     spuvum,1                      ; 'previous command
              ;                                               requires an ans
```

```
wer'
               ;------ parity &, VLF counter
               ;                clear              ------;
               ;
0709 2D0B      rmi001:  st      £h'0,parity
070B 2D0A               st      £h'0,vlfc               ; parity counter
               ;                                          & VLF counter cl
ear
               ;
               ;------        next intr.            ------;
               ;
070D 41                 ld      a,£h'1                  ; next intr. 1bit t
ime
               ;
               ;------          re-warp             ------;
               ;
070E 2A        rmi002:  ret                             ; re-warp
               ;
               ;------   'data ' from ECU           ------;
               ;
070F 3901      rmi000:  test    spuvum,0
0711 95                 b       rmi003                  ; not need data
               ;
0712 C2                 ld      h,£h'2
0713 E2                 ld      l,£h'2                  ; to Rdd routine
               ;
0714 89                 b       rmi001                  ; to parity clear
               ;
               ;------    not need 'data'          ------;
               ;
0715 C1        rmi003:  ld      h,£h'1
0716 EE                 ld      l,£h'e                  ; to Rstd routine
               ;
0717 43                 ld      a,£h'3                  ; next intr. 9bit t
ime
               ;
0718 8E                 b       rmi002                  ; to re-warp
               ;
               ;;;;;;;;;;;;;;;;;;;;;;;;;;;;;;;;;;;;;;;;;;;;;
               ;;;;;;;;;;;;;;;;;;;;;;;;;;;;;;;;;;;;;;;;;;;;;
               ;
               ;--------------------------------------------;
               ;        Rca routine                         ;
               ;               ( in command receive )       ;
               ;--------------------------------------------;
               ;
0719 2F1A      rca:     add     vlfc,£h'1               ; vlf counter
               ;                                            increament
071B 2E3A               cmpr    vlfc,£h'3
071D B4                 b       rca000                  ; vlfc <> 3
               ;
               ;------      address check          ------;
               ;
071E 3C09               ld      a,vlfrb
0720 07                 rorc    a
0721 3837               and     a,£h'7
0723 3F13               st      a,commad                ; address in
               ;
0725 3A20               in      %ip00,a
0727 07                 rorc    a
0728 07                 rorc    a
0729 3833               and     a,£h'3
072B 3802               add     a,£h'2                  ; spu address
               ;
072D 3E13               cmpr    a,commad
072F BA                 b       rca001                  ; address check NG
               ;
               ;------      next intr. address
               ;                       matched       ------;
               ;
0730 C1                 ld      h,£h'1
0731 E6                 ld      l,£h'6                  ; to Rgf routine
               ;
0732 41        rca002:  ld      a,£h'1                  ; next intr. 1bit t
ime
               ;
```

```
          ;-------        re-warp          -------;
          ;
0733 2A   rca003: ret                            ; re-warp
          ;
          ;-------          shift          -------;
          ;
0734 3C09 rca000: ld      a,vlfrb
0736 07           rorc    a                      ; shift
0737 3F09         st      a,vlfrb
          ;
0739 B2           b       rca002                 ; next intr. 1bit t
ime
          ;
          ;-------     next intr. address
          ;               miss matched     -------;
          ;
073A C1   rca001: ld      h,£h'1
073B EE           ld      l,£h'e                 ; to Rstd
          ;
073C 42           ld      a,£h'2                 ; next intr.
          ;                                         6 bit time
          ;
073D B3           b       rca003                 ; re-warp
          ;
          ;;;;;;;;;;;;;;;;;;;;;;;;;;;;;;;;;;;;;;;;;;;;;;;;
          ;;;;;;;;;;;;;;;;;;;;;;;;;;;;;;;;;;;;;;;;;;;;;;;;
          ;
          ;----------------------------------------;
          ;       Rcf routine                      ;
          ;               ( in command receive )   ;
          ;----------------------------------------;
          ;
          ;-------       data set          -------;
          ;
073E 2F1A rcf:    add     vlfc,£h'1              ; VLF counter
          ;                                         increament
0740 2E7A         cmpr    vlfc,£h'7              ;
0742 0E           testp   zf
0743 8F           b       rcf000                 ; branch on
          ;                                         command hi
0744 2E8A         cmpr    vlfc,£h'8
0746 0E           testp   zf
0747 94           b       rcf001                 ; branch on
          ;                                         read function
          ;
0748 3C09         ld      a,vlfrb                ;
074A 07           rorc    a                      ;
074B 3F09         st      a,vlfrb                ; data set
          ;
          ;-------       next intr.        -------;
          ;
074D 41   rcf002: ld      a,£h'1                 ; next intr. 1bit t
ime
          ;
          ;-------        re-warp          -------;
          ;
074E 2A   rcf006: ret                            ; re-warp
          ;
          ;-------     read command lo     -------;
          ;
074F 3C09 rcf000: ld      a,vlfrb
0751 3F14         st      a,commal
          ;
0753 8D           b       rcf002                 ; to next intr.
          ;
          ;-------     read command  hi    -------;
          ;
0754 3C09 rcf001: ld      a,vlfrb
0756 07           rorc    a
0757 07           rorc    a
0758 07           rorc    a
0759 3831         and     a,£0001b
075B 3822         or      a,£0010b
075D 3F15         st      a,commah
          ;
          ;-------     read , write  ?     -------;
```

```
                      ;
075F 3FFD                     st      a,dcm
0761 3C14                     ld      a,commal
0763 3FFC                     st      a,dcl
0765 4F                       ld      a,£h'f
0766 3FFE                     st      a,dch
                      ;
0768 33                       ldl     a,@dc
0769 3F25                     st      a,writen
076B 32                       ldh     a,@dc+
076C 3F27                     st      a,readn
                      ;
076E D0                       cmpr    a,£h'0
076F 0E                       testp   zf
0770 BC                       b       rcf100          ; need not reading
                      ;
                      ; read command
                      ;
0771 3901                     set     spuvum,0        ; set previous comm
and need data
                      ;
0773 40                       ld      a,£h'0
0774 3F28                     st      a,readc         ; reading counter s
et
                      ;
                      ;-------    out 'mark' &
                      ;                next address      -------;
                      ;
0776 3B76             rcf005: clr     %op86,3         ; out 'mark'
                      ;
0778 C1                       ld      h,£h'1
0779 E8                       ld      l,£h'8          ; to Rcp routine
                      ;
077A 40                       ld      a,£h'0          ; next intr.1/2
                      ;                                 bit time
                      ;
077B 8E                       b       rcf006          ; to re-warp routin
e
                      ;
                      ;-------        write command ?      -------;
                      ;
077C 3C25             rcf100: ld      a,writen
077E D0                       cmpr    a,£h'0
077F 0E                       testp   zf

ROM PAGE NO.30

0780 6776                     b       rcf005          ; to Rcp routine
                      ;
                      ;-------        write command        -------;
                      ;
0782 DF                       cmpr    a,£h'f
0783 0E                       testp   zf
0784 B5                       b       rcf110          ; conditional poll
                      ;
0785 3914                     set     spuvdm,1        ; set previous comm
and require
                      ;                                     answer
0787 2D1D                     st      £h'1,lcicot
                      ;
0789 D1                       cmpr    a,£0001b
078A 98                       b       rcf120          ; 'read device data
'
                      ;                                    command
                      ;
                      ; read spu status command
                      ;
078B 41                       ld      a,£h'1
078C 3F24                     st      a,spucp
                      ;
078E 3C02                     ld      a,spusl
0790 3F06                     st      a,vlftl
0792 3C03                     ld      a,spush
0794 3F07                     st      a,vlfth
                      ;
0796 6776                     b       rcf005
```

```
                ;
                ;
                ; read device data command
                ;
                ;
0798 3C42       rcf120: ld      a,kest0l
079A 3F06               st      a,vlftl
079C 3C43               ld      a,kest0h
079E 3F07               st      a,vlfth
                ;
07A0 3C23               ld      a,spusk
07A2 0E                 testp   zf
07A3 AE                 b       rcf121
                ;
07A4 3F24               st      a,spucp
07A6 40                 ld      a,£h'0
07A7 3F17               st      a,spuff
                ;
07A9 44         rcf122: ld      a,£h'4
07AA 3F26               st      a,writeh
                ;
07AC 6776               b       rcf005
                ;
07AE 08         rcf121: inc     a
07AF 3F24               st      a,spucp
07B1 4F                 ld      a,£h'f
07B2 3F17               st      a,spuff                 ; no key stroke
                ;
07B4 A9                 b       rcf122
                ;
                ; conditional poll
                ;
07B5 3C42       rcf110: ld      a,kest0l
07B7 3F06               st      a,vlftl
07B9 3C43               ld      a,kest0h
07BB 3F07               st      a,vlfth                 ; data in
                ;
07BD 41                 ld      a,£h'1
07BE 3F0D               st      a,Icicot

ROM PAGE NO.31

07C0 3F24               st      a,spucp
                ;
07C2 3B76               clr     %op06,3
                ;
07C4 3914               set     spuvdm,1
                ;
07C6 3C23               ld      a,spusk
07C8 0E                 testp   zf
07C9 8F                 b       rcf111
                ;
07CA 40                 ld      a,£h'0
07CB 3F17               st      a,spuff
07CD 6776               b       rcf005
                ;
07CF 4F         rcf111: ld      a,£h'f
07D0 3F17               st      a,spuff                 ; no keystroke
07D2 6776               b       rcf005
                ;
                ;
                ;--------------------------------------------------;
                ;       Rcp routine    ( command read )             ;
                ;--------------------------------------------------;
                ;
                ;
07D4 39CB       rcp:    testp   parity,0
07D6 A9                 b       rcp000                  ; parity error
                ;
07D7 3C25               ld      a,writen
07D9 DF                 cmpr    a,£h'f
07DA A1                 b       rcp100                  ; not conditional p
oll
                ;
07DB 2E0F               cmpr    servrc,£h'0
07DD A1                 b       rcp100                  ; data in
```

```
                  ;
07DE 3954                     clr      spuvdm,1             ; clear previous co
mmand
                  ;                                           need answer bit
07E0 A9                       b        rcp000
                  ;
07E1 3940         rcp100:  clr      vlftb,0              ; send 'ack'
                  ;
                  ;--------          mode change          --------;
                  ;
07E3 3910         rcp003:  set      spuvsh,1             ; change mode
                  ;                                           to 'transmit'
                  ;--------        next intr.             --------;
                  ;
07E5 C1           rcp004:  ld       h,£h'1
07E6 EA                       ld       l,£h'a               ; to Tra routine
                  ;
07E7 40                       ld       a,£h'0               ; next intr. 1/2 bi
t
                  ;                                               time
                  ;--------           re-warp             --------;
                  ;
07E8 2A                       ret
                  ;
                  ;--------        parity error           --------;
                  ;
07E9 3921         rcp000:  set      spuvum,2             ; set 'command inhi
bit'
                  ;
07EB 3908                     set      vlftb,0              ; send 'nack'
07ED
07ED A3                       b        rcp003               ;
                  ;
                  ;
                  ;;;;;;;;;;;;;;;;;;;;;;;;;;;;;;;;;;;;;;;;
                  ;;;;;;;;;;;;;;;;;;;;;;;;;;;;;;;;;;;;;;;;
                  ;
                  ;---------------------------------------;
                  ;        Tra                            ;
                  ;---------------------------------------;
                  ;
                  ;
                  ;--------          mode change          --------;
                  ;
07EE 3950         tra:     clr      spuvsh,1             ; mode change
                  ;                                           to receive mode
07F0 39E1                     testp    spuvum,2
07F2 B7                       b        tra000               ; branch on
                  ;                                           'command inhibit
'
                  ;--------        next intr.             --------;
                  ;
07F3 C1                       ld       h,£h'1
07F4 EC                       ld       l,£h'c               ; to Rcstn routine
                  ;
07F5 45           tra001:  ld       a,£h'5               ; next intr.
                  ;                                               bit time
                  ;
                  ;--------           re-warp             --------;
                  ;
07F6 2A                       ret
                  ;
                  ;--------        next intr.
                  ;                  in parity error      --------;
                  ;
07F7 C2           tra000:  ld       h,£h'2
07F8 E0                       ld       l,£h'0               ; to Rcstab routine
                  ;
07F9 B5                       b        tra001
                  ;
                  ;;;;;;;;;;;;;;;;;;;;;;;;;;;;;;;;;;;;;;;;
                  ;;;;;;;;;;;;;;;;;;;;;;;;;;;;;;;;;;;;;;;;
                  ;
                  ;---------------------------------------;
                  ;        Rcstn    routine               ;
                  ;---------------------------------------;
```

```
                 ;
                 ;
07FA 39B9        rcstn:   test     vlfrb,3
07FC 6820                 b        rcstn0                    ; framing error
                 ;
                 ;-------        read ?          --------;
                 ;
07FE 3C27                 ld       a,readn

ROM PAGE NO.32

0800 D0                   cmpr     a,£0000b
0801 0E                   testp    zf
0802 97                   b        rcstn1                    ; branch on
                 ;                                                 read comman
d
                 ;read or write command
                 ;
0803 3940        rcstn6:  clr      spuvsh,0                  ; to abnormal mode
                 ;
                 ;-------   1200 bit timer on    --------;
                 ;
0805 3914        rcstn2:  set      spuvdm,1                  ; '1200 bit timer '
on
                 ;
0807 42                   ld       a,£h'2
0808 3FF6                 st       a,timrhn
080A 4C                   ld       a,£h'c
080B 3FF5                 st       a,timrmn
080D 4F                   ld       a,£h'f
080E 3FF4                 st       a,timrln
                 ;
0810 48                   ld       a,£h'8
0811 3A8C                 out      a,%opic                   ;
                 ;
                 ;-------   external intr.enable --------;
                 ;
0813 3975        rcstn3:  clr      spuvsl,3
                 ;
                 ;-------        return          --------;
                 ;
0815 66DF                 b        r01111
                 ;
0817 3C25        rcstn1:  ld       a,writen
0819 D0                   cmpr     a,£0000b
081A B1                   b        rcstn7                    ; branch on
                 ;                                             write command
                 ;
                 ; command ended
                 ;
081B 3940                 clr      spuvsh,0                  ; to abnormal mode
                 ;
081D 3934                 set      spuvdm,3                  ; 'command execute'
                 ;
081F 93                   b        rcstn3                    ; to return
                 ;
                 ;-------     framing error      --------;
                 ;
0820 3940        rcstn0:  clr      spuvsh,0                  ; to abnormal mode
                 ;
0822 3931                 set      spuvum,3                  ; framing error
                 ;
0824 4F                   ld       a,£h'f
0825 3F53                 st       a,frame
0827 3FF6                 st       a,timrhn
0829 3FF5                 st       a,timrmn
                 ;
082B 4A                   ld       a,£h'a
082C 3FF4                 st       a,timrln
                 ;
082E 3B36                 set      %op06,3
                 ;
0830 93                   b        rcstn3                    ; to return
                 ;
0831 3910        rcstn7:  set      spuvsh,1                  ; to transmit mode
0833 83                   b        rcstn6
```

```
          ;
          ;;;;;;;;;;;;;;;;;;;;;;;;;;;;;;;;;;;;;;;;;;;;;;;;
          ;;;;;;;;;;;;;;;;;;;;;;;;;;;;;;;;;;;;;;;;;;;;;;;;
          ;
          ;------------------------------------------------;
          ;        Rstd     ( damy routine )               ;
          ;------------------------------------------------;
          ;
          ;
          ;-----          next intr.              ---------;
          ;
0834 C2   rstd:   ld      h,£h'2
0835 E0           ld      l,£h'0                  ; to Rcstab
          ;
0836 45           ld      a,£h'5                  ; next intr.
          ;                                         11 bit time
          ;-----            re-warp               ---------;
          ;
0837 2A           ret
          ;
          ;;;;;;;;;;;;;;;;;;;;;;;;;;;;;;;;;;;;;;;;;;;;;;;;
          ;;;;;;;;;;;;;;;;;;;;;;;;;;;;;;;;;;;;;;;;;;;;;;;;
          ;
          ;------------------------------------------------;
          ;        Rcstab                                  ;
          ;------------------------------------------------;
          ;
          ;
          ;-----       check stop bit             ---------;
          ;
0838 39B9 rcstab: test    v1frb,3
083A A0           b       rcstn0                  ; framing error
          ;
083B 3940 rcstal: clr     spuvsh,0                ; to abnormal mode
          ;
083D 3975         clr     spuvsl,3                ; external intr. en
able
          ;
083F 66DF         b       r01111                  ; return
          ;
          ;
          ;------------------------------------------------;
          ;        Rdd      ( data receive )               ;
          ;------------------------------------------------;
          ;
          ;
0841 2E3A rdd:    cmpr    v1fc,£h'3
0843 0E           testp   zf
0844 98           b       rdd000                  ; data 1 set
          ;
0845 2E7A         cmpr    v1fc,£h'7
0847 A8           b       rdd001
          ;
          ; data h set
          ;
0848 3C28         ld      a,readc
084A 05           rolc    a
084B 3821         or      a,£0001b
084D 31           xch     a,l
084E C8           ld      h,£h'8
084F 3C09         ld      a,v1frb
0851 0F           st      a,@hl                   ; data in
          ;
0852 3B76         clr     %op06,3                 ; out 'mark'
          ;
          ; to Rdp routine
          ;
0854 C2           ld      h,£h'2
0855 E4           ld      l,£h'4                  ; to Rdp
          ;
0856 40           ld      a,£h'0                  ; next intr.
          ;                                         1/2 bit time
          ;
          ; re-warp
          ;
0857 2A   rdd002: ret
```

```
                ;
                ; data in
                ;
0858 2F1A       rdd000: add     vlfc,£h'1
                ;
085A 3C28               ld      a,readc
085C 05                 rolc    a
085D 383E               and     a,£1110b
085F 31                 xch     a,1
0860 C8                 ld      h,£h'8
0861 3C09               ld      a,vlfrb
0863 0F                 st      a,@hl                   ; data in
                ;
0864 41                 ld      a,£h'1
0865 C2                 ld      h,£h'2
0866 E2                 ld      1,£h'2
                ;
0867 97                 b       rdd002                  ; to return
                ;
                ; shift
                ;
0868 2F1A       rdd001: add     vlfc,£h'1               ; vlf counter
                                                          increase
086A 3C09               ld      a,vlfrb
086C 07                 rorc    a
086D 3F09               st      a,vlfrb                 ; shift
                ;
086F 41                 ld      a,£h'1
                ;
0870 97                 b       rdd002                  ; to return
                ;
                ;;;;;;;;;;;;;;;;;;;;;;;;;;;;;;;;;;;;;;;;;;;;;;
                ;;;;;;;;;;;;;;;;;;;;;;;;;;;;;;;;;;;;;;;;;;;;;;
                ;
                ;--------------------------------------------;
                ;       Rdp     ( parity bit )               ;
                ;--------------------------------------------;
                ;
                ;
0871 39C3       rdp:    testp   parity,0
0873 BC                 b       rdp000                  ; parity error
                ;
0874 3948               clr     vlftb,0                 ; set 'ack'
                ;
0876 3910       rdp001: set     spuvsh,1                ; set to transmit m
ode
                ;
                ; to Tdack routine
                ;
0878 C2                 ld      h,£h'2
0879 E6                 ld      1,£h'6                  ; to Tdack
                ;
087A 40                 ld      a,£h'0                  ; next intr.1/2 bit
                ;                                                       tim
e
                ; re-warp
                ;
087B 2A                 ret
                ;
                ; set 'nack'
                ;
087C 3908       rdp000: set     vlftb,0                 ; set 'nack'
                ;
087E B6                 b       rdp001                  ; to return
                ;
                ;;;;;;;;;;;;;;;;;;;;;;;;;;;;;;;;;;;;;;;;;;;;;;
                ;;;;;;;;;;;;;;;;;;;;;;;;;;;;;;;;;;;;;;;;;;;;;;
                ;
                ;--------------------------------------------;
                ;       Tdack  out ( 'ack' or 'nack' )       ;
                ;--------------------------------------------;
                ;
                ;
087F 3950       tdack:  clr     spuvsh,1                ; to receive mode
                ;
                ; to Rdast routine
```

```
          ;
0881 C2           ld      h,£h'2
0882 E8           ld      l,£h'8          ; to Rdast
          ;
0883 45           ld      a,£h'5          ; next intr.
          ;                                  11 bit time
          ; re-warp
          ;
0884 2A           ret
          ;
          ;
          ;----------------------------------------------;
          ;       Rdast     ( stop bit )                 ;
          ;----------------------------------------------;
          ;
          ;
0885 3989 rdast:  test    vlfrb,3
0887 6828         b       rcstn0          ; stop bit error
          ;
0889 39C8         testp   vlftb,0
088B AE           b       rdast4
          ;
088C 3C28 rdast6: ld      a,readc
088E 08           inc     a
088F 3F28         st      a,readc
0891 3E27         cmpr    a,readn
0893 0E           testp   zf
0894 A4           b       rdast3          ; the end
          ;
          ; again
          ;       1200 bit timer start
          ;
0895 42           ld      a,£h'2
0896 3FF6         st      a,timrhn
0898 4C           ld      a,£h'c
0899 3FF5         st      a,timrmn
089B 4F           ld      a,£h'f
089C 3FF4         st      a,timrln
          ;
089E 48           ld      a,£h'8
089F 3A8C         out     a,%op1c         ; timer start
          ;
08A1 3914         set     spuvdm,1        ; 1200bit timer bit
          ;                                                on
08A3 A8           b       rdast1
          ;
          ; set 'command execute bit '
          ;
08A4 3934 rdast3: set     spuvdm,3        ;
          ;
08A6 3941         clr     spuvum,0        ; clear previous co
mmand need
          ;                                 data bit
          ; to return
          ;
08A8 3940 rdast1: clr     spuvsh,0        ; to abnormal mode
          ;
08AA 3975         clr     spuvsl,3        ; 1'st intr. enable
          ;
08AC 66DF         b       r01111          ; return
          ;
08AE 3C16 rdast4: ld      a,vlfec
08B0 08           inc     a
08B1 3F16         st      a,vlfec
          ;
08B3 D5           cmpr    a,£h'5
08B4 BB           b       rdast5
          ;
08B5 3924         set     spuvdm,2        ; 10 sec bit on
08B7 3B36         set     %op06,3
08B9 69B6         b       rst004
          ;
08BB 3C28 rdast5: ld      a,readc
08BD 09           dec     a
08BE 3F28         st      a,readc
```

```
                 ;
08C0 688C                   b       rdast6
                 ;
                 ;
                 ;-----------------------------------------;
                 ;          T0 routine                     ;
                 ;-----------------------------------------;
                 ;
                 ;
                 ; start bit ?
                 ;
08C2 3BC0        t0:        testp   %ip00,0
08C4 94                     b       t00000                 ; not start bit
                 ;
08C5 3935                   set     spuvsl,3               ; external intr.
                 ;                                             disable
08C7 40                     ld      a,£h'0
08C8 3F0C                   st      a,paritt               ; transmit parity
                 ;                                            reset
08CA 3C06                   ld      a,vlftl
08CC 3F08                   st      a,vlftb                ; transmit data in
                 ;
08CE 3B76                   clr     %op06,3                ; out   'mark'
                 ;
                 ;
                 ; next intr.
                 ;
08D0 C2                     ld      h,£h'2
08D1 EC                     ld      l,£h'c                 ; to Td1 routine
                 ;
08D2 40                     ld      a,£h'0                 ; 1/2 bit time
                 ;
                 ; re-warp
                 ;
08D3 2A                     ret
                 ;
                 ;
                 ; start bit error'
                 ;
08D4 3914        t00000:    set     spuvdm,1               ; '1200 bit countin
g'
                 ;
08D6 3940                   clr     spuvsh,0               ; abnormal mode
                 ;
                 ; out 'space'
                 ;
08D8 3B36                   set     %op06,3                ; out 'space'
                 ;
                 ; 1200 bit timer continues
                 ;
08DA 3C8C                   ld      a,incoth
08DC 3FF6                   st      a,timrhn
08DE 3C8B                   ld      a,incotm
08E0 3FF5                   st      a,timrmn
08E2 3C8A                   ld      a,incotl
08E4 3FF4                   st      a,timrln
                 ;
08E6 48                     ld      a,£h'8
08E7 3A8C                   out     a,%op1c                ; 1200 bit timer co
ntinues
                 ;
                 ;
                 ; return
                 ;
08E9 66DF                   b       r01111
                 ;
                 ;
                 ;-----------------------------------------;
                 ;          Td1      routine               ;
                 ;-----------------------------------------;
                 ;
                 ;
                 ; mode change
                 ;
08EB 3950        td1:       clr     spuvsh,1               ; receive mode
```

```
                ;
                ; next intr.
                ;
08ED C2                 ld      h,£h'2
08EE EE                 ld      l,£h'e                  ; to Trmi
                ;
08EF 40                 ld      a,£h'0                  ; next intr.1/2 bit
                ;                                                 time
                ;
                ; re-warp
                ;
08F0 2A                 ret
                ;
                ;;;;;;;;;;;;;;;;;;;;;;;;;;;;;;;;;;;;;;;;;;;;;;;;;
                ;;;;;;;;;;;;;;;;;;;;;;;;;;;;;;;;;;;;;;;;;;;;;;;;;
                ;
                ;------------------------------------------------;
                ;       Trmi    routine                          ;
                ;------------------------------------------------;
                ;
                ;
                ; command ?
                ;
08F1 39B9       trmi:   test    vlfrb,3                 ; command ?
08F3 6903               b       trmi00                  ; command
                ;
                ; next data
                ;
08F5 3910               set     spuvsh,1                ; to transmit mode
                ;
08F7 3C08               ld      a,vlftb
08F9 07                 rorc    a
08FA 3F08               st      a,vlftb                 ; data set
                ;
08FC 41                 ld      a,£h'1
08FD 3F0A               st      a,vlfc                  ; counter set
                ;
                ; next intr.
                ;
08FF C3                 ld      h,£h'3

ROM PAGE NO.36

0900 E2                 ld      l,£h'2                  ; to Tdo
                ;
0901 41                 ld      a,£1                    ; next intr. 1 bit
                ;                                                time
                ; re-warp
                ;
0902 2A         trmi01: ret
                ;
                ;
                ; command received
                ;
0903 3B36       trmi00: set     %op06,3                 ; out 'space'
0905 C3                 ld      h,£h'3
0906 E0                 ld      l,£h'0                  ; to Rdamymi
                ;
0907 40                 ld      a,£h'0                  ; next intr.1/2 bit
                ;                                                time
                ; re-warp
                ;
0908 82                 b       trmi01                  ; to re-warp
                ;
                ;;;;;;;;;;;;;;;;;;;;;;;;;;;;;;;;;;;;;;;;;;;;;;;;;
                ;;;;;;;;;;;;;;;;;;;;;;;;;;;;;;;;;;;;;;;;;;;;;;;;;
                ;
                ;------------------------------------------------;
                ;       Rdamymi routine                          ;
                ;------------------------------------------------;
                ;
                ;
                ; parity,counter clear
                ;
```

```
0909 40        rdamy: 'ld     a,£h'0
090A 3F0B             st      a,parity
090C 3F0A             st      a,vlfc                                ; counter clear
               ;
               ; next intr.
               ;
090E C1               ld      h,£h'1
090F E4               ld      l,£h'4                                ; to Rea
               ;
0910 40               ld      a,£h'0                                ; next intr. 1/2 bi
t
               ;                                                               time
               ; re-warp
               ;
0911 2A               ret
               ;
               ;;;;;;;;;;;;;;;;;;;;;;;;;;;;;;;;;;;;;;;;;;;;;;;;;;;;;
               ;;;;;;;;;;;;;;;;;;;;;;;;;;;;;;;;;;;;;;;;;;;;;;;;;;;;;
               ;
               ;--------------------------------------------------;
               ;          Tdo      routine                        ;
               ;--------------------------------------------------;
               ;
               ;
               ; counter ?
               ;
0912 2E3A      tdo:   cmpr    vlfc,£h'3
0914 0E               testp   zf
0915 A3               b       tdo000                                ; next data set
               ;
0916 2E7A             cmpr    vlfc,£h'7
0918 0E               testp   zf
0919 A8               b       tdo001                                ; parity set
               ;
               ; data set
               ;
091A 3C08             ld      a,vlftb
091C 07               rorc    a
091D 3F08             st      a,vlftb                               ; data set
               ;
               ; counter increase
               ;
091F 2F1A      tdo002: add    vlfc,£h'1
               ;
               ; next intr.                                             no change address
               ;
0921 41               ld      a,£h'1                                ; next intr. 1 bit
time
               ;
               ;
               ; re-warp
               ;
0922 2A               ret
               ;
               ; counter equal 3
               ;
0923 3C07      tdo000: ld     a,vlfth
0925 3F08             st      a,vlftb                               ; transmit data rep
lace
               ;
0927 9F               b       tdo002                                ; to re-warp
               ;
               ; counter equal 7
               ;
0928 3C0C      tdo001: ld     a,paritt
092A 3F08             st      a,vlftb                               ; parity data in
               ;
               ; next intr.
               ;
092C C3               ld      h,£h'3
092D E4               ld      l,£h'4                                ; to Tp
               ;
092E 41               ld      a,£h'1                                ; next intr. 1 bit
               ;                                                               time
               ; re-warp
```

```
092F 2A               ;
                      ret
                      ;
                      ;;;;;;;;;;;;;;;;;;;;;;;;;;;;;;;;;;;;;;;;;;;;
                      ;;;;;;;;;;;;;;;;;;;;;;;;;;;;;;;;;;;;;;;;;;;;
                      ;
                      ;-------------------------------------------;
                      ;        Tp       routine                   ;
                      ;-------------------------------------------;
                      ;
                      ;
0930 3C0D             tp:     ld      a,lcicot
0932 3E24                     cmpr    a,spucp
0934 BB                       b       tp0000
                      ;
                      ; lci counter equals 'spucp'
                      ;
0935 3908                     set     vlftb,0                 ; next data '1'
                      ;
                      ; to Tlci routine
                      ;
0937 C3               tp0001: ld      h,£h'3
0938 E6                       ld      l,£h'6                  ; to Tlci
                      ;
0939 40                       ld      a,£h'0                  ; next intr. 1/2  b
it
                      ;                                                 time
                      ; re-warp
                      ;
093A 2A                       ret
                      ;
                      ;
                      ; lci counter not equal 'spucp'
                      ;
093B 3948             tp0000: clr     vlftb,0                 ; next data '0'
                      ;
093D B7                       b       tp0001                  ; to return
                      ;
                      ;;;;;;;;;;;;;;;;;;;;;;;;;;;;;;;;;;;;;;;;;;;;
                      ;;;;;;;;;;;;;;;;;;;;;;;;;;;;;;;;;;;;;;;;;;;;
                      ;
                      ;-------------------------------------------;
                      ;        Tlci     routine                   ;
                      ;-------------------------------------------;
                      ;
                      ;
093E 3950             tlci:   clr     spuvsh,1                ; to receive mode
                      ;
                      ;
                      ; next intr.
                      ;

ROM PAGE NO. 37

0940 C3                       ld      h,£h'3
0941 E8                       ld      l,£h'8                  ; to Rtack
                      ;
0942 40                       ld      a,£h'0                  ; next intr. 1/2 bi
t
                      ;                                                 time
                      ;
                      ; re-warp
                      ;
0943 2A                       ret
                      ;
                      ;
                      ;;;;;;;;;;;;;;;;;;;;;;;;;;;;;;;;;;;;;;;;;;;;
                      ;;;;;;;;;;;;;;;;;;;;;;;;;;;;;;;;;;;;;;;;;;;;
                      ;
                      ;-------------------------------------------;
                      ;        Rtack    routine                   ;
                      ;-------------------------------------------;
                      ;
                      ;
0944 3910             rtack:  set     spuvsh,1                ; to transmit mode
```

```
          ;
0946 39F9          testp   vlfrb,3            ;
0948 AB            b       rtack0             ; 'nack' from ECU
          ;
          ; 'ack' from ECU
          ;
0949 3BF6          testp   %ip06,3
094B 94            b       rtack1             ; lci counter
          ;                                      equal 'spucp'
094C 3948          clr     vlftb,0            ; transmit data
          ;                                      equal '0'
094E 3951          clr     spuvum,1           ; clear 'previous
          ;                                      command requires
 an answer'
          ;
          ; next intr.
          ;
0950 C3   rtack2:  ld      h,£h'3
0951 EA            ld      l,£h'a             ; to Tst
          ;
0952 40            ld      a,£h'0             ; next intr. 1/2 bi
t
          ;                                      time
          ;
          ; re-warp
          ;
0953 2A            ret
          ;
0954 3908 rtack1:  set     vlftb,0            ; transmit data
          ;                                      equil '1'
0956 3914          set     spuvdm,1           ; 1200 bit timer on
          ;
          ; transmit buffer replace
          ;
0958 3C26          ld      a,writeh
095A 38            xch     a,h
095B 3C0D          ld      a,lcicot
          ;
095D 3801          add     a,£h'1
          ;
095F 85            rolc    a
0960 383E          and     a,£h'e
0962 31            xch     a,l
          ;
0963 0C            ld      a,@hl
0964 3F06          st      a,vlftl
0966 18            inc     l
0967 0C            ld      a,@hl
0968 3F07          st      a,vlfth            ; key data in
          ;
096A 98            b       rtack2
          ;
          ; 'nack' from ECU
          ;
096B 3C16 rtack0:  ld      a,vlfec
096D 08            inc     a
096E 3F16          st      a,vlfec            ; vlf error counter
          ;                                      increase
0970 D5            cmpr    a,£h'5
0971 B9            b       rtack3             ; error not equal
          ;                                      5'th times
0972 3948          clr     vlftb,0            ; transmit data '0'
          ;
0974 3954          clr     spuvdm,1           ; (1200 bit timer)
bit clear
          ;
0976 3924          set     spuvdm,2           ; 10sec timer bit o
n
          ;
0978 90            b       rtack2             ; to re-warp
          ;
          ; error not equal 5'th times
          ;
0979 3908 rtack3:  set     vlftb,0            ; next data '1'
          ;
097B 3914          set     spuvdm,1           ; set '1200 bit tim
```

```
er bit '
                 ;
097D 2FFD                 add     lcicot,£h'f
                 ;
097F 6950                 b       rtack2
                 ;
0981 6950                 b       rtack2                    ; to re-warp
                 ;
                 ;
                 ;;;;;;;;;;;;;;;;;;;;;;;;;;;;;;;;;;;;;;;;;;;;;;;;
                 ;;;;;;;;;;;;;;;;;;;;;;;;;;;;;;;;;;;;;;;;;;;;;;;;
                 ;
                 ;-----------------------------------------------;
                 ;        Tst     rouitne                        ;
                 ;-----------------------------------------------;
                 ;
                 ;
0983 3950        tst:     clr     spuvsh,1                  ; receive mode
                 ;
0985 C3                   ld      h,£h'3
0986 EC                   ld      l,£h'c                    ; to Rst
                 ;
0987 45                   ld      a,£h'5                    ; next intr. 11 bit
                                                              time
                 ;
                 ;
                 ; re-warp
                 ;
0988 2A                   ret
                 ;
                 ;
                 ;-----------------------------------------------;
                 ;        Rst     routine                        ;
                 ;-----------------------------------------------;
                 ;
                 ;
0989 39B9        rst:     test    vlfrb,3                   ;
098B AA                   b       rst000                    ; stop bit cann't f
ind
                 ;
098C 3BF6                 testp   %ip06,3                   ;
098E AE                   b       rst001                    ; out '0'
                 ;
098F 3C0D                 ld      a,lcicot
0991 08                   inc     a
0992 3F0D                 st      a,lcicot                  ; lci counter decre
ase
                 ;
0994 3910                 set     spuvsh,1                  ; to transmit mode
                 ;
0996 3914                 set     spuvdm,1                  ; '1200 bit timr.'
                 ;
0998 42                   ld      a,£h'2
0999 3FF6                 st      a,timrhn
099B 4C                   ld      a,£h'c
099C 3FF5                 st      a,timrmn
099E 4F                   ld      a,£h'f
099F 3FF4                 st      a,timrln
                 ;
09A1 48                   ld      a,£h'8
09A2 3A8C                 out     a,%oplc
                 ;
09A4 3940        rst002:  clr     spuvsh,0                  ; abnormal mode
                 ;
09A6 3975                 clr     spuvsl,3                  ; external intr.ena
ble
                 ;
09A8 66DF                 b       r01111
                 ;
09AA 3951        rst000:  clr     spuvum,1
                 ;
09AC 6820                 b       rcstn0                    ; framing error
                 ;
                 ;
09AE 39E4        rst001:  testp   spuvdm,2                  ; '10 sec bit' on ?
09B0 B6                   b       rst004
```

```
                 ;
                 ; 'command execute bit' on
                 ;
09B1 3934                set     spuvdm,3                ;
                 ;
09B3 3951                clr     spuvum,1                ; previous command
need data
                 ;                                         bit clear
09B5 A4                  b       rst002
                 ;
09B6 3940        rst004: clr     spuvsh,0                ; abnormal mode
                 ;
                 ; 10 sec timer start
                 ;
09B8 46                  ld      a,£h'6
09B9 3FF6                st      a,timrhn
09BB 47                  ld      a,£h'7
09BC 3FF5                st      a,timrmn
09BE 47                  ld      a,£h'7
09BF 3FF4                st      a,timrln
                 ;

ROM PAGE NO.39 *

09C1 40                  ld      a,£h'0
09C2 3A8C                out     a,%oplc
                 ;
09C4 49                  ld      a,£h'9
09C5 3A8C                out     a,%oplc                 ; start
                 ;
09C7 3954                clr     spuvdm,1                ; 1200 bit timer bi
t
                 ;                                         clear
09C9 66DF                b       r01111                  ; return
                 ;
                 ;
                 ;
                 ;;;;;;;;;;;;;;;;;;;;;;;;;;;;;;;;;;;;;;;;;;;;;;;;;;;
                 ;;;;;;;;;;;;;;;;;;;;;;;;;;;;;;;;;;;;;;;;;;;;;;;;;;;
                 ;
                 ;-------------------------------------------------;
                 ;       re-warp   routine                          ;
                 ;-------------------------------------------------;
                 ;
0A00                     org     h'a00
                 ;
                 ; re-warp
                 ;
0A00 D0                  cmpr    a,£h'0
0A01 0E                  testp   zf
0A02 9B                  b       rwarp0                  ; next intr.1/2 bit
                 ;                                         time
0A03 D1                  cmpr    a,£h'1
0A04 0E                  testp   zf
0A05 A4                  b       rwarp1                  ; next  intr. 1 bit
                 ;                                         time
0A06 D2                  cmpr    a,£h'2
0A07 0E                  testp   zf
0A08 AD                  b       rwarp2                  ; next intr. 6 bit
                 ;                                         time
0A09 D3                  cmpr    a,£h'3
0A0A 0E                  testp   zf
0A0B B7                  b       rwarp3                  ; next intr. 9 bit
                 ;                                         time
                 ;                                         time
                 ; 11 bit timer
                 ;
0A0C 4F                  ld      a,£h'f
0A0D 3F1B                st      a,timrho
0A0F 47                  ld      a,£h'7
0A10 3F1A                st      a,timrmo
0A12 4C                  ld      a,£h'c
0A13 3F19                st      a,timrlo
                 ;
                 ; next warp
                 ;
```

```
0A15 29C4    rwarp4: xch    hl,warpcl
0A17 28C4            ld     hl,warpcl
             ;
0A19 66DF            b      r01111                  ; return
             ;
             ;
             ; 1/2 bit timer
             ;
0A1B 4F      rwarp0: ld     a,£h'f
0A1C 3F1B            st     a,timrho
0A1E 3F1A            st     a,timrmo
0A20 4A              ld     a,£h'a
0A21 3F19            st     a,timrlo
             ;
0A23 95              b      rwarp4
             ;
             ; 1 bit timer
             ;
0A24 4F      rwarp1: ld     a,£h'f
0A25 3F1B            st     a,timrho
0A27 3F1A            st     a,timrmo
0A29 44              ld     a,£h'4
0A2A 3F19            st     a,timrlo
             ;
0A2C 95              b      rwarp4
             ;
             ;
             ; 6 bit timer
             ;
0A2D 4F      rwarp2: ld     a,£h'f
0A2E 3F1B            st     a,timrho
0A30 4B              ld     a,£h'b
0A31 3F1A            st     a,timrmo
0A33 48              ld     a,£h'8
0A34 3F19            st     a,timrlo
             ;
0A36 95              b      rwarp4
             ;
             ; 9 bit timer
             ;
0A37 4F      rwarp3: ld     a,£h'f
0A38 3F1B            st     a,timrho
0A3A 49              ld     a,£h'9
0A3B 3F1A            st     a,timrmo
0A3D 44              ld     a,£h'4
0A3E 3F19            st     a,timrlo
             ;

ROM PAGE NO.41

0A40 6A15            b      rwarp4
             ;
                     end

ASSEMBLY COMPLETE,      0 PROGRAM ERROR(S)
```

SYMBOL TABLE

| | | | | | | | |
|---|---|---|---|---|---|---|---|
| COMMAD | 0013 | COMMAH | 0015 | COMMAL | 0014 | * DAAT0H | 0081 |
| * DATA0L | 0080 | * DATA1H | 0083 | * DATA1L | 0082 | * DATA2H | 0085 |
| * DATA2L | 0084 | * DATA3H | 0087 | * DATA3L | 0086 | * DATA4H | 0089 |
| * DATA4L | 0088 | * DATACT | 0200 | DCH | 00FE | DCL | 00FC |
| DCM | 00FD | * DISPA | 0032 | * DISPH | 0031 | * DISPIW | 0034 |
| * DISPL | 0030 | * DISPLW | 0033 | FRAME | 0053 | INCOTH | 008C |
| INCOTL | 008A | INCOTM | 008B | * IOVF1 | 0602 | * KEST | 0022 |
| KEST0H | 0043 | KEST0L | 0042 | * KEST1H | 0045 | * KEST1L | 0044 |
| * KEST2H | 0047 | * KEST2L | 0046 | * KEST3H | 0049 | * KEST3L | 0048 |
| * KEST4H | 004B | * KEST4L | 004A | * KEST5H | 004D | * KEST5L | 004C |
| * KESTBH | 0021 | * KESTBL | 0020 | * KEYND | 0029 | * KEYNN | 002A |
| * KEYOD | 002B | * KEYON | 002C | * KEYS | 0100 | * KEYSB | 0250 |
| * KEYSC | 000E | * KEYT | 0300 | * KEYTB | 00CB | LCICOT | 000D |
| * LDATL1 | 0037 | * LDATL2 | 0038 | * LDATM1 | 0035 | * LDATM2 | 0036 |
| * LDISP | 0300 | * LECOTH | 008F | * LECOTL | 008D | * LECOTM | 008E |
| * LIOVF2 | 0D00 | * LMAIN | 03E0 | * LREMO | 0E00 | * LTABLE | 0000 |
| * LVLFEX | 0C00 | * OVER2A | 0072 | * OVER2H | 0071 | * OVER2L | 0070 |

```
  OVERA1  0012  * OVERH1  0011    OVERL1  0010    PARITT  000C
  PARITY  000B    R0      06B2    R00000  06C2    R00001  06C1
  R01000  06C9  * R01100  06CE    R01110  06EA    R01111  06DF
  RCA     0719    RCA000  0734    RCA001  073A    RCA002  0732
  RCA003  0733    RCF     073E    RCF000  074F    RCF001  0754
  RCF002  074D    RCF005  0776    RCF006  074E    RCF100  077C
  RCF110  07B5    RCF111  07CF    RCF120  0798    RCF121  07AE
  RCF122  07A9    RCP     07D4    RCP000  07E9    RCP003  07E3
* RCP004  07E5    RCP100  07E1  * RCSTA1  083B    RCSTAB  0838
  RCSTN   07FA    RCSTN0  0820    RCSTN1  0817  * RCSTN2  0805
  RCSTN3  0813    RCSTN6  0803    RCSTN7  0831    RDAMY   0909
  RDAST   0885    RDAST1  08A8    RDAST3  08A4    RDAST4  08AE
  RDAST5  08BB    RDAST6  088C    RDD     0841    RDD000  0858
  RDD001  0868    RDD002  0857    RDP     0871    RDP000  087C
  RDP001  0876    READC   0028    READN   0027  * REMD0   0060
* REMD1   0061  * REMD2   0062  * REMD3   0063  * REMD4   0064
* REMD5   0065  * REMD6   0066  * REMD7   0067  * REMOA   006A
* REMOH   0069  * REMOL   0068    RKCE    0050    RMI     06FC
  RMI000  070F    RMI001  0709    RMI002  070E    RMI003  0715
* RNH     006B  * RNL     006D  * RNM     006C    RST     0989
  RST000  09AA    RST001  09AE    RST002  09A4    RST004  09B6
  RSTD    0834    RTACK   0944    RTACK0  096B    RTACK1  0954
  RTACK2  0950    RTACK3  0979    RWARP0  0A1B    RWARP1  0A24
  RWARP2  0A2D    RWARP3  0A37    RWARP4  0A15  * RWRPCH  00CA
* RWRPCL  00C8  * RWRPCM  00C9    SERVRC  000F    SPUCP   0024
  SPUFF   0017    SPUSH   0003    SPUSK   0023    SPUSL   0002
  SPUTT   0018    SPUVDM  0004    SPUVSH  0000    SPUVSL  0005
  SPUVUM  0001    SPW     00FF    SPWB    00C7    T0      08C2
  T00000  08D4    TD1     08EB    TDACK   087F    TDO     0912
  TDO000  0923    TDO001  0928    TDO002  091F  * TIMR2H  00FA
* TIMR2L  00F8  * TIMR2M  00F9    TIMRHN  00F6    TIMRHO  001B
  TIMRLN  00F4    TIMRLO  0019    TIMRMN  00F5    TIMRMO  001A
  TLCI    093E    TP      0930    TP0000  093B    TP0001  0937
  TRA     07EE    TRA000  07F7    TRA001  07F5    TRMI    08F1
  TRMI00  0903    TRMI01  0902    TST     0983    VL0040  06A3
  VL0050  0698    VL0060  0689    VLF001  0635    VLF002  0647
  VLF003  0654    VLF004  066E    VLF005  0640    VLF010  0623
  VLF011  062B    VLF100  061E    VLF200  062D    VLF300  06AD
  VLFC    000A    VLFEC   0016    VLFRB   0009    VLFTB   0008
  VLFTH   0007    VLFTL   0006  * VLFXA   0052  * VLFXH   0051
* VLFXL   0050    WARPCL  00C4  * WARPCM  00C5    WRITEH  0026
  WRITEN  0025

DEFINED    233 USER SYMBOL(S)

LOC  OBJ        LINE          SOURCE STATEMENT

                   1 ;-----------------------------------------------------------------;
                   2 ;                                                         7.1983. ;
                   3 ;          lvlfex.asm        V1.0                                 ;
                   4 ;                                  (TMP4740P)                     ;
                   5 ;                                                                 ;
                   6 ;                 vlf communication     routine                   ;
                   7 ;                                                                 ;
                   8 ;                                                                 ;
                   9 ;-----------------------------------------------------------------;

                  $nolist

                  $list

                 303 ;
                 304 ;
                 305 ;

ROM PAGE NO. 48

0C00             306          org       h'c00
                 307 ;
                 308 ; disable ?
                 309 ;
0C00 39F5        310 vlfex:   testp     spuvsl,3
0C02 6C42        311          b         vlfx00                    ; 1'st intr. disabl
```

```
          ;
          ; push register
          ;
0C04 3F52           st      a,vlfxa
0C06 2950           xch     hl,vlfxl                 ; push register
          ;
          ; clear external counter
          ;
0C08 40             ld      a,£h'0
0C09 3A8C           out     a,%op1c
0C0B 3B04           set     %op04,0
0C0D 3B44           clr     %op04,0                  ; event timer start
          ;
          ; timer start
          ;
0C0F 3CF6           ld      a,timrhn
0C11 3F8C           st      a,incoth
0C13 3CF5           ld      a,timrmn
0C15 3F8B           st      a,incotm
0C17 3CF4           ld      a,timrln
0C19 3F8A           st      a,incotl
          ;
0C1B 4F             ld      a,£h'f
0C1C 3FF6           st      a,timrhn
0C1E 3FF5           st      a,timrmn
0C20 4A             ld      a,£h'a
0C21 3FF4           st      a,timrln
0C23 44             ld      a,£h'4
0C24 3A8C           out     a,%op1c                  ; timer start
                                                       ( 1/2 bit time )
          ;
          ; framing error ?
          ;
0C26 39F1           testp   spuvum,3
0C28 6C43           b       vlfx01                   ; framing error
          ;
          ; mode change from abnormal to normal
          ;
0C2A 3900           set     spuvsh,0                 ; to normal mode
          ;
          ; transmit ?
          ;
0C2C 39D0           testp   spuvsh,1
0C2E 6C57           b       vlfx02                   ; transmit mode
          ;
          ; next routine
          ;
0C30 40             ld      a,£h'0
0C31 3FC4           st      a,warpcl
0C33 41             ld      a,£h'1
0C34 3FC5           st      a,warpcm                 ; address h'010
          ;
          ; next timer setting
          ;
0C36 4F             ld      a,£h'f
0C37 3F1B           st      a,timrho
0C39 3F1A           st      a,timrmo
0C3B 44             ld      a,£h'4
0C3C 3F19           st      a,timrlo
          ;
          ; pop register
          ;
0C3E 3C52     vlfx03: ld      a,vlfxa

ROM PAGE NO. 49

0C40 2950           xch     hl,vlfxl
          ;
          ; return
          ;
0C42 2B       vlfx00: reti
          ;
          ;
          ; framing error
          ;
0C43 00       vlfx01: nop
0C44 4F             ld      a,£h'f
```

```
0C45 3F18              st      a,sputt
           ;
           ;   ld      a,£h'f
           ;   st      a,timrhn
           ;   ld      a,£h'7
           ;   st      a,timrmn
           ;   ld      a,£h'c
           ;   st      a,timrln
           ;
           ;   ld      a,£h'4
           ;   out     a,%op1c                  ; timer start 11 bi
t
           ;                                        time
0C47 3C8C              ld      a,incoth
0C49 3F1B              st      a,timrho
0C4B 3C8B              ld      a,incotm
0C4D 3F1A              st      a,timrmo
0C4F 3C8A              ld      a,incotl
0C51 3F19              st      a,timrlo
           ;
0C53 3B36              set     %op06,3
           ;
0C55 6C3E              b       vlfx03
           ;
           ;
           ; transmit mode
           ;
0C57 3B76      vlfx02: clr     %op06,3          ; out 'mark'
           ;
0C59 3C06              ld      a,vlftl
0C5B 3F08              st      a,vlftb          ; transmit buffer
           ;                                        clear
0C5D 4F                ld      a,£h'f
0C5E 3F1B              st      a,timrho
0C60 3F1A              st      a,timrmo
0C62 4A                ld      a,£h'a
0C63 3F19              st      a,timrlo         ; timer set
           ;
0C65 42                ld      a,£h'2
0C66 3FC5              st      a,warpcm
0C68 4A                ld      a,£h'a
0C69 3FC4              st      a,warpcl         ; next routin
           ;
0C6B 6C3E              b       vlfx03           ; to return
           ;
           ;
                       end

ASSEMBLY COMPLETE,     0 PROGRAM ERROR(S)
```

SYMBOL TABLE

```
* COMMAD  0013   * COMMAH  0015   * COMMAL  0014   * DATA0H  0081
* DATA0L  0080   * DATA1H  0083   * DATA1L  0082   * DATA2H  0085
* DATA2L  0084   * DATA3H  0087   * DATA3L  0086   * DATA4H  0089
* DATA4L  0088   * DATACT  0200   * DCH     00FE   * DCL     00FC
* DCM     00FD   * DISPA   0032   * DISPH   0031   * DISPIW  0034
* DISPL   0030   * DISPLW  0033   * FLASH   0350     INCOTH  008C
  INCOTL  008A     INCOTM  008B   * KEST    0022   * KEST0H  0043
* KEST0L  0042   * KEST1H  0045   * KEST1L  0044   * KEST2H  0047
* KEST2L  0046   * KEST3H  0049   * KEST3L  0048   * KEST4H  004B
* KEST4L  004A   * KEST5H  004D   * KEST5L  004C   * KESTBH  0021
* KESTBL  0020   * KEYND   0029   * KEYNN   002A   * KEYOD   002B
* KEYON   002C   * KEYS    0100   * KEYSB   0250   * KEYSC   000E
* KEYT    0300   * KEYTB   00CB   * LCICOT  000D   * LDASL1  003B
* LDASL2  003C   * LDASM1  0039   * LDASM2  003A   * LDATL1  0037
* LDATL2  0038   * LDATM1  0035   * LDATM2  0036   * LDISP   0B00
* LECOTH  008F   * LECOTL  008D   * LECOTM  008E   * LEDD    0310
* LIOVF1  0600   * LIOVF2  0D00   * LMAIN   03E0   * LREMO   0E00
* LTABLE  0000   * LVLFEX  0C00   * OVER2A  0072   * OVER2H  0071
* OVER2L  0070   * OVERA1  0012   * OVERH1  0011   * OVERL1  0010
* PARITT  000C   * PARITY  000B   * READC   0028   * READN   0027
* REMD0   0060   * REMD1   0061   * REMD2   0062   * REMD3   0063
* REMD4   0064   * REMD5   0065   * REMD6   0066   * REMD7   0067
* REMOA   006A   * REMOH   0069   * REMOL   0068   * RKCE    0050
```

```
* RNH      006B    * RNL      0@5D    * RNM      006C    * RWRPCH   00CA
* RWRPCL   00C8    * RWRPCM   00C9    * SERVRC   000F    * SPUCP    0024
* SPUSH    0003    ~ SPUSK    0023    * SPUSL    0002      ^UTT     0018
* SPUVDM   0004      SPUVSH   0000      SPUVSL   0005      SPUVUM   0001
* SPW      00FF    ~ SPWB     00C7    * TIMR2H   00FA    * TIMR2L   00F8
* TIMR2M   00F9      TIMRHN   00F6      TIMRHO   001B      TIMRLN   00F4
  TIMRLO   0019      TIMRMN   00F5      TIMRMO   001A    * VLFC     000A
* VLFEC    0016    * VLFEX    0C00    * VLFRB    0009      VLFTB    0008
* VLFTH    0007      VLFTL    0006      VLFX00   0C42      VLFX01   0C4?
  VLFX02   0C57      VLFX03   0C3E      VLFXA    0052    * VLFXH    0051
  VLFXL    0050      WARPCL   00C4      WARPCM   00C5    * WRITEH   0026
* WRITEN   0025

DEFINED    137 USER SYMBOL(S)
```

```
LOC   OBJ        LINE         SOURCE STATEMENT

                        !---------------------------------------------------------!
                        !                                              7.1983.   !
                        !        lremo.asm         V1.0                           !
                        !                                    (TMP4740P)           !
                        !                                                         !
                        !                  remota.       routine                  !
                        !                                                         !
                        !                                                         !
                        !---------------------------------------------------------!

                       $nolist

                       $list

                        !

ROM PAGE NO.56

0E00                            org      h'e00
                        !
                        !
                          !!!!  r escape
                        !
0E00 3F6A                       st       a,remoa
0E02 44                         ld       a,£10100b
0E03 13                         xch      a,eir
0E04 366F                       eiclr    il,101111b
0E06 2968                       xch      hl,remol
                        !
                        !!!!    to stop timer2
                        !
0E08 40                         ld       a,£0
0E09 3A8D                       out      a,%opld
                        !!!!    check N1
                        !
0E0B 3C6B                       ld       a,rnh
0E0D D3                         cmpr     a,£h'3
0E0E 0E                         testp    zf
0E0F 6E5C                       b        int100
                        !
0E11 D2                         cmpr     a,£2
0E12 0E                         testp    zf
0E13 A4                         b        int200
                        !
                        !!!     N1=1 or 0
0E14 41                         ld       a,£1
0E15 3F6B                       st       a,rnh              !
                        !
                        !!      setting timer2 on 4.5ms
                        !
0E17 4F                         ld       a,£h'f
0E18 3FFA                       st       a,timr2h
0E1A 4E                         ld       a,£h'e
0E1B 3FF9                       st       a,timr2m
0E1D 3FF8                       st       a,timr2l
                        !
```

```
0E1F 48                  ld      a,£8
0E20 3A8D                out     a,%op1d
0E22 6EE7                b       ret2
                ;
                ;;;      N1=2
                ;
0E24 3CF8       int200:  ld      a,timr2l          ; timer check
0E26 3802                add     a,£h'2
0E28 05                  rolc    a
0E29 04                  testp   cf                ;
0E2A 9E                  b       int210            ;jump on carry '1'
                ;
                ;;       setting timer2
                ;
0E2B 3B06       in2000:  set     %op06,0
                ;
0E2D 4E                  ld      a,£h'e
0E2E 3FFA                st      a,timr2h
0E30 47                  ld      a,£h'7
0E31 3FF9                st      a,timr2m
0E33 4C                  ld      a,£h'c
0E34 3FF8                st      a,timr2l
                ;
0E36 48                  ld      a,£8
0E37 3A8D                out     a,%op1d           ;start
                ;
0E39 40                  ld      a,£0
0E3A 3F6B                st      a,rnh             ;N1=0
                ;
0E3C 6EE7                b       ret2
                ;
                ;;       start data receive
                ;
0E3E 3CF9       int210:  ld      a,timr2m

ROM PAGE NO.57

0E40 DF                  cmpr    a,£h'f
0E41 6E2B                b       in2000
                ;
0E43 43                  ld      a,£3
0E44 3F6B                st      a,rnh             ;N1=3
                ;
                ;        ram clear
                ;
0E46 C6                  ld      h,£6
0E47 E0                  ld      l,£0
                ;
0E48 11                  mov     l,a
                ;
0E49 0F         int211:  st      a,@hl
0E4A 18                  inc     l
0E4B 3898                cmpr    l,£8
0E4D 0E                  testp   zf
0E4E 90                  b       int212
0E4F 89                  b       int211
                ;
                ;        setting timer2
                ;
0E50 3FF8       int212:  st      a,timr2l
0E52 4F                  ld      a,£h'f
0E53 3FF9                st      a,timr2m
0E55 3FFA                st      a,timr2h
                ;
0E57 48                  ld      a,£8
0E58 3A8D                out     a,%op1d
                ;
0E5A 6EE7                b       ret2
                ;
                ;;;      data receive
                ;                N1=3
0E5C 3C6C       int100:  ld      a,rnm
0E5E 31                  xch     a,l       ;l <—— N2
                ;
0E5F C6                  ld      h,£6
```

```
                     ;
0E60 3CF8                       ld      a,timr21
                     ;
0E62 3809                       add     a,£9
                     ;
0E64 6E87                       b       int130  ;carry '0'
                     ;
0E66 3C6D            int110:    ld      a,rnl   ;a(000 N3
0E68 D0                         cmpr    a,£0    ;N3=0 ?
0E69 0E                         testp   zf
0E6A B8                         b       int121
                     ;
0E6B D1                         cmpr    a,£1    ;N3=1 ?
0E6C 0E                         testp   zf
0E6D BE                         b       int122
                     ;
0E6E D2                         cmpr    a,£2    ;N3=2 ?
0E6F 0E                         testp   zf
0E70 6E83                       b       int123
                     ;
                     ;          N3=3 I J"12
0E72 0C                         ld      a,@hl
0E73 3821                       or      a,£1
0E75 0F                         st      a,@hl
0E76 6E87                       b       int130
                     ;
0E78 0C              int121:   ,ld      a,@hl
0E79 3828                       or      a,£8
0E7B 0F                         st      a,@hl
0E7C 6E87                       b       int130
                     ;
0E7E 0C              int122:    ld      a,@hl
0E7F 3824                       or      a,£4

ROM PAGE NO.58 *

0E81 0F                         st      a,@hl
0E82 87                         b       int130
                     ;
0E83 0C              int123:    ld      a,@hl
0E84 3822                       or      a,£2
0E86 0F                         st      a,@hl
                     ;
0E87 3C6D            int130:    ld      a,rnl
0E89 3801                       add     a,£1
0E8B 3F6D                       st      a,rnl
                     ;
0E8D D4                         cmpr    a,£4
0E8E 9B                         b       int140          ;jump on N3(4
                     ;
0E8F 40                         ld      a,£0
0E90 3F6D                       st      a,rnl           ; N3(—— 0
                     ;
0E92 3C6C                       ld      a,rnm
0E94 3801                       add     a,£1            ;a(—— N2+1
0E96 3F6C                       st      a,rnm
                     ;
0E98 D8                         cmpr    a,£8
0E99 0E                         testp   zf
0E9A A8                         b       int150          ;jump N2=8
                     ;
                     ;          setting timer2
                     ;
0E9B 4F              int140:    ld      a,£h'f
0E9C 3FFA                       st      a,timr2h
0E9E 3FF9                       st      a,timr2m
0EA0 40                         ld      a,£0
0EA1 3FF8                       st      a,timr21
                     ;
0EA3 48                         ld      a,£8
0EA4 3A8D                       out     a,%opld
0EA6 6EE7                       b       ret2
                     ;
                     ;;;        data check & convert
                     ;;         check code was complete or not
                     ;
```

```
0EA8 E0          int150:  ld      l,£0
0EA9 0C                   ld      a,@hl
                 ;
0EAA D1                   cmpr    a,£1
0EAB 6EE0                 b       int160
                 ;
0EAD E3                   ld      l,£3
                 ;
0EAE 0C                   ld      a,@hl
                 ;
0EAF DD                   cmpr    a,£h'd
0EB0 6EE0                 b       int160          ;received data was error
                 ;
                 ;        check data was complete or not
                 ;
0EB2 4F                   ld      a,£h'f
                 ;
0EB3 E7                   ld      l,£7
                 ;
0EB4 1F                   xor     a,@hl
                 ;
0EB5 E5                   ld      l,£5
                 ;
0EB6 16                   cmpr    a,@hl
0EB7 6EE0                 b       int160          ;data was not complete
                 ;
                 ;        data convert
                 ;
0EB9 0C                   ld      a,@hl
                 ;
0EBA D0                   cmpr    a,£0
0EBB 0E                   testp   zf
0EBC 6EC2                 b       int171  ;
                 ;
0EBE 4C                   ld      a,£h'c
0EBF 3FFD                 st      a,dcm           ;data counter setting

ROM PAGE NO.59 *

0EC1 85                   b       int172
                 ;
0EC2 4D          int171:  ld      a,£h'd
0EC3 3FFD                 st      a,dcm           ;data countersetting
                 ;
0EC5 19          int172:  dec     l       ;l(—— £4
                 ;
0EC6 0C                   ld      a,@hl
                 ;
0EC7 3FFC                 st      a,dcl           ;data counter setting
                 ;
0EC9 4F                   ld      a,£h'f
0ECA 3FFE                 st      a,dch           ; data counter setting
                 ;
                 ;;
0ECC 33                   ldl     a,@dc
0ECD 31                   xch     a,l
                 ;
0ECE 32                   ldh     a,@dc+
0ECF 30                   xch     a,h
                 ;
0ED0 2250                 call    keysb
                 ;
0ED2 3930                 set     spuvsh,3        ; remote flag on
                 ;
                 ;        setting timer2
0ED4 4F                   ld      a,£h'f
0ED5 3FFA                 st      a,h'fa
0ED7 43                   ld      a,£h'3
0ED8 3FF9                 st      a,h'f9
0EDA 40                   ld      a,£h'0
0EDB 3FF8                 st      a,h'f8
                 ;
0EDD 48                   ld      a,£8
0EDE 3A8D                 out     a,%opld ;
                 ;
```

```
                  ;;       N<--0
                  ;
0EE0 40           int160:  ld       a,#0
0EE1 3F6B                  st       a,rnh
0EE3 3F6C                  st       a,rnm
0EE5 3F6D                  st       a,rnl
                  ;
                  ;;;      return routine
                  ;
0EE7 2968         ret2:    xch      hl,remol
0EE9 47                    ld       a,#0111b
0EEA 36AF                  diclr    il,101111b
0EEC 13                    xch      a,eir
0EED 3C6A                  ld       a,remoa
                  ;;
0EEF 3B46                  clr      %op06,0
                  ;
0EF1 2B                    reti
                  ;;
                  ;
                  ;
                  ;
                           end

ASSEMBLY COMPLETE,      0 PROGRAM ERROR(S)

                         SYMBOL TABLE

* COMMAD  0013   * COMMFC  0015   * COMMGR  0014   * DATACT  0200
  DCH     00FE     DCL     00FC     DCM     00FD   * DISPA   0032
* DISPH   0031   * DISPIW  0034   * DISPL   0030   * DISPLW  0033
  IN2000  0E2B   * INCOTH  003B   * INCOTL  0039   * INCOTM  003A
  INT100  0E5C   * INT110  0E66     INT121  0E78     INT122  0E7E
  INT123  0E83     INT130  0E87     INT140  0E9B     INT150  0EA8
  INT160  0EE0     INT171  0EC2     INT172  0EC5     INT200  0E24
  INT210  0E3E     INT211  0E49     INT212  0E50   * KEST    0043
* KEST0H  0023   * KEST0L  0022   * KEST1H  0025   * KEST1L  0024
* KEST2H  0027   * KEST2L  0026   * KEST3H  0029   * KEST3L  0028
* KEST4H  002B   * KEST4L  002A   * KESTBH  0041   * KESTBL  0040
* KEYND   002C   * KEYNN   002D   * KEYOD   002E   * KEYON   002F
* KEYS    0100     KEYSB   0250   * KEYSC   000E   * KEYTB   00CB
* LCICOT  000D   * LDATL1  0037   * LDATL2  0038   * LDATM1  0035
* LDATM2  0036   * LDISP   0B00   * LECOTH  003E   * LECOTL  003C
* LECOTM  003D   * LIOVF1  0600   * LIOVF2  0D00   * LMAIN   03EB
* LTABLE  0000   * LVLFEX  0C00   * OVERA1  0012   * OVERH1  0011
* OVERL1  0010   * PARITT  000C   * PARITY  000B   * REMD0   0060
* REMD1   0061   * REMD2   0062   * REMD3   0063   * REMD4   0064
* REMD5   0065   * REMD6   0066   * REMD7   0067     REMOA   006A
* REMOH   0069     REMOL   0068     RET2    0EE7   * RKCE    0050
  RNH     006B     RNL     006D     RNM     006C   * RWRPCH  00CA
* RWRPCL  00C8   * RWRPCM  00C9   * SERVRC  000F   * SPUCP   0021
* SPUSH   0003   * SPUSK   0020   * SPUSL   0002   * SPUVDM  0004
  SPUVSH  0000   * SPUVSL  0005   * SPUVUM  0001   * SPW     00FF
* SPWB    00C7     TIMR2H  00FA     TIMR2L  00F8     TIMR2M  00F9
* TIMRHN  00F6   * TIMRHO  001B   * TIMRLN  00F4   * TIMRLO  0019
* TIMRMN  00F5   * TIMRMO  001A   * VDATAH  0018   * VDATAL  0017
* VLFC    000A   * VLFEC   0016   * VLFRB   0009   * VLFTB   0008
* VLFTH   0007   * VLFTL   0006   * VLFXA   0052   * VLFXH   0051
* VLFXL   0050   * WARPCL  00C4   * WARPCM  00C5

DEFINED   123 USER SYMBOL(S)

LOC  OBJ      LINE         SOURCE STATEMENT

                  ;---------------------------------------------------------;
                  ;                                               7.1983.   ;
                  ;        subroutine      V1.0                             ;
                  ;                                  (TMP4740P)             ;
                  ;                                                         ;
                  ;                                                         ;
                  ;                                                         ;
                  ;---------------------------------------------------------;

$nolist
$list
```

```
                  ;

ROM PAGE NO. 1

0050                      org     h'050
                  ;
0050 3C17         rkce:   ld      a,spuff
0052 DF                   cmpr    a,£h'f
0053 98                   b       rkce5
                  ;
0054 40                   ld      a,£h'0
0055 3F17                 st      a,spuff
0057 AB                   b       rkce4              ; to return
                  ;
0058 3C23         rkce5:  ld      a,spusk
005A 3E24                 cmpr    a,spucp
005C AC                   b       rkce0              ; branch on
                                                       spusk<>spucp
                  ;
005D 394F                 clr     servrc,0           ; clear service request
                  ;
005F 3942                 clr     spusl,0            ; new character available
                  ;
0061 4F                   ld      a,£h'f
0062 3F42                 st      a,kest0l           ;
0064 3F43                 st      a,kest0h           ; no keystroke
                  ;
                  ; spusk,spucp clear
                  ;
0066 40                   ld      a,£h'0
0067 3F23                 st      a,spusk
0069 3F24                 st      a,spucp
                  ;
                  ; return
                  ;
006B 2A           rkce4:  ret
                  ;
                  ;
                  ; buffer
                  ;
006C 3C24         rkce0:  ld      a,spucp
006E 08                   inc     a
006F 3F0E                 st      a,keysc
                  ;
0071 3C0E         rkce1:  ld      a,keysc
0073 05                   rolc    a
0074 383E                 and     a,£1110b
                  ;
0076 31                   xch     a,l
0077 C4                   ld      h,£h'4
                  ;
0078 0C           rkce2:  ld      a,0hl
                  ;
0079 388E                 add     l,£h'e             ; l<— l-2
                  ;
007B 0F                   st      a,0hl
                  ;
007C 3883                 add     l,£h'3             ; l<— l+3
                  ;
007E 0C                   ld      a,0hl
                  ;
007F 388E         rkce3:  add     l,£h'e             ; l<— l-2
                  ;

ROM PAGE NO. 2 *

0081 0F                   st      a,0hl
                  ;
0082 3883                 add     l,£h'3
                  ;
0084 389C                 cmpr    l,£h'c             ; buffer bottom ?
0086 6078                 b       rkce2
                  ;
0088 2FFE                 add     keysc,£h'f         ; keysc<— keysc-1
```

```
                 ;
008A 2E1E                cmpr    keysc,£h'1
008C 6071                b       rkce1
                 ;
                 ; spusk(-- ( spusk-spucp )
                 ;
008E 04                  testp   cf                          ; cf (-- 1
                 ;
008F C2                  ld      h,£h'2
0090 E3                  ld      l,£h'3                      ; spusk = m( hl )
                 ;
0091 3C24                ld      a,spucp
                 ;
0093 14                  subrc   a,@hl                       ; spusk-spucp
                 ;
0094 0F                  st      a,@hl                       ;
                 ;
0095 40                  ld      a,£h'0
0096 3F24                st      a,spucp                     ; spucp (-- 0
                 ;
0098 606B                b       rkce4                       ; to return
                 ;
                 ;
                 ;

ROM PAGE NO. 4

0100                     org     h'100
                 ;
0100 4F          keys:   ld      a,£h'f
0101 3F0E                st      a,keysc
0103 3F29                st      a,keynd
                 ;
0105 E0                  ld      l,£h'0
0106 4E                  ld      a,£h'e
                 ;
0107 3AA5        key001: out     a,%op05           ;
                 ;
0109 2300                call    keyt              ; timer
                 ;
010B 30                  xch     a,h
                 ;
010C 3A27                in      %ip07,a           ;
                 ;
010E DF                  cmpr    a,£h'f            ;
010F 0E                  testp   zf                ;
0110 98                  b       key002            ;
                 ;
0111 18                  inc     l
0112 3F29                st      a,keynd           ;
0114 3C0E                ld      a,keysc           ;
0116 3F2A                st      a,keynn           ;
                 ;
0118 2F1E        key002: add     keysc,£1          ;
011A 2E3E                cmpr    keysc,£h'3        ;
011C B2                  b       key003            ;
                 ;
011D 2CF5                out     £h'f,%op05        ;
011F 3B74                clr     %op04,3           ;
                 ;
0121 2300                call    keyt
                 ;
0123 3A27                in      %ip07,a           ;
0125 3B34                set     %op04,3           ;
                 ;
0127 DF                  cmpr    a,£h'f            ;
0128 0E                  testp   zf                ;
0129 B6                  b       key004            ;
                 ;
012A 18                  inc     l
012B 3F29                st      a,keynd
012D 3C0E                ld      a,keysc
012F 3F2A                st      a,keynn
0131 B6                  b       key004
                 ;
```

```
0132 30         key003: xch     a,h
0133 05                 rolc    a
0134 87                 b       key001
0135 87                 b       key001
                ;
0136 30         key004: xch     a,h
0137 3C29               ld      a,keynd
                ;
0139 DF                 cmpr    a,£h'f
013A 0E                 testp   zf              ;
013B 617D               b       key005          ; key released
                ;
013D 3891               cmpr    l,£h'1          ;
013F 0E                 testp   zf              ;

ROM PAGE NO. 5

0140 82                 b       key020          ;
0141 B3                 b       key006          ;
                ;
0142 3C29       key020: ld      a,keynd
                ;
0144 DE                 cmpr    a,£h'e
0145 0E                 testp   zf
0146 91                 b       key021
                ;
0147 DD                 cmpr    a,£h'd
0148 0E                 testp   zf
0149 91                 b       key021
                ;
014A DB                 cmpr    a,£h'b
014B 0E                 testp   zf
014C 91                 b       key021
                ;
014D D7                 cmpr    a,£h'7
014E 0E                 testp   zf
014F 91                 b       key021
0150 B3                 b       key006
                ;
0151 3C2B       key021: ld      a,keyod
0153 3E29               cmpr    a,keynd
0155 A8                 b       key007
                ;
0156 3C2C               ld      a,keyon
0158 3E2A               cmpr    a,keynn
015A A8                 b       key007
                ;
015B 39E0               testp   spuvsh,2
015D B8                 b       key022
                ;
                ;
015E 3985       key030: test    spuvsl,0        ;
0160 B2                 b       key010          ;
                ;
                ;
0161 2200               call    datact
                ;
0163 2250               call    keysb
                ;
                ;
0165 3945               clr     spuvsl,0        ;
0167 AA                 b       key008          ;
                ;
0168 3905       key007: set     spuvsl,0        ;
                ;
016A 3C29       key008: ld      a,keynd         ;
016C 3F2B               st      a,keyod         ;
016E 3C2A               ld      a,keynn         ;
0170 3F2C               st      a,keyon         ;
                ;
                ;
0172 2A         key010: ret                     ;return
                ;
0173 3945       key006: clr     spuvsl,0
0175 3920               set     spuvsh,2
0177 AA                 b       key008
```

```
                ;
0178 3905       key022: set     spuvsl,0
017A 3960               clr     spuvsh,2
017C AA                 b       key008
                ;
                ;
                ;
017D 3C29       key025: ld      a,keyod         ;
                ;
017F DF                 cmpr    a,£h'f          ;

ROM PAGE NO. 6

0180 6168               b       key007          ;
                ;
0182 3985               test    spuvsl,0        ;
0184 616A               b       key008          ;
                ;
0186 3945               clr     spuvsl,0        ;
                ;
                ;
0188 3952               clr     spusl,1         ;
                ;
018A 6173               b       key006
                ;
                ;

ROM PAGE NO. 8

0200                    org     h'200
                ;
0200 3C2A       datact: ld      a,keynn         ;
0202 30                 xch     a,h             ;
                ;
0203 10                 mov     h,a             ;
0204 DF                 cmpr    a,£h'f          ;
0205 0E                 testp   zf              ;
0206 AA                 b       data04          ;
                ;
0207 3C29               ld      a,keynd         ;
0209 5C                 test    a,0             ;
020A 9E                 b       data01          ;
                ;
020B 5D                 test    a,1             ;
020C A2                 b       data02          ;
                ;
020D 5E                 test    a,2             ;
020E A6                 b       data03          ;
                ;
020F 30                 xch     a,h             ;
                ;
0210 30         data05: xch     a,h             ;
0211 4F                 ld      a,£h'f          ;
0212 3FFD               st      a,dcm           ;
0214 3FFE       data06: st      a,dch           ;
0216 10                 mov     h,a             ;
0217 3FFC               st      a,dcl           ;
                ;
0219 33                 ldl     a,@dc           ;
021A 31                 xch     a,l             ;
                ;
021B 32                 ldh     a,@dc+          ;
021C 30                 xch     a,h             ;
                ;
021D 2A         data10: ret                     ;
                ;
021E 30         data01: xch     a,h             ;
021F 3824               or      a,£h'4          ;
0221 90                 b       data05          ;
                ;
0222 30         data02: xch     a,h             ;
0223 3828               or      a,£h'8          ;
0225 90                 b       data05          ;
                ;
0226 30         data03: xch     a,h             ;
0227 382C               or      a,£h'c          ;
```

```
0229 90        571         b       data05        ;
               572 ;
022A 3C29      573 data04: ld      a,keynd       ;
022C 30        574         xch     a,h           ;
022D 4E        575         ld      a,£h'e        ;
022E 3FFD      576         st      a,dcm         ;
0230 4F        577         ld      a,£h'f        ;
0231 94        578         b       data06        ;
               579 ;
0232           580
0232           581
               582 ;
0250           583         org     h'250
               584 ;
0250 2920      585 keysb:  xch     hl,kestbl
               586 ;
0252 3C23      587         ld      a,spusk
               588 ;
0254 3912      589         set     spusl,1                ; key currently dep
ression
               590 ;
0256 D5        591         cmpr    a,£h'5
0257 0E        592         testp   zf
0258 AC        593         b       keysb4
               594 ;
0259 3902      595         set     spusl,0                ; new character ava
ilable
               596 ;
025B 390F      597         set     servrc,0               ; service request
               598 ;
025D 08        599         inc     a
               600 ;
025E 3F23      601         st      a,spusk
               602 ;
0260 05        603         rolc    a
               604 ;
0261 383E      605         and     a,£h'e
               606 ;
0263 31        607         xch     a,l
               608 ;
0264 C4        609         ld      h,£h'4
               610 ;
0265 3C20      611         ld      a,kestbl
0267 0F        612         st      a,@hl
               613 ;
0268 18        614         inc     l
               615 ;
0269 3C21      616         ld      a,kestbh
026B 0F        617         st      a,@hl
               618 ;
026C 2A        619 keysb4: ret
               620 ;

ROM PAGE NO.12

0300           621         org     h'300
               622 ;
               623 ; keyt routine
               624 ;
0300 3FCB      625 keyt:   st      a,keytb
               626 ;
0302 40        627         ld      a,£h'0
               628 ;
0303 08        629 keyt0:  inc     a
0304 00        630         nop
0305 00        631         nop
0306 00        632         nop
0307 0E        633         testp   zf
0308 8A        634         b       keyt1
               635 ;
0309 83        636         b       keyt0
               637 ;
030A 3CCB      638 keyt1:  ld      a,keytb
               639 ;
030C 2A        640         ret
```

```
                ;
                ;
                ;
                ;;;
                ;;;
                ;;;
                ;;;
0315                        org     h'315
                ;
                ; ledd
                ;
0315 10         ledd:       mov     h,a
                ;
0316 5F                     test    a,3
0317 99                     b       ledd01
0318 A8                     b       ledd00
                ;
                ; ascii code
                ;
0319 3804       ledd01:     add     a,£h'4
031B 3FFD                   st      a,dcm
031D 4F                     ld      a,£h'f
031E 3FFE                   st      a,dch
0320 31                     xch     a,l
0321 3FFC                   st      a,dcl
                ;
0323 33                     ldl     a,@dc
0324 31                     xch     a,l
                ;
0325 32                     ldh     a,@dc+
0326 30                     xch     a,h
                ;
0327 2A                     ret
                ;
                ;
                ; for each seguement
                ;
0328 2920       ledd00:     xch     hl,kestbl
                ;
032A E0                     ld      l,£0
032B C2                     ld      h,£2
                ;
032C 4F                     ld      a,£h'f
032D 1F                     xor     a,@hl
                ;
032E 0F                     st      a,@hl
                ;
032F 18                     inc     l
0330 4F                     ld      a,£h'f
                ;
0331 1F                     xor     a,@hl
0332 0F                     st      a,@hl
                ;
0333 2920                   xch     hl,kestbl
                ;
0335 2A                     ret
                ;
                ;
                ;
                ;;;
                ;;;
                ;;;

ROM PAGE NO.13

0350                        org     h'350
                ;
                ; flash routine
                ;
0350 3C35       flash:      ld      a,ldatm1
0352 3F39                   st      a,ldasm1
0354 3C36                   ld      a,ldatm2
0356 3F3A                   st      a,ldasm2
0358 3C37                   ld      a,ldatl1
035A 3F3B                   st      a,ldasl1
```

```
035C 3C38              ld      a,ldatl2
035E 3F3C              st      a,ldasl2
                 ;
0360 3C33              ld      a,displw
0362 5C                test    a,0
0363 A9                b       flash0          -; msd not flashing
                 ;
                 ; msd flashing
                 ;
0364 4F                ld      a,£h'f
0365 3F39              st      a,ldasm1
0367 3F3A              st      a,ldasm2
                 ;
0369 3C33        flash0: ld    a,displw
036B 5D                test    a,1
036C B2                b       flash1          ; lsd not flashing
                 ;
                 ; lsd flashing
                 ;
036D 4F                ld      a,£h'f
036E 3F3B              st      a,ldasl1
0370 3F3C              st      a,ldasl2
                 ;
0372 3C34        flash1: ld    a,dispiw
0374 5D                test    a,1
0375 63AC              b       flas30          ; indicator 'off'
                 ;
0377 5C                test    a,0
0378 6393              b       flas20          ; indicator 'on'
                 ;
                 ;
                 ; indicator flashing
                 ;
037A 3C36              ld      a,ldatm2
037C 3837              and     a,£0111b
037E 3F36              st      a,ldatm2
                 ;

ROM PAGE NO. 14

0380 3C38              ld      a,ldatl2
0382 3837              and     a,£0111b
0384 3F38              st      a,ldatl2        ; indicator 'on' pe
riod
                 ;
0386 3C3A              ld      a,ldasm2
0388 3828              or      a,£1000b
038A 3F3A              st      a,ldasm2
                 ;
038C 3C3C              ld      a,ldasl2
038E 3828              or      a,£1000b
0390 3F3C              st      a,ldasl2        ; indicator 'off' p
eriod
                 ;
0392 2A                ret
                 ;
                 ;
                 ;
                 ; indicator 'on'
                 ;
0393 3C36        flas20: ld    a,ldatm2
0395 3837              and     a,£0111b
0397 3F36              st      a,ldatm2
                 ;
0399 3C38              ld      a,ldatl2
039B 3837              and     a,£0111b
039D 3F38              st      a,ldatl2
                 ;
039F 3C3A              ld      a,ldasm2
03A1 3837              and     a,£0111b
03A3 3F3A              st      a,ldasm2
                 ;
03A5 3C3C              ld      a,ldasl2
03A7 3837              and     a,£0111b
03A9 3F3C              st      a,ldasl2
```

```
                ;       ,
03AB 2A                 ret
                ;
                ; indicator 'off'
                ;
03AC 3C36       flas30: ld      a,ldatm2
03AE 3828               or      a,£1000b
03B0 3F36               st      a,ldatm2
                ;
03B2 3C38               ld      a,ldatl2
03B4 3828               or      a,£1000b
03B6 3F38               st      a,ldatl2
                ;
03B8 3C3A               ld      a,ldasm2
03BA 3828               or      a,£1000b
03BC 3F3A               st      a,ldasm2
                ;
03BE 3C3C               ld      a,ldasl2

ROM PAGE NO.15

03C0 3828               or      a,£1000b
03C2 3F3C               st      a,ldasl2
                ;
03C4 2A                 ret
                ;
                        end

ASSEMBLY COMPLETE,      0 PROGRAM ERROR(S)
```

SYMBOL TABLE

| | | | | | | | |
|---|---|---|---|---|---|---|---|
| * COMMAD | 0013 | * COMMAH | 0015 | * COMMAL | 0014 | DATA01 | 021E |
| DATA02 | 0222 | DATA03 | 0226 | DATA04 | 022A | DATA05 | 0210 |
| DATA06 | 0214 | * DATA0H | 0081 | * DATA0L | 0080 | * DATA10 | 021D |
| * DATA1H | 0083 | * DATA1L | 0082 | * DATA2H | 0085 | * DATA2L | 0084 |
| * DATA3H | 0087 | * DATA3L | 0086 | * DATA4H | 0089 | * DATA4L | 0088 |
| DATACT | 0200 | DCH | 00FE | DCL | 00FC | DCM | 00FD |
| * DISPA | 0032 | * DISPH | 0031 | DISPIW | 0034 | * DISPL | 0030 |
| DISPLW | 0033 | FLAS20 | 0393 | FLAS30 | 03AC | * FLASH | 0350 |
| FLASH0 | 0369 | FLASH1 | 0372 | * INCOTH | 008C | * INCOTL | 008A |
| * INCOTM | 008B | * KEST | 0022 | KEST0H | 0043 | KEST0L | 0042 |
| * KEST1H | 0045 | * KEST1L | 0044 | * KEST2H | 0047 | * KEST2L | 0046 |
| * KEST3H | 0049 | * KEST3L | 0048 | * KEST4H | 004B | * KEST4L | 004A |
| * KEST5H | 004D | * KEST5L | 004C | KESTBH | 0021 | KESTBL | 0020 |
| KEY001 | 0107 | KEY002 | 0118 | KEY003 | 0132 | KEY004 | 0136 |
| KEY005 | 017D | KEY006 | 0173 | KEY007 | 0168 | KEY008 | 016A |
| KEY010 | 0172 | KEY020 | 0142 | KEY021 | 0151 | KEY022 | 0178 |
| * KEY030 | 015E | KEYND | 0029 | KEYNN | 002A | KEYOD | 002B |
| KEYON | 002C | * KEYS | 0100 | KEYSB | 0250 | KEYSB4 | 026C |
| KEYSC | 000E | KEYT | 0300 | KEYT0 | 0303 | KEYT1 | 030A |
| KEYTB | 00C3 | * LCICOT | 000D | LDASL1 | 003B | LDASL2 | 003C |
| LDASM1 | 0039 | LDASM2 | 003A | LDATL1 | 0037 | LDATL2 | 0038 |
| LDATM1 | 0035 | LDATM2 | 0036 | * LDISP | 0B00 | * LECOTH | 008F |
| * LECOTL | 008D | * LECOTM | 008E | * LEDD | 0315 | LEDD00 | 0328 |
| LEDD01 | 0319 | * LIOVF1 | 0600 | * LIOVF2 | 0D00 | * LMAIN | 03E0 |
| * LREMO | 0E00 | * LTABLE | 0000 | * LVLFEX | 0C00 | * OVER2A | 0072 |
| * OVER2H | 0071 | * OVER2L | 0070 | * OVERA1 | 0012 | * OVERH1 | 0011 |
| * OVERL1 | 0010 | * PARITT | 000C | * PARITY | 000B | * READC | 0028 |
| * READN | 0027 | * REMD0 | 0060 | * REMD1 | 0061 | * REMD2 | 0062 |
| * REMD3 | 0063 | * REMD4 | 0064 | * REMD5 | 0065 | * REMD6 | 0066 |
| * REMD7 | 0067 | * REMOA | 006A | * REMOH | 0069 | * REMOL | 0068 |
| * RKCE | 0050 | RKCE0 | 006C | RKCE1 | 0071 | RKCE2 | 0078 |
| * RKCE3 | 007F | RKCE4 | 006B | RKCE5 | 0058 | * RNH | 006B |
| * RNL | 006D | * RNM | 006C | * RWRPCH | 00CA | * RWRPCL | 00C8 |
| * RWRPCM | 00C9 | SERVRC | 000F | SPUCP | 0024 | SPUFF | 0017 |
| * SPUSH | 0003 | SPUSK | 0023 | SPUSL | 0002 | * SPUVDM | 0004 |
| SPUVSH | 0000 | SPUVSL | 0005 | * SPUVUM | 0001 | * SPW | 00FF |
| * SPWB | 00C7 | * TIMR2H | 00FA | * TIMR2L | 00F8 | * TIMR2M | 00F9 |
| * TIMRHN | 00F6 | * TIMRHO | 001B | * TIMRLN | 00F4 | * TIMRLO | 0019 |
| * TIMRMN | 00F5 | * TIMRMO | 001A | * VLFC | 000A | * VLFEC | 0016 |
| * VLFRB | 0009 | * VLFTB | 0008 | * VLFTH | 0007 | * VLFTL | 0006 |
| * VLFXA | 0052 | * VLFXH | 0051 | * VLFXL | 0050 | * WARPCL | 00C4 |
| * WARPCM | 00C5 | * WRITEH | 0026 | * WRITEN | 0025 | | |

DEFINED 167 USER SYMBOL(S)

```
LOC   OBJ        LINE         SOURCE STATEMENT

                    1 ;-----------------------------------------;
                    2 ;                                         ;
                    3 ;       data table                        ;
                    4 ;                                         ;
                    5 ;-----------------------------------------;
                    6 ;
                    7 ; command coding table
                    8 ;

ROM PAGE NO. 60

 0F20               9          org      h'f20
                   10 ;
 0F20 01           11          data     h'01           ; '00' read status
 0F21 10           12          data     h'10           ; '01' indicator power cont
rol
 0F22 10           13          data     h'10           ; '02' indicator mode
 0F23 10           14          data     h'10           ; '03' device input control
 0F24 10           15          data     h'10           ; '04' device output contro
l
 0F25 10           16          data     h'10           ; '05' power relay control
 0F26 00           17          data     h'00           ; '06' clear display
 0F27 10           18          data     h'10           ; '07' device display contr
ol
                   19 ;
 0F28 10           20          data     h'10           ; '08' insert character
 0F29 02           21          data     h'02           ; '09' read device data
 0F2A 20           22          data     h'20           ; '0a' display character at
specified position
 0F2B 0F           23          data     h'0f           ; '0b' conditional poll
 0F2C 00           24          data     h'00           ; blank
 0F2D 00           25          data     h'00           ; blank
 0F2E 00           26          data     h'00           ; blank
 0F2F 00           27          data     h'00           ; blank
                   28 ;
 0F30 00           29          data     h'00           ; blank
 0F31 00           30          data     h'00           ; blank
 0F32 00           31          data     h'00           ; blank
 0F33 00           32          data     h'00           ; blank
 0F34 00           33          data     h'00           ; blank
 0F35 00           34          data     h'00           ; blank
 0F36 00           35          data     h'00           ; blank
 0F37 00           36          data     h'00           ; blank
                   37 ;
 0F38 00           38          data     h'00           ; blank
 0F39 00           39          data     h'00           ; blank
 0F3A 00           40          data     h'00           ; blank
 0F3B 00           41          data     h'00           ; blank
 0F3C 00           42          data     h'00           ; blank
 0F3D 00           43          data     h'00           ; blank
 0F3E 00           44          data     h'00           ; blank
 0F3F 20           45          data     h'20           ; command expansion
                   46 ;
                   47 ;
                   48 ; ascii coding
                   49 ;
 0F40              50          org      h'f40
                   51 ;
                   52 ; f40-f4f
                   53 ;
                   54 ;
                   55 ;   f40 -f6f -> h'ff 'blank'
                   56 ;
 0F40 FF           57          data     h'ff
 0F41 FF           58          data     h'ff
 0F42 FF           59          data     h'ff
 0F43 FF           60          data     h'ff
 0F44 FF           61          data     h'ff
 0F45 FF           62          data     h'ff
 0F46 FF           63          data     h'ff
 0F47 FF           64          data     h'ff
                   65 ;
 0F48 FF           66          data     h'ff
```

```
0F49 FF            data    h'ff
0F4A FF            data    h'ff
0F4B FF            data    h'ff
0F4C FF            data    h'ff
0F4D FF            data    h'ff
0F4E FF            data    h'ff
0F4F FF            data    h'ff
              ;
              ;  f50-f5f
              ;
0F50 FF            data    h'ff
0F51 FF            data    h'ff
0F52 FF            data    h'ff
0F53 FF            data    h'ff
0F54 FF            data    h'ff
0F55 FF            data    h'ff
0F56 FF            data    h'ff
0F57 FF            data    h'ff
              ;
0F58 FF            data    h'ff
0F59 FF            data    h'ff
0F5A FF            data    h'ff
0F5B FF            data    h'ff
0F5C FF            data    h'ff
0F5D FF            data    h'ff
0F5E FF            data    h'ff
0F5F FF            data    h'ff
              ;
              ;  f60-f6f
              ;
0F60 FF            data    h'ff
0F61 FF            data    h'ff
0F62 FF            data    h'ff
0F63 FF            data    h'ff
0F64 FF            data    h'ff
0F65 FF            data    h'ff
0F66 FF            data    h'ff
0F67 FF            data    h'ff
              ;
0F68 FF            data    h'ff
0F69 FF            data    h'ff
0F6A FF            data    h'ff
0F6B FF            data    h'ff
0F6C FF            data    h'ff
0F6D FF            data    h'ff
0F6E FF            data    h'ff
0F6F FF            data    h'ff
              ;
              ;  f70-f7f
              ;
0F70 C0            data    h'c0      ; 0
0F71 F9            data    h'f9      ; 1
0F72 A4            data    h'a4      ; 2
0F73 B0            data    h'b0      ; 3
0F74 99            data    h'99      ; 4
0F75 92            data    h'92      ; 5
0F76 82            data    h'82      ; 6
0F77 D8            data    h'd8      ; 7
              ;
0F78 80            data    h'80      ; 8
0F79 90            data    h'90      ; 9
0F7A FF            data    h'ff      ; blank
0F7B C9            data    h'c9      ; 11
0F7C FF            data    h'ff      ; blank
0F7D B7            data    h'b7      ; =
0F7E FF            data    h'ff      ; blank
0F7F FF            data    h'ff      ; blank
              ;
              ;  f80-f8f
              ;
0F80 FF            data    h'ff      ; blank
0F81 88            data    h'88      ; A
0F82 83            data    h'83      ; b
0F83 C6            data    h'c6      ; C
0F84 A1            data    h'a1      ; d
```

```
0F85 86            data    h'86     ; E
0F86 8E            data    h'8e     ; F
0F87 82            data    h'82     ; G
                 ;
0F88 89            data    h'89     ; H
0F89 CF            data    h'cf     ; I
0F8A E1            data    h'e1     ; J
0F8B FF            data    h'ff     ; blank
0F8C C7            data    h'c7     ; L
0F8D FF            data    h'ff     ; blank
0F8E FF            data    h'ff     ; blank
0F8F C0            data    h'c0     ; O
                 ;
                 ; f90-f9f
                 ;
0F90 8C            data    h'8c     ; P
0F91 FF            data    h'ff     ; blank
0F92 AF            data    h'af     ; r
0F93 92            data    h'92     ; S
0F94 FF            data    h'ff     ; blank
0F95 C1            data    h'c1     ; U
0F96 FF            data    h'ff     ; blank
0F97 FF            data    h'ff     ; blank
                 ;
0F98 FF            data    h'ff     ; blank
0F99 FF            data    h'ff     ; blank
0F9A FF            data    h'ff     ; blank
0F9B FF            data    h'ff     ; blank
0F9C FF            data    h'ff     ; blank
0F9D FF            data    h'ff     ; blank
0F9E FF            data    h'ff     ; blank
0F9F BF            data    h'bf     ; blank
                 ;
                 ; fa0-faf
                 ;
0FA0 FF            data    h'ff     ; blank
0FA1 88            data    h'88     ; A
0FA2 83            data    h'83     ; b
0FA3 C6            data    h'c6     ; C
0FA4 A1            data    h'a1     ; d
0FA5 86            data    h'86     ; E
0FA6 8E            data    h'8e     ; F
0FA7 82            data    h'82     ; G
                 ;
0FA8 89            data    h'89     ; H
0FA9 CF            data    h'cf     ; I
0FAA E1            data    h'e1     ; J
0FAB FF            data    h'ff     ; blank
0FAC C7            data    h'c7     ; L
0FAD FF            data    h'ff     ; blank
0FAE FF            data    h'ff     ; blank
0FAF C0            data    h'c0     ; O
                 ;
                 ; fb0-fbf
                 ;
0FB0 8C            data    h'8c     ; P
0FB1 FF            data    h'ff     ; blank
0FB2 AF            data    h'af     ; r
0FB3 92            data    h'92     ; S
0FB4 FF            data    h'ff     ; blank
0FB5 C1            data    h'c1     ; blank
0FB6 FF            data    h'ff     ; blank
0FB7 FF            data    h'ff     ; blank
                 ;
0FB8 FF            data    h'ff     ; blank
0FB9 FF            data    h'ff     ; blank
0FBA FF            data    h'ff     ; blank
0FBB FF            data    h'ff     ; blank
0FBC FF            data    h'ff     ; blank
0FBD FF            data    h'ff     ; blank
0FBE FF            data    h'ff     ; blank
0FBF FF            data    h'ff     ; blank
                 ;
                 ;
                 ;*remote control data
```

```
                 ;
0FC0                     org     h'fc0
                 ;
0FC0 FF                  data    h'ff
0FC1 FF                  data    h'ff
0FC2 FF                  data    h'ff
0FC3 FF                  data    h'ff
0FC4 13                  data    h'13      ; on / off
0FC5 11                  data    h'11      ; event
0FC6 FF                  data    h'ff
0FC7 16                  data    h'16      ; clear
0FC8 FF                  data    h'ff
0FC9 FF                  data    h'ff
0FCA FF                  data    h'ff
0FCB FF                  data    h'ff
0FCC FF                  data    h'ff
0FCD 12                  data    h'12      ; auth
0FCE FF                  data    h'ff
0FCF 17                  data    h'17      ; send
                 ;
0FD0 FF                  data    h'ff
0FD1 38                  data    h'38      ; 8
0FD2 34                  data    h'34      ; 4
0FD3 10                  data    h'10      ; +
0FD4 32                  data    h'32      ; 2
0FD5 14                  data    h'14      ; -
0FD6 36                  data    h'36      ; 6
0FD7 FF                  data    h'ff
0FD8 31                  data    h'31      ; 1
0FD9 39                  data    h'39      ; 9
0FDA 35                  data    h'35      ; 5
0FDB FF                  data    h'ff
0FDC 33                  data    h'33      ; 3
0FDD 30                  data    h'30      ; 0
0FDE 37                  data    h'37      ; 7
0FDF 15                  data    h'15      ; scan
                 ;
                 ;
0FE7                     org     h'fe7
                 ;
                 ;* keyscan data
                 ;
0FE7 37                  data    h'37              ; '7'
0FE8 00                  data    h'00              ;
0FE9 00                  data    h'00              ;
0FEA 00                  data    h'00              ; no use
0FEB 32                  data    h'32              ; '2'
0FEC 00                  data    h'00              ; no use
0FED 34                  data    h'34              ; '4'
0FEE 13                  data    h'13              ; 'on/off'
0FEF 00                  data    h'00              ; no use
0FF0 14                  data    h'14              ; '-'
0FF1 15                  data    h'15              ; pc/fc scan
0FF2 16                  data    h'16              ; 'c'
0FF3 36                  data    h'36              ; '6'
0FF4 17                  data    h'17              ; s/send
0FF5 00                  data    h'00              ; no use
0FF6 00                  data    h'00              ; no use
0FF7 12                  data    h'12              ; a/auth
0FF8 10                  data    h'10              ; '+'
0FF9 11                  data    h'11              ; e/event
0FFA 35                  data    h'35              ; '5'
0FFB 33                  data    h'33              ; '3'
0FFC 30                  data    h'30              ; '0'
0FFD 39                  data    h'39              ; '9'
0FFE 38                  data    h'38              ; '8'
0FFF 31                  data    h'31              ; '1'
                 ;
                 ;
                         end

ASSEMBLY COMPLETE,       0 PROGRAM ERROR(S)

                         SYMBOL TABLE
 DEFINED       0 USER SYMBOL(S)
```

```
LOC  OBJ         LINE      SOURCE STATEMENT

                   ;---------------------------------------------------------;
                   ;                                                 7.1983. ;
                   ;       ldisp.asm       V1.0                              ;
                   ;                                (TMP4740P)               ;
                   ;                                                         ;
                   ;               display      routine                      ;
                   ;                                                         ;
                   ;                                                         ;
                   ;---------------------------------------------------------;

                  $nolist

                  $list

                   ;
                   ;
0B00                       org     h'b00
                   ;
                   ; interrupts enable
                   ;
0B00 3F32                  st      a,dispa
0B02 44                    ld      a,£0100b
0B03 13                    xch     a,eir
0B04 365F                  eiclr   il,101111b
                   ;
                   ;
                   ;
                   ;  push register
                   ;
                   ;
0B06 2930                  xch     hl,displ
                   ;
                   ;  count up led counter
                   ;
0B08 3C8D                  ld      a,lecotl
0B0A 08                    inc     a
0B0B 3F8D                  st      a,lecotl
                   ;
0B0D D0                    cmpr    a,£h'0
0B0E B3                    b       displ0
                   ;
0B0F 3C8E                  ld      a,lecotm
0B11 08                    inc     a
0B12 3F8E                  st      a,lecotm
                   ;
0B14 D0                    cmpr    a,£h'0
0B15 B3                    b       displ0
                   ;
0B16 3C8F                  ld      a,lecoth
0B18 08                    inc     a
0B19 3F8F                  st      a,lecoth
                   ;
0B1B D0                    cmpr    a,£h'0
0B1C B3                    b       displ0
                   ;
                   ;
                   ;  counter over flow
                   ;
                   ;
0B1D 4F                    ld      a,£h'f
0B1E 3F8F                  st      a,lecoth
0B20 43                    ld      a,£h'3
0B21 3F8E                  st      a,lecotm
0B23 40                    ld      a,£h'0
0B24 3F8D                  st      a,lecotl
                   ;
0B26 3C33                  ld      a,displw                     ; invert flag
0B28
0B28 5E                    test    a,2
0B29 AF                    b       displ2
                   ;
```

```
0B2A 383B                and     a,£1011b
                ;
0B2C 3F33                st      a,displw            ; '1'->'0'
0B2E B3                  b       displ0
                ;
0B2F 3824       displ2:  or      a,£0100b
0B31 3F33                st      a,displw            ; '0'->'1'
                ;
                ;
                ;  led "on"
                ;
                ;
0B33 3C33       displ0:  ld      a,displw
0B35 5E                  test    a,2
0B36 6B63                b       displ1              ; imaginaly part
                ;
                ;
                ; real part
                ;
                ;
                ;
                ; lsd 'on'
                ;
0B38 5F                  test    a,3                 ;
0B39 6B4F                b       displ3              ; lsd 'on'
                ;
                ; msd 'on'
                ;
0B3B 3837                and     a,£0111b
0B3D 3F33                st      a,displw
0B3F 3C35                ld      a,ldatm1
0B41 3AA1                out     a,%op01
0B43 3C36                ld      a,ldatm2
0B45 3AA2                out     a,%op02
0B47 3B56                clr     %op06,1
0B49 3B26                set     %op06,2
                ;
0B4B 3925                set     spuvsl,2            ; 'keyscan ready' o
n
                ;
0B4D 6B89                b       dispi0
                ;
                ; lsd 'on'
                ;
0B4F 3828       displ3:  or      a,£1000b
0B51 3F33                st      a,displw
                ;
0B53 3C37                ld      a,ldatl1
0B55 3AA1                out     a,%op01
0B57 3C38                ld      a,ldatl2
0B59 3AA2                out     a,%op02
0B5B 3B16                set     %op06,1
0B5D 3B66                clr     %op06,2
                ;
0B5F 6B89                b       dispi0
                ;
                ;
                ;  imaginaly part
                ;
                ;
                ; key scan ready
                ;
0B61 3925                set     spuvsl,2
                ;
0B63 5F         displ1:  test    a,3
0B64 B9                  b       displ4
                ;
                ; msd 'on'
                ;
0B65 3837                and     a,£0111b
0B67 3F33                st      a,displw
                ;
0B69 3C39                ld      a,ldasm1
0B6B 3AA1                out     a,%op01
0B6D 3C3A                ld      a,ldasm2
```

```
0B6F 3AA2                 out     a,%op02
                      ;
0B71 3B26                 set     %op06,2
0B73 3B56                 clr     %op06,1
                      ;
0B75 3925                 set     spuvsl,2              ; key scan ready
                      ;
0B77 6B89                 b       dispi0
                      ;
                      ; lsd 'on'
                      ;
0B79 3828             displ4: or  a,£1000b
0B7B 3F33                 st      a,displw
                      ;
0B7D 3C3B                 ld      a,ldasl1
0B7F 3AA1                 out     a,%op01

ROM PAGE NO.46 *

0B81 3C3C                 ld      a,ldasl2
0B83 3AA2                 out     a,%op02
                      ;
0B85 3B16                 set     %op06,1
0B87 3B66                 clr     %op06,2
                      ;
                      ;
                      ;  return
                      ;
                      ;
0B89 2930             dispi0: xch hl,displ
                      ;
0B8B 47                   ld      a,£h'7
                      ;
0B8C 36AF                 diclr   il,101111b
                      ;
0B8E 3C1C                 ld      a,eirb
0B90 13                   xch     a,eir
0B91 3C32                 ld      a,dispa
                      ;
0B93 2B                   reti
                      ;
                          end

ASSEMBLY COMPLETE,        0 PROGRAM ERROR(S)
```

SYMBOL TABLE

| | | | | | | | |
|---|---|---|---|---|---|---|---|
| * COMMAD | 0013 | * COMMAH | 0015 | * COMMAL | 0014 | * DATA0H | 0081 |
| * DATA0L | 0080 | * DATA1H | 0083 | * DATA1L | 0082 | * DATA2H | 0085 |
| * DATA2L | 0084 | * DATA3H | 0087 | * DATA3L | 0086 | * DATA4H | 0089 |
| * DATA4L | 0088 | * DATACT | 0200 | * DCH | 00FE | * DCL | 00FC |
| * DCM | 00FD | DISPA | 0032 | * DISPH | 0031 | DISPI0 | 0B89 |
| * DISPIW | 0034 | DISPL | 0030 | DISPL0 | 0B33 | DISPL1 | 0B63 |
| DISPL2 | 0B2F | DISPL3 | 0B4F | DISPL4 | 0B79 | DISPLW | 0033 |
| EIRB | 001C | * FLASH | 0350 | * INCOTH | 008C | * INCOTL | 008A |
| * INCOTM | 008B | * KEST | 0022 | * KEST0H | 0043 | * KEST0L | 0042 |
| * KEST1H | 0045 | * KEST1L | 0044 | * KEST2H | 0047 | * KEST2L | 0046 |
| * KEST3H | 0049 | * KEST3L | 0048 | * KEST4H | 004B | * KEST4L | 004A |
| * KEST5H | 004D | * KEST5L | 004C | * KESTBH | 0021 | * KESTBL | 0020 |
| * KEYND | 0029 | * KEYNN | 002A | * KEYOD | 002B | * KEYON | 002C |
| * KEYS | 0100 | * KEYSB | 0250 | * KEYSC | 000E | * KEYT | 0300 |
| * KEYTB | 00CB | * LCICOT | 000D | LDASL1 | 003B | LDASL2 | 003C |
| LDASM1 | 0039 | LDASM2 | 003A | LDATL1 | 0037 | LDATL2 | 0038 |
| LDATM1 | 0035 | LDATM2 | 0036 | LECOTH | 008F | LECOTL | 008D |
| LECOTM | 008E | * LEDD | 0310 | * LIOVF1 | 0600 | * LIOVF2 | 0D00 |
| * LMAIN | 03E0 | * LREMO | 0E00 | * LVLFEX | 0C00 | * OVER2A | 0072 |
| * OVER2H | 0071 | * OVER2L | 0070 | * OVERA1 | 0012 | * OVERH1 | 0011 |
| * OVERL1 | 0010 | * PARITT | 000C | * PARITY | 000B | * READC | 0028 |
| * READN | 0027 | * REMD0 | 0060 | * REMD1 | 0061 | * REMD2 | 0062 |
| * REMD3 | 0063 | * REMD4 | 0064 | * REMD5 | 0065 | * REMD6 | 0066 |
| * REMD7 | 0067 | * REMOA | 006A | * REMOH | 0069 | * REMOL | 0068 |
| * RKCE | 0050 | * RNH | 006B | * RNL | 006D | * RNM | 006C |
| * RWRPCH | 00CA | * RWRPCL | 00C8 | * RWRPCM | 00C9 | * SERVRC | 000F |
| * SPUCP | 0024 | * SPUSH | 0003 | * SPUSK | 0023 | * SPUSL | 0002 |
| * SPUVDM | 0004 | * SPUVSH | 0000 | SPUVSL | 0005 | * SPUVUM | 0001 |

```
* SPW      00FF    * SPWB     00C7    * TABLE    0000    * TIMR2H   00FA
* TIMR2L   00F8    * TIMR2M   00F9    * TIMRHN   00F6    * TIMRHO   001B
* TIMRLN   00F4    * TIMRLO   0019    * TIMRMN   00F5    * TIMRMO   001A
* VLFC     000A    * VLFEC    0016    * VLFRB    0009    * VLFTB    0008
* VLFTH    0007    * VLFTL    0006    * VLFXA    0052    * VLFXH    0051
* VLFXL    0050    * WARPCL   00C4    * WARPCM   00C5    * WRITEH   0026
* WRITEN   0025

DEFINED    137 USER SYMBOL(S)

LOC  OBJ       LINE         SOURCE STATEMENT

                  1 ;-------------------------------------------------------------;
                  2 ;                                                     7.1983. ;
                  3 ;       ltable.asm        V1.0                                ;
                  4 ;                                     (TMP4740P)              ;
                  5 ;                                                             ;
                  6 ;              table          routine                         ;
                  7 ;                                                             ;
                  8 ;                                                             ;
                  9 ;-------------------------------------------------------------;

                    $nolist

                    $list

                 27 ;

ROM PAGE NO. 0

0000             28         org     h'000
0000 63E0        29         b       lmain
                 30 ;
0002 6C00        31         b       lvlfex
                 32 ;
0004 2B          33         reti
0005 00          34         nop
                 35 ;
0006 6600        36         b       liovf1
                 37 ;
0008 6D00        38         b       liovf2
                 39 ;
000A 6B00        40         b       ldisp
                 41 ;
000C 6E00        42         b       lremo
                 43 ;
                 44         end

ASSEMBLY COMPLETE,       0 PROGRAM ERROR(S)

                       SYMBOL TABLE

  LDISP    0B00      LIOVF1   0600     LIOVF2   0D00     LMAIN    03E0
  LREMO    0E00      LVLFEX   0C00

DEFINED      6 USER SYMBOL(S)

LOC  OBJ       LINE         SOURCE STATEMENT

                  1 ;-------------------------------------------------------------;
                  2 ;                                                     7.1983. ;
                  3 ;       liovf2.asm        V1.0                                ;
                  4 ;                                     (TMP4740P)              ;
                  5 ;                                                             ;
                  6 ;              remote con.      routine                       ;
                  7 ;                                                             ;
                  8 ;                                                             ;
                  9 ;-------------------------------------------------------------;

                    $nolist
                    $list
                268 ;
```

```
0D00                            org     h'd00
                        ;
                        ;
                        ;
                        ; push register
                        ;
                        ;
0D00 3F72                       st      a,over2a
0D02 44                         ld      a,£0100b
0D03 13                         xch     a,eir
0D04 366F                       eiclr   il,101111b
0D06 2970                       xch     hl,over21
                        ;;
                        ;;      timer2 stop
                        ;;
0D08 40                         ld      a,£0
0D09 3A8D                       out     a,%op1d
                        ;;;;;;;;;;;;;;;;;;;;;;;;;;;;;;;;;;;;;;;;;;;;;;;;;;;;;;;;;;
                        ;;;;;;;;;;;;;;;;;;;;;;;;;;;;;;;;;;;;;;;;;;;;;;;;;;;;;;;;;;
                        ;
                        ;;      check   N1  routine
                        ;
0D0B 3C6B                       ld      a,rnh
0D0D D1                         cmpr    a,£1
0D0E 6D43                       b       rem100          ; N1 was not '1'
                        ;;
                        ;;      N1=1
                        ;;
0D10 3BD0                       testp   %00,1           ; check port for remote
0D12 AF                         b       rem200          ; port was '1' ,it was not
start bit
                        ;
                        ;;      it was start bit
                        ;
0D13 42                         ld      a,£2
0D14 3F6B                       st      a,rnh           ; N2=2
                        ;
                        ;       setting timer2
0D16 3B06                       set     %op06,0
0D18 4F                         ld      a,£h'f
0D19 3FFA                       st      a,timr2h
0D1B 4D                         ld      a,£h'd
0D1C 3FF9                       st      a,timr2m
0D1E 47                         ld      a,£7
0D1F 3FF8                       st      a,timr21
                        ;;
0D21 48                         ld      a,£8
0D22 3A8D                       out     a,%op1d         ; timer2 start
                        ;;
                        ;;;     return routine
                        ;;
0D24 2970               rem300: xch     hl,over21
0D26 47                         ld      a,£0111b
0D27 36AF                       diclr   il,101111b
0D29 13                         xch     a,eir
0D2A 3C72                       ld      a,over2a
                        ;;
0D2C 3B46                       clr     %op06,0
0D2E 2B                         reti
                        ;
                        ;;
0D2F 39F0               rem200: testp   spuvsh,3        ;
0D31 B3                         b       rem210
                        ;
0D32 A4                         b       rem300          ; jump to return routine
                        ;
                        ;
0D33 3B06               rem210: set     %op06,0
0D35 4F                         ld      a,£h'f
0D36 3FFA                       st      a,timr2h
0D38 45                         ld      a,£5
0D39 3FF9                       st      a,timr2m
0D3B 4E                         ld      a,£h'e
0D3C 3FF8                       st      a,timr21
                        ;;
```

```
0D3E 40          ld      a,£0
0D3F 3A8D        out     a,%opld
             ;;
0D41 6D24        b       rem300
             ;;;;;;;;;;;;;;;;;;;;;;;;;;
             ;;;;;;;;;;;;;;;;;;;;;;;;;;
             ;;;;;;;;;;;;;;;;;;;;;;;;;;
             ;
             ;
             ;           N1 was not '1'
             ;
0D43 3C6B    rem100: ld      a,rnh
0D45 D0          cmpr    a,£0
0D46 0E          testp   zf
0D47 92          b       rem110
0D48 88      re1000: b       re1000
             ;;
             ;
0D49 40      rem120: ld      a,£0
0D4A 3F6B        st      a,rnh
0D4C 3F6C        st      a,rnm
0D4E 3F6D        st      a,rnl
             ;
0D50 6D24        b       rem300
             ;;;
             ;;;
             ;;;
0D52 39B0    rem110: test    spuvsh,3
0D54 89          b       rem120          ; F1.was not '1'
             ;
             ;           data creat routine
             ;
0D55 3970        clr     spuvsh,3
             ;
0D57 3952        clr     spusl,1         ; (key currently depressed
) off
             ;
0D59 6D24        b       rem300          ; return
             ;
                 end
```

ASSEMBLY COMPLETE, 0 PROGRAM ERROR(S)

SYMBOL TABLE

| | | | | | | | |
|---|---|---|---|---|---|---|---|
| * COMMAD | 0013 | * COMMFC | 0015 | * COMMGR | 0014 | * DATACT | 0200 |
| * DCH | 00FE | * DCL | 00FC | * DCM | 00FD | * DISPA | 0032 |
| * DISPH | 0031 | * DISPIW | 0034 | * DISPL | 0030 | * DISPLW | 0033 |
| * INCOTH | 003B | * INCOTL | 0039 | * INCOTM | 003A | * KEST | 0043 |
| * KEST0H | 0023 | * KEST0L | 0022 | * KEST1H | 0025 | * KEST1L | 0024 |
| * KEST2H | 0027 | * KEST2L | 0026 | * KEST3H | 0029 | * KEST3L | 0028 |
| * KEST4H | 002B | * KEST4L | 002A | * KESTBH | 0041 | * KESTBL | 0040 |
| * KEYND | 002C | * KEYNN | 002D | * KEYOD | 002E | * KEYON | 002F |
| * KEYS | 0100 | * KEYSB | 0250 | * KEYSC | 000E | * KEYTB | 00CB |
| * LCICOT | 000D | * LDATL1 | 0037 | * LDATL2 | 0038 | * LDATM1 | 0035 |
| * LDATM2 | 0036 | * LDISP | 0B00 | * LECOTH | 003E | * LECOTL | 003C |
| * LECOTM | 003D | * LIOVF1 | 0600 | * LMAIN | 03E0 | * LREMO | 0E00 |
| * LVLFEX | 0C00 | OVER2A | 0072 | * OVER2H | 0071 | OVER2L | 0070 |
| * OVERA1 | 0012 | * OVERH1 | 0011 | * OVERL1 | 0010 | * PARITT | 000C |
| * PARITY | 000B | RE1000 | 0D48 | REM100 | 0D43 | REM110 | 0D52 |
| REM120 | 0D49 | REM200 | 0D2F | REM210 | 0D33 | REM300 | 0D24 |
| * REMD0 | 0060 | * REMD1 | 0061 | * REMD2 | 0062 | * REMD3 | 0063 |
| * REMD4 | 0064 | * REMD5 | 0065 | * REMD6 | 0066 | * REMD7 | 0067 |
| * REMOA | 006A | * REMOH | 0069 | * REMOL | 0068 | * RKCE | 0050 |
| RNH | 006B | RNL | 006D | RNM | 006C | * RWRPCH | 00CA |
| * RWRPCL | 00C8 | * RWRPCM | 00C9 | * SERVRC | 000F | * SPUCP | 0021 |
| * SPUSH | 0003 | * SPUSK | 0020 | SPUSL | 0002 | * SPUVDM | 0004 |
| SPUVSH | 0000 | * SPUVSL | 0005 | * SPUVUM | 0001 | * SPW | 00FF |
| * SPWB | 00C7 | * TABLE | 0000 | TIMR2H | 00FA | TIMR2L | 00F8 |
| TIMR2M | 00F9 | * TIMRHN | 00F6 | * TIMRHO | 001B | * TIMRLN | 00F4 |
| * TIMRLO | 0019 | * TIMRMN | 00F5 | * TIMRMO | 001A | * VDATAH | 0018 |
| * VDATAL | 0017 | * VLFC | 000A | * VLFEC | 0016 | * VLFRB | 0009 |
| * VLFTB | 0008 | * VLFTH | 0007 | * VLFTL | 0006 | * VLFXA | 0052 |
| * VLFXH | 0051 | * VLFXL | 0050 | * WARPCL | 00C4 | * WARPCM | 00C5 |

DEFINED 116 USER SYMBOL(S)

APPENDIX B

```
LOCATION OBJECT CODE LINE      SOURCE LINE

                         '8041'
                         ;***************************************************************
                         ;*                                                             *
                         ;*          8042   Drop Processor Main Routine                 *
                         ;*                                                             *
                         ;***************************************************************
                         ;      <<<<<<<<<<<<   Using Register   >>>>>>>>>>>>>>>>>>
                         ;                                  Bank 0
                         ;R0 ------ General  Register   --Converter
                         ;R1 ------ General  Register   --Used in drop poll map
                         ;R2 ------ General  Register   --Converter
                         ;R3 ------ Genelal  Register   --Converter   , Soft counter
                         ;R4 ------ General  Register , RF cable switch ( Store cable num. )
                         ;R5 ------ Counter  for  count 04 CMD
                         ;R6 ------
                         ;R7 ------ Interrupt routine start address
                         ;---------------------------------------------------------------
                         ;    <<<<<<<<<<<<  Port                 >>>>>>>>>>>>>>>>>>
                         ;P1 <5> <4> <3> <2> <1> <0>    Subscriber  Select
                         ;P1 <7>                        Test switch ( Reset out ( 15 us.10 us))
                         ;P4 <3> <2> <1> <0>            Converter Control
                         ;P5 <3> <2> <1>                Drop Scan Switch   S2.S1,S0
                         ;P5 <4>                        VLF OUT
                         ;P6 <3> <2> <1> <0>            Power Detect I
                         ;P7 <1> <0>                                 II
                         ;P7 <3> <2>                    ECU Address
                         ;
                         ;_______________________________________________________________
                         ;CODE          Address       Coment                     pin out
        <0009>           DAT_1     EQU  00001001B  ; Tuning data   '1'              Q 1
        <0001>           DAT_0     EQU  00000001B  ; Tuning data   '0'              Q 1
        <0008>           CLKDAT    EQU  00001000B  ; Clock data    '1'              Q 0
        <000A>           LODDAT    EQU  00001010B  ; Load  pulse data  '1'          Q 2
        <0004>           PWRDT0    EQU  00000100B  ; Power off                      Q 4
        <000C>           PWRDT1    EQU  00001100B  ; Power on                       Q 4
        <0003>           CABL_A    EQU  00000011B  ; Cable Select A                 Q 3
        <000B>           CABL_B    EQU  00001011B  ; Cable Select B                 Q 3
        <000D>           DETDAT    EQU  00001101B  ; Power check                    Q 5
        <0006>           CABL_C    EQU  00000110B  ; Cable Select C                 Q 6
        <000E>           CABL_D    EQU  00001110B  ; Cable Select D                 Q 6
                         ;
                         ;----------  Valiable  constant       -------------------------
        <0003>           COUNT_R5 EQU   3            ; 04:84 Priority_lebel
                         ;----------  Sub. Command constant  ---------------------------
                         ;DEVCNT   EQU    00H          ; Device control
                         ;DSPCNT   EQU    01H          ; Device display control
                         ;SETDAT   EQU    02H          ; Set data to device
                         ;REDDAT   EQU    03H          ; Read data
                         ;----------     Memory loc.  ----------------------------------
                         ;Label          head addess      Comment
        <0020>           PWRDET    EQU    20H         ; 01 Command
        <0021>           CHANEL    EQU    21H         ; 03 Command
        <0024>           SUBMES    EQU    24H         ; 04 Command SUB
        <0025>           SNDMES    EQU    25H         ; 04 Command
        <002D>           SUBPWR    EQU    2DH         ; 05 Command
        <002F>           SUBSWT    EQU    2FH         ; 06 Command
        <0031>           DRPPOL    EQU    31H         ; 07 Command
        <0038>           DEVPOL    EQU    38H         ; 08 Command
        <0056>           FOR84     EQU    56H         ; 84 Command
                         ;---------------------------------------------------------------
                                     ORG        0H
0000 15                             DIS     I            ;  Disnable  ext interrupt
0001 0409                           JMP     START        ;  Start Address
                                     ORG        3H       ;
0003 93                             RETR                 ;
                         ;           ORG        7H       ;
                         ;          JMP     TIMINT       ;  TIMER INT.
                         ;---------------------------------------------------------------
                                    ORG        09H
0009                     START:
                         ;
0009 237F                           MOV     A,#07FH      ;
000B 39                             OUTL    P1,A         ;  RESET PULSE FOR PERIFERAL PROCESSOR
000C 23FF                           MOV     A,#0FFH      ;
000E 39                             OUTL    P1,A         ;
                         ;
000F F5                             EN      FLAGS        ;  enable flags IBF.OBF
0010 A5                             CLR     F1           ;  F1 -- use for command header ( A0 )
0011 35                  START0:    DIS     TCNTI        ;
0012 65                             STOP    TCNT         ;
                                                         ;======= Initialize ==============
                                                         ; 04 command buffer clear
0013 B826                           MOV     R0,#SNDMES+1 ;
0015 B040                           MOV     @R0,#040H    ;
                         ;
```

```
                                        ; 84 command buffer clear
0017 B857              MOV    R0,#FOR84+1   ;
0019 B0FF              MOV    @R0,#0FFH     ;
                ;
001B B81C              MOV    R0,#01CH      ; register bank 1  R4
001D B031              MOV    @R0,#DRPPOL   ;   Set Drop poll map head address
                ;                           ;   for  interrupt initial start.
001F B831              MOV    R0,#DRPPOL    ;
0021 BB07              MOV    R3,#7         ;
0023 B0FF       INILP1: MOV   @R0,#0FFH     ; Drop Poll Map initialization.
0025 18                INC    R0            ;
0026 EB23              DJNZ   R3,INILP1     ;
                ;
0028 B838              MOV    R0,#DEVPOL    ;
002A BA06              MOV    R2,#6         ;
002C BB05       INILP2: MOV   R3,#5         ; Device Poll Map initialization.
002E B0FF       INILP3: MOV   @R0,#0FFH     ;
0030 18                INC    R0            ;
0031 EB2E              DJNZ   R3,INILP3     ;
0033 EA2C              DJNZ   R2,INILP2     ;
                ;
0035 BF04              MOV    R7,#04H       ;  Initialize  address Register
                                            ;        for  interrupt routine starting
                ;
0037 2304              MOV    A,#PWRDT0     ;  All coventer switch off
0039 14D2              CALL   ALLCNT        ;
003B 2303              MOV    A,#CABL_H     ;
003D 14D2              CALL   ALLCNT        ;
                ;      MOV    A,#CABL_C     ;   Clear Subscriber data
                ;      CALL   ALLCNT        ;
                ;
003F 5454              CALL   INIT_P        ;  Power detect line Initialization
                ;
0041 C5                SEL    RB0           ;
0042 230A              MOV    A,#010        ;
0044 62                MOV    T,A           ;  Timer counter set ' 010h '
0045 BD03              MOV    R5,#COUNT_R5  ;
                ;
0047 25                EN     TCNTI         ;
0048 45                STRT   CNT           ;  ==== initialize end =======
                ;-------------------------------------------------------------
                ;
0049 D676       START2: JNIBF CONT1         ;  IBF full ?
004B 7650              JF1    START3        ; ---
                ;                           ;  Case of using command port
004D 22         START4: IN    A,DBB         ;
004E 0449              JMP    START2        ; Error  -- Data Comming ignored
                ;
0050 A5         START3: CLR   F1            ;  F1 flag clear
0051 22                IN     A,DBB         ;  Input Command
0052 AB                MOV    R3,A          ;
0053 03F7              ADD    A,#-9         ;   If enter command is invalid one  ( GT.8 ) then ignore
0055 F649              JC     START2        ;      ( input )  ======
0057 FB                MOV    A,R3          ;
0058 0358              ADD    A,#COMMAND    ;
005A B3                JMPP   @A            ;  Estimate jump address
                ;      ------------------------------------------
005B 64         COMMAND: DB   COM0          ;
005C 66                DB     COM1          ;
005D 68                DB     COM2          ;
005E 6A                DB     COM3          ;
005F 6C                DB     COM4          ;
0060 6E                DB     COM5          ;
0061 70                DB     COM6          ;
0062 72                DB     COM7          ;
0063 74                DB     COM8          ;
                ;      -------------
0064 042F       COM0:  JMP    RESET         ;  reset command
0066 0497       COM1:  JMP    RPDL          ;  read power detect line
0068 0449       COM2:  JMP    START2        ;  not assigned
006A 0484       COM3:  JMP    CTFC          ;  command tuner frequency change
006C 040A       COM4:  JMP    SMTD          ;  send message to device response
006E 244C       COM5:  JMP    SPC           ;  subscriver power.cable control
0070 0449       COM6:  JMP    START2        ;  not assigned
0072 247F       COM7:  JMP    SDPS          ;  define drop poll sequence
0074 24D4       COM8:  JMP    SDEPS         ;  define device poll sequenze
                ;-------------------------------------------------------------
                ; ' 84 Command response     ;
0076 B857       CONT1: MOV    R0,#FOR84+1   ;  84 command was occured
0078 F0                MOV    A,@R0         ;
0079 F284              JB7    CONT2         ;
007B 5438              CALL   RESP84        ;
007D 0449              JMP    START2        ;
                ;-------------------------------------------------------------
                ; ' 04 Command response
007F 2300       START5: MOV   A,#00H        ; Status  flag 04 ready
0081 90                MOV    STS,A         ;
0082 0449              JMP    START2        ;
                ;
0084 B826       CONT2: MOV    R0,#SNDMES+1  ;
0086 F0                MOV    A,@R0         ;
0087 F249              JB7    START2        ;  04 response is not exist ,return.
0089 D27F              JB6    START5        ;  04 response is not exist,reset status & return.
                ;
008B 541D              CALL   RES04         ;     Send to Data_Processor
                ;                           ;
008D 0449              JMP    START2        ; return main routine
```

```
                ;
                ;*****************************************************************
                ;*****************************************************************
008F BA00       RESET:   MOV     R2,#00          :   Send response "00" before  reset.
0091 BB01                MOV     R3,#01          :
0093 34FC                CALL    RESOUT          :
0095 0411                JMP     START0          :   ===== reset =====
                ;################################
                ;   ( Read power detect line  & Read ECU Address   )
0097 0E         RPDL:    MOVD    A,P6            :  power detect  3 2 1 0
0098 530F                ANL     A,#0FH          :
009A AB                  MOV     R3,A            :
009B 0F                  MOVD    A,P7            :  power detect  X X 5 4
                ;                                :   & ECU Address
009C 47                  SWAP    A               ;
009D 4B                  ORL     A,R3            :  A -- power det. 0 - 5
009E B820                MOV     R0,#PWRDET      :
00A0 A0                  MOV     @R0,A           ;
00A1 BA01                MOV     R2,#01H         ;
00A3 BB02                MOV     R3,#02H         :  2 byte send to data processor
                ;
00A5 34FC                CALL    RESOUT          ;    Send to Data_Processor
00A7 14AB                CALL    PS              : Call subscrivers power check
00A9 0449                JMP     START2          :  (  set power detect line all high )
                ;
                ;
00AB B820       PS:      MOV     R0,#PWRDET      : try  !! subscriver power on
00AD F0                  MOV     A,@R0           :
00AE 43C0                ORL     A,#11000000B    : ( For  Subscriber that powered off !!
00B0 AA                  MOV     R2,A            :
00B1 54C8                CALL    PWRCHK          :
00B3 83                  RET                     :
                ;################################
                ;      ( Change Tuner Frequency Change   )
                ;
00B4 B821       CTFC:    MOV     R0,#CHANEL      :
00B6 BB03                MOV     R3,#03H         :
00B8 5410                CALL    INPCOM          :  Stored  N  &  3 ( converter number
00BA 23FF                MOV     A,#0FFH         :
00BC DB                  XRL     A,R3            :
00BD C64D                JZ      START4          :  Error - input data is invalid one.
                ;
00BF B821                MOV     R0,#CHANEL      ;
00C1 F0                  MOV     A,@R0           ;
00C2 03FA                ADD     A,#-06H         ;
00C4 F649                JC      START2          :  Error - Drop number is invalid.
                ;
00C6 5466                CALL    TUNER           :   Changing frequency
00C8 BA03                MOV     R2,#03H         ;
00CA BB02                MOV     R3,#02H         ;
00CC B821                MOV     R0,#CHANEL      :
                ;
00CE 34FC                CALL    RESOUT          ;  Send to Data_Processor  response " 03 "
                ;
00D0 0449                JMP     START2          ;  return main routine
                ;
                ;--------------------------------
00D2 3C         ALLCNT:  MOVD    P4,A            ;  Select  6 subscriber
00D3 BAC0                MOV     R2,#0C0H        ;
00D5 54AE                CALL    SELECT          ;
00D7 83                  RET
                ;################################
                ;      ( Send Message to Device )
00D8 544C       FINDS4:  CALL    WAIT_84         ;  if 84 CMD is exist,then send it to Data_Processor.
00DA B826       SMTD:    MOV     R0,#SNDMES+1    ;
00DC F0                  MOV     A,@R0           :  See that buffer for 04 command is empty
00DD F2D8                JB7     FIND84          ;  if buffer is full,then this routine wait
00DF D2E3       SMTD0:   JB6     SMTD1           ;             for sending to device by int. routine
00E1 5410                CALL    RES04           :  Send 04 response to Data Processor
                ;
00E3 2310       SMTD1:   MOV     A,#00010000B    : Set 04 command busy
00E5 90                  MOV     STS,A           ;
00E6 C8                  DEC     R0              :
00F7 BB02                MOV     R3,#002H        : input 2 byte ( device ID ,BYTE COUNT )
00E9 5410                CALL    INPCOM          :
00EB FB                  MOV     A,R3            ;
00EC D3FF                XRL     A,#0FFH         :
00EE C64D                JZ      START4          ;
                ;
00F0 B826                MOV     R0,#SNDMES+1    :  See the number of send bytes
00F2 F0                  MOV     A,@R0           :                    for ata processor
00F3 AB                  MOV     R3,A            :
                ;
00F4 03F9                ADD     A,#-7H          :  If BYTE COUNT is greater than 6
00F6 E6FA                JNC     SMTD4           :   then,input data was aborted .
00F8 2438                JMP     SMTD2           ;  abort command ( illigal return)
                ;
00FA 18         SMTD4:   INC     R0              ;  input message data
00FB 5410                CALL    INPCOM          :
                ;
00FD FB                  MOV     A,R3            :
00FE D3FF                XRL     A,#0FFH         :
0100 C67A                JZ      START7          :
                ;
                ;-------- sub command set routine
0102 B827                MOV     R0,#SNDMES+2    ; command ,address
```

```
0104 B924        MOV     R1,#SUBMES    ; Sub. message for intr. routine
0106 F0          MOV     A,@R0         ;
0107 53F8        ANL     A,#0F8H       ;
0109 77          RR      A             ;
010A 77          RR      A             ;
010B 77          RR      A             ;
010C AA          MOV     R2,A          ;
010D D31F          XRL     A,#1FH        ;
010F C62D          JZ      EXPAND        ;
0111 FA            MOV     A,R2          ;
0112 97            CLR     C             ;
0113 67            RRC     A             ;
0114 033C          ADD     A,#FNCTBL     ;
0116 A3            MOVP    A,@A          ;
0117 A1            MOV     @R1,A         ;
0118 FA            MOV     A,R2          ;
0119 1231          JB0     ODDFNC        ;
011B 230F          MOV     A,#0FH        ;
011D 51            ANL     A,@R1         ;
011E A1            MOV     @R1,A         ;
                ;---------------------------------
                ;
011F B826       SUBCOM:  MOV     R0,#SNDMES+1  ;
0121 F0                  MOV     A,@R0         ;
0122 43C0                ORL     A,#0C0H       ; Set 04 Buffer full ( active )
0124 A0                  MOV     @R0,A         ;
                ;
                ;       count down  R5  ( Count time which 04 command ocured )
                ;
0125 FD                         MOV     A,R5            ;
0126 962A                       JNZ     SET_R5          ;
0128 BD04                       MOV     R5,#COUNT_R5+1  ;
012A CD         SET_R5:         DEC     R5              ;
                ;
                ;
012B 0449                JMP     START2        ;
                ;
012D B102       EXPAND:  MOV     @R1,#02H      ; expand command is fixed .
012F 241F                JMP     SUBCOM        ;    send to device
0131 23F0       ODDFNC:  MOV     A,#0F0H       ;
0133 51                  ANL     A,@R1         ;
0134 47                  SWAP    A             ;
0135 A1                  MOV     @R1,A         ;
0136 241F                JMP     SUBCOM        ;
                ;
0138 B040       SMTD2:   MOV     @R0,#40H      ;  Set status " buffer empty "
013A 0449                JMP     START2        ;
                ;
                ;       Kind of function  define table
                ;        number of command  are  as follow.
                ;            1 ----  device contorl
                ;            2 ----  send device data
                ;            3 ----  read device information
                ;
                ;                                   ; command number
013C 23         FNCTBL:  DB       23H          ;  1,0
013D 22                  DB       22H          ;  3,2
013E 22                  DB       22H          ;  5,4
013F 21                  DB       21H          ;  7,6  Specified
0140 32                  DB       32H          ;  9,8
0141 32                  DB       32H          ;  B,A  ______________
0142 11                  DB       11H          ;  D,C
0143 11                  DB       11H          ;  F,E   device control
0144 11                  DB       11H          ; 11,10 ______________
0145 22                  DB       22H          ; 13,12
0146 22                  DB       22H          ; 15,14  send data  n to device
0147 22                  DB       22H          ; 17,16       n = 1 to 5
0148 22                  DB       22H          ; 19,18 ______________
0149 33                  DB       33H          ; 1B,1A
014A 33                  DB       33H          ; 1D,1C  read device information
014B 33                  DB       33H          ; 1F,1E ______________
                                               ; other  send data
                ;################################
                ;   (    Subscriver power control & Subscriver Switch Control     )
                ;
014C B82D       SPC:     MOV     R0,#SUBPWR.   ;
014E BB01                MOV     R3,#01H       ;
0150 5410                CALL    INPCOM        ;  input
                ;
0152 FB                  MOV     A,R3          ;
0153 D3FF                XRL     A,#0FFH       ;  Check Error indicater.
0155 C67A                JZ      START7        ;
                ;
0157 B82D                MOV     R0,#SUBPWR    ;
0159 F0                  MOV     A,@R0         ;
015A 5307                ANL     A,#07H        ;
015C AB                  MOV     R3,A          ; Drop Number
015D AC                  MOV     R4,A          ;
015E F0                  MOV     A,@R0         ;
015F F272                JB7     SPC0          ;    bit 7 equal  1- power on  0- power off
```

```
          ;
0161 548C          SPC1:     CALL    PWROFF      ;
          ;
          ;
0163               SPCCOM:
0163 FC                      MOV     A,R4        ;
0164 AB                      MOV     R3,A        ;  Restore  Converter Number
0165 F0                      MOV     A,@R0       ;
0166 D276                    JB6     SSC1        ;    bit 6 equal 1- sel. cable A
          ;                                                       0- sel. cable B
0168 54C0          SSC0:     CALL    CABLEA      ;
          ;
016A               SSCCOM:
          ;
016A BA05                    MOV     R2,#05H     ; Send response " 05 "
016C BB02                    MOV     R3,#02H     ;
016E 34FC                    CALL    RESOUT      ;   R0 -- SUBPWR
0170 0449                    JMP     START2      ;
          ;
0172 54B4          SPC0:     CALL    PWRON       ;
0174 2463                    JMP     SPCCOM      ;
          ;
0176 54C4          SSC1:     CALL    CABLEB      ;
0178 246A                    JMP     SSCCOM      ;
          ;
          ;
017A 044D          START7:   JMP     START4      ;
          ;################################
          ;        Define Drop Poll Sequence  )
          ;
017C BBFF          CHGFAL:   MOV     R3,#0FFH    ;
017E 83                      RET                 ;
          ;
017F B831          SDPS:     MOV     R0,#DRPPOL  ;
0181 BB03                    MOV     R3,#03      ;
          ;
0183 3494                    CALL    CHANGE      ;
          ;
0185 FB                      MOV     A,R3        ;
0186 D3FF                    XRL     A,#0FFH     ;
0188 C67A                    JZ      START7      ;
          ;
018A BA07                    MOV     R2,#07H     ;
018C BB01                    MOV     R3,#01H     ;
018E 34FC                    CALL    RESOUT      ;
0190 0449                    JMP     START2      ;
          ;
0192 0450          START9:   JMP     START3      ;
          ;
0194 D694          CHANGE:   JNIBF   CHANGE      ; Change Drop poll map format
0196 767C                    JF1     CHGFAL      ;
0198 22                      IN      A,DBB       ;
0199 A0                      MOV     @R0,A       ;
019A 72B5                    JB3     NOPOL       ;
          ;
019C 47            RETPOL:   SWAP    A           ;
019D 18                      INC     R0          ;
019E A0                      MOV     @R0,A       ;
          ;
019F 18                      INC     R0          ;
01A0 EB94                    DJNZ    R3,CHANGE   ;
          ;
01A2 D6A2          POLMOD:   JNIBF   POLMOD      ;
01A4 767C                    JF1     CHGFAL      ;
01A6 22                      IN      A,DBB       ;
          ;
01A7 2A                      XCH     A,R2        ;
01A8 B931                    MOV     R1,#DRPPOL  ;
01AA F1                      MOV     A,@R1       ;
01AB A0                      MOV     @R0,A       ;
01AC 2A                      XCH     A,R2        ;
          ;
01AD 34C9                    CALL    SETR7       ;
          ;
01AF C8                      DEC     R0          ;
01B0 F0                      MOV     A,@R0       ;
01B1 4380                    ORL     A,#80H      ;
01B3 A0                      MOV     @R0,A       ;
          ;
01B4 83            CHGEND:   RET                 ;
          ;
          ;
01B5 2A            NOPOL:    XCH     A,R2        ;
01B6 FB                      MOV     A,R3        ;
01B7 D303                    XRL     A,#03H      ;
01B9 C6C1                    JZ      RETSTP      ;
          ;
01BB C8                      DEC     R0          ;
```

```
01BC F0                 MOV     A,@R0          ;
01BD 4380               ORL     A,#80H         ;
01BF A0                 MOV     @R0,A          ;
                ;
01C0 18                 INC     R0             ;
                ;
01C1 2A         RETSTP: XCH     A,R2           ;
01C2 249C               JMP     RETPOL         ;
                ;
                ;
01C4 F1         RNDPBN: MOV     A,@R1          ;
01C5 53DF               ANL     A,#11011111B   ;
01C7 A1                 MOV     @R1,A          ;
01C8 83                 RET                    ;
                ;
01C9 D3FF       SETP7:  XRL     A,#0FFH        ;
01CB B91F               MOV     R1,#31         ;
01CD 96C4               JNZ     RNDPBN         ;
                ;
01CF F1                 MOV     A,@R1          ;
01D0 4320               ORL     A,#00100000B   ;
01D2 A1                 MOV     @R1,A          ;
01D3 83                 RET                    ;
                ;
                ;
                ;
                ;*******************************************************
                ;               Define  Device  Poll Sequence     )
                ;
01D4 D6D4       SDEPS:  JNIBF   SDEPS          ;
01D6 76FA               JF1     START8         ;
01D8 B838               MOV     R0,#DEVPOL     ;
01DA 22                 IN      A,DBB          ;
01DB 5307               ANL     A,#07H         ;
01DD AB                 MOV     R3,A           ;
01DE AC                 MOV     R4,A           ;
01DF C6E7               JZ      SDEPS1         ;
                ;
01E1 F8         SDEPS0: MOV     A,R0           ;
01E2 0305               ADD     A,#05H         ;
01E4 A8                 MOV     R0,A           ;
01E5 EBE1               DJNZ    R3,SDEPS0      ;
                ;
01E7 BB05       SDEPS1: MOV     R3,#05H        ;
01E9 5410               CALL    INPCOM         ;
01EB FB                 MOV     A,R3           ;
01EC D3FF               XRL     A,#0FFH        ;
01EE C6FA               JZ      START8         ;
                ;
01F0 BA08               MOV     R2,#08H        ;
01F2 BB02               MOV     R3,#02H        ;
01F4 B804               MOV     R0,#04H        ;
01F6 34FC               CALL    RESOUT         ;
01F8 0449               JMP     START2         ;
                ;
01FA 044D       START8: JMP     START4         ;
                ;******************************
                ;-------    Response Output Routine  ----------------------------
01FC 86FC       RESOUT: JOBF    RESOUT         ;  Check olut buffer full ?
01FE 95                 CPL     F0             ;
01FF FA                 MOV     A,R2           ;
0200 02                 OUT     DBB,A          ;       output .Command....
                ;
0201 CB                 DEC     R3             ;
0202 FB                 MOV     A,R3           ;
                ;
0203 C60D               JZ      RESEND         ;  Command only
                ;
0205 8605       RESCNT: JOBF    RESCNT         ;
0207 85                 CLR     F0             ;
0208 F0                 MOV     A,@R0          ;
0209 02                 OUT     DBB,A          ;       output . data....
020A 18                 INC     R0             ;
020B EB0E               DJNZ    R3,RESCN1      ;
020D 83         RESEND: RET                    ;
020E 4405       RESCN1: JMP     RESCNT         ;
                ;
                ;--------------------------------------------------------------
                ;-------    input command and  data ________________________
                ;
                ;          R0 -----   response Data head address
                ;          R3 -----   Bytes of input data
0210 D610       INPCOM: JNIBF   INPCOM         ;
0212 761A               JF1     INPEND         ; comming data is not a command
0214 22                 IN      A,DBB          ;       input......
0215 A0                 MOV     @R0,A          ;  Store Data
0216 18                 INC     R0             ;
0217 EB10               DJNZ    R3,INPCOM      ;
0219 83                 RET                    ;
```

```
021A BBFF      INPEND:   MOV     R3,#0FFH        :     R3=0ffh
021C 83                  RET                     :  data failure
               ;
               ;
               ;
               ;      04 response output  routine
               ;
               ;
021D F0        RES04:    MOV     A,@R0           ;
021E C62F                JZ      SD1             :   error message
               ;
               ;         ADD     A,#-7           ;
               ;         JC      S04END          :
               ;
0220 F0                  MOV     A,@R0           :
0221 0303                ADD     A,#03H          ;  + Device ID ,command ,BYTE COUNT
               ;
0223 AB        SD2:      MOV     R3,A            ;
0224 BA04                MOV     R2,#04H         :
0226 B825                MOV     R0,#SNDMES      :
0228 34FC                CALL    RESOUT          :  response
               ;
022A B826      S04END:   MOV     R0,#SNDMES+1    :
022C B040                MOV     @R0,#40H        :  clear 04 response for next datas.
022E 83                  RET
               ;
               ;
022F 2304      SD1.      MOV     A,#004H         :   Error  message
0231 4423                JMP     SD2             :    ( same as 84 Command )
               ;
               ;-----------------------------------------------------------------
               ;         Response   84 Command
               ;
0233           RES_84:
0233 B857                MOV     R0,#FOR84+1     ;
0235 F0                  MOV     A,@R0           :
0236 F247                JB7     END_84          ;
               ;
0238 C648      RESP84:   JZ      F84FAL          :  Called at main loop runing.
               ;
023A F0                  MOV     A,@R0           :
023B 0303                ADD     A,#03H          :
023D AB                  MOV     R3,A            :  store BYTE COUNT for send
               ;
023E C8        F84ERR:   DEC     R0              ;
               ;
023F BA84                MOV     R2,#84H         :
0241 34FC                CALL    RESOUT          :  Response out
               ;                                 :
0243 B857      S84END:   MOV     R0,#FOR84+1     ;
0245 B080                MOV     @R0,#080H       :  reset 84 command
0247 83        END_84:   RET                     ;
               ;
               ;
0248 BB04      F84FAL:   MOV     R3,#04          :  if VLF communication is failed.
024A 443E                JMP     F84ERR          : send that condition to data proce.
               ;__________________________________________________________________
024C           WAIT_84:
024C FD                  MOV     A,R5            ;
024D 9653                JNZ     WAIT_END        ; If R5 = 0 then look 84 buffer
024F 5433                CALL    RES_84          ;   send 84 command
0251 BD03                MOV     R5,#COUNT_R5    :  initialize R5 ( counter )
0253           WAIT_END:
0253 83                  RET                     :
               ;-----------------------------------------------------------------
0254 B820      INIT_P:   MOV     R0,#PWRDET      :  Power Detect line initialization
0256 B0C0                MOV     @R0,#0C0H       :
0258 14AB                CALL    PS              : Call subscrivers power detect
025A 83                  RET
               ;
               ;==========  Change  Converter Number  to bit pattern  ===========
               ;
               ;
025B BAFE      BITSEL:   MOV     R2,#0FEH        ; R3: Drop or Converter Num.
025D FB                  MOV     A,R3            : R2: Bit pattern (Active Low)
025E C665                JZ      CON0            :  exam: Converter 3
0260 FA                  MOV     A,R2            :   1111 0111 B
0261 E7        TUNLP1:   RL      A               :
0262 EB61                DJNZ    R3,TUNLP1       :
0264 AA                  MOV     R2,A            :
0265 83        CON0:     RET                     :
               ;
               ;--------------------------------
               ;;;;;;;;;;;;;;;;;;;;;;;;;;;;;;;;;;;;;;;;;;;;;;;;;;;;;;;;;;;;;;;;;;;
               ;;                     Change Tuner freq.                         ;
               ;;;;;;;;;;;;;;;;;;;;;;;;;;;;;;;;;;;;;;;;;;;;;;;;;;;;;;;;;;;;;;;;;;;
               ;   Used Resister
               ;     R0 ---   Indicate Channel Command ( 07 command )
               ;     R2 ---   Converter Select
               ;     R3 ---   Working
```

```
                   ;
                   ;

0266 B821          TUNER:    MOV     R0,#CHANEL      ;
0268 F0                      MOV     A,@R0           :  @R0 --  Converter number
0269 AB                      MOV     R3,A            :
                   ;
026A 545B                    CALL    BITSEL          :
                   ;
026C B823                    MOV     R0,#CHANEL+2    :
026E BB02                    MOV     R3,#02          :  @R0 --  Main Counter 2 bits
0270 548F          TUNLP3:   CALL    DATOUT          :
0272 EB70                    DJNZ    R3,TUNLP3       :
                   ;
0274 F0                      MOV     A,@R0           .  Abort one  bit in @R0
0275 E7                      RL      A               :
0276 A0                      MOV     @R0,A           :
                   ;
0277 C8                      DEC     R0              :  @R0 --  Main Counter N
0278 BB08                    MOV     R3,#08          :
027A 548F          TUNLP2:   CALL    DATOUT          .
027C EB7A                    DJNZ    R3,TUNLP2       :
                   ;
027E 18                      INC     R0              :
027F BB05                    MOV     R3,#05          :
0281 548F          TUNLP4:   CALL    DATOUT          :   Swallow counter
0283 EB81                    DJNZ    R3,TUNLP4       :
                   ;
0285 230A                    MOV     A,#LODDAT       .  Load pulse
0287 54A5                    CALL    PULSE           :
                   ;
0289 2301                    MOV     A,#DAT_0        :  Clear Data
028B 3C                      MOVD    P4,A            :
028C 54AE                    CALL    SELECT          :
028E 83                      RET                     :
                   ;-----------------------------------------------------
028F 97            DATOUT:   CLR     C               :
0290 F0                      MOV     A,@R0           :
0291 F7            CICLE0:   RLC     A               :
0292 A0                      MOV     @R0,A           :
0293 2309                    MOV     A,#DAT_1        :
0295 3C                      MOVD    P4,A            :  Data & Function set  Data  1
0296 F69B                    JC      DATA1           :
0298 2307                    MOV     A,#07H          :   if output data is  0
029A 9C                      ANLD    P4,A            :      then invert a data
                   ;                                           that recentry  outputed
029B FA            DATA1:    MOV     A,R2            .  Select  high
029C 39                      OUTL    P1,A            :
029D 23FF                    MOV     A,#0FFH         :
029F 39                      OUTL    P1,A            :  Select  Low
                   ;
02A0 54A3                    CALL    CLOCK           :
                   ;
02A2 83                      RET                     :
                   ;------------------------------------------------------------------
02A3 2308          CLOCK:    MOV     A,#CLKDAT       :
02A5 3C            PULSE:    MOVD    P4,A            :  Clock High
02A6 FA                      MOV     A,R2            ;
02A7 39                      OUTL    P1,A            :       Select high
02A8 23FF                    MOV     A,#0FFH         :
02AA 39                      OUTL    P1,A            :       Select low
                   ;
02AB 2307                    MOV     A,#07H          :  Clock Low
02AD 9C                      ANLD    P4,A            :
02AE FA            SELECT:   MOV     A,R2            :       Select high
02AF 39                      OUTL    P1,A            :
02B0 23FF                    MOV     A,#0FFH         :
02B2 39                      OUTL    P1,A            :       Select low
02B3 83                      RET                     :
                   ;------------ Power, Cable , Power check          ---------------
02B4 230C          PWRON:    MOV     A,#PWRDT1       :
02B6 3C            CONCOM:   MOVD    P4,A            :
                   ;
02B7 545B                    CALL    BITSEL          :  SET R3 --- Converter Number
02B9 54AE                    CALL    SELECT          :
02BB 83                      RET                     :
02BC 2304          PWROFF:   MOV     A,#PWRDT0       :
02BE 44B6                    JMP     CONCOM          :
                   ;
02C0 2303          CABLEA:   MOV     A,#CABL_A       :  Select RF cable A
02C2 44B6                    JMP     CONCOM          :
                   ;
02C4 2308          CABLEB:   MOV     A,#CABL_B       :  Select RF cable B
02C6 44B6                    JMP     CONCOM          :
                   ;
02C8 230D          PWRCHK:   MOV     A,#DETDAT       :  Power  Check
02CA 3C                      MOVD    P4,A            :
02CB 54AE                    CALL    SELECT          :
02CD 83                      RET                     :
                   ;---------------  END  --------------------------------------
Errors=    0
```

```
LOCATION OBJECT CODE LINE     SOURCE LINE

"8048"
;Last Ver.(AKI)
;
;%%%82043310%%%%%%%%%%%%%%%%%%%%%%%%%%%%%%%%%%%%%%%%%%%%%%%%%%%%%%%%%%%%%%%
;
;
;                    Drop   Processor   ( 8042 )
;
;                timer  interrupt  routine.  ver 2.2.1
;
;                     [ Hot ver. ] + 04_An      by  Hideo Shigihara.
;
;%%%%%%%%%%%%%%%%%%%%%%%%%%%%%%%%%%%%%%%%%%%%%%%%%%%%%%%%%%%%%%%%82043310%%%
;
;
;\\\\\\\\\\\\\\\\\\\\\\\\\\\\\\\\\\\\\\\\\\\\\\\\\\\\\\\\\\\\\\\\\\\\\\\\\\\\
;\\                                                                       \\
;\\                   --- Register bank 1 ---                             \\
;\\                                                                       \\
;\\\\\\\\\\\\\\\\\\\\\\\\\\\\\\\\\\\\\\\\\\\\\\\\\\\\\\\\\\\\\\\\\\\\\\\\\\\\
;\\                                                                       \\
;\\    *****  R0   :   Working resister.                          *****  \\
;\\                                                                       \\
;\\    *****  R1   :   Working resister.                          *****  \\
;\\                                                                       \\
;\\    *****  R2   :   Data (bit) counter.                        *****  \\
;\\                                                                       \\
;\\    *****  R3   :   Transmit or receive data buffer.           *****  \\
;\\                                                                       \\
;\\    *****  R4   :   Current access drop map address.           *****  \\
;\\                                                                       \\
;\\    *****  R5   :   Current access device map address.         *****  \\
;\\                                                                       \\
;\\    *****  R6   :   VLF flags.                                 *****  \\
;\\                                                                       \\
;\\               (bit0)   =   Error counter 0.                          \\
;\\                                                                       \\
;\\               (bit1)   =   Error counter 1.                          \\
;\\                                                                       \\
;\\               (bit2)   =   Error counter 2.                          \\
;\\                                                                       \\
;\\               (bit3)   =   --- No used. ---                          \\
;\\                                                                       \\
;\\               (bit4)   =   --- No used. ---                          \\
;\\                                                                       \\
;\\               (bit5)   =   --- No used. ---                          \\
;\\                                                                       \\
;\\               (bit6)   =   RCK flag.                                 \\
;\\                                                                       \\
;\\               (bit7)   =   --- No used. ---                          \\
;\\                                                                       \\
;\\    *****  R7   :   Polling flag                               *****  \\
;\\                                                                       \\
;\\               (bit0)   =   Return wait flag.                         \\
;\\                                                                       \\
;\\               (bit1)   =   No request flag.                          \\
;\\                                                                       \\
;\\               (bit2)   =   Only 04 flag.                             \\
;\\                                                                       \\
;\\               (bit3)   =   --- No used. ---                          \\
;\\                                                                       \\
;\\               (bit4)   =   R.R  or  priority flag(device).           \\
;\\                                                                       \\
;\\               (bit5)   =   R.R  or  priority flag(drop).             \\
;\\                                                                       \\
;\\               (bit6)   =   First drop select flag.                   \\
;\\                                                                       \\
;\\               (bit7)   =   Response flag.                            \\
;\\                                                                       \\
;\\\\\\\\\\\\\\\\\\\\\\\\\\\\\\\\\\\\\\\\\\\\\\\\\\\\\\\\\\\\\\\\\\\\\\\\\\\\
;
;
        ORG      07H
;
;]]]]]]]]]]]]]]]]]]]]]]]]]]]]]]]]]]]][[[[[[[[[[[[[[[[[[[[[[[[[[[[[[[[[[[[[
;||||||||||||||||||||||||||||||||||||||||||||||||||||||||||||||||||||||||
;
;                  TIMER INTERRUPT ROUTINE.
;
;||||||||||||||||||||||||||||||||||||||||||||||||||||||||||||||||||||||||
;
0007 6400                  JMP     HETIT
;
;]]]]]]]]]]]]]]]]]]]]]]]]]]]]]]]]]]]][[[[[[[[[[[[[[[[[[[[[[[[[[[[[[[[[[[[[
;
;------------------------------------------------------------------------
;
```

```
                 ;
<0024>           SDMSGK    EQU     24H              ;Submessage for device response.
                                                     (Command only ,WR or RD data.)
                 ;
                 ;
<0025>           SDMSGH    EQU     25H              ;04 command buffer ( ID.)
                 ;
                 ;
<0026>           SDMSG1    EQU     26H              ;04 command buffer ( byte count.)
                 ;
                 ;
<0027>           SDMSGC    EQU     27H              ;04 command buffer ( command.)
                 ;
                 ;
<0031>           DRMAP0    EQU     31H              ;Drop polling map ( 2.0 )
                 ;
                 ;
<0036>           DRMAP5    EQU     36H              ;Drop polling map ( 2.5 )
                 ;
                 ;
<0037>           DRMAPH    EQU     37H              ;Drop polling map ( 2.H )
                 ;
                 ;
<0038>           DVM10     EQU     38H              ;Device polling map ( 1.0.0 )
                 ;
                 ;
<003D>           DVM11     EQU     3DH              ;Device polling map ( 1.1.0 )
                 ;
                 ;
<0042>           DVM12     EQU     42H              ;Device polling map ( 1.2.0 )
                 ;
                 ;
<0047>           DVM13     EQU     47H              ;Device polling map ( 1.3.0 )
                 ;
                 ;
<004C>           DVM14     EQU     4CH              ;Device polling map ( 1.4.0 )
                 ;
                 ;
<0051>           DVM15     EQU     51H              ;Device polling map ( 1.5.0 )
                 ;
                 ;
<0056>           RE84H     EQU     56H              ;84 command buffer ( ID.)
                 ;
                 ;
<0057>           RE841     EQU     57H              ;84 command buffer ( byte count.)
                 ;
                 ;
<0058>           RE84C     EQU     58H              ;84 command buffer ( data 0.)
                 ;
                 ;
<005D>           TXBUF     EQU     5DH              ;Transmissive data buffer.
                 ;
                 ;
<005E>           DEMAP0    EQU     5EH              ;Device polling map ( 2.N.0 ).
                 ;
                 ;
<0065>           DEMAP7    EQU     65H              ;Device polling map ( 2.N.7 ).
                 ;
                 ;
<0067>           DEMAPH    EQU     67H              ;Device polling map ( 2.N.H ).
                 ;
                 ;
<0068>           LAV1      EQU     68H              ;Indirect addressing data buffer.
                 ;
                 ;
<0069>           ANSPAR    EQU     69H              ;Parity flag ..
                 ;
                 ;
<006A>           POLING    EQU     6AH              ;Current access device & drop
                                                      number set buffer.
                 ;
                 ;
<006B>           CNTBY     EQU     6BH              ;Byte counter for Rx or Tx.
                 ;
                 ;
<006C>           SAVDRP    EQU     6CH              ;Drop number save buffer.
                 ;
                 ;
                 ;
                 ;------------------------------------------------------------
                 ;
                                   ORG         300H
                 ;
                 ;************************************************************
                 ;------------------------------------------------------------
                 ;
                 ;************  INDIRECT ADDRESSING ROUTINE.  ****************
                 ;
0300 2F          HETIT:    XCH     A,R7             ;Jumping address set.
                 ;
0301 D5                    SEL     RB1              ;Register bank change.
```

```
                 177 ;
0302 0305        178           ADD     A,#NEGIH        ;Indirect addressing jump.
0304 B3          179           JMPP    @A              ;
                 180 ;
                 181 ;
                 182 ;*******************************************************************
                 183 ;
                 184 ;-------------------------------------------------------------------
                 185 ;
                 186 ;###############  INDIRECT ADDRESSING TABLE.  ####################
                 187 ;
                 188 ;
0305 2527292B2D  189 NEGIH:   DB       A0, A1, A2, A3, A4, A5, A6, A7
                 190 ;
                 191 ;
030D 3537393B3D  192          DB       A8, B9,B10,C11,C12,C13,C14,C15
                 193 ;
                 194 ;
0315 4547494B4D  195          DB      C16,C17,C18,C19,D20,D21,D22,D23
                 196 ;
                 197 ;
031D 5557595B5D  198          DB      D24,D25,D26,D27,D28,E29,E30,F31
                 199 ;
                 200 ;
                 201 ;*******************************************************************
                 202 ;
                 203 ;-------------------------------------------------------------------
                 204 ;|||||||||||||||||||||||||||||||||||||||||||||||||||||||||||||||||||
                 205 ;|                                                                 |
                 206 ;|$$$$$$$$$$$  JUMP  TABLE  FOR  TIMER  INTERRUPT.  $$$$$$$$$$$$|
                 207 ;|                                                                 |
                 208 ;|                  ( I  N  D  E  X )                              |
                 209 ;|                                                                 |
0325 649A        210 A0:      JMP     CPCMO      ;[#0]  : Conditional poll command      |
                 211 ;|                                    set & start bit Tx routine|
                 212 ;|         [ L.No  423 ]                                         |
                 213 ;|                                                                 |
0327 64E3        214 A1:      JMP     DWBO       ;[#1]  : Transmissive data Tx          |
                 215 ;|                                    routine.                     |
                 216 ;|         [ L.No  519 ]                                         |
                 217 ;|                                                                 |
0329 64B5        218 A2:      JMP     MIOO       ;[#2]  : Message indicator bit Tx      |
                 219 ;|                                    routine.                     |
                 220 ;|         [ L.No  456 ]                                         |
                 221 ;|                                                                 |
032B 64FE        222 A3:      JMP     PALBO      ;[#3]  : Last bit of transmissive      |
                 223 ;|                                    data Tx routine.             |
                 224 ;|         [ L.No  556 ]                                         |
                 225 ;|                                                                 |
032D 6465        226 A4:      JMP     MTMINT     ;[#4]  : Drop select & start bit Tx    |
                 227 ;|                                    routine.                     |
                 228 ;|         [ L.No  355 ]                                         |
                 229 ;|                                                                 |
032F 841A        230 A5:      JMP     PARBT      ;[#5]  : Parity bit Tx routine.        |
                 231 ;|                                                                 |
                 232 ;|         [ L.No  604 ]                                         |
                 233 ;|                                                                 |
0331 8411        234 A6:      JMP     STOPO      ;[#6]  : Stop bit Tx routine.(1)       |
                 235 ;|                                                                 |
                 236 ;|         [ L.No  585 ]                                         |
                 237 ;|                                                                 |
0333 8439        238 A7:      JMP     ACK1       ;[#7]  : ACK receive & ckeck           |
                 239 ;|                                    routine.(1)                  |
                 240 ;|         [ L.No  655 ]                                         |
                 241 ;|                                                                 |
0335 8422        242 A8:      JMP     RCK        ;[#8]  : RCK receive & check           |
                 243 ;|                                    routine.                     |
                 244 ;|         [ L.No  624 ]                                         |
                 245 ;|                                                                 |
0337 C47F        246 B9:      JMP     ACK4       ;[#9]  : ACK check 4.                  |
                 247 ;|                                  (disposal of 04 command.)     |
                 248 ;|         [ L.No 1456 ]                                         |
                 249 ;|                                                                 |
0339 A4E8        250 B10:     JMP     COM04D     ;[#10] : 04 command data Tx.           |
                 251 ;|                                  (disposal of 04 command.)     |
                 252 ;|         [ L.No 1241 ]                                         |
                 253 ;|                                                                 |
033B 848E        254 C11:     JMP     KEYDAY     ;[#11] : Start bit Tx.                 |
                 255 ;|                                      (Rx routine.)             |
                 256 ;|         [ L.No  740 ]                                         |
                 257 ;|                                                                 |
033D 84BB        258 C12:     JMP     PALK       ;[#12] : Parity bit Rx.                |
                 259 ;|                                      (Rx routine.)             |
                 260 ;|         [ L.No  814 ]                                         |
                 261 ;|                                                                 |
033F 8498        262 C13:     JMP     RSTAT      ;[#13] : Start bit erase.              |
                 263 ;|                                      (Rx routine.)             |
                 264 ;|         [ L.No  760 ]                                         |
                 265 ;|                                                                 |
```

```
0341 84A2    C14:     JMP     RBSET        ;[#14] : Receivable data Rx.      |
             ;|                                   (Rx routine.)              |
             ;|        [ L.No  780 ]                                         |
             ;|                                                              |
0343 84DE    C15:     JMP     ACKOT        ;[#15] : ACK bit Tx. (1)          |
             ;|                                   (Rx routine.)              |
             ;|        [ L.No  855 ]                                         |
             ;|                                                              |
0345 A4AE    C16:     JMP     STGN84       ;[#16] : Stop bit Tx 6.           |
             ;|                                 continue 84 command data Rx|
             ;|        [ L.No 1137 ]                                         |
             ;|                                                              |
0347 A43A    C17:     JMP     NCKOT        ;[#17] : NCK Tx .                 |
             ;|                                   (Rx routine.)              |
             ;|        [ L.No  999 ]                                         |
             ;|                                                              |
0349 A4BE    C18:     JMP     STGN04       ;[#18] : Stop bit Tx 7.           |
             ;|                                 continue 04 command data Rx|
             ;|        [ L.No 1137 ]                                         |
             ;|                                                              |
034B C43E    C19:     JMP     ACK3         ;[#19] : ACK check 3.             |
             ;|                                    (Rx routine.)             |
             ;|        [ L.No 1393 ]                                         |
             ;|                                                              |
034D A4D4    D20:     JMP     COM04        ;[#20] : Start bit Tx.            |
             ;|                                    (04 command.)             |
             ;|        [ L.No 1215 ]                                         |
             ;|                                                              |
034F A406    D21:     JMP     STER84       ;[#21] : Stop bit Tx 3.           |
             ;|                                 disposal of 84 com error.    |
             ;|        [ L.No  922 ]                                         |
             ;|                                                              |
0351 84F8    D22:     JMP     STER04       ;[#22] : Stop bit Tx 2.           |
             ;|                                 disposal of 04 com error.    |
             ;|        [ L.No  900 ]                                         |
             ;|                                                              |
0353 A49A    D23:     JMP     STGR84       ;[#23] : Stop bit Tx 5.           |
             ;|                                 84 com all ok & end.         |
             ;|        [ L.No 1110 ]                                         |
             ;|                                                              |
0355 A424    D24:     JMP     STGR04       ;[#24] : Stop bit Tx 4.           |
             ;|                                 04 com all ok & end.         |
             ;|        [ L.No  965 ]                                         |
             ;|                                                              |
0357 84EC    D25:     JMP     REPRX        ;[#25] : Stop bit Tx 1.           |
             ;|                                 challenge once more.         |
             ;|        [ L.No  879 ]                                         |
             ;|                                                              |
0359 A459    D26:     JMP     LCIN         ;[#26] : Last character indicator |
             ;|                                    check.                    |
             ;|        [ L.No 1038 ]                                         |
             ;|                                                              |
035B E434    D27:     JMP     IDLINT       ;[#27] : Wait routine for 84 com.  test.test
             ;|                                       ( No 1 )               |
             ;|        [ L.No 1684 ]                                         |
             ;|                                                              |
035D E416    D28:     JMP     DSCF84       ;[#28] : Drop scan for 84 command.|
             ;|                                                              |
             ;|        [ L.No 1629 ]                                         |
             ;|                                                              |
035F E477    E29:     JMP     DSF04C       ;[#29] : Drop scan for 04 command.|
             ;|                                                              |
             ;|        [ L.No 1765 ]                                         |
             ;|                                                              |
0361 E44B    E30:     JMP     NDPS04       ;[#30] : Changing opreation to 84.|
             ;|                                                              |
             ;|        [ L.No 1713 ]                                         |
             ;|                                                              |
0363 64CE    F31:     JMP     SMLING       ;[#31] : Life sample.             |
             ;|                                                              |
             ;|        [ L.No  492 ]                                         |
             ;|                                                              |
             ;|                                                              |
             ;|$$$$$$$$$$$$$$$$$$$$$$$$$$$$$$$$$$$$$$$$$$$$$$$$$$$$$$$$$$$$$$|
             ;|                                                              |
             ;||||||||||||||||||||||||||||||||||||||||||||||||||||||||||||||||
             ;
             ;%%%%%%%%%%%%%%%%%%%%%%%%%%%%%%%%%%%%%%%%%%%%%%%%%%%%%%%%%%%%%%%%
             ;%                                                              %
             ;%****  CONDITIONAL-POLL.CONDITIONAL-POLL.CONDITIONAL-POLL.  ****%
             ;%                                                              %
             ;%%%%%%%%%%%%%%%%%%%%%%%%%%%%%%%%%%%%%%%%%%%%%%%%%%%%%%%%%%%%%%%%
             ;
             ;***************************************************************
             ;
             ;         (   DROP SELECT & START BIT SET.   )
             ;                                                         #A4
             ;***************************************************************
             ;
```

```
           ;  ...................................................
0365 00     MTMINT:  NOP
0366 266C            JNT0     ETDSR        ;Detect service request
           ;                                 from SPU.
           ;  ...................................................
           ;
0368 D40B            CALL     TSET1        ;1 bit time counter set & start.
036A 6489   NOTMAP:  JMP      DVMNS        ;( no request ! )
           ;                               ;
           ;                                ( request ! )
036C D40B   ETDSR:   CALL     TSET1        ;1 bit time counter set & start.
           ;
036E B831            MOV      R0,#DRMAP0   ;Drop map set or not.
0370 F0              MOV      A,@R0        ;
0371 726A            JB3      NOTMAP       ;
           ;
0373 F486            CALL     DEVCH        ;Changing the device map.
           ;
0375 BD5E            MOV      R5,#DEMAP0   ;First device select.
           ;
           ;
0377 FD     DMSRE:   MOV      A,R5         ;Next device select.
0378 A8              MOV      R0,A         ;
0379 F0              MOV      A,@R0        ;
037A B867            MOV      R0,#DEMAPH   ;Device map 1 set or not ?
037C A0              MOV      @R0,A        ;
037D D3FF            XRL      A,#0FFH      ;
037F C689            JZ       DVMNS        ;
           ;
           ;                                ( set ! )
0381 D422            CALL     PARCLL       ;Parity flag clear
           ;                                 & VLF flags clear.
0383 D414            CALL     VLF00        ;Start bit "0" set.
           ;
0385 2300            MOV      A,#0         ;***NEXT [CPCM0]***
0387 C4EF            JMP      JMPR         ;RETR.
           ;
           ;                                ( No request or not set ! )
0389 FF     DVMNS:   MOV      A,R7         ;
038A 4302            ORL      A,#02H       ;Drop scan flag set.
038C AF              MOV      R7,A         ;
           ;
038D B4FF            CALL     BCNTBC       ;04 command set or not ?
038F F293            JB7      SF04D        ;
0391 C4F2            JMP      NTDRP        ;( Not set ! )
           ;
           ;
0393 FF     SF04D:   MOV      A,R7
0394 4304            ORL      A,#04H       ;
0396 AF              MOV      R7,A         ;
0397 E459            JMP      INT04S       ;Disposal of 04 command.
           ;                                ***NEXT [COM04]***
           ;
           ;
           ;
           ;*************************************************************
           ;
           ;      ( CONDITIONAL POLL COMMAND SET & START BIT SET.  )
           ;                                                          #A0
           ;*************************************************************
           ;
           ;|||||||||||||||||||||||||||||||||||||||||||||||||||||||||||||
           ;|                                                           |
0399 58     CPCOM:   DB       58H          ;                             |
           ;|                                                           |
           ;|||||||||||||||||||||||||||||||||||||||||||||||||||||||||||||
           ;
           ;
           ;  ...................................................
039A F8     CPCM0:   MOV      A,R0         ;Start bit trans.
039B 3D              MOVD     P5,A         ;
           ;  ...................................................
           ;
039C D40B            CALL     TSET1        ;1 bit time counter set & start.
           ;
039E 2399            MOV      A,#CPCOM     ;Conditional poll command set.
03A0 A3              MOVP     A,@A         ;( Transmissive data set. )
03A1 A9              MOV      R1,A         ;
03A2 B867            MOV      R0,#DEMAPH   ;[#TXBUF] <--- conditional poll
03A4 F0              MOV      A,@R0        ; command + device address.
03A5 530F            ANL      A,#0FH       ;
03A7 49              ORL      A,R1         ;
03A8 B85D            MOV      R0,#TXBUF    ;
03AA A0              MOV      @R0,A        ;
           ;
03AB B868            MOV      R0,#LAV1     ;Indirect addressing buffer set.
03AD B007            MOV      @R0,#7       ;
           ;
03AF D414            CALL     VLF00        ;MI bit "0" set.
```

```
                 ;
03B1 2302                MOV    A,#2          ;***NEXT [MI00]***
03B3 C4EF                JMP    JMPR          ;RETR.
                 ;
                 ;
                 ;
                 ;**************************************************************
                 ;
                 ;              <  MESSAGE INDICATOR BIT Tx .  >
                 ;                                                          #A2
                 ;**************************************************************
                 ;
                 ;       ...................................................
0385 F8          MI00:   MOV    A,R0          ;MI bit trans.
0386 3D                  MOVD   P5,A          ;
                 ;       ...................................................
                 ;
03B7 D40F                CALL   TSET05        ;1 bit time counter set & start.
                 ;
03B9 B85D                MOV    R0,#TXBUF     ;A<--[TXBUF]
03BB F0                  MOV    A,@R0         ;
03BC 67                  RRC    A             ;Rotate right.
03BD AB                  MOV    R3,A          ;
03BE F6C4                JC     VLFD1         ;Cy=1 ?
                 ;
03C0 D414                CALL   VLFD0         ;(Carry = 0)
                 ;                             Transmissive data = '0' set.
                 ;
03C2 64C3                JMP    MI00E         ;
                 ;
03C4 D429        VLFD1:  CALL   PALAN         ;(Carry = 1)
                 ;                             Parity analyse.
                 ;
03C6 D41B                CALL   VLFD1         ;Transmissive data = '1' set.
                 ;
03C8 BA07        MI00E:  MOV    R2,#07H       ;Bit counter set.
                 ;
03CA 231F                MOV    A,#31         ;***NEXT [SMLING]***   ←変更部分
03CC C4EF                JMP    JMPR          ;RETR.
                 ;
                 ;
                 ;
                 ;**************************************************************
                 ;
                 ;                  <  LIFE   SAMPLE.  >
                 ;                                                         #F31
                 ;**************************************************************
                 ;
                 ;       ...................................................
03CE 00          SMLING: NOP                  ;exist the bad Device on
03CF 36D9                JT0    SMLOK         ;      this cable ?
                 ;       ...................................................
03D1 D40F                CALL   TSET05        ;(Error !)
                 ;                             Half bit time counter set &
03D3 FE                  MOV    A,R6          ;    start.
03D4 4310                ORL    A,#10H        ;
03D6 AE                  MOV    R6,A          ;
03D7 64DF                JMP    DWB0JP        ;
                 ;
03D9 D40F        SMLOK:  CALL   TSET05        ;(Ok !)
                 ;                             Half bit time counter set &
03DB FE                  MOV    A,R6          ;    start.
03DC 53EF                ANL    A,#0EFH       ;
03DE AE                  MOV    R6,A          ;
                 ;
03DF 2301        DWB0JP: MOV    A,#1          ;***NEXT [DWB0]***
03E1 C4EF                JMP    JMPR          ;RETR.
                 ;
                 ;
                 ;**************************************************************
```

FILE: AKI:SHIGI HEWLETT-PACKARD: 8048 Assembler

LOCATION OBJECT CODE LINE SOURCE LINE

```
                 ;
                 ;               <  8 BIT DATA Tx.  >
                 ;                                                          #A1
                 ;**************************************************************
                 ;
                 ;       ...................................................
03E3 F8          DWB0:   MOV    A,R0          ;Transmissive data trans.
03E4 3D                  MOVD   P5,A          ;
                 ;       ...................................................
                 ;
03E5 D40B                CALL   TSET1         ;1 bit time counter set & start.
                 ;
03E7 FB                  MOV    A,R3          ;Rotate right.
03E8 67                  RRC    A             ;
03E9 AB                  MOV    R3,A          ;
03EA F6F0                JC     VLFD2         ;Cy = 1 ?
```

```
                    ;
03EC D414                    CALL    VLF00          ;Next transmissive data = '0' set.
                    ;
03EE 64F4                    JMP     DWB0C          ;
                    ;
03F0 D429           VLFD2:   CALL    PALAN          ;Next transmissive data = '1' set.
                    ;
03F2 D418                    CALL    VLF01          ;Parity flag set.
                    ;
03F4 EAFA           DWB0C:   DJNZ    R2,DWB0E       ;Transmissive data end ?
                    ;                                ( end ! )
03F6 2303                    MOV     A,#3           ;***NEXT [PALAN]***
03F8 C4EF                    JMP     JMPR           ;RETR.
                    ;
                    ;                                ( not end ! )
03FA 2301           DWB0E:   MOV     A,#1           ;***NEXT [DWB0]***
03FC C4EF                    JMP     JMPR           ;RETR.
                    ;
                    ;
                    ;
                    ;****************************************************************
                    ;
                    ;                     (  LAST DATA Tx.  )
                    ;                                                            #A3
                    ;****************************************************************
                    ;
                    ;        ...................................................
03FE F8             PALB0:   MOV     A,R0           ;Last data trans.
03FF 3D                      MOVD    P5,A           ;
                    ;        ...................................................
                    ;
0400 D40B                    CALL    TSET1          ;1 bit time counter set & start.
                    ;
0402 B869                    MOV     R0,#ANSPAR     ;
0404 F0                      MOV     A,@R0          ;Parity flag check.
0405 120B                    JB0     EVNST          ;
                    ;
0407 D414                    CALL    VLF00          ;(  Even  !  )
                    ;                                Parity bit "0" set.
0409 840D                    JMP     PBSED          ;
                    ;
FILE: AKI:SHIGI           HEWLETT-PACKARD: 8048 Assembler

LOCATION OBJECT CODE LINE      SOURCE LINE

040B D418           EVNST:   CALL    VLF01          ;(  Odd  !  )
                    ;                                Parity bit "1" set.
                    ;
040D 2305           PBSED:   MOV     A,#5           ;***NEXT [MTMINT]***
040F C4EF                    JMP     JMPR           ;RETR.
                    ;
                    ;
                    ;
                    ;****************************************************************
                    ;
                    ;                     (  STOP BIT Tx.  )
                    ;                                                            #A6
                    ;****************************************************************
                    ;
                    ;        ...................................................
0411 F8             STOP0:   MOV     A,R0           ;
0412 3D                      MOVD    P5,A           ;Stop bit trans.
                    ;        ...................................................
                    ;
0413 D40F                    CALL    TSET05         ;Half bit time counter set & start.
                    ;
0415 B868                    MOV     R0,#LAV1       ;Indirect addressing.
0417 F0                      MOV     A,@R0          ;***NEXT <-- [LAV1]***
0418 C4EF                    JMP     JMPR           ;RETR.
                    ;
                    ;
                    ;
                    ;****************************************************************
                    ;
                    ;                     (  PARITY BIT Tx.  )
                    ;                                                            #A5
                    ;****************************************************************
                    ;
                    ;        ...................................................
041A F8             PARBT:   MOV     A,R0
041B 3D                      MOVD    P5,A           ;Parity bit trans.
                    ;        ...................................................
                    ;
041C D40F                    CALL    TSET05         ;Half bit time counter set & start.
                    ;
041E 2308                    MOV     A,#8           ;Indirect addressing.
                    ;                                ***NEXT [RCK]***
```

```
0420 C4EF            JMP    JMPR          ;RETR.
          ;
          ;
          ;
          ;
          ;**********************************************************************
          ;
          ;                         ( RCK CHECK.  )
          ;                                                                 #A3
          ;**********************************************************************
          ;
          ;       ...............................................................
0422 00   RCK:       NOP                  ;
0423 362D            JT0    SPCEI         ;RCK bit detect.
          ;       ...............................................................
```

FILE: AKI:SHIGI HEWLETT-PACKARD: 8048 Assembler

```
LOCATION OBJECT CODE LINE     SOURCE LINE

          ;
0425 D40F            CALL   TSET05        ;Half bit time counter set & start.
          ;
0427 FE              MOV    A,R6          ;RCK flag set.
0428 4340            ORL    A,#40H        ;( OK  !.)
042A AE              MOV    R6,A          ;
042B 8433            JMP    RCKE          ;
          ;                                ( Error  ! )
042D D40F SPCEI:     CALL   TSET05        ;Half bit time counter set & start.
          ;
042F FE              MOV    A,R6          ;RCK flag set.
0430 53BF            ANL    A,#0BFH       ;
0432 AE              MOV    R6,A          ;
          ;
0433 D41B RCKE:      CALL   VLF01         ;Stop bit "1" set.
          ;
0435 2306            MOV    A,#6          ;***NEXT [STOP0]***
0437 C4EF            JMP    JMPR          ;RETR.
          ;
          ;
          ;
          ;**********************************************************************
          ;
          ;                         ( ACK CHECK.  )
          ;                                                                 #A7
          ;**********************************************************************
          ;
          ;       ...............................................................
0439 00   ACK1:      NOP                  ;
043A 2647            JNT0   CMCHK4        ;ACK bit detect.
          ;       ...............................................................
          ;
043C D40F            CALL   TSET05        ;Half bit time counter set & start.
          ;
043E FE              MOV    A,R6          ;RCK flag check !
043F D26A            JB6    RCKEND        ;
          ;
0441 B4FF ERRCKT:    CALL   BCNTBC        ;(  RCK error  !  )
0443 F23C            JB7    DP04ST        ;
0445 C4AF            JMP    DISEND        ;(ER)
          ;
0447 D40F CMCHK4:    CALL   TSET05        ;Half bit time counter set & start.
0449 FE              MOV    A,R6          ;
044A 924E            JB4    ABERSP        ;
044C 8441            JMP    ERRCKT        ;
          ;
044E B867 ABERSP:    MOV    R0,#DEMAPH    ;make error message (04).
0450 F0              MOV    A,@R0         ;
0451 5307            ANL    A,#07H        ;
0453 E7              RL     A             ;
0454 E7              RL     A             ;
0455 E7              RL     A             ;
0456 A9              MOV    R1,A          ;
0457 B837            MOV    R0,#DRMAPH    ;
0459 F0              MOV    A,@R0         ;
045A 5307            ANL    A,#07H        ;
045C 49              ORL    A,R1          ;
```

FILE: AKI:SHIGI HEWLETT-PACKARD: 8048 Assembler

```
LOCATION OBJECT CODE LINE     SOURCE LINE

045D B856            MOV    R0,#RE84H     ;
045F A0              MOV    @R0,A         ;
0460 B858            MOV    R0,#RE84C     ;
0462 B004            MOV    @R0,#04H      ;
0464 B857            MOV    R0,#RE841     ;
0466 B000            MOV    @R0,#0H       ;
0468 8441            JMP    ERRCKT        ;
          ;
```

```
                          ;                             ( ACK & RCK ok  !  )
046A D422       RCKEND:  CALL    PARCLL                ;Parity flag clear
                                                             & VLF flags clear.
                          ;
                          ;
046C B867                 MOV     R0,#DEMAPH            ;Make address byte of 84 command.
046E F0                   MOV     A,@R0                 ;
046F 5307                 ANL     A,#07H                ;[#POLING] <--- drop number ( upper
0471 E7                   RL      A                     ; 5 bit ) + device address ( lower
0472 E7                   RL      A                     ; 3 bit ).
0473 E7                   RL      A                     ;
0474 A9                   MOV     R1,A                  ;
0475 B837                 MOV     R0,#DRMAPH            ;
0477 F0                   MOV     A,@R0                 ;
0478 5307                 ANL     A,#07H                ;
047A 49                   ORL     A,R1                  ;
047B B86A                 MOV     R0,#POLING            ;
047D A0                   MOV     @R0,A                 ;
                          ;
047E B868                 MOV     R0,#LAY1              ;
0480 B000                 MOV     @R0,#0H               ;84 command flag set.
0482 B86B                 MOV     R0,#CNTBY             ;Byte counter clear.
0484 B000                 MOV     @R0,#0H               ;
                          ;
0486 D414                 CALL    VLF00                 ;Start bit "0"  set.              te
                          ;
0488 230B                 MOV     A,#11                 ;(Advance !)
                          ;                              ***NEXT [KEYDAY]***
048A C4EF                 JMP     JMPR                  ;RETR.
                          ;
048C E459       DP04ST:   JMP     INT04S                ;Disposal of 04 command.
                          ;
                          ;
                          ;
                          ;**************************************************************
                          ;
                          ;****  84COM-84COM-84COM-84COM-84COM-84COM-84COM-84COM-84COM  ****
                          ;*                                                              *
                          ;*                   DISPOSAL OF 84 COMMAND.                    *
                          ;*                                                              *
                          ;****  84COM-84COM-84COM-84COM-84COM-84COM-84COM-84COM-84COM  ****
                          ;
                          ;**************************************************************
                          ;
                          ;          ( START BIT Tx <--- Rx ROUTINE.  )
                          ;                                                          #C1:
                          ;**************************************************************
                          ;
                          ;         ..................................................
048E F8         KEYDAY:   MOV     A,R0                  ;
FILE: AKI:SHIGI           HEWLETT-PACKARD: 8048 Assembler

LOCATION OBJECT CODE LINE     SOURCE LINE

048F 3D                   MOVD    P5,A                  ;Start bit trans.
                          ;       ..................................................

0490 D40B                 CALL    TSET1                 ;1 bit time counter set & start.
                          ;
0492 D418                 CALL    VLF01                 ;Start bit reset stb "1"  set.
                          ;
0494 230D                 MOV     A,#13                 ;***NEXT [RSTAT]***
0496 C4EF                 JMP     JMPR                  ;RETR.
                          ;
                          ;
                          ;
                          ;**************************************************************
                          ;
                          ;          ( START BIT ERASE.<--- Rx ROUTINE.  )
                          ;                                                          #C13
                          ;**************************************************************
                          ;
                          ;       ..................................................
0498 F8         RSTAT:    MOV     A,R0                  ;Start bit clear.
0499 3D                   MOVD    P5,A                  ;
                          ;       ..................................................
                          ;
049A D40F                 CALL    TSET05                ;Half bit time counter set & start.
                          ;
049C BA08                 MOV     R2,#08H               ;Bit counter set.
                          ;
049E 230E                 MOV     A,#14                 ;***NEXT [RBSET]***
04A0 C4EF                 JMP     JMPR                  ;RETR.
                          ;
                          ;
                          ;
                          ;**************************************************************
                          ;
                          ;          ( DATA Rx <--- Rx ROUTINE.  )
                          ;                                                          #C14
                          ;**************************************************************
```

```
                     ;
                     ;          ..................................................
04A2 00              RBSET:     NOP
04A3 26AB                       JNT0     VDATI1         ;Received data is
                     ;                                   " 0 " or " 1 " ?
                     ;          ..................................................
                     ;
04A5 D40B                       CALL     TSET1          ;1 bit time counter set & start.
                     ;
04A7 F431                       CALL     VLFI0          ;( Data = "0".  )
04A9 84B1                       JMP      CNTDN          ;
                     ;                                   ( Data = "1".  )
04AB D40B            VDATI1:    CALL     TSET1          ;1 bit time counter set & start.
                     ;
04AD D429                       CALL     PALAH          ;Parity flag set.
04AF F42B                       CALL     VLFI1          ;
                     ;
04B1 EAB7            CNTDN:     DJNZ     R2,SETRB       ;Receive end or not ?
                     ;
                     ;                                   ( Receive end ! )
FILE: AKI:SHIGI         HEWLETT-PACKARD: 8048 Assembler

LOCATION OBJECT CODE LINE     SOURCE LINE

04B3 230C            PALKS:     MOV      A,#12          ;***NEXT [PALK]***
04B5 C4EF                       JMP      JMPR           ;RETR.
                     ;
                     ;                                   ( Receive continue ! )
04B7 230E            SETRB:     MOV      A,#14          ;***NEXT [RBSET]***
04B9 C4EF                       JMP      JMPR           ;RETR.
                     ;
                     ;
                     ;
                     ;*****************************************************************
                     ;
                     ;               (  PARITY BIT Rx.<--- Rx ROUTINE.  )
                     ;                                                              #C12-
                     ;*****************************************************************
                     ;
                     ;          ..................................................
04BB 00              PALK:      NOP
04BC 26D5                       JNT0     PTYBI          ;Parity bit Rx.
                     ;          ..................................................
                     ;
04BE D40F                       CALL     TSET05         ;Half bit time counter set & start.
                     ;
04C0 B869                       MOV      R0,#ANSPAR     ;(Parity bit = "0")
04C2 F0                         MOV      A,@R0          ;
04C3 12C7                       JB0      NCKAC          ;
04C5 84CD                       JMP      ACKAC          ;
                     ;
04C7 D418            NCKAC:     CALL     VLF01          ;( Parity error ! )
                     ;                                   NACK "1" set.
                     ;
04C9 2311                       MOV      A,#17          ;***NEXT [NCKOT]***
04CB C4EF                       JMP      JMPR           ;RETR.
                     ;
                     ;                                   ( Parity ok ! )
04CD D424            ACKAC:     CALL     PARCLR         ;Parity flag clear.
04CF D414                       CALL     VLF00          ;
                     ;                                   ACK "0" set.
                     ;
04D1 230F                       MOV      A,#15          ;***NEXT [ACKOT]***
04D3 C4EF                       JMP      JMPR           ;RETR.
                     ;
04D5 D40F            PTYBI:     CALL     TSET05         ;Half bit time counter set & start.
                     ;
04D7 B869                       MOV      R0,#ANSPAR     ;Parity bit = "1" ?
04D9 F0                         MOV      A,@R0          ;
04DA 12CD                       JB0      ACKAC          ;(Parity Ok !)
04DC 84C7                       JMP      NCKAC          ;(Parity error !)
                     ;
                     ;
                     ;
                     ;*****************************************************************
                     ;
                     ;               (  ACK Tx.<--- Rx ROUTINE.  )
                     ;                                                              #C15
                     ;*****************************************************************
                     ;
                     ;          ..................................................
```

```
FILE: AKI:SHIGI          HEWLETT-PACKARD: 8048 Assembler

LOCATION OBJECT CODE LINE     SOURCE LINE

    04DE F8              ACKOT:   MOV     A,R0          ;ACK trans.
    04DF 3D                       MOVD    P5,A          ;
                         ;        ..................................................
                         ;
    04E0 D40F                     CALL    TSET05        ;Half bit time counter set & start
                         ;
    04E2 FF                       MOV     A,R7          ;
    04E3 4380                     ORL     A,#80H        ;Response flag set.
    04E5 AF                       MOV     R7,A          ;
                         ;
    04E6 D41B                     CALL    VLF01         ;Stop bit "1" set.
                         ;
    04E8 231A                     MOV     A,#26         ;***NEXT [LCIN]***
    04EA C4EF                     JMP     JMPR .        ;RETR.
                         ;
                         ;
                         ;**************************************************************
                         ;
                         ;          <  STOP BIT Tx 1. CHALLENGE Rx ONCE MORE.  >
                         ;                                                          #D2
                         ;**************************************************************
                         ;
                         ;        ..................................................
    04EC F8              REPRX:   MOV     A,R0          ;Stop bit Tx.
    04ED 3D                       MOVD    P5,A          ;
                         ;        ..................................................
                         ;
    04EE D40B                     CALL    TSET1         ;1 bit time counter set & start.
                         ;
    04F0 D424                     CALL    PARCLR        ;Parity flag clear.
                         ;
    04F2 D414                     CALL    VLF00         ;Start bit "0" set.
                         ;
    04F4 230B                     MOV     A,#11         ;***NEXT [KEYDAY]***
    04F6 C4EF                     JMP     JMPR .        ;RETR.
                         ;
                         ;
                         ;
                         ;**************************************************************
                         ;
                         ;          <  STOP BIT Tx 2.<--- FOR 04 COMMAND.  >
                         ;                                                          #D2
                         ;**************************************************************
                         ;
                         ;        ..................................................
    04F8 F8              STER04:  MOV     A,R0          ;Stop bit trans.
    04F9 3D                       MOVD    P5,A          ;
                         ;        ..................................................
                         ;
    04FA D40B                     CALL    TSET1         ;1 bit time counter set & start.
                         ;
    04FC B827                     MOV     R0,#SDMSGC    ;
    04FE B002                     MOV     @R0,#02H      ;Error indicator set.
    0500 B826                     MOV     R0,#SDMSG1    ;
    0502 B000                     MOV     @R0,#0H       ;
                         ;
    0504 E48A                     JMP     R04ERS        ;
FILE: AKI:SHIGI          HEWLETT-PACKARD: 8048 Assembler

LOCATION OBJECT CODE LINE     SOURCE LINE

                         ;
                         ;
                         ;
                         ;**************************************************************
                         ;
                         ;          <  STOP BIT Tx 3. FOR 84 COMMAND.  >
                         ;                                                          #D21
                         ;**************************************************************
                         ;
                         ;        ..................................................
    0506 F8              STER84:  MOV     A,R0          ;Stop bit trans.
    0507 3D                       MOVD    P5,A          ;
                         ;        ..................................................
                         ;
    0508 D40B                     CALL    TSET1         ;1 bit time counter set & start.
                         ;
    050A B86A                     MOV     R0,#POLING    ;Drop & device address set
                         ;                                  to response buffer.
    050C F0                       MOV     A,@R0         ;
    050D B856                     MOV     R0,#RES4H     ;
    050F A0                       MOV     @R0,A         ;
```

```
                 ;
0510 B858                    MOV     R0,#RE84C       :
0512 B002                    MOV     @R0,#02H        :( DEVICE to ECU link error ! )
0514 B857                    MOV     R0,#RE841       ;Error indicator set.
0516 B000                    MOV     @R0,#0H         ;
0518 C4AF                    JMP     DISEND
                 ;
                 ;
                 ;
                 ;-----------------------------------------------------SUB ROUTINE---
                 ;
                 ;      [ INPUT DATA SET TO 04 BUF. & BYTE COUNTER INC.ROUTINE. ]
                 ;
                 ;-------------------------------------------------------------------
                 ;
051A D403        INDABY:     CALL    CNTBCK          ;
051C 0328                    ADD     A,#SDMSGC+1     ;
051E A8                      MOV     R0,A            ;
051F FB                      MOV     A,R3            ;
0520 A0                      MOV     @R0,A           ;Input data set to 04 buf.
                 ;
0521 D407                    CALL    BCNINC          ;Byte counter Inc.
0523 83                      RET
                 ;
                 ;
                 ;*******************************************************************
                 ;
                 ;           (  STOP BIT Tx 4. 04 COMMAND ALL OK ! END !   )
                 ;                                                              #D24
                 ;*******************************************************************
                 ;
                 ;           ....................................................
0524 F8          STGR04:     MOV     A,R0            :Stop bit trans.
0525 3D                      MOVD    P5,A            :
                 ;           ....................................................
                 ;

FILE: AKI:SHIGI          HEWLETT-PACKARD: 8048 Assembler

LOCATION OBJECT CODE LINE     SOURCE LINE

0526 D40B                    CALL    TSET1           ;1 bit time counter set & start.
                 ;
0528 B827                    MOV     R0,#SDMSGC      ;Device address clear.
052A F0                      MOV     A,@R0           ;
052B 53F8                    ANL     A,#0F8H         ;
052D 77                      RR      A               ;
052E 77                      RR      A               ;
052F 77                      RR      A               ;
0530 A0                      MOV     @R0,A           ;
                 ;
0531 B41A                    CALL    INDABY          ;Input data set to 04 buf.
                 :                                      & byte counter inc.routine.
                 ;
0533 10                      INC     @R0             :
                 ;
0534 F0                      MOV     A,@R0           :
0535 B826                    MOV     R0,#SDMSG1      ;Byte counter buffer set.
0537 A0                      MOV     @R0,A           ;
                 ;
0538 E48A                    JMP     R04ERS
                 ;
                 ;
                 ;
                 ;*******************************************************************
                 ;
                 ;                 (  NCK Tx.<--- Rx ROUTINE.  )
                 ;                                                              #C17
                 ;*******************************************************************
                 ;
                 ;           ....................................................
053A F8          NCKOT:      MOV     A,R0            ;NCK trans.
053B 3D                      MOVD    P5,A            ;
                 ;           ....................................................
                 ;
053C D40B                    CALL    TSET1           ;1 bit time counter set & start.
                 ;
053E FE                      MOV     A,R6            :
053F 5248                    JB2     REPER           :Error = 5 times ?
0541 1E                      INC     R6              :Error counter inc.
0542 D41B                    CALL    VLF01           ;
                 ;                                    Stop  bit "1" set.
                 ;
0544 2319                    MOV     A,#25           ;***NEXT [REPRX]***
0546 C4EF                    JMP     JMPR            ;PETR.
                 ;
0548 B868        REPER:      MOV     R0,#LAV1        ;( 5 times error ! )
054A F0                      MOV     A,@R0           :Disposal of 04 command or
                 ;                                      84 command ?
```

```
0548 C653                 JZ      JER84        ;
054D D41B                 CALL    VLF01        ;04 command error response.
                     ;                          stop bit "1" set.
                     ;
054F 2316                 MOV     A,#22        ;***NEXT [STER04]***
0551 C4EF                 JMP     JMPR         ;RETR.
                     ;
0553 D41B            JER84:  CALL VLF01        ;84 ( dr polling ) error response.
                     ;                          stop bit "1" set.
```

FILE: AKI:SHIGI HEWLETT-PACKARD: 8048 Assembler

LOCATION OBJECT CODE LINE SOURCE LINE

```
                     ;
0555 2315                 MOV     A,#21        ;***NEXT [STER84]***
0557 C4EF                 JMP     JMPR         ;RETR.
                     ;
                     ;
                     ;*************************************************************
                     ;
                     ;        (  LAST CHARACTER INDICATOR CHECK.  )
                                                                              #D26
                     ;
                     ;*************************************************************
                     ;
                     ;    ..........................................................
0559 00              LCIN:   NOP
055A 267B                 JNT0    LCIEN        ;Last character indicator
                                                detect.
                     ;
                     ;    ..........................................................
                     ;
055C D40F                 CALL    TSET05       ;Half bit time counter set & start.
                     ;
055E B868                 MOV     R0,#LAV1     ;
0560 F0                   MOV     A,@R0        ;
0561 C66F                 JZ      BAI84        ;Disposal of 84 command or
                     ;
0563 D403                 CALL    CNTBCK       ;Byte counter check.
0565 D304                 XRL     A,#4H        ;Data <= 5 byte ?
0567 C68E                 JZ      LCIER        ;(    04    )error.
                     ;                          good !
0569 D41B                 CALL    VLF01        ;(  Disposal of 04 command !  )
                     ;                          Stop bit "1" set.
                     ;
056B 2312                 MOV     A,#18        ;***NEXT [STGN04]***
056D C4EF                 JMP     JMPR         ;RETR.
                     ;
056F D403            BAI84:  CALL CNTBCK       ;
0571 D304                 XRL     A,#4H        ;Data <= 5 byte ?
0573 C694                 JZ      DY84         ;(    84    )error.
                     ;
                     ;                          good !
0575 D41B                 CALL    VLF01        ;( Disposal of 84 command ! )
                     ;                          Stop bit "1" set.
                     ;
0577 2310                 MOV     A,#16        ;***NEXT [STGN84]***
0579 C4EF                 JMP     JMPR         ;RETR.
                     ;
057B D40F            LCIEN:  CALL TSET05       ;Half bit time counter set & start.
                     ;
057D B868                 MOV     R0,#LAV1     ;
057F F0                   MOV     A,@R0        ;
0580 C688                 JZ      ENST84       ;
0582 D41B                 CALL    VLF01        ;( Disposal of 04 command ! )
                     ;                          Stop bit "1" set.
                     ;
0584 2318                 MOV     A,#24        ;***NEXT [STGR04]***
0586 C4EF                 JMP     JMPR         ;RETR.
                     ;
                     ;                          ( Disposal of 84 command ! )
0588 D41B            ENST84: CALL VLF01        ;
```

FILE: AKI:SHIGI HEWLETT-PACKARD: 8048 Assembler

LOCATION OBJECT CODE LINE SOURCE LINE

```
                     ;                          Stop bit "1" set.
                     ;
058A 2317                 MOV     A,#23        ;***NEXT [STGR84]***
058C C4EF                 JMP     JMPR         ;RETR.
                     ;
                     ;                          ( grater than 5 byte! )
058E D41B            LCIER:  CALL VLF01        ;( Disposal of 04 command ! )
                     ;                          Stop bit "1" set.
                     ;
0590 2316                 MOV     A,#22        ;***NEXT [STER04]***
0592 C4EF                 JMP     JMPR         ;RETR.
                     ;
0594 D41B            DY84:   CALL VLF01        ;( Disposal of 84 command ! )
                     ;                          Stop bit "1" set.
```

```
                 ;
0596 2315                  MOV     A,#21         ;***NEXT [STER34]***
0598 C4EF                  JMP     JMPR          ;RETR.
                 ;
                 ;
                 ;
                 ;***************************************************************
                 ;
                 ;          ( STOP BIT Tx 5.  84 COMMANMD ALL OK ! END !  )
                 ;                                                          #D23
                 ;***************************************************************
                 ;
                 ;         .................................................
059A F8          STGR84:   MOV     A,R0          ;Stop bit trans.
059B 3D                    MOVD    P5,A          ;
                 ;         .................................................
                 ;
059C D40B                  CALL    TSET1         ;1 bit time counter set & start.
                 ;
059E B4CC                  CALL    REDSTB        ;Response data set to 84 buffer.
                 ;
05A0 B86A                  MOV     R0,#POLING    ;Disposal address buffer set.
05A2 F0                    MOV     A,@R0         ;
05A3 B856                  MOV     R0,#RE84H     ;
05A5 A0                    MOV     @R0,A         ;
05A6 D407                  CALL    BCNINC        ;Byte counter buffer set.
05A8 F0                    MOV     A,@R0         ;
05A9 B857                  MOV     R0,#RE841     ;
05AB A0                    MOV     @R0,A         ;
05AC C4AF                  JMP     DISEND
                 ;
                 ;
                 ;
                 ;***************************************************************
                 ;
                 ;          ( STOP BIT Tx 6. 84 COMMAND Rx DATA CONTINUE.  )
                 ;                                                          #C16
                 ;***************************************************************
                 ;
                 ;         .................................................
05AE F8          STGN84:   MOV     A,R0          ;Stop bit trans.
05AF 3D                    MOVD    P5,A          ;
                 ;         .................................................
```

FILE: AKI:SHIGI HEWLETT-PACKARD: 8048 Assembler

```
LOCATION OBJECT CODE LINE     SOURCE LINE

                 ;
05B0 D40B                  CALL    TSET1         ;1 bit time counter set & start.
                 ;
05B2 B4CC                  CALL    REDSTB        ;Input data set to 84 command
                 ;                                            buffer.
05B4 D407                  CALL    BCNINC        ;Byte counter Inc.
                 ;
05B6 D422                  CALL    PARCLL        ;Parity flag clear
                 ;                                     & VLF flags clear.
                 ;
05B8 D414                  CALL    VLF00         ;
                 ;                                Start bit "0" set.
                 ;
05BA 230B                  MOV     A,#11         ;***NEXT [KEYDAY]***
05BC C4EF                  JMP     JMPR          ;RETR.
                 ;
                 ;
                 ;
                 ;***************************************************************
                 ;
                 ;          ( STOP BIT Tx 7. 04 COMMAND DATA Rx CONTINUE.  )
                 ;                                                          #C13
                 ;***************************************************************
                 ;
                 ;         .................................................
05BE F8          STGN04:   MOV     A,R0          ;Stop bit trans.
05BF 3D                    MOVD    P5,A          ;
                 ;         .................................................
                 ;
05C0 D40B                  CALL    TSET1         ;1 bit time counter set % start.
                 ;
05C2 B41A                  CALL    INDABY        ;Input data set to 04 buf.
                 ;                                  byte counter inc. routine.
                 ;
05C4 D422                  CALL    PARCLL        ;Parity flag clear
                 ;                                     & VLF flags clear.
                 ;
05C6 D414                  CALL    VLF00         ;
                 ;                                Start bit "0" set.
                 ;
05C8 230B                  MOV     A,#11         ;***NEXT [KEYDAY]***
05CA C4EF                  JMP     JMPR          ;RETR.
                 ;
                 ;
```

```
                ;
                ;*************************************************************
                ;--------------------------------------------------SUB ROUTINE---
                ;
                ;                [ RESPONSE DATA SET TO 84 BUFFER. ]
                ;
                ;-----------------------------------------------------------------
                ;
05CC D403       REDSTB:  CALL    CNTBCK          ;
05CE 0358                ADD     A,#RE84C        ;
05D0 A8                  MOV     R0,A            ;
05D1 FB                  MOV     A,R3            ;
05D2 A0                  MOV     @R0,A           ;Input data set to 84 buf.
FILE: AKI:SHIGI          HEWLETT-PACKARD: 8048 Assembler

LOCATION OBJECT CODE LINE     SOURCE LINE

05D3 83                  RET                     ;
                ;
                ;
                ;-----------------------------------------------------------------
                ;
                ;****  04COM-04COM-04COM-04COM-04COM-04COM-04COM-04COM-04COM  ****
                ;*                                                               *
                ;*                  DISPOSAL OF 04 COMMAND.                      *
                ;*                                                               *
                ;****  04COM-04COM-04COM-04COM-04COM-04COM-04COM-04COM-04COM  ****
                ;
                ;*****************************************************************
                ;
                ;              ( START BIT Tx. <--- 04 COMMAND.  )
                ;                                                            #D20
                ;*****************************************************************
                ;
                ;       ..................................................
05D4 F8         COM04:   MOV     A,R0            ;Start bit trans.
05D5 3D                  MOVD    P5,A            ;
                ;       ..................................................
                ;
05D6 D40B                CALL    TSET1           ;1 bit time counter set & start.
                ;
05D8 B827                MOV     R0,#SDMSGC      ;
05DA F0                  MOV     A,@R0           ;
05DB B85D                MOV     R0,#TXBUF       ;Tx buffer <--- command (04)
05DD A0                  MOV     @R0,A           ;
05DE B868                MOV     R0,#LAV1        ;
05E0 B013                MOV     @R0,#19         ;[LAV1] <-- ACK3.
05E2 D414                CALL    VLF00           ;MI bit "0" set.
                ;
05E4 2302                MOV     A,#2            ;***NEXT (MI00)***.
05E6 C4EF                JMP     JMPR            ;RETR.
                ;
                ;
                ;
                ;*****************************************************************
                ;
                ;              (  04 COMMAND  DATA Tx.   )
                ;                                                            #B10
                ;*****************************************************************
                ;
                ;       ..................................................
05E8 F8         COM04D:  MOV     A,R0            ;Start bit Tx.
05E9 3D                  MOVD    P5,A            ;
                ;       ..................................................
                ;
05EA D40B                CALL    TSET1           ;1 bit time counter set & start.
                ;
05EC D403                CALL    CNTBCK          ;
05EE 0327                ADD     A,#SDMSGC       ;
05F0 A8                  MOV     R0,A            ;
05F1 F0                  MOV     A,@R0           ;
05F2 B85D                MOV     R0,#TXBUF       ;Tx buffer <--- Data set.
05F4 A0                  MOV     @R0,A           ;
05F5 B868                MOV     R0,#LAV1        ;
FILE: AKI:SHIGI          HEWLETT-PACKARD: 8048 Assembler

LOCATION OBJECT CODE LINE     SOURCE LINE

05F7 B009                MOV     @R0,#9          ;[LAV1] <--- ACK4.
05F9 D41B                CALL    VLF01           ;MI bit "1" set.
                ;
05FB 2302                MOV     A,#2            ;***NEXT (MI00)***
05FD C4EF                JMP     JMPR            ;RETR.
                ;
                ;
                ;
                ;*****************************************************************
```

```
                 ;------------------------------------------------SUB ROUTINE----
                 ;
                 ;                  [ BYTE COUNT BYTE CHECK.  ]
                 ;
                 ;-----------------------------------------------------------------
                 ;
05FF B826        BCNTBC:  MOV      R0,#SDMSG1    ;
0601 F0                   MOV      A,@R0         ;
0602 83                   RET
                 ;
                 ;
                 ;------------------------------------------------SUB ROUTINE---
                 ;
                 ;                    [ BYTE COUNTER CHECK.  ]
                 ;
                 ;-----------------------------------------------------------------
                 ;
0603 B86B        CNTBCK:  MOV      R0,#CNTBY     ;
0605 F0                   MOV      A,@R0         ;
0606 83                   RET
                 ;
                 ;
                 ;------------------------------------------------SUB ROUTINE---
                 ;
                 ;                   [ BYTE COUNTER INC.  ]
                 ;
                 ;-----------------------------------------------------------------
                 ;
0607 B86B        BCNINC:  MOV      R0,#CNTBY     ;
0609 10                   INC      @R0           ;
060A 83                   RET
                 ;
                 ;
                 ;------------------------------------------------SUB ROUTINE---
                 ;
                 ;                [ 1 BIT TIME COUNTER SET.  ]
                 ;
                 ;-----------------------------------------------------------------
                 ;
060B 23EF        TSET1:   MOV      A,#239        ;
060D C411                 JMP      TIST          ;
                 ;
                 ;
                 ;------------------------------------------------SUB ROUTINE--
                 ;
                 ;                [ HALF BIT TIME COUNTER SET. ]
                 ;
                 ;-----------------------------------------------------------------
FILE: AKI:SHIGI          HEWLETT-PACKARD: 8048 Assembler

LOCATION OBJECT CODE LINE     SOURCE LINE

                 ;
060F 23F8        TSET05:  MOV      A,#248        ;
                 ;
0611 62          TIST:    MOV      T,A           ;
0612 45                   STRT     CNT           ;
0613 83                   RET
                 ;
                 ;
                 ;------------------------------------------------SUB ROUTINE---
                 ;
                 ;                [ VLF OUTPUT DATA "0" SET.  ]
                 ;
                 ;-----------------------------------------------------------------
                 ;
0614 B837        VLF00:   MOV      R0,#DRMAPH    ;
0616 F0                   MOV      A,@R0         ;
0617 5307                 ANL      A,#07H        ;
0619 C420                 JMP      VLFOST        ;
                 ;
                 ;
                 ;------------------------------------------------SUB ROUTINE---
                 ;
                 ;                [ VLF OUTPUT DATA "1" SET.  ]
                 ;
                 ;-----------------------------------------------------------------
                 ;
061B B837        VLF01:   MOV      R0,#DRMAPH    ;
061D F0                   MOV      A,@R0         ;
061E 4308                 ORL      A,#08H        ;
0620 A8          VLFOST:  MOV      R0,A          ;
0621 83                   RET
                 ;
                 ;
                 ;------------------------------------------------SUB ROUTINE---
                 ;
                 ;                  [ PARITY FLAG CLEAR.  ]
                 ;
                 ;-----------------------------------------------------------------
```

```
                 ;
0622 BE00        PARCLL:  MOV     R6,#0          ;VLF flags clear.
                 ;
0624 B869        PARCLR:  MOV     R0,#ANSPAR     ;Parity flag clear.
0626 B000                 MOV     @R0,#0H        ;
0628 83                   RET
                 ;
                 ;
                 ;----------------------------------------------------SUB ROUTINE---
                 ;
                 ;                        [  PARITY CHECK.  ]
                 ;
                 ;------------------------------------------------------------------
                 ;
0629 B869        PALAN:   MOV     R0,#ANSPAR     ;
062B 10                   INC     @R0            ;
062C 83                   RET
                 ;
                 ;

FILE: AKI:SHIGI          HEWLETT-PACKARD: 8048 Assembler

LOCATION OBJECT CODE LINE     SOURCE LINE

                 ;----------------------------------------------------SUB ROUTINE---
                 ;
                 ;            [ Error response set to 04 buffer. ]
                 ;
                 ;------------------------------------------------------------------
                 ;
062D B827        ERRSES:  MOV     R0,#SDMSGC     ;Error indicate .
062F FE                   MOV     A,R6           ;
0630 D236                 JB6     ERRSEA         ;
0632 B003                 MOV     @R0,#03H       ;( abnormal error  ! )
0634 C438                 JMP     ERRSEE         ;
                 ;
0636 B001        ERRSEA:  MOV     @R0,#01H       ;( normal error  ! )
0638 B826        ERRSEE:  MOV     R0,#SDMSG1     ;
063A B000                 MOV     @R0,#0H        ;
063C E48A                 JMP     R04ERS         ;
                 ;
                 ;
                 ;******************************************************************
                 ;
                 ;               (  ACK CHECK 3 <--- 04 COMMAND.   )
                 ;                                                             #D29
                 ;******************************************************************
                 ;
                 ;        ..................................................
063E 00          ACK3:    NOP                    ;
063F 2648                 JNT0     ACKER         ;ACK bit Rx.
                 ;        ..................................................
                 ;
0641 D40F                 CALL    TSET05         ;Half bit time counter set & start.
                 ;
0643 FE                   MOV     A,R6           ;RCK ?
0644 D254                 JB6     ACKSSC         ;
0646 C44A                 JMP     ACKER2         ;
                 ;                                RCK error.
0648 D40F        ACKER:   CALL    TSET05         ;Half bit time counter set & start.
                 ;
064A FE          ACKER2:  MOV     A,R6           ;
064B 527D                 JB2     ACEND          ;5 times error ?
064D 1E                   INC     R6             ;
064E D414                 CALL    VLF00          ;Re-challenge.
                 ;                                Start bit "0" set.
                 ;
0650 2314                 MOV     A,#20          ;***NEXT (COM04)***
0652 C4EF                 JMP     JMPR           ;RETR.
                 ;
0654 B824        ACKSSC:  MOV     R0,#SDMSGK     ;(command only!)
0656 F0                   MOV     A,@R0          ;
0657 325F                 JB1     RWMOD          ;
0659 B826                 MOV     R0,#SDMSG1     ;
065B B040                 MOV     @R0,#01000000B;
065D E48A                 JMP     R04ERS         ;
                 ;
065F 126D        RWMOD:   JB0     RDMOD          ;Command + RD or WR ?
0661 B86B                 MOV     R0,#CNTBY      ;
0663 B001                 MOV     @R0,#1H        ;
0665 D422                 CALL    PARCLL         ;Parity flag clear
FILE: AKI:SHIGI          HEWLETT-PACKARD: 8048 Assembler

LOCATION OBJECT CODE LINE     SOURCE LINE

                 ;                                      & VLF flags clear.
0667 D414                 CALL    VLF00          ;
                 ;                                Start bit "0" set.
                 ;
                 ;                                (command + message!)
0669 230A                 MOV     A,#10          ;***NEXT (COM04D)***
```

```
0668 C4EF               JMP     JMPR            ;RETR.
                   ;
066D D422     RDMOD:    CALL    PARCLL          ;Parity flag clear
                   ;                                    & VLF flags clear.
066F B868               MOV     R0,#LAV1        ;
0671 B001               MOV     @R0,#1H         ;
0673 B86B               MOV     R0,#CNTBY       ;
0675 B000               MOV     @R0,#0H         ;
0677 D414               CALL    VLF00           ;Start bit "0" set.
                   ;
                   ;                             (command + response!)
0679 230B               MOV     A,#11           ;***NEXT [KEYDAY]***
067B C4EF               JMP     JMPR            ;RETR.
                   ;
067D C42D     ACEND:    JMP     ERRSES          ;
                   ;
                   ;
                   ;
                   ;***************************************************************
                   ;
                   ;              ( ACK CHECK 4.  <--- 04 COMMAND.  )
                   ;                                                           #B9
                   ;***************************************************************
                   ;
                   ;    ....................................................
067F 00       ACK4:     NOP                     ;
0680 2689               JNT0    AERCK           ;ACK bit check.
                   ;    ....................................................
                   ;
0682 D40F               CALL    TSET05          ;Half bit time counter set & start.
                   ;
0684 FE                 MOV     A,R6            ;(ACK !)
0685 D293               JB6     AOKCK           ;
0687 C48B               JMP     AERCK2          ;
                   ;
                   ;                            (  NCK  !  )
0689 D40F     AERCK:    CALL    TSET05          ;Half bit time counter set & start.
                   ;
068B FE       AERCK2:   MOV     A,R6            ;5 times error ?
068C 52A7               JB2     AENCK           ;
068E 1E                 INC     R6              ;Error counter Inc.
                   ;                             Challenge once more.
068F D424               CALL    PARCLR          ;Parity flag clear.
0691 C4A1               JMP     A04CON          ;
                   ;
0693 B4FF     AOKCK:    CALL    BCNTBC          ;(  ACK & RCK ok !  )
0695 5307               ANL     A,#07H          ;
0697 A9                 MOV     R1,A            ;
0698 C9                 DEC     R1              ;
0699 D403               CALL    CNTBCK          ;
069B D9                 XRL     A,R1            ;
FILE: AKI:SHIGI         HEWLETT-PACKARD: 8048 Assembler

LOCATION OBJECT CODE LINE      SOURCE LINE

069C C6A9               JZ      END04W          ;Tx operation end or not ?
069E 10                 INC     @R0             ;
069F D424               CALL    PARCLR          ;Parity flag clear.
                   ;
                   ;                            (  Tx operation continue
                   ;                                     for 04 com !  )
06A1 D414     A04CON:   CALL    VLF00           ;Start bit "0" set.
                   ;
06A3 230A               MOV     A,#10           ;***NEXT (COM04D)***
06A5 C4EF               JMP     JMPR            ;RETR.
                   ;
06A7 C42D     AENCK:    JMP     ERRSES          ;04 command response error.
                   ;                             Error indicator set.
                   ;
                   ;                            (  Tx operation end for 04 com !  )
06A9 B826     END04W:   MOV     R0,#SDMSG1      ;
06AB B040               MOV     @R0,#01000000B;
06AD E48A               JMP     R04ERS          ;
                   ;
                   ;
                   ;
                   ;***************************************************************
                   ;---------------------------------------------------SUB ROUTINE---
                   ;
                   ;              [  JMP TO HEAD ROUTINE.  ]
                   ;
                   ;---------------------------------------------------------------
                   ;
06AF D422     DISEND:   CALL    PARCLL          ;Parity flag clear
                   ;                                    & VLF flags clear.
06B1 B857               MOV     R0,#RE341
06B3 F0                 MOV     A,@R0
06B4 F28A               JB7     JPIDL
06B6 231B               MOV     A,#27
06B8 C4EF               JMP     JMPR
```

```
                         ;
06BA FF          JPIDL:   MOV     A,R7          ;Response flags check !_
06BB F2CA                 JB7     PCHKS         ;
                         ;
                         ;                       ( no  response  ! )
06BD B867        CONTDE:  MOV     R0,#DEMAPH    ;Device end ?
06BF F0                   MOV     A,@R0         ;
06C0 F2C5                 JB7     ALEND         ;
06C2 1D                   INC     R5
06C3 6477                 JMP     DMSRE         ;Device continue.
                         ;
                         ;
06C5 FF          ALEND:   MOV     A,R7          ;
06C6 D2E8                 JB6     PRDR2         ;
06C8 C4F2                 JMP     NTDRP         ;
                         ;
                         ;                       ( response  ! )
06CA 537F        PCHKS:   ANL     A,#7FH        ;
06CC AF                   MOV     R7,A          ;Response flag clear.
                         ;
06CD 92E4                 JB4     PRDEV         ;
                         ;
FILE: AKI:SHIGI         HEWLETT-PACKARD: 8048 Assembler

LOCATION OBJECT CODE LINE      SOURCE LINE

06CF B867                 MOV     R0,#DEMAPH    ;
06D1 F0                   MOV     A,@R0         ;
06D2 F2DF                 JB7     QUESE         ;
06D4 FF                   MOV     A,R7          ;
06D5 B2D9                 JB5     PRLSFS        ;
                         ;
06D7 C4BD                 JMP     CONTDE        ;
                         ;
06D9 FF          PRLSFS:  MOV     A,R7          ;
06DA 4340                 ORL     A,#040H       ;
06DC AF                   MOV     R7,A          ;
06DD C4BD                 JMP     CONTDE        ;
                         ;
06DF FF          QUESE:   MOV     A,R7          ;
06E0 B2EB                 JB5     PRDRP         ;
06E2 C4BD                 JMP     CONTDE        ;(  R.R.device poll &
                         ;                         R.R.drop poll.  )
06E4 B2E8        PRDEV:   JB5     PRDR2         ;(  Priority device poll
                         ;                         & P.R.drop poll.  )
06E6 C4F2                 JMP     NTDRP         ;Next drop select.
                         ;
06E8 53BF        PRDR2:   ANL     A,#0BFH       ;
06EA AF                   MOV     R7,A          ;
                         ;
06EB BD5E        PRDRP:   MOV     R5,#DEMAP0
06ED C4FC                 JMP     STDPS         ;(  Priority or R.R.device poll
                         ;                         & priority drop poll.  )
                         ;                       1st drop select.
                         ;
                         ;----------------------------------------------------SUB ROUTINE---
                         ;
                         ;                   [  RETURN ROUTINE.  ]
                         ;
                         ;-----------------------------------------------------------------
                         ;
06EF C5          JMPR:    SEL     RB0           ;
06F0 2F                   XCH     A,R7          ;
06F1 93                   RETR
                         ;
                         ;
                         ;----------------------------------------------------SUB ROUTINE---
                         ;
                         ;               [  NEXT ACCESS DROP SELECT.  ]
                         ;
                         ;-----------------------------------------------------------------
                         ;
                         ;
06F2 BD5E        NTDRP:   MOV     R5,#DEMAP0    ;
06F4 FC                   MOV     A,R4          ;
06F5 A8                   MOV     R0,A          ;
06F6 F0                   MOV     A,@R0         ;
06F7 F2FC                 JB7     STDPS         ;Drop end or not ?
06F9 1C                   INC     R4            ;( not end ! )
                         ;                       Next drop set.
06FA E409                 JMP     SETSD         ;
                         ;
                         ;
```

```
FILE: AKI:SHIGI          HEWLETT-PACKARD: 8048 Assembler

LOCATION OBJECT CODE LINE     SOURCE LINE

    06FC BC31           1597 STDPS:    MOV     R4,#DRMAP0     ;( Drop end ! )
    06FE B831           1598           MOV     R0,#DRMAP0     ;
    0700 F0             1599           MOV     A,@R0          ;
    0701 7205           1600           JB3     SELSET         ;Drop map set or not ?
                        1601 ;
    0703 E409           1602           JMP     SETSD
                        1603 ;
                        1604 ;                                 ( Not set ! )
    0705 2304           1605 SELSET:   MOV     A,#4           ;***NEXT [MTMINT]***
    0707 C4EF           1606           JMP     JMPR           ;RETR.
                        1607 ;
    0709 FC             1608 SETSD:    MOV     A,R4           ;(  Set !  )
    070A A8             1609           MOV     R0,A           ;
    070B F0             1610           MOV     A,@R0          ;
                        1611 ;
    070C 4308           1612 ANSWO:    ORL     A,#08H         ;
    070E A8             1613           MOV     R0,A           ;
                        1614 ;
    070F FF             1615           MOV     A,R7           ;
    0710 3216           1616           JB1     DSCF84         ;
                        1617 ;
    0712 231C           1618           MOV     A,#28          ;***NEXT [DSCF84]***
    0714 C4EF           1619           JMP     JMPR           ;RETR.
                        1620 ;
                        1621 ;
                        1622 ;----------------------------------------------------------------
                        1623 ;****************************************************************
                        1624 ;
                        1625 ;              [ DROP SCAN FOR 84 COMMAND. ]
                        1626 ;                                                           #D26
                        1627 ;****************************************************************
                        1628 ;
                        1629 ;  ...............................................................
    0716 F8             1630 DSCF84:   MOV     A,R0           ;Drop scan.
    0717 3D             1631           MOVD    P5,A           ;
                        1632 ;  ...............................................................
                        1633 ;
    0718 FF             1634           MOV     A,R7           ;
    0719 321D           1635           JB1     DSCFJJ         ;
                        1636 ;
    071B D40B           1637           CALL    TSET1          ;1 bit time counter set.
                        1638 ;
    071D FF             1639 DSCFJJ:   MOV     A,R7           ;Response flag 2 clear.
    071E 53FD           1640           ANL     A,#0FDH        ;
    0720 AF             1641           MOV     R7,A           ;
                        1642 ;
    0721 F8             1643           MOV     A,R0           ;
    0722 5387           1644           ANL     A,#087H        ;
    0724 B837           1645           MOV     R0,#DRMAPH     ;
    0726 A0             1646           MOV     @R0,A          ;
                        1647 ;
    0727 2304           1648           MOV     A,#4           ;***NEXT [MTMINT]***
    0729 C4EF           1649           JMP     JMPR           ;RETR.
                        1650 ;
                        1651 ;
                        1652 ;****************************************************************
                        1653 ;----------------------------------------------------SUB ROUTINE---
FILE: AKI:SHIGI          HEWLETT-PACKARD: 8048 Assembler

LOCATION OBJECT CODE LINE     SOURCE LINE

                        1654 ;
                        1655 ;              [  VLF INPUT DATA " 1 " SET.  ]
                        1656 ;
                        1657 ;----------------------------------------------------------------
                        1658 ;
    072B 97             1659 VLFI1:    CLR     C              ;
    072C A7             1660           CPL     C              ;
                        1661 ;
    072D FB             1662 VLFRST:   MOV     A,R3           ;
    072E 67             1663           RRC     A              ;
    072F AB             1664           MOV     R3,A           ;
    0730 83             1665           RET
                        1666 ;
                        1667 ;
                        1668 ;----------------------------------------------------------------
                        1669 ;----------------------------------------------------SUB ROUTINE---
                        1670 ;
                        1671 ;              [  VLF INPUT DATA " 0 " SET.  ]
                        1672 ;
                        1673 ;----------------------------------------------------------------
                        1674 ;
    0731 97             1675 VLFI0:    CLR     C              ;
    0732 E42D           1676           JMP     VLFRST         ;
```

```
          ;
          ;
          ;***************************************************************
          ;
          ;               ( WAIT for 84 COMMAND DISPOSAL. )
          ;
          ;***************************************************************
          ;
0734 D40F  IDLINT:  CALL   TSET05      ;Half bit time counter set & start.
0736 B857           MOV    R0,#RE841   ;84 buffer empty.
0738 F0             MOV    A,@R0       ;
0739 F243           JB7    DNTSET      ;
          ;
          ;
073B B4FF           CALL   BCNTBC      ;Exit 04 operation.
073D F245           JB7    ST04DP      ;
          ;
073F 2318           MOV    A,#27       ;***NEXT [IDLINT]***
0741 C4EF           JMP    JMPR        ;
          ;
0743 C48A  DNTSET:  JMP    JPIDL       ;(84 buffer empty.)
          ;
          ;
0745 FF    ST04DP:  MOV    A,R7        ;
0746 4301           ORL    A,#01H      ;
0748 AF             MOV    R7,A        ;
0749 E459           JMP    INT04S      ;
          ;
          ;---------------------------------------------------------------
          ;***************************************************************
          ;
          ;               [ CHANGING OPERATION TO 84 .]
          ;
          ;***************************************************************
          ;
          ;
          ;     ..................................................
074B F8    NDPS04:  MOV    A,R0        ;
074C 3D             MOVD   P5,A        ;
          ;     ..................................................
          ;
074D D40B           CALL   TSET1       ;1 bit timer counter set & start.
          ;
074F FF    MADAD2:  MOV    A,R7        ;
0750 1254           JB0    ARIWT       ;
0752 C4AF           JMP    DISEND      ;
0754 53FE  ARIWT:   ANL    A,#0FEH     ;
0756 AF             MOV    R7,A        ;
0757 E434           JMP    IDLINT      ;
          ;
          ;---------------------------------------------------SUB ROUTINE---
          ;
          ;                   [  04 DROP SELECT.  ]
          ;
          ;---------------------------------------------------------------
          ;
0759 B825  INT04S:  MOV    R0,#SDMSGH  ;
075B F0             MOV    A,@R0       ;
075C 5307           ANL    A,#07H      ;
075E A9             MOV    R1,A        ;
075F B837           MOV    R0,#DRMAPH  ;
0761 F0             MOV    A,@R0       ;
0762 5307           ANL    A,#07H      ;
0764 D9             XRL    A,R1        ;
0765 C67B           JZ     NOCHGE      ;
          ;
0767 F9             MOV    A,R1        ;
0768 4308           ORL    A,#08H      ;
076A A8             MOV    R0,A        ;
          ;
076B FF             MOV    A,R7        ;
076C 3272           JB1    DSF04B      ;
          ;
076E 231D           MOV    A,#29       ;***NEXT [DSF04C]***
0770 C4EF           JMP    JMPR        ;RETR.
          ;
0772 53FD  DSF04B:  ANL    A,#0FDH     ;
0774 AF             MOV    R7,A        ;
0775 E477           JMP    DSF04C      ;
          ;
          ;
          ;---------------------------------------------------------------
          ;***************************************************************
          ;
          ;               [ DROP SCAN FOR 04 COMMAND. ]
          ;                                                        #E29
          ;***************************************************************
          ;
          ;     ..................................................
0777 F8    DSF04C:  MOV    A,R0        ;
0778 3D             MOVD   P5,A        ;
```

```
                 ;          ..............................................
                 ;
0779 D40B                  CALL     TSET1           ;1 bit time counter set.
                 ;
077B F9          NOCHGE:   MOV      A,R1            ;
077C B837                  MOV      R0,#DRMAPH      ;
077E 20                    XCH      A,@R0           ;
077F B86C                  MOV      R0,#SAVDRP      ;
0781 A0                    MOV      @R0,A           ;
                 ;
                 ;
0782 D422                  CALL     PARCLL          ;Parity flag clear
                 ;                                      & VLF flags clear.
0784 D414                  CALL     VLF00           ;Start "0" bit set.
                 ;
0786 2314                  MOV      A,#20           ;***NEXT [COM04]***
0788 C4EF                  JMP      JMPR            ;RETR.
                 ;
                 ;
                 ;-------------------------------------------------SUB ROUTINE---
                 ;
                 ;                  [  04 COMMAND DISP END.  ]
                 ;
                 ;--------------------------------------------------------------
                 ;
078A B86C        R04ERS:   MOV      R0,#SAVDRP      ;
078C F0                    MOV      A,@R0           ;
078D B937                  MOV      R1,#DRMAPH      ;
078F 21                    XCH      A,@R1           ;
0790 A8                    MOV      R0,A            ;
                 ;
0791 FF                    MOV      A,R7            ;
0792 52A7                  JB2      TSUGIN          ;
                 ;
0794 F1                    MOV      A,@R1           ;
0795 D8                    XRL      A,R0            ;
0796 C6AE                  JZ       MADADE          ;
                 ;
0798 B867                  MOV      R0,#DEMAPH      ;
079A F0                    MOV      A,@R0           ;
079B F2AC                  JB7      TSUGI2          ;
                 ;
079D F1                    MOV      A,@R1           ;
079E 5307                  ANL      A,#07H          ;
07A0 4308                  ORL      A,#08H          ;
07A2 A8                    MOV      R0,A            ;
07A3 231E                  MOV      A,#30           ;
07A5 C4EF                  JMP      JMPR            ;
                 ;
07A7 53FB        TSUGIN:   ANL      A,#0FBH         ;
07A9 AF                    MOV      R7,A            ;
                 ;
07AA C4F2                  JMP      NTDRP           ;
07AC C4AF        TSUGI2:   JMP      DISEND          ;
                 ;
07AE E44F        MADADE:   JMP      MADAD2          ;
                 ;
                 ;
                 ;-------------------------------------------------SUB ROUTINE---
                 ;
                 ;                  [  CHANGING THE DEVICE MAP.  ]
                 ;
                 ;--------------------------------------------------------------
                 ;
                 ;||||||||||||||||||||||||||||||||||||||||||||||||||||||||||||||
                 ;|.............................................................
                 ;|              HEAD ADDRESS TABLE OF THE DEVICE MAP 1.
                 ;|.............................................................
                 ;|
07B0 38          ROMTI:    DB       DVM10           ;Drop #0 ( device map 1 ).
                 ;|
07B1 3D                    DB       DVM11           ;Drop #1 (      "       ).
                 ;|
07B2 42                    DB       DVM12           ;Drop #2 (      "       ).
                 ;|
07B3 47                    DB       DVM13           ;Drop #3 (      "       ).
                 ;|
07B4 4C                    DB       DVM14           ;Drop #4 (      "       ).
                 ;|
07B5 51                    DB       DVM15           ;Drop #5 (      "       ).
                 ;|
                 ;||||||||||||||||||||||||||||||||||||||||||||||||||||||||||||||
                 ;
07B6 B837        DEVCH:    MOV      R0,#DRMAPH      ;Device table head address set.
07B8 F0                    MOV      A,@R0           ;    ( for current drop #. )
07B9 5307                  ANL      A,#07H          ;
07BB 03B0                  ADD      A,#ROMTI        ;
07BD A3                    MOVP     A,@A            ;
                 ;
07BE A9                    MOV      R1,A            ;
07BF F1                    MOV      A,@R1           ;
```

```
07C0 72F8                    JB3     PUEND          ;Device polling map set or not ?
07C2 F9                      MOV     A,R1           ;Priority or round robin ?
07C3 0304                    ADD     A,#4H          ;
07C5 A8                      MOV     R0,A           ;
07C6 F0                      MOV     A,@R0          ;
07C7 72CE                    JB3     PRSET          ;
07C9 FF                      MOV     A,R7           ;Polling flag set.(round robin.)
07CA 53EF                    ANL     A,#0EFH        ;
07CC E4D1                    JMP     RPSETE         ;
                   ;
07CE FF            PRSET:    MOV     A,R7           ;Polling flag set.(priority poll.)
07CF 4310                    ORL     A,#10H         ;
07D1 AF            RPSETE:   MOV     R7,A           ;
                   ;
07D2 B85E                    MOV     R0,#DEMAP0     ;R0 = device map 2 pointer.
07D4 BA00                    MOV     R2,#0H         ;R2 = F.F flag.
                   ;
07D6 FA            DEVPS:    MOV     A,R2           ;
07D7 96DE                    JNZ     SWPAC          ;
07D9 BAFF                    MOV     R2,#0FFH       ;
07DB F1                      MOV     A,@R1          ;(  bit 0 - 3  )
07DC E4E3                    JMP     CONCT          ;
                   ;
07DE BA00          SWPAC:    MOV     R2,#0H         ;(  bit 4 - 7  )
07E0 F1                      MOV     A,@R1          ;
07E1 47                      SWAP    A              ;
07E2 19                      INC     R1
                   ;
07E3 530F          CONCT:    ANL     A,#0FH         ;map 2 <--- map 1.
07E5 A0                      MOV     @R0,A          ;
07E6 D30F                    XRL     A,#0FH         ;
07E8 C6F2                    JZ      DEVCE          ;Device end ?
07EA F8                      MOV     A,R0           ;
07EB D365                    XRL     A,#DEMAP7      ;Device map end ?
07ED C6F3                    JZ      DEVCE2         ;
07EF 18                      INC     R0             ;
07F0 E4D6                    JMP     DEVPS
                   ;
07F2 C8            DEVCE:    DEC     R0             ;
07F3 F0            DEVCE2:   MOV     A,@R0          ;
07F4 4380                    ORL     A,#80H         ;
07F6 A0                      MOV     @R0,A          ;
07F7 83                      RET                    ;
                   ;
07F8 B85E          PUEND:    MOV     R0,#DEMAP0     ;Device map 1 not set.
07FA B0FF                    MOV     @R0,#0FFH      ;
07FC 83                      RET                    ;
                   ;
                   ;
                   ;************************************** END ***********************

Errors=     0
```

APPENDIX C

HEWLETT-PACKARD: 8086 Assembler

SOURCE LINE

```
"8086
;
;***********************************************************************************
;
SEISAKU_DD:       EQU 01H          :
SEISAKU_MM:       EQU 12H          :
SEISAKU_YY:       EQU 58H          :
SEISAKU_VV:       EQU 2            : Version No.
;*****
;*****        <<<   TOSHINO_OS   >>>
;*****        <<< TOSHIBA  NO OS >>>
;*****        <<< TOSHI & INO OS >>>
;*****        <<< TOSHI    NO OS >>>
;*****            ==============
;*****                 <<< Data Format >
;*****              Adrs H  --- ( ECU Address H )
;*****              Adrs L  --- ( ECU Address L )
;*****              Data Length N
;*****              Data 1
;*****                .
;*****                .      ( Data F to Drop P  Command / Data )
;*****                .
;*****              Data N
;*****                ------ By  M.TANAKA & T.INOUE  ------
;*****
;*****
;*****    Function
;*****
;*****     (1) --- CCC & ECU Communication
;*****                 Echo Back
```

```
;*****              Forced Tuning / Off / Key
;*****              Send Function ( ALOHA )  Test
;*****
;*****      (2) --- Ram Back up
;*****
;*****      (3) --- Verification
;*****
;*****
;*****
;*****
;**************************************************************************
;$$$$$
;$$$$$          <<<  Bug List  >>>
;$$$$$
;$$$$$
;$$$$$
;$$$$$
;$$$$$
;$$$$$$$$$$$$$$$$$$$$$$$$$$$$$$$$$$$$$$$$$$$$$$$$$$$$$$$$$$$$$$$$$$$$$$$$$$
;
BIAS:           EQU 0000H
;
PROGRAMVERSION: EQU BIAS                      ; DS 4
RX_CRC_ERROR:   EQU BIAS+4                    ; DS 4
RX_CRC_OK_YO:   EQU BIAS+8                    ; DS 4
IBF_OVER_FLOW:  EQU BIAS+12                   ; DS 2
SCAN_MODE_FLAG: EQU BIAS+14                   ; DS 1
VIEW_CHANNEL:   EQU BIAS+16                   ; DS 8*2
PC_CODE:        EQU BIAS+32                   ; DS 8*2
EVENT_CHANNEL   EQU BIAS+48                   ; DS 8
;               EQU BIAS+56
VLF_ERROR_MAP:  EQU BIAS+128                  ; DS 128
PC_FC_LIST:     EQU BIAS+256                  ; DS 128
BASIC_AUTHO:    EQU BIAS+256+128              ; DS 128
                ;   BIAS+512
;
A200H:          EQU 200H
CH_NO_FREQ      EQU A200H      ; DS 256   FREQUENCY TABLE START FROM HERE
TIME_TABLE:     EQU A200H+100H          ; 8*8*2
JUMP_ADDRESS:   EQU A200H+180H          ; 8*8*2
NEXT_GO_ADRS:   EQU A200H+200H          ; 64*2
;                   --- 480H
TO_DROP:        EQU 0500H
TO_CCC:         EQU 0600H
;
DS2:            EQU 0700H
INDEX_RX_1:     EQU DS2+2*1
INDEX_TX_1:     EQU DS2+2*2
CTRL_1:         EQU DS2+2*3
CTRL_1_COUNT:   EQU DS2+2*4
INDEX_RX_2:     EQU DS2+2*5
INDEX_TX_2:     EQU DS2+2*6
CTRL_2:         EQU DS2+2*7
CTRL_2_COUNT:   EQU DS2+2*8
PAGE_SW:        EQU DS2+2*9
ECHO_BACK_FLAG: EQU DS2+2*10
REVERS_CHANEL:  EQU DS2+2*11
TX_BUSY_FLAG:   EQU DS2+2*12
BASE_POINT:     EQU DS2+2*13
INIT_POINT:     EQU DS2+2*14
BINARY_LED:     EQU DS2+2*15
ECHO_BACK_ADRS: EQU DS2+2*16

CONV_NO:        EQU DS2+2*18
DROP_NO:        EQU DS2+2*19
IC_BYTE:        EQU DS2+2*20
DEVICE_NO:      EQU DS2+2*21
ID_BYTE:        EQU DS2+2*22
CONV_NO_BIT:    EQU DS2+2*23
DROP_NO_BIT:    EQU DS2+2*24
DEVICE_NO_BIT:  EQU DS2+2*25

MUL_ADR         EQU DS2+2*29            ; DS 2     STORE #3
EXTRN_STAT      EQU DS2+2*30            ; DS 2
TEMP_R_CH       EQU DS2+2*31            ; DS 2

;                   740H
OBF_BF_N:       EQU DS2+2*32     :    0000  0000
OBF_BF_CMD:     EQU OBF_BF_N+1
OBF_BF_ID:      EQU OBF_BF_N+2
OBF_BF_BYTE:    EQU OBF_BF_N+3
CONV_SELECT:    EQU OBF_BF_N+16  : DS 8

;
DS1:            EQU 0780H
NOW_EVENT:      EQU DS1
BEFOR_EVENT:    EQU DS1+1
```

```
EVENT_ENABLE:     EQU DS1+2

LSB_LED:          EQU DS1+4
MSB_LED:          EQU DS1+5
HSB_LED:          EQU DS1+6
PPV_LED:          EQU DS1+7

KEY_DATA:         EQU DS1+9
ONE_SEC_TIMER:    EQU DS1+10
TUNER_D1:         EQU DS1+11
TUNER_D2:         EQU DS1+12
TUNER_CBL:        EQU DS1+13
UP_FLAG:          EQU DS1+14
DOWN_FLAG:        EQU DS1+15
PC_FC_EXIST:      EQU DS1+16
POWER_FEED:       EQU DS1+17
;


DS16:             EQU 800H
DROP_CMD_BF:      EQU DS16                          ; DS 16
SPU_CMD_BF:       EQU DS16+16*1                     ; DS 16
FROM_OBF_BF:      EQU DS16+16*2                     ; DS 16

SEND_ENABLE:      EQU DS16+16*3                     ; DS 1
SEND_ADDRESS:     EQU SEND_ENABLE+1                 ; DS 2
SEND_INDEX:       EQU SEND_ADDRESS+2                ; DS 1
SEND_CMD_RESP:    EQU SEND_ADDRESS+3                ; DS 1
SEND_DATA_BUFF:   EQU SEND_ADDRESS+4                ; DS 123

EVENT_NO_FREQ:    EQU 900H                          ; DS 256



;
;---------------------------------------
;
KEY_DATA_STACK:   EQU 1000H                         ; DS 16*64=1024
ECU_ADDRESS:      EQU KEY_DATA_STACK+16*64          ; DS 2
TX_LENGTH:        EQU ECU_ADDRESS+2                 ; DS 1
TX_COMMAND:       EQU ECU_ADDRESS+3                 ; DS 1
TX_BUFFER:        EQU ECU_ADDRESS+4                 ; DS 256


;
TIMER_COUNTER:    EQU 2000H-4
INDEX_HISTORY:    EQU 2000H-2
HISTORY_BUFFER:   EQU 2000H



;
PAGE_MEM:         EQU 3000H

STACK_END:        EQU 39FFH
STACK_TOP:        EQU 4000H
;
; ************  BACK_UP RAM Area  **********************************
;
ES_BACK_UP:       EQU 0          ; DS 512
ES_BACK_UP_1:     EQU 200H       ; DS 512
ES_BACK_UP_2:     EQU 400H       ; DS 512
;
ES_EVENT_TIMER:   EQU 600H       ; DS 128*6

;
; ************  Imediate Data  *************************************
;
MUL_NO            EQU            3
TIMER_OUT_CODE:   EQU 0
PLUS_KEY_CODE:    EQU 10H
EVENT_KEY_CODE:   EQU 11H
AUTHO_KEY_CODE:   EQU 12H
ONOFF_KEY_CODE:   EQU 13H
MINUS_KEY_CODE:   EQU 14H
SCAN_KEY_CODE:    EQU 15H
CLEAR_KEY_CODE:   EQU 16H
SEND_KEY_CODE:    EQU 17H
POWER_ON_CODE:    EQU 18H
POWER_OFF_CODE:   EQU 19H
RECENT_ON_CODE:   EQU 1AH
RELEASE_CODE:     EQU 1BH
KEY_PUSH_CODE:    EQU 1CH
;
ASCII_ER:         EQU 4572H
ASCII_AU:         EQU 4155H
ASCII_SC:         EQU 5343H
ASCII_FC:         EQU 4643H
ASCII_PC:         EQU 5043H
ASCII_CL:         EQU 434CH
ASCII_SE:         EQU 5345H
ASCII_AD:         EQU 4164H
```

```
            ASCII_DE:          EQU 6445H
            ASCII_NU:          EQU 0D49CH
            ASCII_NO:          EQU 0D4DCH
            ASCII_CO:          EQU 43DCH
            ASCII_PR:          EQU 5072H
            ;
            PUSH_ALL:          EQU 60H
            POP_ALL:           EQU 61H
            ;
            SEND_MAX:          EQU 64*2
            ;
            ; -------------------------------------------------------------
            ; ************  I / O  Port  **********************************
            ; -------------------------------------------------------------
            ;
            DROP_CMD_PORT:   EQU 082H
            DROP_DATA_PORT:  EQU 080H
            ECU_H_ADDRESS:   EQU 0102H
            ECU_L_ADDRESS:   EQU 0100H
            INT_OFST         EQU               0A0H+(5*4)
            INT1OFST         EQU               52
            INT3OFST         EQU               60
            TIMER1_OFST      EQU               72
            ACHD             EQU               00
            ACHC             EQU               04
            BCHD             EQU               02
            BCHC             EQU               06
            ;---------------CS     SET------------------------------
            ;
            ;                INITIAL SET UP IAPX186
            ;
            ;--------------------------------------------------------
                             ORG               0000H
0000 FA     RUN:             CLI
                             ;LCS SET UP       16KB
0001 B8A2FF                  MOV               AX,0FFA2H
0004 92                      XCHG              DX,AX
0005 B8F800                  MOV               AX,00F8H
0008 EF                      OUT               DX,AX
                             ;PCS SET UP FROM 0000H AT I/O MAPPED
0009 B8A4FF                  MOV               AX,0FFA4H
000C 92                      XCHG              DX,AX
000D B83F00                  MOV               AX,003FH             ;3-WAITES INSERTED
0010 EF                      OUT               DX,AX
0011 B8A8FF                  MOV               AX,0FFA8H
0014 92                      XCHG              DX,AX
0015 B83C88                  MOV               AX,883CH
0018 EF                      OUT               DX,AX
                             ;MCS SET UP 04000H
0019 BAA6FF                  MOV               DX,0FFA6H
001C B8FC21                  MOV               AX,21FCH
001F EF                      OUT               DX,AX
            ;
0020 B80020                  MOV               AX,2000H
0023 8ED8                    MOV               DS,AX
            ;
            ;
0025 BB0000 RAM_CLEAR:       MOV BX,BIAS
0028 B80000                  MOV AX,0
002B 8907   RAM_CLEAR_LP:    MOV [BX],AX
002D 83C302                  ADD BX,2
0030 81FB0040                CMP BX,4000H
0034 72F5                    JC RAM_CLEAR_LP
            ;
            ;
            ;-------------JUMP TABLE WRITE-------------------
0036 B80000                  MOV               AX,0
0039 8ED8                    MOV               DS,AX
            ;--------------INT1 ADDR.-------------------------------
003B BB3400                  MOV               BX,INT1OFST
003E C7070002                MOV               WORD PTR [BX],200H
0042 C7470200FE              MOV               WORD PTR [BX+2],0FE00H
            ;--------------INT3 ADDR. ------------------------------
0047 BB3C00                  MOV               BX,INT3OFST
004A C7070003                MOV               WORD PTR [BX],300H
004E C7470200FE              MOV               WORD PTR [BX+2],0FE00H
            ;--------------INT0 ADDR. /CASCADED WITH INT2/INTA0/----
0053 BB8400                  MOV               BX,INT_OFST
0056 C7070004                MOV               WORD PTR [BX],400H
005A C7470200FE              MOV               WORD PTR [BX+2],0FE00H
005F C747040005              MOV               WORD PTR [BX+4],500H
0064 C7470600FE              MOV               WORD PTR [BX+6],0FE00H
0069 C747080006              MOV               WORD PTR [BX+8],600H
006E C7470A00FE              MOV               WORD PTR [BX+10],0FE00H
            ;--------------TIMER 1 INTR. ADDR.----------------------
0073 BB4800                  MOV               BX,TIMER1_OFST
0076 C7070007                MOV               WORD PTR [BX],700H
007A C7470200FE              MOV               WORD PTR [BX+2],0FE00H
```

```
                 ;--------------SET UP TIMER------------------------
                 ;
                 ;
007F B80020               MOV        AX,2000H
0082 8ED8                 MOV        DS,AX
0084 8ED0                 MOV        SS,AX
                 ;----------------50KHz SQUARE WAVE----------------------
0086 BA52FF               MOV        DX,0FF52H
0089 B80F00               MOV        AX,15
008C EF                   OUT        DX,AX
008D BA54FF               MOV        DX,0FF54H
0090 B80F00               MOV        AX,15
0093 EF                   OUT        DX,AX
0094 BA56FF               MOV        DX,0FF56H
0097 B803C0               MOV        AX,0C003H
009A EF                   OUT        DX,AX
                 ;--------------INITIAL SET UP OF DMA CH.0:RX TRANS---
                 ;--------------SOURCE POINTER------------------
009B B80000               MOV        AX,ACHD
009E BAC0FF               MOV        DX,0FFC0H
00A1 EF                   OUT        DX,AX
00A2 B000                 MOV        AL,0
00A4 BAC2FF               MOV        DX,0FFC2H
00A7 EF                   OUT        DX,AX
                 ;----------------INITIAL SET UP OF DMA CH.1;TX TRANS--
                 ;---------------DESTINATION POINTER-----------
00A8 B80000               MOV        AX,ACHD
00AB BAD4FF               MOV        DX,0FFD4H
00AE EF                   OUT        DX,AX
00AF B000                 MOV        AL,0
00B1 BAD6FF               MOV        DX,0FFD6H
00B4 EE                   OUT        DX,AL
                 ;--------------STACK SET UP-----------------------
00B5 BCF03F               MOV        SP,3FF0H
                 ;----------------INITIAL SET UP OF 8274-----------
00B8 B018                 MOV        AL,00011000B     ;CH.RESET
00BA E604                 OUT        ACHC,AL
                 ;--PTR 2A--
00BC BB0231               MOV        BX,0011000100000010B
00BF BA0400               MOV        DX,ACHC
00C2 E87E01               CALL       SETCOM
                 ;--PTR 2B--
00C5 BB0228               MOV        BX,0010100000000010B
00C8 BA0600               MOV        DX,BCHC
00CB E87501               CALL       SETCOM
                 ;--PTR 4A--
00CE BB0420               MOV        BX,0010000000000100B
00D1 BA0400               MOV        DX,ACHC
00D4 E86C01               CALL       SETCOM
                 ;--PTR 4B--
00D7 BB0420               MOV        BX,0010000000000100B
00DA BA0600               MOV        DX,BCHC
00DD E86301               CALL       SETCOM
                 ;--PTR 7A--
00E0 BB077E               MOV        BX,0111111000000111B
00E3 BA0400               MOV        DX,ACHC
00E6 E85A01               CALL       SETCOM
                 ;--PTR 1B--
00E9 BB010C               MOV        BX,0000110000000001B
00EC BA0600               MOV        DX,BCHC
00EF E85101               CALL       SETCOM
                 ;==================RX INIT=========================
00F2 B010                 MOV        AL,00010000B
00F4 E604                 OUT        ACHC,AL
                 ;--PTR 1A--
00F6 BB012C               MOV        BX,0010110000000001B
00F9 BA0400               MOV        DX,ACHC
00FC E84401               CALL       SETCOM
                 ;--PTR 5A--
00FF BB05E2               MOV        BX,1110001000000101B
0102 BA0400               MOV        DX,ACHC
0105 E83B01               CALL       SETCOM
                 ;--RTS OFF--
0108 BB05E2               MOV        BX,1110001000000101B
010B BA0400               MOV        DX,ACHC
010E E83201               CALL       SETCOM
                 ;-----------------------------------------------------------------
                 ;-----------INITIAL SET UP OF INT0,INT1,INT3,UNMASK----------------
                 ;--INT0---
0111 B82800               MOV        AX,28H           ;LEVEL=0,EDGE TRIGGER,MASK,CASCAD
0114 BA38FF               MOV        DX,0FF38H
0117 EF                   OUT        DX,AX
                 ;--INT1---
0118 B81A00               MOV        AX,1AH           ;LEVEL=1,LEVEL TRIGGER,MASK
011B BA3AFF               MOV        DX,0FF3AH
011E EF                   OUT        DX,AX
                 ;--INT3---
011F B81900               MOV        AX,19H           ;LEVEL=2,LEVEL TRIGGER,MASK
0122 BA3EFF               MOV        DX,0FF3EH
0125 EF                   OUT        DX,AX
                 ;--TIMER1 INTR.--
0126 B80B00               MOV        AX,1011B         ;LEVEL=3,MASK
0129 BA32FF               MOV        DX,0FF32H
012C EF                   OUT        DX,AX
```

```
                    ;
                    ;------------------------------------------------------------
                    ;
                    ;                   Initialize
                    ;
                    ;------------------------------------------------------------
                    ;
012D B80000         MAIN_START:         MOV AX,0
                    ;
0130 BB0005                             MOV BX,TO_DROP
0133 891E0207                           MOV [INDEX_RX_1],BX
0137 891E0407                           MOV [INDEX_TX_1],BX
013B A23E07                             MOV BYTE PTR [TEMP_R_CH],AL
013E A21807                             MOV [TX_BUSY_FLAG],AL
0141 A22407                             MOV [CONV_NO],AL
0144 A29107                             MOV [POWER_FEED],AL
                    ;
0147 A35007                             MOV [CONV_SELECT],AX
014A A35207                             MOV [CONV_SELECT+2],AX
014D A35407                             MOV [CONV_SELECT+4],AX
0150 A35607                             MOV [CONV_SELECT+6],AX
                    ;
0153 BB0006                             MOV BX,TO_CCC
0156 891E0C07                           MOV [INDEX_TX_2],BX
015A 891E0A07                           MOV [INDEX_RX_2],BX
                    ;
015E A20607                             MOV [CTRL_1],AL
0161 A20807                             MOV [CTRL_1_COUNT],AL
0164 A20E07                             MOV [CTRL_2],AL
0167 A24007                             MOV [OBF_BF_N],AL
016A A31407                             MOV [ECHO_BACK_FLAG],AX
016D A31607                             MOV [REVERS_CHANEL],AX
                    ;
0170 B80030                             MOV AX,PAGE_MEM
0173 A31207                             MOV [PAGE_SW],AX
                    ;
0176 BB4107                             MOV BX,OBF_BF_CMD
0179 891E1007                           MOV [CTRL_2_COUNT],BX
                    ;
017D B00A                               MOV AL,10
017F A23A07                             MOV [ONE_SEC_TIMER],AL
                    ;
0182 B80020                             MOV AX,HISTORY_BUFFER
0185 A3FE1F                             MOV [INDEX_HISTORY],AX
0188 E88205                             CALL ECU_ADPS_READ
                    ;
018B E8D605                             CALL INIT_AUTHO_TBL           ;*
018E E8F305                             CALL INIT_VIEW_TBL            ;*
0191 E84B06                             CALL INIT_CODE                ;*
0194 B03F                               MOV AL,3FH                    ;*
0196 A20E00                             MOV [SCAN_MODE_FLAG],AL       ;*

0199 E85606                             CALL            FREQ_CALC
019C E8D306                             CALL CHANNEL_HOSEI
019F E8FC05                             CALL EVENT_DATA_CL
01A2 E88705                             CALL INIT_EV_TIMER
                    ;
                    ;============================================
                    ;
01A5 BB0004                             MOV BX,ES_BACK_UP_2
01A8 26813FA5A5                         CMP WORD PTR ES:[BX],0A5A5H
01AD 740A                               JZ BACK_UP_KAI
01AF BB0002                             MOV BX,ES_BACK_UP_1
01B2 26813FA5A5                         CMP WORD PTR ES:[BX],0A5A5H
01B7 7542                               JNZ BACK_UP_EXIT
01B9 8BF3           BACK_UP_KAI:        MOV SI,BX
01BB B8FC01                             MOV AX,508
01BE B90000                             MOV CX,0
01C1 26326F04       BACK_UP_CK1:        XOR CH,ES:[BX+4]
01C5 26024F04                           ADD CL,ES:[BX+4]
01C9 43                                 INC BX
01CA 48                                 DEC AX
01CB 75F4                               JNZ BACK_UP_CK1
                    ;
01CD 263A6C02                           CMP CH,ES:[SI+2]
01D1 7528                               JNZ BACK_UP_EXIT
01D3 263A4C03                           CMP CL,ES:[SI+3]
01D7 7521                               JNZ BACK_UP_NONE
```

```
                 ;
01D9 8BDE        BACK_UP_YES:    MOV BX,SI
01DB 81F30002                    XOR BX,ES_BACK_UP_1
01DF 81F30004                    XOR BX,ES_BACK_UP_2
01E3 891EFC1F                    MOV [TIMER_COUNTER],BX
                 ;
01E7 B80002                      MOV AX,512
01EA BB0000                      MOV BX,PROGRAMVERSION
01ED 268A0C      BACK_UP_CK2:    MOV CL,ES:[SI]
01F0 880F                        MOV [BX],CL
01F2 43                          INC BX
01F3 46                          INC SI
01F4 48                          DEC AX
01F5 75F6                        JNZ BACK_UP_CK2
01F7 E90100                      JMP BACK_UP_EXIT
                 ;
01FA 90          BACK_UP_NONE:   NOP
                 ;
01FB E81D05      BACK_UP_EXIT:   CALL INIT_TIM_TBL          ;;
01FE E83D05                      CALL INIT_JUMP_TBL         ;;
                 ;
0201 BE0000                      MOV SI,PROGRAMVERSION
0204 C60458                      MOV BYTE PTR [SI],SEISAKU_YY
0207 C6440112                    MOV BYTE PTR [SI+1],SEISAKU_MM
020B C6440201                    MOV BYTE PTR [SI+2],SEISAKU_DD
020F C6440302                    MOV BYTE PTR [SI+3],SEISAKU_VV
                 ;
                 ;==============================================
0213 B840A0                      MOV            AX,0A040H
0216 BACAFF                      MOV            DX,0FFCAH
0219 EF                          OUT            DX,AX
                 ;               IN             AL,ACHC
                 ;               AND            AL,01011111B
021A B07F                        MOV            AL,01111111B
021C BB3C07                      MOV            BX,EXTRN_STAT
021F 8807                        MOV            BYTE PTR [BX],AL
                 ;--UNMASK--INTR's------------------------
0221 B84C00                      MOV          AX,01001100B     ;NOW UNMASK INT0,INT1,INT3,TIMER1_I
0224 BA28FF                      MOV            DX,0FF28H
0227 EF                          OUT            DX,AX
                 ;''''''''''''''''''''''''''''''''''''''''
                 ;--------------RX. ENABLE------------------------------
0228 BB03D9                      MOV            BX,1101100100000011B
022B BA0400                      MOV            DX,ACHC
022E E81200                      CALL           SETCOM
                 ;===================MAIN INITITIALIZE TIMER2========
0231 B80008                      MOV            AX,00800H
0234 BA62FF                      MOV            DX,0FF62H
0237 EF                          OUT            DX,AX
0238 B891C0                      MOV            AX,1100000000000001B
023B BA66FF                      MOV            DX,0FF66H
023E EF                          OUT            DX,AX
                 ;-------------------------------------------------------
023F FB                          STI
                 ;
0240 E98D00                      JMP HAJIMERUYO
                 ;
                 ;=========================================================================
                 ;---------------SETCOM for 8274-----------
0243 8AC3        SETCOM:         MOV            AL,BL
0245 EE                          OUT            DX,AL
0246 8AC7                        MOV            AL,BH
0248 EE                          OUT            DX,AL
0249 C3                          RET
                 ;---------------------------------------------------------------------
                 ;-------------PTR 1A-------------
024A B001        HDLC_TX_START:  MOV            AL,00000001B
024C E604                        OUT            ACHC,AL
024E B00F                        MOV            AL,00001111B
0250 E604                        OUT            ACHC,AL
                 ;---------------REVERSE CH.SELECT----
0252 B005                        MOV            AL,00000101B
0254 E604                        OUT            ACHC,AL
0256 A01607                      MOV            AL,BYTE PTR [REVERS_CHANEL]
0259 A23E07                      MOV            BYTE PTR [TEMP_R_CH],AL
025C 8AE0                        MOV            AH,AL
025E 2401                        AND            AL,00000001B
0260 F8                          CLC
0261 D0C0                        ROL            AL
0263 0C60                        OR             AL,01100000B
0265 E604                        OUT            ACHC,AL
0267 B005                        MOV            AL,00000101B
0269 E606                        OUT            BCHC,AL
026B 8AC4                        MOV            AL,AH
026D 2402                        AND            AL,00000010B
026F 0CE0                        OR             AL,11100000B
0271 E606                        OUT            BCHC,AL
                 ;-------------PTR 5A-----------------
                 ;               MOV            AL,00000101B
                 ;               OUT            ACHC,AL
                 ;               MOV            AL,01100000B
                 ;               OUT            ACHC,AL
```

```
0273 E85300                 CALL        WAIT        ;RTS HOLD 12ms UNTIL Tx.ENAE
0276 E85000                 CALL        WAIT
0279 E84D00                 CALL        WAIT
027C E84A00                 CALL        WAIT
027F E84700                 CALL        WAIT
0282 E84400                 CALL        WAIT
0285 E84100                 CALL        WAIT
0288 E83E00                 CALL        WAIT
         ;-------------PTR 5A-------------
028B B005                   MOV         AL,00000101B
028D E604                   OUT         ACHC,AL
028F A03E07                 MOV         AL,BYTE PTR [TEMP_R_CH]
0292 2401                   AND         AL,00000001B
0294 F8                     CLC
0295 D0C0                   ROL         AL
0297 0C69                   OR          AL,01101001B
0299 E604                   OUT         ACHC,AL
         ;--------------------RTS ON----------------

029B B080                   MOV         AL,10000000B
029D E604                   OUT         ACHC,AL
         ;-----------INITIAL SET UP OF DMA,CH.1:TX TRANS
         ;-----------SOURCE POINTER SET---------------------------------
         ;-------------DESTINATION POINTER SET--------------------------
029F 8BC6                   MOV         AX,SI           ;SOURCE ADR.
02A1 40                     INC         AX
02A2 BAD0FF                 MOV         DX,0FFD0H
02A5 EF                     OUT         DX,AX
02A6 B002                   MOV         AL,02H
02A8 BAD2FF                 MOV         DX,0FFD2H
02AB EE                     OUT         DX,AL
02AC 8AC1                   MOV         AL,CL           ;TRANSFER COUNT
02AE B400                   MOV         AH,0
02B0 BAD8FF                 MOV         DX,0FFD8H
02B3 EF                     OUT         DX,AX
         ;---------------TRANSFER COUNT------------------------------------
         ;------------------CONTROL WORD SET---------------------
02B4 BADAFF                 MOV         DX,0FFDAH
02B7 B88616                 MOV         AX,01686H
02BA EF                     OUT         DX,AX           ;DMA GO !
         ;-------------WAIT ROUTINE----------------------------
02BB E80B00                 CALL        WAIT
         ;-------------FIRST BYTE OUTPUT-------
02BE 8BDE                   MOV         BX,SI           ;SOURCE ADR.
02C0 8A07                   MOV         AL,[BX]
02C2 E600                   OUT         ACHD,AL
         ;
02C4 B0C0                   MOV         AL,11000000B
02C6 E604                   OUT         ACHC,AL
02C8 C3                     RET
         ;==============WAIT============
02C9 BB0000      WAIT:      MOV         BX,0
02CC 43          WAIT1:     INC         BX
02CD 81FBFF00               CMP         BX,0FFH
02D1 75F9                   JNE         WAIT1
02D3 C3                     RET
         ;---------------INTR 3------------------------------------
                            ORG         06300H
         ;00000             CLI
         ;
         ; ------------------------------------------------------------------
         ; ************  OBF Interrupt Operation  ************************
         ; ------------------------------------------------------------------
         ;
6300 9C          OBF_INTERRUPT:  PUSHF                     ;PUSH ALL
6301 60                     DB 60H
6302 E480                   IN AL,DROP_DATA_PORT
         ;
6304 8B361007               MOV SI,[CTRL_2_COUNT]
6308 8804                   MOV [SI],AL                    ; Data Store
```

```
630A 46                        INC SI
6308 89361007                  MOV [CTRL_2_COUNT],SI          ;     Pointer Increment
                  ;
630F BE4007                    MOV SI,OBF_BF_N
6312 FE064007                  INC BYTE PTR [OBF_BF_N]        ;     Data Length Increment
6316 8A0E4007                  MOV CL,[OBF_BF_N]
631A 8A6401                    MOV AH,[SI+1]                  ; AH = Command Byte
                  ;
631D 80F901                    CMP CL,1
6320 750F                      JNZ RESPONSE_2
6322 B001                      MOV AL,1                       ; 1 Byte Response
6324 80FC00                    CMP AH,0                       ;   [ 00 ] [ 07 ]
6327 7429                      JZ RESPONSE_CHK
6329 80FC07                    CMP AH,7
632C 7424                      JZ RESPONSE_CHK
632E E98200       OBF_RET_1    JMP OBF_RET
                  ;
6331 80F902       RESPONSE_2:  CMP CL,2
6334 72F8                      JC OBF_RET_1
                  ;
6336 B002                      MOV AL,2                       ; 2 Bute Tesponse
6338 80FC04                    CMP AH,34H               ;  [ 01 ] [ 02 ] [ 03 ] [ 05 ] [ 06 ] [ 03
633B 7405                      JZ RESPONSE_VAL                : Valiable Length
633D 80FC04                    CMP AH,4                       ;   [ 04 ] [ 84 ]
6340 7510                      JNZ RESPONSE_CHK
                  ;
6342 80F904       RESPONSE_VAL: CMP CL,4                      ; [ 04 ][ 08 ] > 4
6345 726C                      JC OBF_RET
6347 8A4403                    MOV AL,[SI+3]                  ;     Byte Length Load
634A 0403                      ADD AL,3
634C 3C03                      CMP AL,3
634E 7502                      JNZ RESPONSE_CHK
6350 FEC0                      INC AL                         ; [04][84] Error Response
                  ;
6352 3AC8         RESPONSE_CHK: CMP CL,AL
6354 725D                      JC OBF_RET
                  ;
6356 8B5401       OBF_PACKET:  MOV DX,[SI+1]
6359 80CA40                    OR DL,40H                      ; 8742 ---> 80186 Then OR 40H
635C 8B1EFE1F                  MOV BX,[INDEX_HISTORY]
6360 8917                      MOV [BX],DX
6362 8B5403                    MOV DX,[SI+3]
6365 895702                    MOV [BX+2],DX
6368 8B5405                    MOV DX,[SI+5]
636B 895704                    MOV [BX+4],DX
636E 8B16FC1F                  MOV DX,[TIMER_COUNTER]
6372 895706                    MOV [BX+6],DX
6375 83C308                    ADD BX,8
6378 81FB0030                  CMP BX,PAGE_MEM
637C 7203                      JC OBF_MEMO
637E BB0020                    MOV BX,HISTORY_BUFFER
6381 891EFE1F     OBF_MEMO:    MOV [INDEX_HISTORY],BX
                  ;
6385 8A260E07                  MOV AH,[CTRL_2]
6389 80FC28                    CMP AH,40
638C 731C                      JNC OBF_NEW
                  ;
638E 8B1E0A07                  MOV BX,[INDEX_RX_2]
6392 8807                      MOV [BX],AL
6394 FEC3                      INC BL
6396 8A6401       RESPONSE_TRNS: MOV AH,[SI+1]
6399 8827                      MOV [BX],AH
639B 46                        INC SI
639C FEC3                      INC BL
639E FEC8                      DEC AL
63A0 75F4                      JNZ RESPONSE_TRNS
                  ;
63A2 FE060E07                  INC BYTE PTR [CTRL_2]
63A6 891E0A07                  MOV [INDEX_RX_2],BX
                  ;
63AA A24007       OBF_NEW:     MOV [OBF_BF_N],AL              ; [OBF_BF_N] = 0
63AD B84107                    MOV AX,OBF_BF_CMD
63B0 A31007                    MOV [CTRL_2_COUNT],AX          ; [CTRL_2_COUNT] = OBF_BF_CM
                  ;
63B3 B80F00       OBF_RET:     MOV          AX,15
63B6 BA22FF                    MOV          DX,0FF22H
63B9 EF                        OUT          DX,AX
63BA 61                        DB           61H               ;POP ALL
63BB 9D                        POPF
63BC FB                        STI
63BD CF                        IRET
                  ;----------------INTR 1----------------------------------
                               ORG          06200H
                  ;00000000     CLI
                  ;
                  ; ----------------------------------------------------------------
                  ; ************  Drop Processor  IBF  Operation  ****************
                  ; ----------------------------------------------------------------
                  ;
6200 9C           IBF_INTERRUPT: PUSHF
6201 60                        DB 60H
6202 8B1E0407                  MOV BX,[INDEX_TX_1]
6206 8A0E0607                  MOV CL,[CTRL_1]
620A 8A260807                  MOV AH,[CTRL_1_COUNT]
620E 80FC00                    CMP AH,0
6211 756C                      JNZ IBF_2ND
                  ;
6213 80F900       IBF_1ST:     CMP CL,0
6216 750A                      JNZ IBF_EXIST
                  ;------------MASK IBF/ INTR.
6218 B81A00       IBF_EMPTY:   MOV          AX,1AH
621B BA3AFF                    MOV          DX,0FF3AH
```

```
621E EF                                  OUT             DX,AX
621F E97500                              JMP             IBF_RET
                       ;
6222 8A27              IBF_EXIST:        MOV AH,[BX]
6224 FEC3                                INC BL
6226 8A07                                MOV AL,[BX]
6228 E682                                OUT DROP_CMD_PORT,AL
                       ;
622A FEC3                                INC BL
622C 891E0407                            MOV [INDEX_TX_1],BX
6230 FECC                                DEC AH
6232 88260807                            MOV [CTRL_1_COUNT],AH
6236 7506                                JNZ IBF_PACKET
6238 FEC9                                DEC CL
623A 880E0607                            MOV [CTRL_1],CL
                       ;
623E 8B36FE1F          IBF_PACKET:       MOV SI,[INDEX_HISTORY]
6242 8804                                MOV [SI],AL      ;
6244 8A07                                MOV AL,[BX]
6246 884401                              MOV [SI+1],AL    ;
6249 FEC3                                INC BL
624B 8A07                                MOV AL,[BX]
624D 884402                              MOV [SI+2],AL    ;
6250 FEC3                                INC BL
6252 8A07                                MOV AL,[BX]
6254 884403                              MOV [SI+3],AL    ;
6257 FEC3                                INC BL
6259 8A07                                MOV AL,[BX]
625B 884404                              MOV [SI+4],AL    ;
625E FEC3                                INC BL
6260 8A07                                MOV AL,[BX]
6262 884405                              MOV [SI+5],AL    ;
6265 8B16FC1F                            MOV DX,[TIMER_COUNTER]
6269 895406                              MOV [SI+6],DX
626C 83C608                              ADD SI,8
626F 81FE0030                            CMP SI,PAGE_MEM
6273 7203                                JC IBF_MEMO
6275 BE0020                              MOV SI,HISTORY_BUFFER
6278 8936FE1F          IBF_MEMO:         MOV [INDEX_HISTORY],SI
627C E91800                              JMP IBF_RET
                       ;
627F 8A07              IBF_2ND:          MOV AL,[BX]
6281 E680                                OUT DROP_DATA_PORT,AL
6283 FEC3              IBF_SET:          INC BL
6285 891E0407                            MOV [INDEX_TX_1],BX
6289 FECC                                DEC AH
628B 88260807                            MOV [CTRL_1_COUNT],AH
628F 7506                                JNZ IBF_RET
6291 FEC9                                DEC CL
6293 880E0607                            MOV [CTRL_1],CL
                       ;
                       ;
                       ;--------IN_SERVICE LATCH RESET
6297 B80D00            IBF_RET:          MOV             AX,13
629A BA22FF                              MOV             DX,0FF22H
629D EF                                  OUT             DX,AX
629E 61                                  DB              61H
629F 9D                                  POPF
62A0 FB                                  STI
62A1 CF                                  IRET
                       ;

                       ;---------------INTR 0-----------------------------------
                       ;--------------External status Intr.---------------------
                                         ORG             06400H
                       ;@@@@@@            CLI
6400 9C                                  PUSHF
6401 60                                  DB              60H
6402 E404                                IN              AL,ACHC
                       ;`````````````NEW VERSION`````````````
6404 8AC8                                MOV             CL,AL
6406 B010                                MOV             AL,00010000B
6408 E604                                OUT             ACHC,AL
640A E404                                IN              AL,ACHC
640C 8AE8                                MOV             CH,AL
640E A03C07                              MOV             AL,BYTE PTR [EXTRN_STAT]
6411 8AD0                                MOV             DL,AL
6413 8AC5                                MOV             AL,CH
6415 D0C0                                ROL             AL
6417 D0C0                                ROL             AL
6419 D0C0                                ROL             AL
641B 7207                                JC              LOY
641D 8AC1                                MOV             AL,CL
641F 24DF                                AND             AL,11011111B
6421 E90700                              JMP LOZ
                       ;`````````````````
6424 8AC1              LOY:              MOV             AL,CL
6426 0C20                                OR              AL,00100000B
6428 E90000                              JMP             LOZ
642B A23C07            LOZ:              MOV             BYTE PTR [EXTRN_STAT],AL
642E 8AC2                                MOV             AL,DL
6430 2410                                AND             AL,00010000B
```

```
6432 8AE0                    MOV         AH,AL
6434 8AC1                    MOV         AL,CL
6436 2410                    AND         AL,00010000B
6438 3AE0                    CMP         AH,AL
643A 753A                    JNZ         EXIT
643C 8AC2                    MOV         AL,DL
643E 2420                    AND         AL,00100000B
6440 8AE0                    MOV         AH,AL
6442 8AC5                    MOV         AL,CH
6444 2420                    AND         AL,00100000B
6446 3AE0                    CMP         AH,AL
6448 8AC2                    MOV         AL,DL
644A 2480                    AND         AL,10000000B
644C 8AE1                    MOV         AH,CL
644E 80E480                  AND         AH,10000000B
6451 32E0                    XOR         AH,AL
6453 7521                    JNZ         EXIT
6455 8AC1       TX_UNDRN:    MOV         AL,CL
6457 2444                    AND         AL,01000100B
6459 3C40                    CMP         AL,01000000B
645B 7519                    JNE         EXIT              :NOT TX.UNDERRUN
645D B028                    MOV         AL,00101000B
645F E604                    OUT         ACHC,AL
6461 B8100E                  MOV         AX,3600
6464 BA5AFF                  MOV         DX,0FF5AH
6467 EF                      OUT         DX,AX
6468 B801E0                  MOV         AX,1110000000000001B
646B BA5EFF                  MOV         DX,0FF5EH
646E EF                      OUT         DX,AX
646F B80300                  MOV         AX,0011B
6472 BA32FF                  MOV         DX,0FF32H
6475 EF                      OUT         DX,AX
                ;
                ;XIT:         MOV         AL,00010000B
                ;             OUT         ACHC,AL
6476 B038       EXIT:        MOV         AL,00111000B
6478 E604                    OUT         ACHC,AL
647A B80C00                  MOV         AX,12
647D BA22FF                  MOV         DX,0FF22H
6480 EF                      OUT         DX,AX
                ;
6481 B80000                  MOV AX,0
6484 A21807                  MOV [TX_BUSY_FLAG],AL
6487 A31407                  MOV [ECHO_BACK_FLAG],AX
648A 61                      DB          61H
648B 9D                      POPF
648C FB                      STI
648D CF                      IRET

                ;---------------INTR 0-----------------------------------
                             ORG         06500H
                ;0000000      CLI
                ;--------------------------------------------------------------------
                ;---------------FIRST RX. INT SHORT------------------------------------
6500 9C                      PUSHF
6501 60                      DB          60H
6502 8B1E1207                MOV         BX,WORD PTR [PAGE_SW]
                ;
6506 E400       HON:         IN          AL,ACHD       :1ST DATA INPUT
6508 8807                    MOV         [BX],AL
650A 43                      INC         BX
650B 8BC3                    MOV         AX,BX
650D BAC4FF                  MOV         DX,0FFC4H
6510 EF                      OUT         DX,AX
6511 B002                    MOV         AL,02H
6513 BAC6FF                  MOV         DX,0FFC6H
6516 EF                      OUT         DX,AX
6517 B8FF00                  MOV         AX,255
651A BAC8FF                  MOV         DX,0FFC8H
651D EF                      OUT         DX,AX
651E B846A2                  MOV         AX,0A246H     ;DMA START
6521 BACAFF                  MOV         DX,0FFCAH
6524 EF                      OUT         DX,AX
                ;------------IN SERV. LATCH RESET--------
6525 B038                    MOV         AL,00111000B
6527 E604                    OUT         ACHC,AL
```

```
6529 B80C00                          MOV            AX,12
652C BA22FF                          MOV            DX,0FF22H
652F EF                              OUT            DX,AX
6530 61                              DB             61H
6531 9D                              POPF
6532 FB                              STI
6533 CF                              IRET




     ;----------------INTR 0-------------------------------------
     ;----------------Special Rx. intr.--------------------------------
                                     ORG            06600H
     ;000000                         CLI
     ;
     ; ------------------------------------------------------------------
     ; ************ HDLC Rx Interrupt Operation ********************
     ; ------------------------------------------------------------------
     ;
6600 9C              RX_INTERRUPT:   PUSHF
6601 60                              DB 60H
6602 E86400          RX_RCV:         CALL RX_RECEIVE
6605 7256                            JC RX_CRC_ERR                     ; CRC Error
6607 83060A0001                      ADD WORD PTR [RX_CRC_OK_YO+2],1
660C 8316080000                      ADC WORD PTR [RX_CRC_OK_YO],0
6611 8B361207                        MOV SI,[PAGE_SW]
     ;
6615 8B1C                            MOV BX,[SI]                       ; BX = Receive Address
6617 3B1E0014                        CMP BX,[ECU_ADDRESS]
661B 7419                            JZ MY_ADRS
661D 81FBFFFF                        CMP BX,0FFFFH
6621 7413                            JZ MY_ADRS                        ; Global Address
6623 83FB00                          CMP BX,0
6626 751E                            JNZ RX_RET
                                                                       ; SI --- ECU-H Address
6628 A10014          ALOHA_CHECK:    MOV AX,[ECU_ADDRESS]              ; +1        L
662B 234403                          AND AX,[SI+3]                     ; +2    Tx Length
662E 3B4405                          CMP AX,[SI+5]                     ; +3    MASK H Address
6631 7513                            JNZ RX_RET                        ; +4        L
                                                                       ; +5    Ref. H Address
                                                                       ; +6        L
                                                                       ; +7    Real Tx Length
                                                                       ;
6633 83C605          MY_ALOHA:       ADD SI,5                          ; Aloha Address
     ;
6636 89361407        MY_ADRS:        MOV [ECHO_BACK_FLAG],SI           ; ECHO Back Buffer Address
     ;
663A 81C60001                        ADD            SI,100H
663E 81E60033                        AND            SI,3300H
6642 89361207                        MOV            WORD PTR [PAGE_SW],SI
     ;
6646 B038            RX_RET:         MOV            AL,00111000B
6648 E604                            OUT            ACHC,AL
     ;-------------------------
664A B80C00                          MOV            AX,12
664D BA22FF                          MOV            DX,0FF22H
6650 EF                              OUT            DX,AX
6651 B001                            MOV            AL,00000001B
6653 E604                            OUT            ACHC,AL
6655 B00F                            MOV            AL,00001111B
6657 E604                            OUT            ACHC,AL
6659 61                              DB             61H
665A 9D                              POPF
     ;-------------------------
665B FB                              STI
665C CF                              IPET
     ;
665D 8306060001      RX_CRC_ERR:     ADD WORD PTR [RX_CRC_ERROR+2],1
6662 8316040000                      ADC WORD PTR [RX_CRC_ERROR],0
6667 EBDD                            JMP RX_RET
     ;
6669 90              RX_RECEIVE:     NOP
666A B844A0                          MOV            AX,0A044H          ;DMA STOP
666D BACAFF                          MOV            DX,0FFCAH
6670 EF                              OUT            DX,AX
6671 B001                            MOV            AL,00000001B
6673 E604                            OUT            ACHC,AL
6675 E404                            IN             AL,ACHC            ;STATUS INPUT
6677 D0C0                            ROL            AL
6679 D0C0                            ROL            AL
667B B030                            MOV            AL,00110000B       ;ERROR RESET COM
667D E604                            OUT            ACHC,AL
667F B040                            MOV            AL,01000000B       ;RESEP CRC CECKEP
6681 E604                            OUT            ACHC,AL
6683 B020                            MOV            AL,00100000B
6685 E604                            OUT            ACHC,AL
6687 C3                              RET
     ;----------------------
     ;-----------------NON SPECIFIC EOI-------------------
6688 B80080          EOI.            MOV            AX,8000H
668B BA22FF                          MOV            DX,0FF22H
```

```
663E EF                          OUT      DX,AX
663F C3                          RET
                  ;-----------------------------------
                  ;------------TX_DISABLE_ROUTINE
                  ;----TIMER_1 INTR----
                                 ORG      06700H
                  ;0000          CLI
6700 9C                          PUSHF
6701 60                          DB       60H
6702 B8100E                      MOV      AX,3600
6705 BA5AFF                      MOV      DX,0FF5AH
6708 EF                          OUT      DX,AX
6709 B80160                      MOV      AX,0110000000000001B
670C BA5EFF                      MOV      DX,0FF5EH
670F EF                          OUT      DX,AX
6710 B80B00                      MOV      AX,1011B
6713 BA32FF                      MOV      DX,0FF32H
6716 EF                          OUT      DX,AX
                  ;---------------PTR 0A------------------
6717 B028                        MOV      AL,00101000B
6719 E604                        OUT      ACHC,AL
                  ;---------------PTR 05A-----------
671B B005                        MOV      AL,00000101B
671D E604                        OUT      ACHC,AL
671F A03E07                      MOV      AL,BYTE PTR [TEMP_R_CH]
6722 2401                        AND      AL,00000001B
6724 F8                          CLC
6725 D0C0                        ROL      AL
6727 0CE0                        OR       AL,11100000B
6729 E604                        OUT      ACHC,AL
                  ;-----------------------RTS OFF-------------
                  ;---------------PTR 01A------------
672B B001                        MOV      AL,00000001B
672D E604                        OUT      ACHC,AL
672F B02D                        MOV      AL,00101101B
6731 E604                        OUT      ACHC,AL
                  ;---------------PTR 0A---------------
6733 B080                        MOV      AL,10000000B
6735 E604                        OUT      ACHC,AL
                  ;---------------PTR 0A---------------
                  ;              MOV      AL,00010000B   ???????
                  ;              OUT      ACHC,AL
                  ;---------
6737 BA22FF                      MOV      DX,0FF22H
673A B80800                      MOV      AX,08
673D EF                          OUT      DX,AX
673E B80000                      MOV      AX,0.               ;Tx end flag
6741 A21807                      MOV [TX_BUSY_FLAG],AL
6744 A31407                      MOV [ECHO_BACK_FLAG],AX
6747 61                          DB       61H
6748 9D                          POPF
6749 FB                          STI
674A CF                          IRET
                  ;---------------------------------------------
                  ;-----------------------SET UP UCS-------------------------------
                                 ORG      07C00H
7C00 B83FF8                      MOV      AX,0F83FH
7C03 BAA0FF                      MOV      DX,0FFA0H
7C06 EF                          OUT      DX,AX
7C07 EA000000F8                  DB       0EAH,0,0,0,0F8H          ;JUMP TO 0F8000H
                  ;==========================================================
                                 ORG      07FF0H
7FF0 EA0000C0FF                  DB       0EAH,000H,00H,0C0H,0FFH   ;JUMP TO 0FFC000H





                  ;
                  ;----------------------------------------------------------------------
                  ;*************            ****************************************
                  ;*************    Hajime  ****************************************
                  ;*************            ****************************************
                  ;----------------------------------------------------------------------
                  ;
                                 ORG 300H
                  ;
0300 90           HAJIMERUYO:    NOP
0301 E80000                      CALL POWER_DET_CMD
0304 BE2008       HAJIME1:       MOV SI,FROM_OBF_BF
0307 E80000                      CALL LOAD_FROM_DROP
030A 72F8                        JC HAJIME1
030C BE2008                      MOV SI,FROM_OBF_BF
030F 8A4401                      MOV AL,[SI+1]
0312 3C01                        CMP AL,1
0314 75EE                        JNZ HAJIME1       ; IF Response <> Power Det. Then Wait
                  ;
0316 E80000                      CALL POWER_DET_CMD
0319 BE2008       HONBAN1:       MOV SI,FROM_OBF_BF
031C E80000                      CALL LOAD_FROM_DROP
031F 72F8                        JC HONBAN1
0321 BE2008                      MOV SI,FROM_OBF_BF
```

```
0324 8A4401                      MOV AL,[SI+1]
0327 3C01                        CMP AL,1
0329 75EE                        JNZ HONBAN1        ; IF Response <> Power Det. Then Wait
                        ;
032B 8A7402                      MOV DH,[SI+2]      ; DH = Power Detect Data
032E B210                        MOV DL,10H         ; DL = 1st ID_BYTE --- 10H
0330 D0CE               DROP_INIT_LP:   ROR DH
0332 7363                        JNC DRP_NEXT       ; IF CY=0 Then Power Down
                        ;
0334 52                 DEV_INIT_LP:    PUSH DX
0335 88162C07                    MOV [ID_BYTE],DL
0339 E80000                      CALL ID_DROP_DEVICE
033C E80000                      CALL SPU_STATUS_REQ
033F BE2008             DEV_RESP_WT:    MOV SI,FROM_OBF_BF
0342 E80000                      CALL LOAD_FROM_DROP
0345 72F8                        JC DEV_RESP_WT
0347 BE2008                      MOV SI,FROM_OBF_BF  ; SI --- Length
                                                     ; +1     Command
                                                     ; +2     ID_BYTE
                                                     ; +3     Byte Count
                                                     ; +4     Data
034A B004                        MOV AL,4
034C 3A4401                      CMP AL,[SI+1]
034F 75EE                        JNZ DEV_RESP_WT    ; IF [SI+1]=4 Then 04 Command
                        ;
0351 8A4402                      MOV AL,[SI+2]
0354 3A062C07                    CMP AL,[ID_BYTE]
0358 75E5                        JNZ DEV_RESP_WT    ; IF CMD NEQ Status Then Wait Loop
                        ;
035A B000                        MOV AL,0
035C 3A4403                      CMP AL,[SI+3]
035F 742D                        JZ DEV_NEXT        ; VLF Error (Device Off)
                        ;
0361 8A4404                      MOV AL,[SI+4]
0364 24F8                        AND AL,0F8H
0366 75D7                        JNZ DEV_RESP_WT    ; Status Response denai
                        ;
0368 8A5405                      MOV DL,[SI+5]      ; <<< DL = Status >>>
036B E80000                      CALL CONV_SW_BIT_AL ;  SI --- CONVSEL ( Drop_NO. )
                                                     ;  AL --- ( Device )
036E 80E280                      AND DL,80H          ;
0371 740E                        JZ DEV_SW_0        ; IF <7>=0 Then Converter SW=0
0373 8A262607           DEV_SW_1:       MOV AH,[DROP_NO]
0377 80E401                      AND AH,1
037A 7509                        JNZ DEV_CLR        ; IF ODD Drop Then Converter SW=0  Else  Abnorma
037C 0804                        OR [SI],AL
037E E90400                      JMP DEV_CLR
0381 343F               DEV_SW_0:       XOR AL,3FH
0383 2004                        AND [SI],AL
                        ;
0385 E80000             DEV_CLR:        CALL SPU_RELAY_OFF
0388 E80000                      CALL SPU_CLEAR_DISP
038B E80000                      CALL EVENT_LED_OFF
                        ;
038E 5A                 DEV_NEXT:       POP DX
038F 80C208                      ADD DL,8           ; 00**  *DDD
0392 80FA30                      CMP DL,30H         ; 0011  0DDD
0395 729D                        JC DEV_INIT_LP     ;   IF Device<6 Then Next Device
                        ;
0397 80E207             DRP_NEXT:       AND DL,7
039A FEC2                        INC DL             ;    Next Drop
039C 80FA06                      CMP DL,6           ;    IF Drop>5 Then Next Operation
039F 7305                        JNC POLLING_SEQ
03A1 80CA10                      OR DL,10H          ;    Next Device Start from "2"
03A4 EB8A                        JMP DROP_INIT_LP

03A6 E80000             POLLING_SEQ:    CALL DROP_MAP_SET          ;=
                                                                  ;=
03A9 E80000                      CALL DEVICE_MAP_SET              ;= DROP 0
03AC FE062407                    INC BYTE PTR [CONV_NO]           ;=
03B0 E80000                      CALL DEVICE_MAP_SET              ;= DROP 1
03B3 FE062407                    INC BYTE PTR [CONV_NO]           ;=
03B7 E80000                      CALL DEVICE_MAP_SET              ;= DROP 2
03BA FE062407                    INC BYTE PTR [CONV_NO]           ;=
03BE E80000                      CALL DEVICE_MAP_SET              ;= DROP 3
03C1 FE062407                    INC BYTE PTR [CONV_NO]           ;=
03C5 E80000                      CALL DEVICE_MAP_SET              ;= DROP 4
03C8 FE062407                    INC BYTE PTR [CONV_NO]           ;=
03CC E80000                      CALL DEVICE_MAP_SET              ;= DROP 5
                        ;
                        ;
```

```
                ;--------------------------------------------------------------------------------
                ;*************                  **************************************************
                ;*************  Main  Routine   **************************************************
                ;*************                  **************************************************
                ;--------------------------------------------------------------------------------
                ;
                ;
03CF E82C01     MAIN_LOOP:      CALL FORWARD_CMD_CK           ; Cy Flag = 1  Active
03D2 E81100                     CALL TIMER_OPERAT
03D5 7205                       JC KEY_APPLICAT




                ;
03D7 E8CD04     DROP_ACCESS:    CALL DROP_RESPONSE            ; Response no kaishaku
03DA 7305                       JNC ECU_ADRS_NEW              ;      ---> Shori Nshi




                ;
03DC E80000     KEY_APPLICAT:   CALL KEY_OPERATION            ;      ---> Key shori
03DF EBEE                       JMP MAIN_LOOP




                ;
03E1 E82903     ECU_ADRS_NEW:   CALL ECU_ADRS_READ
03E4 EBE9                       JMP MAIN_LOOP









                ;
                ; ***********   Subroutine  *************************************************
                ;
03E6 E8FB00     TIMER_OPERAT:   CALL TIMER_CHK
03E9 7202                       JC TIMER_YO
03EB F8                         CLC
03EC C3                         RET
                ;
03ED FF06FC1F   TIMER_YO:       INC WORD PTR [TIMER_COUNTER]
                ;


03F1 8B16FC1F   TIMER_TOB2:     MOV DX,[TIMER_COUNTER]
03F5 80FA00                     CMP DL,0
03F8 7568                       JNZ TIMER_TYPE_2
03FA 80E607                     AND DH,7
03FD 80FE06                     CMP DH,6
0400 7360                       JNC TIMER_TYPE_2
                ;
0402 B001                       MOV AL,1
0404 8ACE                       MOV CL,DH              ; DH = CONV_NO
0406 D2C0                       ROL AL,CL              ; AL = CONV_NO_BIT
0408 84068007                   TEST AL,[NOW_EVENT]
040C 7454                       JZ TIMER_TYPE_2
040E B700                       MOV BH,0
0410 8ADE                       MOV BL,DH
                ;       ******  PAY Channel View  ******
0412 BE3000                     MOV SI,EVENT_CHANNEL
0415 03F3                       ADD SI,BX
0417 8A1C                       MOV BL,[SI]            ; BL = EVENT View Channel
0419 BE0006                     MOV SI,ES_EVENT_TIMER  ; Counter Up & Pay ?
041C 8AE6                       MOV AH,DH
041E B000                       MOV AL,0
0420 D1C8                       ROR AX
0422 03F0                       ADD SI,AX
0424 268A20                     MOV AH,ES:[SI][BX]
0427 80FCF8                     CMP AH,0F8H
042A 7336                       JNC TIMER_TYPE_2
042C 26800008                   ADD BYTE PTR ES:[SI][BX],8
0430 268038F8                   CMP BYTE PTR ES:[SI][BX],0F8H
0434 722C                       JC  TIMER_TYPE_2
                ;
0436 800E8007C0                 OR BYTE PTR [NOW_EVENT],0C0H
043B 80CE10                     OR DH,10H
043E 88362807                   MOV [IC_BYTE],DH
0442 E80000                     CALL CONV_TO_DROP
0445 E80000                     CALL ID_DROP_DEVICE
                ;
0448 A02E07                     MOV AL,[CONV_NO_BIT]
044B 343F                       XOR AL,3FH
044D 20068107                   AND BYTE PTR [BEFOR_EVENT],AL
                ;
0451 BE3000                     MOV SI,EVENT_CHANNEL
```

```
0454 03362407                           ADD SI,[CONV_NO]
0458 8A1C                               MOV BL,[SI]
045A B700                               MOV BH,0
045C E80000                             CALL BINDEC_LED
045F E80000                             CALL RUN_CONVERTER
                   ;
0462 8B1EFC1F      TIMER_TYPE_2:        MOV BX,[TIMER_COUNTER]
0466 81E3FF0F                           AND BX,0FFFH
                   ;
046A 81FB0004                           CMP BX,ES_BACK_UP_2            ; 1024
046E 734C                               JNC TIMER_TOB
0470 81FB0002                           CMP BX,ES_BACK_UP_1            ; 512
0474 721B                               JC MOV_1_ST
                   ;
0476 268A07        MOV_2_ND:            MOV AL,ES:[BX+ES_BACK_UP]      ; BX = 512 - 1023
0479 2688870002                         MOV ES:[BX+ES_BACK_UP_1],AL
047E 753C                               JNZ TIMER_TOB
0480 26C7060002                         MOV WORD PTR ES:[ES_BACK_UP_1],0A5A5H
0487 26C7060004                         MOV WORD PTR ES:[ES_BACK_UP_2],0
048E E92B00                             JMP TIMER_TOB
                   ;
0491 83FB04        MOV_1_ST:            CMP BX,4
0494 7214                               JC MOV_1_INIT
0496 8A07                               MOV AL,[BX]
0498 2688870002                         MOV ES:[BX+ES_BACK_UP_1],AL
049D 2630060202                         XOR ES:[ES_BACK_UP_1+2],AL
04A2 2600060302                         ADD ES:[ES_BACK_UP_1+3],AL
04A7 E91200                             JMP TIMER_TOB
                   ;
04AA 26C6870002    MOV_1_INIT:          MOV BYTE PTR ES:[BX+ES_BACK_UP_1],0
04B0 83FB00                             CMP BX,0
04B3 7507                               JNZ TIMER_TOB
04B5 26C7060004                         MOV WORD PTR ES:[ES_BACK_UP_2],0A5A5H
                   ;
04BC 81E33F00      TIMER_TOB:           AND BX,3FH                     ; 00**  ****
04C0 881E2807                           MOV [IC_BYTE],BL
04C4 02DB                               ADD BL,BL
04C6 BE0003                             MOV SI,TIME_TABLE
04C9 8B00                               MOV AX,[SI][BX]
04CB 3DFFFF                             CMP AX,0FFFFH
04CE 7412                               JZ TIMER_SLEEP                 ; Timer Wa Tukawanai
04D0 FF08                               DEC WORD PTR [SI][BX]
04D2 750E                               JNZ TIMER_SLEEP                ;    <---    Madada
                   ;
04D4 B100                               MOV CL,TIMER_OUT_CODE          ;    <---    Jikan desuyo
04D6 880E8907                           MOV [KEY_DATA],CL
04DA E80000                             CALL IC_DROP_DEVICE
04DD E80000                             CALL CONV_TO_DROP
                   ;
04E0 F9            TIMER_ACTIVE:        STC
04E1 C3                                 RET
                   ;


04E2 F8            TIMER_SLEEP:         CLC
04E3 C3                                 RET

                   ;
                   ; ************ Timer Counter Check ******************************
                   ;
                   ;=================SUBROUTINE FOR COUNT SEC=============
04E4 BA66FF        TIMER_CHK:           MOV          DX,0FF66H
04E7 ED                                 IN           AX,DX
04E8 A92000                             TEST         AX,0020H
04EB F8                                 CLC
04EC 740F                               JZ           RETTIM2
04EE B80008                             MOV          AX,0800H
04F1 BA62FF                             MOV          DX,0FF62H
04F4 EF                                 OUT          DX,AX
04F5 B801C0                             MOV          AX,1100000000000001B
04F8 BA66FF                             MOV          DX,0FF66H
04FB EF                                 OUT          DX,AX
04FC F9                                 STC
04FD C3            RETTIM2:             RET
```

```
                 ;
                 ;----------------------------------------------------------------------
                 ;*************                        **********************************
                 ;*************  HDLC Forward Command  **********************************
                 ;*************                        **********************************
                 ;----------------------------------------------------------------------
                 ;
04FE 8B361407    FORWARD_CMD_CK:  MOV SI;[ECHO_BACK_FLAG]
0502 83FE00                       CMP SI,0
0505 7503                         JNZ FORWARD_COME
0507 E90102                       JMP TX_CCC_N_RET
                                                                ; SI=Data Buffer Address
050A C706140700  FORWARD_COME:    MOV WORD PTR [ECHO_BACK_FLAG],0  ; +0 --- ECU H Address
0510 8A4403                       MOV AL,[SI+3]                 ; +1          L
0513 3C80                         CMP AL,80H                    ; +2     Rx Data Length
0515 7333                         JNC FORWARD_CMDTBL            ; +3     Command
0517 3C20                         CMP AL,20H
0519 7303                         JNC CCC_CMD_20_7F
051B E98501                       JMP CCC_DROP_CMD       ; 00 - 1F Command
                 ;
051E 740A        CCC_CMD_20_7F:   JZ FORCED_KEY          ; 20 - 7F Command
0520 3C30                         CMP AL,30H
0522 7403                         JZ COLD_START
0524 E9E401                       JMP TX_CCC_N_RET
                 ;
0527 E9D6FA      COLD_START:      JMP RUN                ; *******  Cold Start  ******
                 ;
052A 8A4404      FORCED_KEY:      MOV AL,[SI+4]
052D A22807                       MOV [IC_BYTE],AL
0530 8A6405                       MOV AH,[SI+5]
0533 88268907                     MOV [KEY_DATA],AH
0537 E80000                       CALL IC_DROP_DEVICE
053A E80000                       CALL CONV_TO_DROP
053D E80000                       CALL KEY_OPERATION
0540 F9                           STC
0541 C3                           RET
                 ;
0542 5B          FORWARD_JUMP:    POP BX
0543 03D8                         ADD BX,AX
0545 8A4403                       MOV AL,[SI+3]
0548 53                           PUSH BX
0549 C3                           RET
                 ;
054A 2C80        FORWARD_CMDTBL:  SUB AL,80H
054C 25FC00                       AND AX,0FCH
054F E8F0FF                       CALL FORWARD_JUMP
                 ;
0552 E97C00      CCC_CMD_JMPTBL:  JMP SEND_FUNC_MOD      ; 80H ---
0555 90                           NOP
0556 E99600                       JMP SEND_RESPONSE      ; 84H ---
0559 90                           NOP
055A E90000                       JMP PAY_GROUP_1        ; 88H ---
055D 90                           NOP
055E E90000                       JMP PAY_GROUP_2        ; 8CH ---
0561 90                           NOP
0562 E9A601                       JMP TX_CCC_N_RET       ; 90H ---
0565 90                           NOP
0566 E9A201                       JMP TX_CCC_N_RET       ; 94H ---
0569 90                           NOP
056A E99E01                       JMP TX_CCC_N_RET       ; 98H ---
056D 90                           NOP
056E E99A01                       JMP TX_CCC_N_RET       ; 9CH ---
0571 90                           NOP
0572 E99601                       JMP TX_CCC_N_RET       ; A0H ---           [Ino]
0575 90                           NOP
0576 E99201                       JMP TX_CCC_N_RET       ; A4H ---           [Ino]
0579 90                           NOP
057A E98E01                       JMP TX_CCC_N_RET       ; A8H ---           [Ino]
057D 90                           NOP
057E E98A01                       JMP TX_CCC_N_RET       ; ACH ---           [Ino]
0581 90                           NOP
0582 E98601                       JMP TX_CCC_N_RET       ; B0H ---           [Ino]
0585 90                           NOP
0586 E98201                       JMP TX_CCC_N_RET       ; B4H ---           [Ino]
0589 90                           NOP
058A E97E01                       JMP TX_CCC_N_RET       ; B8H ---           [Ino]
058D 90                           NOP
058E E97A01                       JMP TX_CCC_N_RET       ; BCH ---           [Ino]
0591 90                           NOP
0592 E97601                       JMP TX_CCC_N_RET       ; C0H ---           [Ben]
0595 90                           NOP
0596 E97201                       JMP TX_CCC_N_RET       ; C4H ---           [Ben]
0599 90                           NOP
059A E96E01                       JMP TX_CCC_N_RET       ; C8H ---           [Ben]
059D 90                           NOP
059E E96A01                       JMP TX_CCC_N_RET       ; CCH ---           [Ben]
05A1 90                           NOP
```

```
05A2 E96601                    JMP TX_CCC_N_RET     ; D0H ---
05A5 90                        NOP
05A6 E96201                    JMP TX_CCC_N_RET     ; D4H ---
05A9 90                        NOP
05AA E95E01                    JMP TX_CCC_N_RET     ; D8H ---
05AD 90                        NOP
05AE E95A01                    JMP TX_CCC_N_RET     ; DCH ---
05B1 90                        NOP
05B2 E95601                    JMP TX_CCC_N_RET     ; E0H ---
05B5 90                        NOP
05B6 E95201                    JMP TX_CCC_N_RET     ; E4H ---
05B9 90                        NOP
05BA E94E01                    JMP TX_CCC_N_RET     ; E8H ---
05BD 90                        NOP
05BE E94A01                    JMP TX_CCC_N_RET     ; ECH ---
05C1 90                        NOP
05C2 E95500                    JMP ECHO_BACK_CMD    ; F0H ---
05C5 90                        NOP
05C6 E9E300                    JMP FORCED_TUNE      ; F4H ---
05C9 90                        NOP
05CA E95A00                    JMP DISPLAY_MEMORY   ; F8H ---
05CD 90                        NOP
05CE E99300                    JMP STORE_MEMORY     ; FCH ---
                  ;
                  ; ************  Send Function Response  *************************
                  ;
05D1 2403         SEND_FUNC_MOD:   AND AL,3                          ; 80 - 83 Command
05D3 7407                      JZ S_F_M_SET
05D5 3C01                      CMP AL,1
05D7 740D                      JZ S_F_M_CLR
05D9 E92F01                    JMP TX_CCC_N_RET                  ; 82 - 83 Command
                  ;
05DC 8A6404       S_F_M_SET:       MOV AH,[SI+4]                     ; 80 Command
05DF 88263008                  MOV [SEND_ENABLE],AH
05E3 E92501                    JMP TX_CCC_N_RET
                  ;
05E6 B400         S_F_M_CLR:       MOV AH,0                          ; 81 Command
05E8 88263308                  MOV [SEND_INDEX],AH
05EC E91C01                    JMP TX_CCC_N_RET
                  ;
05EF 8A263308     SEND_RESPONSE:   MOV AH,[SEND_INDEX]               ; 84 - 87 Command
05F3 80FC00                    CMP AH,0
05F6 741F                      JZ NO_SEND
05F8 8A6403       YES_SEND:        MOV AH,[SI+3]
05FB 88263408                  MOV [SEND_CMD_RESP],AH
05FF 2403                      AND AL,3
0601 A21607                    MOV [REVERS_CHANEL],AL
0604 FE063308                  INC BYTE PTR [SEND_INDEX]
0608 FE063308                  INC BYTE PTR [SEND_INDEX]
060C BE3108                    MOV SI,SEND_ADDRESS
060F A10014                    MOV AX,[ECU_ADDRESS]
0612 8904                      MOV [SI],AX
0614 E9D600                    JMP TX_CCC_RUN
                  ;
0617 E9F100       NO_SEND:         JMP TX_CCC_N_RET
                  ;
                  ; ************  Echo Back Command  *****************************
                  ;
061A 2403         ECHO_BACK_CMD:   AND AL,3                     ; Command >= 0F0H
061C A21607                    MOV [REVERS_CHANEL],AL       ; Reverse Channel Command
061F A10014       ECHO_BACK_SURU:  MOV AX,[ECU_ADDRESS]
0622 8904                      MOV [SI],AX
0624 E9C600                    JMP TX_CCC_RUN
                  ;
                  ; ************  Display Memory  ********************************
                  ;
0627 8B5C05       DISPLAY_MEMORY:  MOV BX,[SI+5]          ;    <<< Display Memory >>>
062A 8A4403                    MOV AL,[SI+3]
062D A20314                    MOV [TX_COMMAND],AL
0630 8A4404                    MOV AL,[SI+4]          ; SI --- ECU Address H
0633 BE0414                    MOV SI,TX_BUFFER       ; +1     ECU Address L
0636 A20214                    MOV [TX_LENGTH],AL     ; +2     Rx Length
0639 81FB0080                  CMP BX,8000H           ; +3     Command
063D 7310                      JNC DISP_MEM_5517
063F 8A27         TX_TRNS2:        MOV AH,[BX]            ; +4     Tx Length
0641 8824                      MOV [SI],AH            ; +5     Tx Address L
0643 46                        INC SI                 ; +6     Tx Address H
0644 43                        INC BX
0645 FEC8                      DEC AL
0647 75F6                      JNZ TX_TRNS2
0649 BE0014                    MOV SI,ECU_ADDRESS
064C E99E00                    JMP TX_CCC_RUN
                  ;
064F 81E3FF7F     DISP_MEM_5517:   AND BX,7FFFH           ; Back Up Memory Display
0653 268A27       TX_TRNS3:        MOV AH,ES:[BX]
0656 8824                      MOV [SI],AH
0658 46                        INC SI
0659 43                        INC BX
065A FEC8                      DEC AL
065C 75F5                      JNZ TX_TRNS3
065E BE0014                    MOV SI,ECU_ADDRESS
0661 E98900                    JMP TX_CCC_RUN
```

```
0664 8B5C05      STORE_MEMORY:    MOV BX,[SI+5]          ;     <<< Store Memory >>>
0667 8A4403                       MOV AL,[SI+3]
066A A20314                       MOV [TX_COMMAND],AL
066D 8A4404                       MOV AL,[SI+4]          ; SI --- ECU Address H
                                                         ; +1     ECU Address L
0670 A20214                       MOV [TX_LENGTH],AL     ; +2     Rx Length
0673 81FB0080                     CMP BX,8000H           ; +3     Command
0677 730E                         JNC STOR_MEM_5517
0679 8A6407      ST_TRNS2:        MOV AH,[SI+7]          ; +4     St Length
067C 8827                         MOV [BX],AH            ; +5     St Address L
067E 46                           INC SI                 ; +6     St Address H
067F 43                           INC BX
0680 FEC8                         DEC AL
0682 75F5                         JNZ ST_TRNS2
0684 E98400                       JMP TX_CCC_N_RET
                 ;
0687 81E3FF7F    STOR_MEM_5517:   AND BX,7FFFH           ; Back Up Memory Display
068B 81FB0001                     CMP BX,100H
068F 7303                         JNC ST_TRNS3
0691 E97700                       JMP TX_CCC_N_RET       ; Sokowa Interrupt Table
0694 8A6407      ST_TRNS3:        MOV AH,[SI+7]
0697 268827                       MOV ES:[BX],AH
069A 46                           INC SI
069B 43                           INC BX
069C FEC8                         DEC AL
069E 75F4                         JNZ ST_TRNS3
06A0 E96800                       JMP TX_CCC_N_RET
                 ;
                 ; ************  CCC ---> Data Processor ---> Drop Processor  *****
                 ;
06A3 83C602      CCC_DROP_CMD:    ADD SI,2
06A6 E80000                       CALL LOAD_TO_DROP
06A9 E95F00                       JMP TX_CCC_N_RET
                 ;
                 ; ************  Forced Tuning  --- Nth Converter  ***************
                 ;
06AC 8A4404      FORCED_TUNE:     MOV AL,[SI+4]               ; SI --- ECU H Address
06AF A22807                       MOV [IC_BYTE],AL            ; +1        L Address
06B2 E80000                       CALL IC_DROP_DEVICE         ; +2     Tx Data Lendth
06B5 E80000                       CALL CONV_TO_DROP           ; +3     Command E0H
06B8 8A5C05                       MOV BL,[SI+5]               ; +4     Converter NO.
06BB 80FB64                       CMP BL,100                  ; +5     Tuning Channel
06BE 7312                         JNC FORCED_OFF
                 ;
06C0 E80000      FORCED_ON:       CALL BINDEC_LED
06C3 E80000                       CALL LED_VIEW_TBL
06C6 E80000                       CALL SPU_LED_DISP
06C9 E80000                       CALL RUN_CONVERTER
06CC E80000                       CALL WAKEARI_DE_ON
06CF E93900                       JMP TX_CCC_N_RET
                 ;
06D2 E80000      FORCED_OFF:      CALL OP_SPU_OFF
06D5 E93300                       JMP TX_CCC_N_RET
                 ;
                 ; ************  SPU to CCC  Send  ********************************
                 ;
06D8 BE0214      SPECIAL_SPU_1:   MOV SI,TX_LENGTH
06DB BB0207                       MOV BX,INDEX_RX_1
06DE C60441                       MOV BYTE PTR [SI],65
06E1 C6440100                     MOV BYTE PTR [SI+1],0
06E5 83C602                       ADD SI,2
06E8 B040                         MOV AL,64
06EA E952FF                       JMP TX_TRNS2
                 ;
                 ; ############  Send to CCC  ######################################
                 ;
06ED A01807      TX_CCC_RUN:      MOV AL,[TX_BUSY_FLAG]
06F0 3C00                         CMP AL,0
06F2 7517                         JNZ TX_CCC_N_RET
                 ;
06F4 8A4C02      TX_RUN_SUB:      MOV CL,[SI+2]
06F7 FEC1                         INC CL
06F9 FEC1                         INC CL
06FB 80F903                       CMP CL,3
06FE 7302                         JNC TX_YOSHI
0700 B103                         MOV CL,3
0702 880E1807    TX_YOSHI:        MOV [TX_BUSY_FLAG],CL    ; [[[  SI --- Start Address  ]]]
0706 E841FB                       CALL HDLC_TX_START       ; [[[  CL --- Data Length    ]]]
0709 F9                           STC
070A C3                           RET
                 ;
                 ;
                 ;
070B F8          TX_CCC_N_RET:    CLC
070C C3                           RET
                 ;
                 ;
                 ;
```

```
                    ;
                    ;-------------------------------------------------------------------------
                    ;*************                           ***********************************
                    ;*************   Subroutine              ***********************************
                    ;*************                           ***********************************
                    ;-------------------------------------------------------------------------
                    ;
                    ; ************  ECU Address Read Routine  ************************
                    ;
0700 BA0001         ECU_ADRS_READ:   MOV   DX,ECU_L_ADDRESS
0710 EC                              IN AL,DX
0711 8AE0                            MOV AH,AL
0713 BA0201                          MOV   DX,ECU_H_ADDRESS
0716 EC                              IN AL,DX                       ; AH = L , AL = H Addres.
0717 A30014                          MOV [ECU_ADDRESS],AX
071A C3                              RET
                    ;
                    ; ***********  Timer Table Initialize  **************************
                    ;
071B BE0003         INIT_TIM_TBL:    MOV SI,TIME_TABLE
071E BB0000                          MOV BX,0
0721 C600FF         INIT_TIM_LP:     MOV BYTE PTR [SI][BX],0FFH
0724 43                              INC BX
0725 81FB8000                        CMP BX,128
0729 75F6                            JNZ INIT_TIM_LP
072B C3                              RET
                    ;
                    ; ***********  Event Timer Table Initialize  ***************************
                    ;
072C BE0006         INIT_EV_TIMER:   MOV SI,ES_EVENT_TIMER
072F BB0000                          MOV BX,0
0732 26C60000       INIT_EV_1:       MOV BYTE PTR ES:[SI][BX],0
0736 43                              INC BX
0737 81FB0003                        CMP BX,128*6
073B 75F5                            JNZ INIT_EV_1
073D C3                              RET
                    ;
                    ; ***********  JUMP_ADDRESS Table Initialize  ******************
                    ;
073E E80300         INIT_JUMP_TBL:   CALL INIT_WA_DOKO
0741 E90000                          JMP OP_INITIAL
0744 58             INIT_WA_DOKO:    POP AX
0745 A31C07                          MOV [INIT_POINT],AX
0748 BE8003                          MOV SI,JUMP_ADDRESS
074B BB0000                          MOV BX,0
074E 8900           INIT_JUMP_LP:    MOV [SI][BX],AX
0750 83C302                          ADD BX,2
0753 81FB8000                        CMP BX,128
0757 75F5                            JNZ INIT_JUMP_LP
0759 E80300                          CALL BASE_WA_DOKO
075C E90000                          JMP BASE_ROUTINE
075F 58             BASE_WA_DOKO:    POP AX
0760 A31A07                          MOV [BASE_POINT],AX
0763 C3                              RET
                    ;
                    ; ***********  BASIC_AUTHO  Table Initialize  ******************
                    ;
0764 BE0001         INIT_AUTHO_TBL:  MOV SI,PC_FC_LIST
0767 BB0000                          MOV BX,0
076A C60000         JUNKO:           MOV BYTE PTR [SI][BX],0
076D 43                              INC BX
076E 81FB0001                        CMP BX,256
0772 75F6                            JNZ JUNKO
                    ;
0774 BE8001                          MOV SI,BASIC_AUTHO
0777 BB0100                          MOV BX,1
077A C6003F         JUN:             MOV BYTE PTR [SI][BX],3FH
077D 43                              INC BX
077E 83FB5A                          CMP BX,90
0781 75F7                            JNZ JUN
0783 C3                              RET
                    ;
                    ; ***********  View Channel Table Initialize  ******************
                    ;
0784 BE1000         INIT_VIEW_TBL:   MOV SI,VIEW_CHANNEL
0787 BB0000                          MOV BX,0                       ; S4,S3,S2,S1  S0,C2,C1,C0
078A 8AE3           INIT_VIEW_LP:    MOV AH,BL
078C FEC4                            INC AH
078E 80CC30                          OR AH,30H
0791 C60030                          MOV BYTE PTR [SI][BX],30H
0794 886008                          MOV BYTE PTR [SI][BX+8],AH
0797 43                              INC BX
0798 83FB08                          CMP BX,8
079B 75ED                            JNZ INIT_VIEW_LP
079D C3                              RET
```

```
                  ;
                  ; ************  EVENT Table  MODE  Initialize  ******************
                  ;
079E BB0006       EVENT_DATA_CL:  MOV BX,ES_EVENT_TIMER
07A1 26C707FF0F   CHIHARU:        MOV WORD PTR ES:[BX],0FFFH
07A6 83C302                       ADD BX,2
07A9 81FB0009                     CMP BX,ES_EVENT_TIMER+128*6
07AD 72F2                         JC CHIHARU
                  ;
07AF BE0009                       MOV SI,EVENT_NO_FREQ
07B2 B120                         MOV CL,32
07B4 C744400100   LP1:            MOV WORD PTR [SI+32*2],1
07B9 83C602                       ADD SI,2
07BC FEC1                         INC CL
07BE 80F93F                       CMP CL,63
07C1 75F1                         JNZ LP1
                  ;
07C3 BE0009                       MOV SI,EVENT_NO_FREQ
07C6 BB0002                       MOV BX,CH_NO_FREQ
07C9 B140                         MOV CL,64
07CB 8B07         LP2:            MOV AX,[BX]
07CD 89848000                     MOV [SI+64*2],AX
07D1 83C602                       ADD SI,2
07D4 83C302                       ADD BX,2
07D7 FEC1                         INC CL
07D9 80F980                       CMP CL,128
07DC 75ED                         JNZ LP2
                  ;
07DE C3                           RET
                  ;
                  ; ************  PC_CODE & PR_CODE  Initialize  ******************
                  ;
07DF BE2000       INIT_CODE:      MOV SI,PC_CODE
07E2 BB0000                       MOV BX,0
07E5 C7000000     INIT_CODE_LP:   MOV WORD PTR [SI][BX],0
07E9 83C302                       ADD BX,2
07EC 83FB10                       CMP BX,16
07EF 75F4                         JNZ INIT_CODE_LP
07F1 C3                           RET
                  ;
                  ; ************  Converter Frequency Calculation  *************
                  ;
07F2 C7063A0703   FREQ_CALC:      MOV       WORD PTR DS:[MUL_ADR],MUL_NO
07F8 B90000                       MOV       CX,0      ;A-CABLE
07FB B84000                       MOV       AX,64
07FE 48           CAL_STDA:       DEC       AX
07FF E81500                       CALL      FREQ_CAL
0802 3D0000                       CMP       AX,0
0805 75F7                         JNZ       CAL_STDA
0807 B9FF00                       MOV       CX,0FFH   ;B-CABLE
080A B84000                       MOV       AX,64
080D 48           CAL_STDB:       DEC       AX
080E E80600                       CALL      FREQ_CAL
0811 3D0000                       CMP       AX,0
0814 75F7                         JNZ       CAL_STDB
0816 C3                           RET
                  ; ================STD FREQ. CALICULATION SUBROUTINE=======
0817 80E120       FREQ_CAL:       AND       CL,00100000B
081A 50                           PUSH      AX
081B 8BD0                         MOV       DX,AX
081D 754E                         JNZ       UP64          ;B-CABLE ====>UP64
081F 3D0000       UP64_D:         CMP       AX,0
0822 743A                         JE        ZERO
0824 3D3F00                       CMP       AX,63
0827 7435                         JE        ZERO
0829 3D0600                       CMP       AX,6
082C 7335                         JNC       CH6_62        ;CHANNELL ARE FROM 6 TO 62
082E 3D0400                       CMP       AX,4
0831 7335                         JNC       CH4_5         ;CHANNELL ARE FROM 4 TO 5
0833 BB4B01                       MOV       BX,331
0836 F6263A07     MULTI:          MUL       BYTE PTR DS:[MUL_ADR]      ;CH_NO*3
083A 03C3                         ADD       AX,BX                      ;CH_NO*3+OFFS:
083C 80F900       ADDER:          CMP       CL,0
083F 7400                         JZ        ADDER_1
                  ;;;;            ADD       DX,64         ;64 OR 63 ??????
0841 80E403       ADDER_1:        AND       AH,00000011B
0844 F8                           CLC
0845 D0C4                         ROL       AH
0847 D0C4                         ROL       AH
0849 D0C4                         ROL       AH
084B D0C4                         ROL       AH
084D D0C4                         ROL       AH
084F D0C4                         ROL       AH
0851 0AE1                         OR        AH,CL
0853 BB0002                       MOV       BX,CH_NO_FREQ
0856 8BF2                         MOV       SI,DX
0858 03F2                         ADD       SI,DX
085A 8900                         MOV       [BX][SI],AX   ;STORE ON & OS
085C 58                           POP       AX
085D C3                           RET
                  ;----------------------------------------------
085E B80000       ZERO:           MOV       AX,0
```

```
0861 EB09                      JMP             ADDER
                    ;------------------------------------------------
0863 BB5701         CH6_62:    MOV             BX,343
0866 EBCE                      JMP             MULTI
                    ;------------------------------------------------
0868 BB4D01         CH4_5:     MOV             BX,333
086B EBC9                      JMP             MULTI
                    ;------------------------------------------------
086D 83C240         UP64:      ADD             DX,64           ;64/63 Which???
0870 EBA0                      JMP             UP64_D
                    ;
                    ; ************  Japan Channel Hosei  ****************************
                    ;
0872 BE0002         CHANNEL_HOSEI:  MOV SI,CH_HO_FREQ
0875 B95140                    MOV CX,4051H            ; Japan  1
0878 898C8E00                  MOV [SI+71*2],CX
                    ;
087C B96640                    MOV CX,4066H            ; Japan  3
087F 898C9200                  MOV [SI+73*2],CX
                    ;
0883 B99840                    MOV CX,4098H            ; Japan  4
0886 898C9400                  MOV [SI+74*2],CX
                    ;
088A B98E40                    MOV CX,408EH            ; Japan  6
088D 898C9800                  MOV [SI+76*2],CX
                    ;
0891 B99340                    MOV CX,4093H            ; Japan  9
0894 898C9C00                  MOV [SI+78*2],CX
                    ;
0898 B99940                    MOV CX,4099H            ; Japan 10
089B 898CA000                  MOV [SI+80*2],CX
                    ;
089F B99F40                    MOV CX,409FH            ; Japan 12
08A2 898CA400                  MOV [SI+82*2],CX
08A6 C3                        RET
                    ;
                    ; ************  Drop Processor Response no shikibetu  ************
                    ;
08A7 BE2000         DROP_RESPONSE:  MOV SI,FROM_OBF_BF
08AA E80000                    CALL LOAD_FROM_DROP     ; Drop Processor kara no OBF Data wo FROM_OBF_BF ni utusu
08AD 7215                      JC DROP_RESP_NOP
08AF BE2000                    MOV SI,FROM_OBF_BF
08B2 8A4401                    MOV AL,[SI+1]           ;   ( AL ) = Command
08B5 3C01                      CMP AL,1
08B7 740D                      JZ DROP_RESP_01
08B9 3C04                      CMP AL,4
08BB 740B                      JZ DROP_RESP_04
08BD 3C84                      CMP AL,84H
08BF 7503                      JNZ DROP_RESP_NOP
08C1 E99F00                    JMP DROP_RESP_84
                    ;
08C4 F8             DROP_RESP_NOP:  CLC                ; Key Data None ---> CY=0
08C5 C3                        RET
                    ;
                    ; ===================================[SI]==[+1]====[+2]==========
08C6 EBFC           DROP_RESP_01:   JMP DROP_RESP_NOP  ;       [01][POW.DETECT]
                    ; ===================================[SI]==[+1]==[+2]===[+3][+4]==[+5]==
08C8 8A4402         DROP_RESP_04:   MOV AL,[SI+2]
08CB A22C07                    MOV [ID_BYTE],AL
08CE E80000                    CALL ID_DROP_DEVICE
                    ;
08D1 BE2008                    MOV SI,FROM_OBF_BF
08D4 8A4C03                    MOV CL,[SI+3]           ;       [04][ID_BYTE][02][00][STATUS]
08D7 80F900                    CMP CL,0                ;                             00   **
08DA 7466                      JZ RESP_VLF_ERR
08DC BF8000                    MOV DI,VLF_ERROR_MAP
08DF B700                      MOV BH,0
08E1 8A1E2C07                  MOV BL,[ID_BYTE]
08E5 03D8                      ADD BX,BX
08E7 8121FEFF                  AND WORD PTR [DI][BX],0FFFEH
                    ;
08EB 8A6C04                    MOV CH,[SI+4]           ;                         02   00   **
08EE 80FD00                    CMP CH,0
08F1 7402                      JZ RESP_STATUS
08F3 EBCF                      JMP DROP_RESP_NOP
                    ;
08F5 8A5405         RESP_STATUS:    MOV DL,[SI+5]      ;     [ Status ]
08F8 80E204                    AND DL,4                ;   S * * * . * P * *
08FB 7431                      JZ KEY_DEPRESS          ;   ^           ^ ^
08FD 8A5405         RECENT_ON:      MOV DL,[SI+5]      ;   ^             ^ I
0900 E80000                    CALL CONV_SW_BIT_AL     ;   ^    SPU Recent Power ON
0903 80E280                    AND DL,80H              ;   ^                 I
0906 7411                      JZ CONV_SW_0            ;   Converter Select SW
0908 8A262607       CONV_SW_1:      MOV AH,[DROP_NO]
090C 80E401                    AND AH,1
090F 7518                      JNZ CONV_SW_SET
0911 0804                      OR [SI],AL
0913 E80000                    CALL JUMP_ADRS_INIZ
0916 E91000                    JMP CONV_SW_SET
0919 8A24           CONV_SW_0:      MOV AH,[SI]
091B 343F                      XOR AL,3FH
091D 2004                      AND [SI],AL
091F E80000                    CALL DROP_BIT_AL        ; 10/19 Henkou !!!
0922 22C4                      AND AL,AH
0924 7403                      JZ CONV_SW_SET
0926 E80000                    CALL JUMP_ADRS_INIZ
0929 E80000         CONV_SW_SET:    CALL JUMP_ADRS_INIT
092C F8                        CLC
092D C3                        RET
                    ;
```

```
092E 8A5405      KEY_DEPRESS:     MOV DL,[SI+5]        ;           I
0931 80E202                       AND DL,2             ;     Key Currently Depressed
0934 740A                         JZ ELSE_STATUS
0936 B01C                         MOV AL,KEY_PUSH_CODE
0938 A28907                       MOV [KEY_DATA],AL
093B E80000                       CALL DROP_TO_CONV
093E F9                           STC
093F C3                           RET
0940 F8          ELSE_STATUS:     CLC
0941 C3                           RET
                 ;
0942 E80000      RESP_VLF_ERR:    CALL DROP_TO_CONV
0945 BE8000                       MOV SI,VLF_ERROR_MAP           ;
0948 B700                         MOV BH,0                       ;
094A 8A1E2C07                     MOV BL,[ID_BYTE]               ;
094E 03DB                         ADD BX,BX                      ;
0950 8B00                         MOV AX,[SI][BX]                ;
0952 050200                       ADD AX,2                       ;
0955 350100                       XOR AX,1                       ;
0958 8900                         MOV [SI][BX],AX                ;
095A D0C8                         ROR AL                         ;
095C 7303                         JNC VLF_ERR_RET                ;
095E E80000                       CALL JUMP_ADRS_INIT
0961 F8          VLF_ERR_RET:     CLC
0962 C3                           RET
                 ; =================================================================
0963 8A4C03      DROP_RESP_84:    MOV CL,[SI+3]        ;       [84][ID/DROP]   [01][KEY]
0966 80F900                       CMP CL,0
0969 742D                         JZ RESP_84_NRET
                 ;
096B 8A6402                       MOV AH,[SI+2]        ; ( AH ) = ID_BYTE
096E 88262C07                     MOV [ID_BYTE],AH
                 ;
0972 E80000                       CALL ID_DROP_DEVICE ; ---> CONV_NO , DROP_NO , DEVICE_NO
0975 E80000                       CALL DROP_TO_CONV
                 ;
0978 8A6C04                       MOV CH,[SI+4]
097B 882E8907                     MOV [KEY_DATA],CH
                 ;
097F BE8000                       MOV SI,VLF_ERROR_MAP
0982 B700                         MOV BH,0
0984 8A1E2C07                     MOV BL,[ID_BYTE]
0988 03DB                         ADD BX,BX
098A 8120FEFF                     AND WORD PTR [SI][BX],0FFFEH
                 ;
098E 80FDFF                       CMP CH,0FFH
0991 7402                         JZ SENS_STATUS
0993 F9                           STC                  ; Push Key Board ---> CY=1
0994 C3                           RET
                 ;
0995 E80000      SENS_STATUS:     CALL SPU_STATUS_REQ ; 0FFH ---> No Key Stroke
0998 F8          RESP_84_NRET:    CLC
0999 C3                           RET
                 ;
                 ;
                 ;
                                  GLOBAL          SPECIAL_SPU_1
                 ;
                 ;
                 ;
                                  EXTRN           POWER_DET_CMD
                                  EXTRN           LOAD_FROM_DROP
                                  EXTRN           LOAD_TO_DROP
                                  EXTRN           SPU_STATUS_REQ
                                  EXTRN           ID_DROP_DEVICE
                                  EXTRN           IC_DROP_DEVICE
                                  EXTRN           CONV_SW_BIT_AL
                                  EXTRN           DROP_BIT_AL
                                  EXTRN           SPU_RELAY_OFF
                                  EXTRN           SPU_CLEAR_DISP
                                  EXTRN           EVENT_LED_OFF
                                  EXTRN           DROP_MAP_SET
                                  EXTRN           KEY_OPERATION
                                  EXTRN           CONV_TO_DROP
                                  EXTRN           DROP_TO_CONV
                                  EXTRN           BINDEC_LED
                                  EXTRN           LED_VIEW_TBL
                                  EXTRN           SPU_LED_DISP
                                  EXTRN           RUN_CONVERTER
                                  EXTRN           WAKEARI_DE_ON
                                  EXTRN           OP_SPU_OFF
                                  EXTRN           OP_INITIAL
                                  EXTRN           BASE_ROUTINE
                                  EXTRN           JUMP_ADRS_INIT
                                  EXTRN           JUMP_ADRS_INIZ
                                  EXTRN           DEVICE_MAP_SET
                 ;
                                  EXTRN           PAY_GROUP_1
                                  EXTRN           PAY_GROUP_2

Errors=     0
```

CROSS REFERENCE TABLE

| | SYMBOL | TYPE | REFERENCES |
|---|---|---|---|
| 84 | CTRL_1 | A | 443,777,801,836 |
| 85 | CTRL_1_COUNT | A | 444,778,798,833 |
| 88 | CTRL_2 | A | 445,738,752 |
| 89 | CTRL_2_COUNT | A | 454,683,686,757 |
| | DEVICE_MAP_SET | E | 1225,1227,1229,1231,1233,1235,2070 |
| 102 | DEVICE_NO | A | |
| 106 | DEVICE_NO_BIT | A | |
| 1204 | DEV_CLR | A | 1198,1200 |
| 1163 | DEV_INIT_LP | A | 1211 |
| 1208 | DEV_NEXT | A | 1185 |
| 1167 | DEV_RESP_WT | A | 1149,1177,1181,1189 |
| 1201 | DEV_SW_0 | A | 1175 |
| 1196 | DEV_SW_1 | A | |
| 1592 | DISPLAY_MEMORY | A | 1546 |
| 1609 | DISP_MEM_5517 | A | 1599 |
| 136 | DOWN_FLAG | A | |
| 1264 | DROP_ACCESS | A | |
| | DROP_BIT_AL | E | 1995,2068 |
| 143 | DROP_CMD_BF | A | |
| 230 | DROP_CMD_PORT | A | 733 |
| 231 | DROP_DATA_PORT | A | 681,829 |
| 1160 | DROP_INIT_LP | A | 1218 |
| | DROP_MAP_SET | E | 1223,2064 |
| 108 | DROP_NO | A | 1196,1976 |
| 105 | DROP_NO_BIT | A | |
| 1931 | DROP_RESPONSE | A | 1264 |
| 1940 | DROP_RESP_01 | A | 1937 |
| 1958 | DROP_RESP_04 | A | 1939 |
| 2019 | DROP_RESP_94 | A | 1942 |
| 1944 | DROP_RESP_NOP | A | 1933,1941,1948,1967 |
| | DROP_TO_CONV | E | 1998,2004,2027,2067 |
| 1213 | DRP_NEXT | A | 1161 |
| 120 | DS1 | A | 121,122,123,125,126,127,128,130,131,132,133,134,135,136,137,138 |
| 142 | DS16 | A | 143,144,145,147 |
| 81 | DS2 | A | 82,83,84,85,86,87,88,89,90,91,92,93,94,95,96,97,99,100,101,102,103,104,105,106,108,109,110,113 |
| 97 | ECHO_BACK_ADRS | A | |
| 1584 | ECHO_BACK_CMD | A | 1542 |
| 91 | ECHO_BACK_FLAG | A | 447,922,1016,1110,1446,1451 |
| 1586 | ECHO_BACK_SUMU | A | |
| 161 | ECU_ADDRESS | A | 162,163,164,999,1006,1576,1586,1606,1616,1730 |
| 1278 | ECU_ADRS_NEW | A | 1265 |
| 1729 | ECU_ADRS_READ | A | 461,1278 |
| 232 | ECU_H_ADDRESS | H | 1728 |
| 233 | ECU_L_ADDRESS | A | 1725 |
| 2001 | ELSE_STATUS | A | 1995 |
| 1068 | EOI | A | |
| 182 | ES_BACK_UP | A | 1356 |
| 183 | ES_BACK_UP_1 | A | 430,499,1357,1357,1359,1366,1367,1368,1371 |
| 194 | ES_BACK_UP_2 | A | 477,499,1351,1360,1374 |
| 186 | ES_EVENT_TIMER | A | 1319,1745,1804,1807 |
| 62 | EVENT_CHANNEL | A | 1316,1341 |
| 1804 | EVENT_DATA_CL | A | 472 |
| 123 | EVENT_ENABLE | A | |
| 194 | EVENT_KEY_CODE | A | |
| | EVENT_LED_OFF | E | 1206,2063 |
| 153 | EVENT_NO_FREQ | A | 1810,1818 |
| 914 | EXIT | A | 883,895,899 |
| 72 | A200H | A | 73,74,75,76 |
| 239 | ACHC | A | 343,346,354,362,370,373,377,381,539,569,571,574,582,604,610,614,642,355,359, 360,901,915,969,1023,1029 1031,1047,1048,1052,1054,1056,1082,1085,1091,1095, 1097,1100 |
| 238 | ACHD | A | 325,333,639,952 |
| 1873 | ADDER | A | 1893 |
| 1876 | ADDER_1 | A | 1874 |
| 1006 | ALOHA_CHECK | A | |
| 214 | ASCII_AO | A | |
| 208 | ASCII_AU | A | |
| 212 | ASCII_CL | A | |
| 218 | ASCII_CO | A | |
| 215 | ASCII_DE | A | |
| 207 | ASCII_ER | A | |
| 210 | ASCII_FC | A | |
| 217 | ASCII_MO | A | |
| 216 | ASCII_NU | A | |
| 211 | ASCII_PC | A | |
| 219 | ASCII_PP | A | |
| 209 | ASCII_SC | A | |
| 213 | ASCII_SE | A | |
| 195 | AUTHO_KEY_CODE | A | |
| 486 | BACK_UP_CK1 | A | 490 |
| 504 | BACK_UP_CK2 | A | 509 |
| 514 | BACK_UP_EXIT | A | 482,493,510 |
| 483 | BACK_UP_KAI | A | 479 |
| 512 | BACK_UP_HOME | A | 495 |
| 497 | BACK_UP_YES | A | |
| 94 | BASE_POINT | A | 1768 |
| | BASE_ROUTINE | E | 1766,2075 |
| 1767 | BASE_WA_DOKO | A | 1765 |
| 66 | BASIC_AUTHO | A | 1790 |
| 241 | BCHC | A | 350,358,366,584,588 |
| 240 | BCHD | A | |
| 122 | BEFOR_EVENT | A | 1379 |
| 52 | BIAS | A | 55,56,57,58,59,60,61,62,64,65,66,276 |
| 96 | BINARY_LED | A | |
| | BINDEC_LED | E | 1345,1663,2068 |
| 1846 | CAL_STDA | A | 1849 |
| 1852 | CAL_STDB | A | 1855 |
| 1459 | CCC_CMD_20_7F | A | 1456 |
| 1486 | CCC_CMD_JMPTBL | A | |
| 1649 | CCC_DROP_CMD | A | 1457 |
| 1898 | CH4_5 | A | 1869 |

```
1895  CH6_62            A  1867
1906  CHANNEL_HOSEI     A  471
1805  CHIHARU           A  1808
  73  CH_NO_FREQ        A  1819,1885,1906
 199  CLEAR_KEY_CODE    A
1464  COLD_START        A  1461
  99  CONV_NO           A  431,1226,1228,1230,1232,1234,1342
 104  CONV_NO_BIT       A  1337
 117  CONV_SELECT       A  434,435,436,437
1982  CONV_SW_0         A  1975
1976  CONV_SW_1         A
      CONV_SW_BIT_AL    E  1192,1973,2059
1989  CONV_SW_SET       A  1978,1981,1987
      CONV_TO_DROP      E  1334,1389,1471,1658,2066
 109  EXTRN_STAT        A  530,362,876
1466  FORCED_KEY        A  1459
1670  FORCED_OFF        A  1661
1663  FORCED_ON         A
1655  FORCED_TUNE       A  1544
1482  FORWARD_CMDTBL    A  1454
1446  FORWARD_CMD_CK    A  1256
1451  FORWARD_COME      A  1448
1476  FORWARD_JUMP      A  1484
1858  FREQ_CAL          A  1847,1853
1843  FREQ_CALC         A  470
 145  FROM_OBF_BF       A  1141,1144,1150,1153,1167,1170,1931,1934,1954
1141  HAJIME1           A  1143,1147
1139  HAJIMERUYO        A  551
 568  HDLC_TX_START     A  1696
 170  HISTORY_BUFFER    A  459,735,824
 952  HON               A
1150  HONBAN1           A  1152,1156
 127  HSB_LED           A
 782  IBF_1ST           A
 828  IBF_2ND           A  780
 785  IBF_EMPTY         A
 790  IBF_EXIST         A  783
 774  IBF_INTERRUPT     A
 825  IBF_MEMO          A  823
  58  IBF_OVER_FLOW     A
 803  IBF_PACKET        A  799
 840  IBF_RET           A  788,826,834
 830  IBF_SET           A
 101  IC_BYTE           A  1333,1377,1467,1656
      IC_DROP_DEVICE    E  1388,1470,1657,2058
 103  ID_BYTE           A  1164,1180,1951,1960,2007,2024,2034
      ID_DROP_DEVICE    E  1165,1335,1952,2026,2057
 169  INDEX_HISTORY     A  460,724,736,803,825
  82  INDEX_RX_1        A  427,1676
  86  INDEX_RX_2        A  441,742,753
  83  INDEX_TX_1        A  428,776,796,831
  87  INDEX_TX_2        A  440
1773  INIT_AUTHO_TBL    A  463
1833  INIT_CODE         A  465
1835  INIT_CODE_LP      A  1838
1747  INIT_EV_1         A  1750
1745  INIT_EV_TIMER     A  473
1761  INIT_JUMP_LP      A  1764
1755  INIT_JUMP_TBL     A  515
  95  INIT_POINT        A  1758
1737  INIT_TIM_LP       A  1740
1735  INIT_TIM_TBL      A  514
1792  INIT_VIEW_LP      A  1799
1790  INIT_VIEW_TBL     A  464
1757  INIT_WA_DOKO      A  1755
 235  INT1OFST          A  288
 236  INT3OFST          A  292
 234  INT_OFST          A  296
  75  JUMP_ADDRESS      A  1759
      JUMP_ADRS_INIT    E  1989,2015,2076
      JUMP_ADRS_INIZ    E  1980,1988,2077
1782  JUN               A  1785
1775  JUNKO             A  1778
1271  KEY_APPLICAT      A  1258
 130  KEY_DATA          A  1387,1469,1997,2030
 160  KEY_DATA_STACK    A  161
1993  KEY_DEPRESS       A  1971
      KEY_OPERATION     E  1271,1472,2065
 205  KEY_PUSH_CODE     A  1996
      LED_VIEW_TBL      E  1664,2069
      LOAD_FROM_DROP    E  1142,1151,1168,1932,2054
      LOAD_TO_DROP      E  1650,2055
 873  LOY               A  868
 876  LOZ               A  871,875
1812  LP1               A  1816
1821  LP2               A  1827
 125  LSB_LED           A
1256  MAIN_LOOP         A  1272,1279
 424  MAIN_START        A
 197  MINUS_KEY_CODE    A
```

```
1371  MOV_1_INIT          A  1364
1363  MOV_1_ST            A  1354
1356  MOV_2_ND            A
 126  MSB_LED             A
1871  MULTI               A  1896,1899
 108  MUL_ADR             A  1843,1871
 191  MUL_NO              A  1843
1016  MY_ADRS             A  1000,1002
1014  MY_ALOHA            A
  76  NEXT_GO_ADRS        A
 121  NOW_EVENT           A  1311,1331
1580  NO_SEND             A  1568
 116  OBF_BF_BYTE         A
 114  OBF_BF_CMD          A  453,756
 115  OBF_BF_ID           A
 113  OBF_BF_N            A  114,115,116,117,446,688,689,690,755
 679  OBF_INTERRUPT       A
 736  OBF_MEMO            A  734
 755  OBF_NEW             A  740
 722  OBF_PACKET          A
 759  OBF_RET             A  700,712,720
 700  OBF_RET_1           A  703
 131  ONE_SEC_TIMER       A  457
 196  ONOFF_KEY_CODE      A
      OP_INITIAL          E  1756,2074
      OP_SPU_OFF          E  1670,2073
 175  PAGE_MEM            A  450,733,822
  90  PAGE_SW             A  451,950,996,1020
      PAY_GROUP_1         E  1490,2080
      PAY_GROUP_2         E  1492,2081
  61  PC_CODE             A  1833
 137  PC_FC_EXIST         A
  65  PC_FC_LIST          A  1773
 193  PLUS_KEY_CODE       A
1223  POLLING_SEQ         A  1216
 222  POP_ALL             A
      POWER_DET_CMD       E  1140,1149,2053
 138  POWER_FEED          A  432
 202  POWER_OFF_CODE      A
 201  POWER_ON_CODE       A
 129  PPV_LED             A
  55  PROGRAMVERSION      A  503,517
 221  PUSH_ALL            A
 276  RAM_CLEAR           A
 278  RAM_CLEAR_LP        A  281
1972  RECENT_ON           A
 203  RECENT_ON_CODE      A
 204  RELEASE_CODE        A
 702  RESPONSE_2          A  694
 719  RESPONSE_CHK        A  697,699,709,716
 745  RESPONSE_TRNS       A  750
 711  RESPONSE_VAL        A  707
2044  RESP_94_NRET        A  2021
1969  RESP_STATUS         A  1966
2004  RESP_VLF_ERR        A  1957
1415  RETTIM2             A  1407
  92  REVERS_CHANEL       A  448,575,1572,1585
 252  RUN                 A  1464
      RUN_CONVERTER       E  1346,1666,2071
1033  RX_CRC_ERR          A  993
  56  RX_CRC_ERROR        A  1038,1039
  57  RX_CRC_OK_YO        A  994,995
 990  RX_INTERRUPT        A
 992  RX_RCV              A
1042  RX_RECEIVE          A  992
1022  RX_RET              A  1004,1009,1040
 198  SCAN_KEY_CODE       A
  59  SCAN_MODE_FLAG      A  467
   5  SEISAKU_DD          A  520
   6  SEISAKU_MM          A  519
   8  SEISAKU_VV          A  521
   7  SEISAKU_YY          A  518
 148  SEND_ADDRESS        A  149,150,151,1575
 150  SEND_CMD_RESP       A  1570
 151  SEND_DATA_BUFF      A
 147  SEND_ENABLE         A  148,1559
1552  SEND_FUNC_MOD       A  1486
 149  SEND_INDEX          A  1563,1566,1573,1574
 200  SEND_KEY_CODE       A
 224  SEND_MAX            A
1566  SEND_RESPONSE       A  1488
2043  SENS_STATUS         A  2039
 561  SETCOM              A  347,351,355,359,363,367,374,378,382,540
1675  SPECIAL_SPU_1       A  2049
      SPU_CLEAR_DISP      E  1205,2062
 144  SPU_CMD_BF          A
      SPU_LED_DISP        E  1665,2070
      SPU_RELAY_OFF       E  1204,2061
      SPU_STATUS_REQ      E  1166,2043,2056
 177  STACK_END           A
```

```
 179 STACK_TOP        A
1619 STORE_MEMORY     A  1548
1635 STOR_MEM_5517    A  1626
1627 ST_TRNS2         A  1632
1639 ST_TRNS3         A  1637,1644
1562 S_F_M_CLR        A  1555
1558 S_F_M_SET        A  1553
 110 TEMP_R_CH        A  429,576,605,1086
 237 TIMER1_OFST      A  304
1391 TIMER_ACTIVE     A
1403 TIMER_CHK        A  1292
 168 TIMER_COUNTER    A  500,730,819,1297,1301,1348
1292 TIMER_OPERAT     A  1257
 192 TIMER_OUT_CODE   A  1396
1396 TIMER_SLEEP      A  1382,1384
1376 TIMER_TOB        A  1352,1358,1361,1369,1373
1301 TIMER_TOB2       A
1348 TIMER_TYPE_2     A  1303,1306,1312,1326,1329
1297 TIMER_YO         A  1293
  74 TIME_TABLE       A  1379,1735
  79 TO_CCC           A  439
  78 TO_DROP          A  426
 134 TUNER_CBL        A
 132 TUNER_D1         A
 133 TUNER_D2         A
 164 TX_BUFFER        A  1596
  93 TX_BUSY_FLAG     A  430,921,1109,1685,1695
1702 TX_CCC_M_RET     A  1449,1462,1494,1496,1498,1500,1502,1504,1506,1508,1510,1512,1514,1516,1518,1520,1522,
                         1524,1526,1528,153C 1532,1534,1536,1538,1540,1556,1560,1564,1580,1633,1638,1645,1651,
                         1668,1671,1687
1685 TX_CCC_RUN       A  1579,1588,1607,1617
 163 TX_COMMAND       A  1594,1621
 162 TX_LENGTH        A  1597,1624,1675
1689 TX_RUN_SUB       A
1688 TX_TRNS2         A  1605,1681
1618 TX_TRNS3         A  1615
 898 TX_UNDRN         A
1695 TX_YOSHI         A  1693
1901 UP64             A  1861
1862 UP64_D           A  1902
 135 UP_FLAG          A
  60 VIEW_CHANNEL     A  1790
  64 VLF_ERROR_MAP    A  1958,2005,2032
2016 VLF_ERR_RET      A  2014
 645 WAIT             A  594,595,596,597,598,599,600,601,635
 646 WAIT1            A  648
     WAKEARI_DE_ON    E  1667,2072
1569 YES_SEND         A
1892 ZERO             A  1863,1865
```

SOURCE LINE

```
'8086'
;
;*****************************************************************
;
SEISAKU_DD:      EQU 02H          ;
SEISAKU_MM:      EQU 12H          ;
SEISAKU_YY:      EQU 58H          ;
SEISAKU_VV:      EQU 2            ; Version No.
;*****
;*****       <<<  Application   >>>
;*****            ==============
;*****
;*****                 ------ By M.TANAKA ------
;*****
;*****    Function
;*****     (1) --- SPU Key Control
;*****             6 Drop / 4 SPU ( 2nd Subscriber )
;*****
;*****     (2) --- Ram Back up
;*****
;*****     (3) --- Hardware Check
;*****
;*****             Off Event       Conv , SW , Device No. (3 Degit)
;*****             Off Send        Revrese Data Send
;*****             Event           Event LED On
;*****
;*****
;*****
;*****
;*****
;*****
;*****
;*****
;*****************************************************************
;$$$$$
;$$$$$         <<<  Bug List  >>>
;$$$$$
;$$$$$    (1)     2< 2nd Sub. de Converter On/Off ga okashii
;$$$$$
;$$$$$
;$$$$$
;$$$$$
;$$$$$$$$$$$$$$$$$$$$$$$$$$$$$$$$$$$$$$$$$$$$$$$$$$$$$$$$$$$$$$$$$$
```

```
;
BIAS:           EQU 0000H
;
PROGRAMVERSION: EQU BIAS                ; DS 4
RX_CRC_ERROR:   EQU BIAS+4              ; DS 4
RX_CRC_OK_YO:   EQU BIAS+8              ; DS 4
IBF_OVER_FLOW:  EQU BIAS+12             ; DS 2
SCAN_MODE_FLAG: EQU BIAS+14             ; DS 1
VIEW_CHANNEL:   EQU BIAS+16             ; DS 8*2
PC_CODE:        EQU BIAS+32             ; DS 8*2
EVENT_CHANNEL   EQU BIAS+48             ; DS 8
;               EQU BIAS+56
VLF_ERROR_MAP:  EQU BIAS+128            ; DS 128
PC_FC_LIST:     EQU BIAS+256            ; DS 128
BASIC_AUTHO:    EQU BIAS+256+128        ; DS 128
                ;   BIAS+512
;
A200H:          EQU 200H
CH_NO_FREQ      EQU A200H               ; DS 256    FREQUENCY TABLE START FROM HERE
TIME_TABLE:     EQU A200H+100H          ; 8*8*2
JUMP_ADDRESS:   EQU A200H+180H          ; 8*8*2
NEXT_GO_ADRS:   EQU A200H+200H          ; 64*2
;                    --- 480H
TO_DROP:        EQU 0500H
TO_CCC:         EQU 0600H
;
DS2:            EQU 0700H
INDEX_RX_1:     EQU DS2+2*1
INDEX_TX_1:     EQU DS2+2*2
CTRL_1:         EQU DS2+2*3
CTRL_1_COUNT:   EQU DS2+2*4
INDEX_RX_2:     EQU DS2+2*5
INDEX_TX_2:     EQU DS2+2*6
CTRL_2:         EQU DS2+2*7
CTRL_2_COUNT:   EQU DS2+2*8
PAGE_SW:        EQU DS2+2*9
ECHO_BACK_FLAG: EQU DS2+2*10
REVERS_CHANEL:  EQU DS2+2*11
TX_BUSY_FLAG:   EQU DS2+2*12
BASE_POINT:     EQU DS2+2*13
INIT_POINT:     EQU DS2+2*14
BINARY_LED:     EQU DS2+2*15
ECHO_BACK_ADRS: EQU DS2+2*16

CONV_NO:        EQU DS2+2*18
DROP_NO:        EQU DS2+2*19
IC_BYTE:        EQU DS2+2*20
DEVICE_NO:      EQU DS2+2*21
ID_BYTE:        EQU DS2+2*22
CONV_NO_BIT:    EQU DS2+2*23
DROP_NO_BIT:    EQU DS2+2*24
DEVICE_NO_BIT:  EQU DS2+2*25

MUL_ADR         EQU DS2+2*29            ; DS 2      STORE #3
EXTRN_STAT      EQU DS2+2*30            ; DS 2
TEMP_R_CH       EQU DS2+2*31            ; DS 2

;                   740H
OBF_BF_N:       EQU DS2+2*32      ;     0000  0000
OBF_BF_CMD:     EQU OBF_BF_N+1
OBF_BF_ID:      EQU OBF_BF_N+2
OBF_BF_BYTE:    EQU OBF_BF_N+3
CONV_SELECT:    EQU OBF_BF_N+16 ; DS 8

;
DS1:            EQU 0780H
NOW_EVENT:      EQU DS1
BEFOR_EVENT:    EQU DS1+1
EVENT_ENABLE:   EQU DS1+2

LSB_LED:        EQU DS1+4
MSB_LED:        EQU DS1+5
HSB_LED:        EQU DS1+6
PPV_LED:        EQU DS1+7

KEY_DATA:       EQU DS1+9
ONE_SEC_TIMER:  EQU DS1+10
TUNER_D1:       EQU DS1+11
TUNER_D2:       EQU DS1+12
TUNER_CBL:      EQU DS1+13
UP_FLAG:        EQU DS1+14
DOWN_FLAG:      EQU DS1+15
PC_FC_EXIST:    EQU DS1+16
POWER_FEED:     EQU DS1+17
```

```
;
DS16:           EQU 800H
DROP_CMD_BF:    EQU DS16                        ; DS 16
SPU_CMD_BF:     EQU DS16+16*1                   ; DS 16
FROM_OBF_BF:    EQU DS16+16*2                   ; DS 16

SEND_ENABLE:    EQU DS16+16*3                   ; DS 1
SEND_ADDRESS:   EQU SEND_ENABLE+1               ; DS 2
SEND_INDEX:     EQU SEND_ADDRESS+2              ; DS 1
SEND_CMD_RESP:  EQU SEND_ADDRESS+3              ; DS 1
SEND_DATA_BUFF: EQU SEND_ADDRESS+4              ; DS 123

EVENT_NO_FREQ:  EQU 900H                        ; DS 256


HELP:           EQU 0A00H
;
;--------------------------------------
;
KEY_DATA_STACK: EQU 1000H                       ; DS 16*64*1024
ECU_ADDRESS:    EQU KEY_DATA_STACK+16*64        ; DS 2
TX_LENGTH:      EQU ECU_ADDRESS+2               ; DS 1
TX_COMMAND:     EQU ECU_ADDRESS+3               ; DS 1
TX_BUFFER:      EQU ECU_ADDRESS+4               ; DS 256


;
TIMER_COUNTER:  EQU 2000H-4
INDEX_HISTORY:  EQU 2000H-2
HISTORY_BUFFER: EQU 2000H



;
PAGE_MEM:       EQU 3000H

STACK_END:      EQU 39FFH
STACK_TOP:      EQU 4000H
;
; ************  BACK_UP RAM Area  ********************************
;
ES_BACK_UP:     EQU 0           ; DS 512
ES_BACK_UP_1:   EQU 200H        ; DS 512
ES_BACK_UP_2:   EQU 400H        ; DS 512
;
ES_EVENT_TIMER: EQU 600H        ; DS 128*6

;
; ************  Imediate Data  ***********************************
;
MUL_NO          EQU             3
TIMER_OUT_CODE: EQU 0
PLUS_KEY_CODE:  EQU 10H
EVENT_KEY_CODE: EQU 11H
AUTHO_KEY_CODE: EQU 12H
ONOFF_KEY_CODE: EQU 13H
MINUS_KEY_CODE: EQU 14H
SCAN_KEY_CODE:  EQU 15H
CLEAR_KEY_CODE: EQU 16H
SEND_KEY_CODE:  EQU 17H
POWER_ON_CODE:  EQU 18H
POWER_OFF_CODE: EQU 19H
RECENT_ON_CODE: EQU 1AH
RELEASE_CODE:   EQU 1BH
KEY_PUSH_CODE:  EQU 1CH
;
ASCII_ER:       EQU 4572H
ASCII_AU:       EQU 4155H
ASCII_SC:       EQU 5343H
ASCII_FC:       EQU 4643H
ASCII_PC:       EQU 5043H
ASCII_CL:       EQU 434CH
ASCII_SE:       EQU 5345H
ASCII_AD:       EQU 4164H
ASCII_DE:       EQU 6445H
ASCII_HU:       EQU 0D49CH
ASCII_NO:       EQU 0D4DCH
ASCII_CQ:       EQU 43DCH
ASCII_PR:       EQU 5072H
;
PUSH_ALL:       EQU 60H
POP_ALL:        EQU 61H
;
SEND_MAX:       EQU 64*2
;
; --------------------------------------------------------------
; ************  I / O  Port  *************************************
; --------------------------------------------------------------
```

```
               ;
               DROP_CMD_PORT:   EQU 082H
               DROP_DATA_PORT:  EQU 080H
               ECU_H_ADDRESS:   EQU 0102H
               ECU_L_ADDRESS:   EQU 0100H
               INT_OFST         EQU           0A0H+(5*4)
               INT1OFST         EQU           52
               INT3OFST         EQU           60
               TIMER1_OFST      EQU           72
               ACHD             EQU           00
               ACHC             EQU           04
               BCHD             EQU           02
               BCHC             EQU           06


                                ORG 1000H


               ;
1000 BE3003    JUMP_ADRS_INIT:  MOV SI,JUMP_ADDRESS
1003 B700                       MOV BH,0
1005 8A1E2C07                   MOV BL,[ID_BYTE]
1009 02D8                       ADD BL,BL
100B 8B0E1C07                   MOV CX,[INIT_POINT]
100F 8908                       MOV [SI][BX],CX
1011 C3                         RET
               ;
               ;
1012 BE8003    JUMP_ADRS_INIC:  MOV SI,JUMP_ADDRESS
1015 B700                       MOV BH,0
1017 8A1E2807                   MOV BL,[IC_BYTE]
101B 02D8                       ADD BL,BL
101D 8B0E1C07                   MOV CX,[INIT_POINT]
1021 8908                       MOV [SI][BX],CX
1023 C3                         RET
               ;
               ;
1024 BE8003    JUMP_ADRS_INIZ:  MOV SI,JUMP_ADDRESS
1027 B700                       MOV BH,0
1029 8A1E2C07                   MOV BL,[ID_BYTE]
102D 80F301                     XOR BL,1
1030 02D8                       ADD BL,BL
1032 8B0E1C07                   MOV CX,[INIT_POINT]
1036 8908                       MOV [SI][BX],CX
1038 C3                         RET
               ; ************   Converter ---> Drop ni hankan *******
1039 56        CONV_TO_DROP:    PUSH SI
103A E84E00                     CALL CONV_SW_BIT_AL
103D 2204                       AND AL,[SI]
103F 7418                       JZ HIROKO
1041 8A262807                   MOV AH,[IC_BYTE]
1045 80E4FE                     AND AH,0FEH
1048 88262C07                   MOV [ID_BYTE],AH
104C 8A262407                   MOV AH,[CONV_NO]
1050 80E406                     AND AH,06H
1053 88262607                   MOV [DROP_NO],AH
1057 5E                         POP SI
1058 C3                         RET
1059 8A262807  HIROKO:          MOV AH,[IC_BYTE]
105D 88262C07                   MOV [ID_BYTE],AH
1061 8A262407                   MOV AH,[CONV_NO]
1065 88262607                   MOV [DROP_NO],AH
1069 5E                         POP SI
106A C3                         RET
               ;
               ;
106B 56        DROP_TO_CONV:    PUSH SI
106C E81C00                     CALL CONV_SW_BIT_AL
106F 2204                       AND AL,[SI]
1071 7402                       JZ HIROYO
1073 B001                       MOV AL,1
1075 8A262C07  HIROYO:          MOV AH,[ID_BYTE]
1079 0AE0                       OR AH,AL
107B 88262807                   MOV [IC_BYTE],AH
107F 8A262607                   MOV AH,[DROP_NO]
1083 0AE0                       OR AH,AL
1085 88262407                   MOV [CONV_NO],AH
1089 5E                         POP SI
108A C3                         RET
               ;
               ;
108B BE5007    CONV_SW_BIT_AL:  MOV SI,CONV_SELECT
108E B500                       MOV CH,0
1090 8A0E2607                   MOV CL,[DROP_NO]
1094 03F1                       ADD SI,CX
1096 E88505                     CALL DEVICE_BIT_AL
1099 C3                         RET
               ;
109A 50        CONV_SW_FLAG:    PUSH AX
109B 51                         PUSH CX
```

```
109C 56                   PUSH SI
109D E8EBFF               CALL CONV_SW_BIT_AL
10A0 2204                 AND AL,[SI]
10A2 5E                   POP SI
10A3 59                   POP CX
10A4 58                   POP AX
10A5 C3                   RET
          ;
          ; ***********  ID_BYTE  ---> DROP_NO , DEVICE_NO  *************
          ;
10A6 50       ID_DROP_DEVICE: PUSH AX
10A7 51                   PUSH CX
10A8 8A262C07             MOV AH,[ID_BYTE]
10AC 8AC4                 MOV AL,AH
10AE 80E407               AND AH,7
10B1 88262607             MOV [DROP_NO],AH
10B5 B103                 MOV CL,3           ; A4 A3 A2 A1   A0 D2 D1 D0
10B7 D2C8                 ROR AL,CL          ; -  -  -  A4   A3 A2 A1 A0
10B9 2407                 AND AL,7           ; 0  0  0  A4   A3 A2 A1 A0
10BB A22A07               MOV [DEVICE_NO],AL
          ;
10BE E91800               JMP MAKE_DATA
          ;
          ; ***********  IC_BYTE  ---> CONV_NO , DEVICE_NO  *************
          ;
10C1 50       IC_DROP_DEVICE: PUSH AX
10C2 51                   PUSH CX
10C3 8A262907             MOV AH,[IC_BYTE]
10C7 8AC4                 MOV AL,AH
10C9 80E407               AND AH,7
10CC 88262407             MOV [CONV_NO],AH
10D0 B103                 MOV CL,3           ; A4 A3 A2 A1   A0 D2 D1 D0
10D2 D2C8                 ROR AL,CL          ; -  -  -  A4   A3 A2 A1 A0
10D4 2407                 AND AL,7           ; 0  0  0  A4   A3 A2 A1 A0
10D6 A22A07               MOV [DEVICE_NO],AL
          ;
10D9 B001     MAKE_DATA:  MOV AL,1
10DB 8A0E2407             MOV CL,[CONV_NO]
10DF D2C0                 ROL AL,CL
10E1 A22E07               MOV [CONV_NO_BIT],AL
          ;
10E4 B001                 MOV AL,1
10E6 8A0E2607             MOV CL,[DROP_NO]
10EA D2C0                 ROL AL,CL
10EC A23007               MOV [DROP_NO_BIT],AL
          ;
10EF B001                 MOV AL,1
10F1 8A0E2A07             MOV CL,[DEVICE_NO]
10F5 D2C0                 ROL AL,CL
10F7 A23207               MOV [DEVICE_NO_BIT],AL
          ;
10FA 59                   POP CX
10FB 58                   POP AX
10FC C3                   RET
          ;
          ; ***********  TO_DROP Buffer Space ?  ***********************
          ;
10FD A00607   TO_DROP_SPACE: MOV AL,[CTRL_1]
1100 3C28                 CMP AL,40
1102 F5                   CMC
1103 C3                   RET
          ;
          ; ***********  AL Wa Suuji Kai     ?  ***********************
          ;
1104 3C30     KAZUKO:     CMP AL,30H
1106 7203                 JC KAZUKO_RET
1108 3C3A                 CMP AL,3AH
110A F5                   CMC
110B C3       KAZUKO_RET: RET
          ;
          ; ***********  TO_DROP  Buffer ni ireru  *********************
          ;
110C E8EEFF   LOAD_TO_DROP: CALL TO_DROP_SPACE   ; Korenara Anzenne !!!!!!!!!!!!
110F 721F                 JC IBF_OVR
          ;
1111 8B1E0207             MOV BX,[INDEX_RX_1]
1115 8A0C                 MOV CL,[SI]
1117 FEC1                 INC CL
1119 8A24     LD1:        MOV AH,[SI]
111B 8827                 MOV [BX],AH
111D FEC3                 INC BL
111F 46                   INC SI
1120 FEC9                 DEC CL
1122 75F5                 JNZ LD1
1124 FE060607             INC BYTE PTR [CTRL_1]
1128 891E0207             MOV [INDEX_RX_1],BX
112C E84705               CALL IBF_UNMASK
112F C3       RETRN:      RET
1130 FF060C00 IBF_OVR:    INC WORD PTR [IBF_OVER_FLOW]
1134 C3                   RET
```

```
                      ;
                      ; ************  TO_CCC   Buffer kara toridasu  ******************
                      ;
1135 A00E07           LOAD_FROM_DROP: MOV AL,[CTRL_2]
1138 3C01                             CMP AL,1
113A 72F3                             JC RETRN
113C 8B1E0C07                         MOV BX,[INDEX_TX_2]
1140 8A0F                             MOV CL,[BX]
1142 FEC1                             INC CL
1144 8A27             LD2:            MOV AH,[BX]
1146 8824                             MOV [SI],AH
1148 FEC3                             INC BL
114A 46                               INC SI
114B FEC9                             DEC CL
114D 75F5                             JNZ LD2
114F FE0E0E07                         DEC BYTE PTR [CTRL_2]
1153 891E0C07                         MOV [INDEX_TX_2],BX
1157 F8                               CLC
1158 C3                               RET
                      ;
                      ; ************  DROP MAP Set  *************************************
                      ;
1159 BE0008           DROP_MAP_SET:   MOV SI,DROP_CMD_BF
115C C60405                           MOV BYTE PTR [SI],5
115F C6440107                         MOV BYTE PTR [SI+1],7
1163 C6440210                         MOV BYTE PTR [SI+2],10H
1167 C6440332                         MOV BYTE PTR [SI+3],32H
116B C6440454                         MOV BYTE PTR [SI+4],54H
116F C64405F0                         MOV BYTE PTR [SI+5],0F0H
1173 E896FF                           CALL LOAD_TO_DROP
1176 C3                               RET
                      ;
                      ; ************  Power Detect Command  *****************************
                      ;
1177 BE0008           POWER_DET_CMD:  MOV SI,DROP_CMD_BF
117A C60401                           MOV BYTE PTR [SI],1
117D C6440101                         MOV BYTE PTR [SI+1],1
1181 E888FF                           CALL LOAD_TO_DROP
1184 C3                               RET
                      ;
                      ; ************  Subscriber Power OFF Control  *******************
                      ;
1185 BE0008           CONV_P_OFF_CMD: MOV SI,DROP_CMD_BF
1188 C60402                           MOV BYTE PTR [SI],2
118B C6440105                         MOV BYTE PTR [SI+1],5
118F A02407                           MOV AL,[CONV_NO]
1192 2407                             AND AL,7
1194 884402                           MOV BYTE PTR [SI+2],AL
1197 E872FF                           CALL LOAD_TO_DROP
                      ;
119A A02E07                           MOV AL,[CONV_NO_BIT]
119D 343F                             XOR AL,3FH
119F 20068007                         AND [NOW_EVENT],AL
11A3 C3                               RET
                      ;
                      ; ************  Subscriber Power ON Control  ********************
                      ;
11A4 BE0008           CONV_P_ON_CMD:  MOV SI,DROP_CMD_BF
11A7 C60402                           MOV BYTE PTR [SI],2
11AA C6440105                         MOV BYTE PTR [SI+1],5
11AE A08D07                           MOV AL,[TUNER_CBL]
11B1 884402                           MOV BYTE PTR [SI+2],AL
11B4 E855FF                           CALL LOAD_TO_DROP
11B7 C3                               RET
                      ;
                      ; ************  Select Subscriber Cable  ************************
                      ;
11B8 C3               CABLE_SEL_CMD:  RET
11B9 BE0008                           MOV SI,DROP_CMD_BF
11BC C60402                           MOV BYTE PTR [SI],2
11BF C6440106                         MOV BYTE PTR [SI+1],6
11C3 A08D07                           MOV AL,[TUNER_CBL]
11C6 247F                             AND AL,7FH
11C8 884402                           MOV BYTE PTR [SI+2],AL
11CB E83EFF                           CALL LOAD_TO_DROP
11CE C3                               RET
                      ;
                      ; ************  Tuner Frequency Change Request  ****************
                      ;
11CF BE0008           TUNER_FREQ_CMD: MOV SI,DROP_CMD_BF
11D2 C60404                           MOV BYTE PTR [SI],4
11D5 C6440103                         MOV BYTE PTR [SI+1],3
11D9 A02407                           MOV AL,[CONV_NO]
11DC 884402                           MOV BYTE PTR [SI+2],AL
11DF A08B07                           MOV AL,[TUNER_D1]
11E2 884403                           MOV BYTE PTR [SI+3],AL
11E5 A08C07                           MOV AL,[TUNER_D2]
11E8 884404                           MOV BYTE PTR [SI+4],AL
11EB E81EFF                           CALL LOAD_TO_DROP
11EE C3                               RET
```

```
                    ;
                    ; ************  Converter Wo Ugokasu Program  ********************
                    ;
                    ;
11EF 50             RUN_CONVERTER:  PUSH AX
11F0 53                             PUSH BX
11F1 56                             PUSH SI
                    ;
11F2 A02C07                         MOV AL,[ID_BYTE]
11F5 50                             PUSH AX
                    ;
11F6 E8AF00                         CALL GO_CONVERTER
                    ;
11F9 BE8003                         MOV SI,JUMP_ADDRESS
11FC B700                           MOV BH,0
11FE 8A1E2607                       MOV BL,[DROP_NO]
1202 80C310                         ADD BL,10H
1205 8AF3                           MOV DH,BL                 ; DH = First ID_BYTE
1207 02DB                           ADD BL,BL
1209 03DE                           ADD BX,SI                 ; BX = First SPU JUMP_ADDRESS
120B B202                           MOV DL,2                  ; DL = First SPU No.
120D E88AFE                         CALL CONV_SW_FLAG
1210 7520                           JNZ CONV1_VIEW_CK
                    ;
                    ;
1212 88362C07       CONV0_VIEW_CK:  MOV [ID_BYTE],DH
1216 88162A07                       MOV [DEVICE_NO],DL
121A E87DFE                         CALL CONV_SW_FLAG
121D 7503                           JNZ CONV0_NEXT
                    ;
121F E84000                         CALL CONV_SUB
                    ;
1222 83C310         CONV0_NEXT:     ADD BX,10H      ; JUMP_ADDRESS
1225 80C608                         ADD DH,8        ; ID_BYTE
1229 FEC2                           INC DL          ; CONV_NO
122A 80FA06                         CMP DL,6
122D 75E3                           JNZ CONV0_VIEW_CK
122F E91D00                         JMP CONV_OP_END
                    ;
1232 88362C07       CONV1_VIEW_CK:  MOV [ID_BYTE],DH
1236 88162A07                       MOV [DEVICE_NO],DL
123A E85DFE                         CALL CONV_SW_FLAG
123D 7403                           JZ CONV1_NEXT
                    ;
123F E82000                         CALL CONV_SUB
                    ;
1242 83C310         CONV1_NEXT:     ADD BX,10H      ; JUMP_ADDRESS
1245 80C608                         ADD DH,8        ; ID_BYTE
1248 FEC2                           INC DL          ; CONV_NO
124A 80FA06                         CMP DL,6
124D 75E3                           JNZ CONV1_VIEW_CK
                    ;
124F 58             CONV_OP_END:    POP AX
1250 A22C07                         MOV [ID_BYTE],AL
1253 E850FE                         CALL ID_DROP_DEVICE
1256 A08007                         MOV AL,[NOW_EVENT]
1259 243F                           AND AL,3FH
125B A28107                         MOV [BEFOR_EVENT],AL
                    ;
125E 5E                             POP SI
125F 5B                             POP BX
1260 58                             POP AX
1261 C3                             RET
                    ;
1262 8B0F           CONV_SUB:       MOV CX,[BX]
1264 3B0E1C07                       CMP CX,[INIT_POINT]
1268 743D                           JZ AKEMI
126A 53                             PUSH BX
126B 52                             PUSH DX
                    ;
126C 8A268007                       MOV AH,[NOW_EVENT]
1270 F6C4C0                         TEST AH,0C0H
1273 750E                           JNZ AYA0
1275 32268107                       XOR AH,[BEFOR_EVENT]
1279 84262E07                       TEST AH,[CONV_NO_BIT]
127D 741D                           JZ MODE_SAME
127F 8A268007                       MOV AH,[NOW_EVENT]
1283 F6C480         AYA0:           TEST AH,80H
1286 7411                           JZ AYA3
1288 F6C440                         TEST AH,40H
128B 7406                           JZ AYA2
128D E88801         AYA1:           CALL EVENT_LED_NRM
1290 E90900                         JMP MODE_SAME
                    ;
1293 E8D901         AYA2:           CALL EVENT_LED_FLH
1296 E90300                         JMP MODE_SAME
                    ;
1299 E88701         AYA3:           CALL EVENT_LED_OFF
                    ;
129C 3B0E1A07       MODE_SAME:      CMP CX,[BASE_POINT]
```

```
12A0 7503                            JNZ AKINA
12A2 E80602                          CALL SPU_LED_DISP
12A5 5A              AKINA:          POP DX
12A6 5B                              POP BX
                     ;
12A7 C3              AKEMI:          RET
                     ;
12A8 8A3E8507        GO_CONVERTER:   MOV BH,[MSB_LED]
12AC 8A1E8407                        MOV BL,[LSB_LED]
12B0 E8EB03                          CALL DECBIN_BX
                     ;        ****** EVENT Program Taiou  ******
12B3 BE0009                          MOV SI,EVENT_NO_FREQ
12B6 A08007                          MOV AL,[NOW_EVENT]
12B9 84062E07                        TEST AL,[CONV_NO_BIT]
12BD 7503                            JNZ CONV_EVENT
12BF BE0002                          MOV SI,CH_NO_FREQ
12C2 03F3            CONV_EVENT:     ADD SI,BX
                     ;
12C4 8A00                            MOV AL,[SI][BX]
12C6 A29B07                          MOV [TUNER_D1],AL
12C9 8A6001                          MOV AH,[SI][BX+1]
12CC 88268C07                        MOV [TUNER_D2],AH
12D0 D0C4                            ROL AH
12D2 80E440                          AND AH,40H
12D5 80CC80                          OR AH,80H
12D8 0A262407                        OR AH,[CONV_NO]
12DC 88268D07                        MOV [TUNER_CBL],AH
12E0 E8C1FE                          CALL CONV_P_ON_CMD
12E3 E8D2FE                          CALL CABLE_SEL_CMD
12E6 E8E6FE                          CALL TUNER_FREQ_CMD
12E9 C3                              RET
                     ;
                     ;
                     ;
12EA BE8003          STP_CONVERTER:  MOV SI,JUMP_ADDRESS
12ED B700                            MOV BH,0
12EF 8A1E2607                        MOV BL,[DROP_NO]
12F3 80C310                          ADD BL,10H
12F6 8AF3                            MOV DH,BL               ; DH = First ID_BYTE
12F8 02DB                            ADD BL,BL
12FA 03DE                            ADD BX,SI               ; BX = First SPU JUMP_ADDRESS
12FC B202                            MOV DL,2                ; DL = First SPU No.
12FE E899FD                          CALL CONV_SW_FLAG
1301 7525                            JNZ CONV1_STP_CK
                     ;
                     ;
1303 88362C07        CONV0_STP_CK:   MOV [ID_BYTE],DH
1307 88162A07                        MOV [DEVICE_NO],DL
130B E88CFD                          CALL CONV_SW_FLAG
130E 7508                            JNZ STPC0_NEXT
1310 8B0E1C07                        MOV CX,[INIT_POINT]
1314 390F                            CMP [BX],CX
1316 7534                            JNZ CONV_VIEW_YET
1318 83C310          STPC0_NEXT:     ADD BX,10H        ; JUMP_ADDRESS
131B 80C608                          ADD DH,8          ; ID_BYTE
131E FEC2                            INC DL            ; CONV_NO
1320 80FA06                          CMP DL,6
1323 75DE                            JNZ CONV0_STP_CK
1325 E92200                          JMP CONV_VIEW_STP
                     ;
1328 88362C07        CONV1_STP_CK:   MOV [ID_BYTE],DH
132C 88162A07                        MOV [DEVICE_NO],DL
1330 E867FD                          CALL CONV_SW_FLAG
1333 7408                            JZ STPC1_NEXT
1335 8B0E1C07                        MOV CX,[INIT_POINT]
1339 390F                            CMP [BX],CX
133B 750F                            JNZ CONV_VIEW_YET
133D 83C310          STPC1_NEXT:     ADD BX,10H        ; JUMP_ADDRESS
1340 80C608                          ADD DH,8          ; ID_BYTE .
1343 FEC2                            INC DL            ; CONV_NO
1345 80FA06                          CMP DL,6
1348 75DE                            JNZ CONV1_STP_CK
                     ;
134A F8              CONV_VIEW_STP:  CLC
134B C3                              RET
                     ;
134C F9              CONV_VIEW_YET:  STC
134D C3                              RET
                     ;
                     ; ************  Device MAP Set  *********************************
                     ;
134E A02407          DEVICE_MAP_SET: MOV AL,[CONV_NO]
1351 BE0008                          MOV SI,DROP_CMD_BF
1354 C60407                          MOV BYTE PTR [SI],7
1357 C6440108                        MOV BYTE PTR [SI+1],8
135B 884402                          MOV BYTE PTR [SI+2],AL        ; Drop No. = ( AL )
135E C6440332                        MOV BYTE PTR [SI+3],32H
1362 C6440454                        MOV BYTE PTR [SI+4],54H
1366 C64405FF                        MOV BYTE PTR [SI+5],0FFH
136A C64406FF                        MOV BYTE PTR [SI+6],0FFH
```

```
136E C64407F0            MOV BYTE PTR [SI+7],0F0H
1372 E897FD              CALL LOAD_TO_DROP
1375 C3                  RET
     ;
     ; ************  SPU Status Request Command Create  **************
     ;
1376 BE1008     SPU_STATUS_REQ: MOV SI,SPU_CMD_BF
1379 C60404              MOV BYTE PTR [SI],4            ; Length
137C C6440104            MOV BYTE PTR [SI+1],4          ; Drop Command
1380 A02C07              MOV AL,[ID_BYTE]
1383 884402              MOV BYTE PTR [SI+2],AL         ; ID_BYTE
1386 C6440301            MOV BYTE PTR [SI+3],1          ; Byte Count
138A A02A07              MOV AL,[DEVICE_NO]
138D 884404              MOV BYTE PTR [SI+4],AL         ; Status Req. Command
1390 E879FD              CALL LOAD_TO_DROP
1393 C3                  RET
     ;
     ; ************  Clear Device Display  Command  *****************
     ;
1394 BE1008     SPU_CLEAR_DISP: MOV SI,SPU_CMD_BF
1397 C60404              MOV BYTE PTR [SI],4            ; Length
139A C6440104            MOV BYTE PTR [SI+1],4          ; Drop Command
139E A02C07              MOV AL,[ID_BYTE]
13A1 884402              MOV BYTE PTR [SI+2],AL         ; ID_BYTE
13A4 C6440301            MOV BYTE PTR [SI+3],1          ; Byte Count
13A8 A02A07              MOV AL,[DEVICE_NO]
13AB 0C30                OR AL,30H
13AD 884404              MOV BYTE PTR [SI+4],AL         ; Clear Disp. Command
13B0 E859FD              CALL LOAD_TO_DROP
13B3 C3                  RET
     ;
     ; ************  Relay Control ON Command  **********************
     ;
13B4 BE1008     SPU_RELAY_ON:   MOV SI,SPU_CMD_BF
13B7 C60405              MOV BYTE PTR [SI],5            ; Length
13BA C6440104            MOV BYTE PTR [SI+1],4          ; Drop Command
13BE A02C07              MOV AL,[ID_BYTE]
13C1 884402              MOV BYTE PTR [SI+2],AL         ; ID_BYTE
13C4 C6440302            MOV BYTE PTR [SI+3],2          ; Byte Count
13C8 A02A07              MOV AL,[DEVICE_NO]
13CB 0C28                OR AL,28H
13CD 884404              MOV BYTE PTR [SI+4],AL         ; Relay Cont. Command
13D0 B0FF                MOV AL,0FFH
13D2 884405              MOV BYTE PTR [SI+5],AL         ;       ON
13D5 E834FD              CALL LOAD_TO_DROP
13D8 C3                  RET
     ;
     ; ************  Relay Control OFF Command  *********************
     ;
13D9 BE1008     SPU_RELAY_OFF:  MOV SI,SPU_CMD_BF
13DC C60405              MOV BYTE PTR [SI],5            ; Length
13DF C6440104            MOV BYTE PTR [SI+1],4          ; Drop Command
13E3 A02C07              MOV AL,[ID_BYTE]
13E6 884402              MOV BYTE PTR [SI+2],AL         ; ID_BYTE
13E9 C6440302            MOV BYTE PTR [SI+3],2          ; Byte Count
13ED A02A07              MOV AL,[DEVICE_NO]
13F0 0C28                OR AL,28H
13F2 884404              MOV BYTE PTR [SI+4],AL         ; Relay Cont. Command
13F5 B000                MOV AL,0
13F7 884405              MOV BYTE PTR [SI+5],AL         ;       OFF
13FA E80FFD              CALL LOAD_TO_DROP
13FD C3                  RET
     ;
     ; ************  Event LED ON Command  **************************
     ;
13FE BE1008     EVENT_LED_ON:   MOV SI,SPU_CMD_BF
1401 C60405              MOV BYTE PTR [SI],5            ; Length
1404 C6440104            MOV BYTE PTR [SI+1],4          ; Drop Command
1408 A02C07              MOV AL,[ID_BYTE]
140B 884402              MOV BYTE PTR [SI+2],AL         ; ID_BYTE
140E C6440302            MOV BYTE PTR [SI+3],2          ; Byte Count
1412 A02A07              MOV AL,[DEVICE_NO]
1415 0C08                OR AL,8
1417 884404              MOV BYTE PTR [SI+4],AL         ; Event LED Cont. Command
141A B0FF                MOV AL,0FFH
141C 884405              MOV BYTE PTR [SI+5],AL         ;       ON
141F E8EAFC              CALL LOAD_TO_DROP
1422 C3                  RET
     ;
     ; ************  Event LED OFF Command  *************************
     ;
1423 BE1008     EVENT_LED_OFF:  MOV SI,SPU_CMD_BF
1426 C60405              MOV BYTE PTR [SI],5            ; Length
1429 C6440104            MOV BYTE PTR [SI+1],4          ; Drop Command
142D A02C07              MOV AL,[ID_BYTE]
1430 884402              MOV BYTE PTR [SI+2],AL         ; ID_BYTE
1433 C6440302            MOV BYTE PTR [SI+3],2          ; Byte Count
1437 A02A07              MOV AL,[DEVICE_NO]
143A 0C08                OR AL,8
143C 884404              MOV BYTE PTR [SI+4],AL         ; Event LED Cont. Command
```

```
143F B000                    MOV AL,0
1441 884405                  MOV BYTE PTR [SI+5],AL           ;       OFF
1444 E8C5FC                  CALL LOAD_TO_DROP
1447 C3                      RET
                        ;
                        ; ************  Event LED Normal Command  ***********************
                        ;
1448 E8B3FF             EVENT_LED_NRM:  CALL EVENT_LED_ON
144B BE1008                  MOV SI,SPU_CMD_BF
144E C60405                  MOV BYTE PTR [SI],5              ; Length
1451 C6440104                MOV BYTE PTR [SI+1],4            ; Drop Command
1455 A02C07                  MOV AL,[ID_BYTE]
1458 884402                  MOV BYTE PTR [SI+2],AL           ; ID_BYTE
145B C6440302                MOV BYTE PTR [SI+3],2            ; Byte Count
145F A02A07                  MOV AL,[DEVICE_NO]
1462 0C10                    OR AL,10H
1464 884404                  MOV BYTE PTR [SI+4],AL           ; Event LED Mode Command
1467 C6440500                MOV BYTE PTR [SI+5],0            ;       Normal
146B E89EFC                  CALL LOAD_TO_DROP
146E C3                      RET
                        ;
                        ; ************  Event LED Flash Command  ************************
                        ;
146F E88CFF             EVENT_LED_FLH:  CALL EVENT_LED_ON
1472 BE1008                  MOV SI,SPU_CMD_BF
1475 C60405                  MOV BYTE PTR [SI],5              ; Length
1478 C6440104                MOV BYTE PTR [SI+1],4            ; Drop Command
147C A02C07                  MOV AL,[ID_BYTE]
147F 884402                  MOV BYTE PTR [SI+2],AL           ; ID_BYTE
1482 C6440302                MOV BYTE PTR [SI+3],2            ; Byte Count
1486 A02A07                  MOV AL,[DEVICE_NO]
1489 0C10                    OR AL,10H
148B 884404                  MOV BYTE PTR [SI+4],AL           ; Event LED Mode Command
148E C64405FF                MOV BYTE PTR [SI+5],0FFH         ;       Flash
1492 E877FC                  CALL LOAD_TO_DROP
1495 C3                      RET
                        ;
                        ; ************  SPU View Channel  Operation  ********************
                        ;
1496 BE1000             SPU_VIEW_DISP:  MOV SI,VIEW_CHANNEL
1499 B700                    MOV BH,0
149B 8A1E2407                MOV BL,[CONV_NO]
149F 8A20                    MOV AH,[SI][BX]
14A1 8A4008                  MOV AL,[SI][BX+8]
14A4 88268507           SPU_LED_AX:     MOV [MSB_LED],AH
14A8 A28407                  MOV [LSB_LED],AL
                        ;
                        ; ************  SPU LED & EVENT_LED Operation  ******************
                        ;
14AB BE1008             SPU_LED_DISP:   MOV SI,SPU_CMD_BF
14AE C60406                  MOV BYTE PTR [SI],6              ; Length
14B1 C6440104                MOV BYTE PTR [SI+1],4            ; Drop Command
14B5 A02C07                  MOV AL,[ID_BYTE]
14B8 884402                  MOV BYTE PTR [SI+2],AL           ; Device/Drop
14BB C6440303                MOV BYTE PTR [SI+3],3            ; Byte Count
14BF A02A07                  MOV AL,[DEVICE_NO]
14C2 0C50                    OR AL,50H
14C4 884404                  MOV BYTE PTR [SI+4],AL           ; Display Character Command
14C7 C6440500                MOV BYTE PTR [SI+5],0            ;         LSB
14CB A08407                  MOV AL,[LSB_LED]
14CE 884406                  MOV BYTE PTR [SI+6],AL           ;         Data
14D1 E838FC                  CALL LOAD_TO_DROP
                        ;
14D4 BE1008                  MOV SI,SPU_CMD_BF
14D7 C6440501                MOV BYTE PTR [SI+5],1            ;         MSB
14DB A08507                  MOV AL,[MSB_LED]
14DE 884406                  MOV BYTE PTR [SI+6],AL           ;         Data
14E1 E828FC                  CALL LOAD_TO_DROP
14E4 C3                      RET
                        ;
                        ; ************  SPU LED & EVENT_LED Operation  ******************
                        ;
14E5 BE1008             SPU_LED_DISFL:  MOV SI,SPU_CMD_BF
14E8 C60406                  MOV BYTE PTR [SI],6              ; Length
14EB C6440104                MOV BYTE PTR [SI+1],4            ; Drop Command
14EF A02C07                  MOV AL,[ID_BYTE]
14F2 884402                  MOV BYTE PTR [SI+2],AL           ; Device/Drop
14F5 C6440303                MOV BYTE PTR [SI+3],3            ; Byte Count
14F9 A02A07                  MOV AL,[DEVICE_NO]
14FC 0C50                    OR AL,50H
14FE 884404                  MOV BYTE PTR [SI+4],AL           ; Display Character Command
1501 C6440580                MOV BYTE PTR [SI+5],80H          ;         LSB Flash
1505 A08407                  MOV AL,[LSB_LED]
1508 884406                  MOV BYTE PTR [SI+6],AL           ;         Data
150B E8FEFB                  CALL LOAD_TO_DROP
                        ;
150E BE1008                  MOV SI,SPU_CMD_BF
1511 C6440501                MOV BYTE PTR [SI+5],1            ;         MSB
1515 A08507                  MOV AL,[MSB_LED]
1518 884406                  MOV BYTE PTR [SI+6],AL           ;         Data
```

```
151B E8EEFB                          CALL LOAD_TO_DROP
151E C3                              RET
                   ;
                   ; ************  SPU LED & EVENT_LED Operation  ******************
                   ;
151F BE1008        SPU_LED_FLASH:    MOV SI,SPU_CMD_BF
1522 C60406                          MOV BYTE PTR [SI],6            ; Length
1525 C6440104                        MOV BYTE PTR [SI+1],4          ; Drop Command
1529 A02C07                          MOV AL,[ID_BYTE]
152C 884402                          MOV BYTE PTR [SI+2],AL         ; Device/Drop
152F C6440303                        MOV BYTE PTR [SI+3],3          ; Byte Count
1533 A02A07                          MOV AL,[DEVICE_NO]
1536 0C50                            OR AL,50H
1538 884404                          MOV BYTE PTR [SI+4],AL         ; Display Character Command
153B C6440580                        MOV BYTE PTR [SI+5],80H        ;        LSB Flash
153F A08407                          MOV AL,[LSB_LED]
1542 884406                          MOV BYTE PTR [SI+6],AL         ;        Data
1545 E8C4FB                          CALL LOAD_TO_DROP
                   ;
1548 BE1008                          MOV SI,SPU_CMD_BF
154B C6440581                        MOV BYTE PTR [SI+5],81H        ;        MSB Flash
154F A08507                          MOV AL,[MSB_LED]
1552 884406                          MOV BYTE PTR [SI+6],AL         ;        Data
1555 E8B4FB                          CALL LOAD_TO_DROP
1558 C3                              RET
                   ;
                   ; ************  SPU LED & EVENT_LED New Operation  ***************
                   ;
1559 BE1008        SPU_LED_FLAST:    MOV SI,SPU_CMD_BF
155C C60406                          MOV BYTE PTR [SI],6            ; Length
155F C6440104                        MOV BYTE PTR [SI+1],4          ; Drop Command
1563 A02C07                          MOV AL,[ID_BYTE]
1566 884402                          MOV BYTE PTR [SI+2],AL         ; Device/Drop
1569 C6440303                        MOV BYTE PTR [SI+3],3          ; Byte Count
156D A02A07                          MOV AL,[DEVICE_NO]
1570 0C50                            OR AL,50H
1572 884404                          MOV BYTE PTR [SI+4],AL         ; Display Character Command

                   ;
1575 C6440583                        MOV BYTE PTR [SI+5],83H        ;        USB Flash
1579 C6440630                        MOV BYTE PTR [SI+6],30H        ;        Data
157D E88CFB                          CALL LOAD_TO_DROP
                   ;
1580 BE1008                          MOV SI,SPU_CMD_BF
1583 C6440582                        MOV BYTE PTR [SI+5],82H        ;        HSB Flash
1587 A08607                          MOV AL,[HSB_LED]
158A 884406                          MOV BYTE PTR [SI+6],AL         ;        Data
158D E87CFB                          CALL LOAD_TO_DROP
                   ;
1590 BE1008                          MOV SI,SPU_CMD_BF
1593 C6440580                        MOV BYTE PTR [SI+5],80H        ;        LSB Flash
1597 A08407                          MOV AL,[LSB_LED]
159A 884406                          MOV BYTE PTR [SI+6],AL         ;        Data
159D E86CFB                          CALL LOAD_TO_DROP
                   ;
15A0 BE1008                          MOV SI,SPU_CMD_BF
15A3 C6440581                        MOV BYTE PTR [SI+5],81H        ;        MSB Flash
15A7 A08507                          MOV AL,[MSB_LED]
15AA 884406                          MOV BYTE PTR [SI+6],AL         ;        Data
15AD E85CFB                          CALL LOAD_TO_DROP
15B0 C3                              RET
                   ; ************  Authorize Sareteirukai  --->  CY  ***************
15B1 E85F00        AUTHO_KAI:        CALL CONV_BIT_AL       ; AL = 2 ** CONV_NO
15B4 8B1E1E07                        MOV BX,WORD PTR [BINARY_LED]
15B8 BE8001                          MOV SI,BASIC_AUTHO
15BB 2200                            AND AL,[SI][BX]        ; Z = 0 --- No
15BD C3                              RET
                   ; ************  IF PC Code=0 Then   Z=1    ELSE   Z=0  ***********
15BE 53            PC_CODE_0_KAI:    PUSH BX
15BF 56                              PUSH SI
15C0 BE2000                          MOV SI,PC_CODE
15C3 B700                            MOV BH,0
15C5 8A1E2407                        MOV BL,[CONV_NO]
15C9 02DB                            ADD BL,BL
15CB 8B10                            MOV DX,[SI][BX]
15CD 83FA00                          CMP DX,0
15D0 5E                              POP SI
15D1 5B                              POP BX
15D2 C3                              RET
                   ; ************  IF SC Mode   Then   Z=1    ELSE   Z=0  ***********
15D3 E83D00        SC_MODE_KAI:      CALL CONV_BIT_AL
15D6 22060E00                        AND AL,[SCAN_MODE_FLAG]
15DA C3                              RET
                   ;
15DB BE2000        PC_CODE_ADRS:     MOV SI,PC_CODE
15DE B700                            MOV BH,0
15E0 8A1E2407                        MOV BL,[CONV_NO]
15E4 02DB                            ADD BL,BL
15E6 C3                              RET
                   ; ************  PC/FC List & Authorize   CY= 1 --- None  *********
```

```
15E7 50              PCFC_MAP_ARUKA: PUSH AX
15E8 E82800                          CALL CONV_BIT_AL       ; AL = 2 ** CONV_NO
15EB BE0001                          MOV SI,PC_FC_LIST
15EE B100                            MOV CL,0
15F0 8AE0            AKANE:          MOV AH,AL              ; Z = 0 --- No
15F2 2224                            AND AH,[SI]
15F4 22A48000                        AND AH,[SI+128]
15F8 750B                            JNZ AKANE_CHAN
15FA 46                              INC SI
15FB FEC1                            INC CL
15FD 80F964                          CMP CL,100
1600 75EE                            JNZ AKANE
1602 58                              POP AX
1603 F9                              STC
1604 C3                              RET
1605 58              AKANE_CHAN:     POP AX
1606 F8                              CLC
1607 C3                              RET
                     ; ************  Drop No. Bit Position ---> AL ****************
1608 51              DROP_BIT_AL:    PUSH CX
1609 8A0E2607                        MOV CL,[DROP_NO]
160D B001                            MOV AL,1
160F D2C0                            ROL AL,CL
1611 59                              POP CX
1612 C3                              RET
                     ; ************  Converter Bit Position ---> AL ****************
1613 51              CONV_BIT_AL:    PUSH CX
1614 8A0E2407                        MOV CL,[CONV_NO]
1618 B001                            MOV AL,1
161A D2C0                            ROL AL,CL
161C 59                              POP CX
161D C3                              RET
                     ; ************  Device Bit Position ---> AL ******************
161E 51              DEVICE_BIT_AL:  PUSH CX
161F 8A0E2A07                        MOV CL,[DEVICE_NO]
1623 B001                            MOV AL,1
1625 D2C0                            ROL AL,CL
1627 59                              POP CX
1628 C3                              RET
                     ; ************  EVENT Mode ---> Basic Mode *********************
1629 A02E07          EVENT_TO_BASIC: MOV AL,[CONV_NO_BIT]
162C 343F                            XOR AL,3FH
162E 20068007                        AND [NOW_EVENT],AL
1632 C3                              RET
                     ; ************  Timer Set Operation *****************************
1633 B90200          TIMER_02_SEC:   MOV CX,2
1636 E92B00                          JMP TIMER_SET_CX
1639 B90400          TIMER_04_SEC:   MOV CX,4
163C E92500                          JMP TIMER_SET_CX
163F B90500          TIMER_05_SEC:   MOV CX,5
1642 E91F00                          JMP TIMER_SET_CX
1645 90              TIMER_UD_SEC:   NOP
1646 B90A00          TIMER_1_SEC:    MOV CX,10
1649 E91800                          JMP TIMER_SET_CX
164C B91400          TIMER_2_SEC:    MOV CX,20
164F E91200                          JMP TIMER_SET_CX
1652 B93200          TIMER_5_SEC:    MOV CX,50
1655 E90C00                          JMP TIMER_SET_CX
1658 B96400          TIMER_10_SEC:   MOV CX,100
165B E90600                          JMP TIMER_SET_CX
165E B92C01          TIMER_30_SEC:   MOV CX,300
1661 E90000                          JMP TIMER_SET_CX
1664 53              TIMER_SET_CX:   PUSH BX
1665 56                              PUSH SI
1666 BE0003                          MOV SI,TIME_TABLE
1669 B700                            MOV BH,0
166B 8A1E2807                        MOV BL,[IC_BYTE]
166F 02DB                            ADD BL,BL
1671 8908                            MOV [SI][BX],CX
1673 5E                              POP SI
1674 5B                              POP BX
1675 C3                              RET
                     ;
                     ; ************  IBF Interrupt Unmask ****************************
                     ;
1676 B81200          IBF_UNMASK:     MOV            AX,12H
1679 BA3AFF-                         MOV            DX,0FF3AH      ;  IBF Interrupt Unmask
167C EF                              OUT            DX,AX
167D C3                              RET
                     ;
                     ; ************  Channel Table ---> LED ***********************
                     ;
167E BE1000          VIEW_TBL_LED:   MOV SI,VIEW_CHANNEL    ; [ID_BYTE]
1681 B700                            MOV BH,0
1683 8A1E2407                        MOV BL,[CONV_NO]
1687 8A20                            MOV AH,[SI][BX]
1689 8A4008                          MOV AL,[SI][BX+8]
168C 88268507                        MOV [MSB_LED],AH
1690 A28407                          MOV [LSB_LED],AL
1693 8BD8                            MOV BX,AX
```

```
1695 C3                              RET
                            ;
                            ; ************  LED ---> BX  ***********************************
                            ;
1696 8A3E8507       LED_BIN_BX:      MOV BH,[MSB_LED]     ; BX <--- LED
169A 8A1E8407                        MOV BL,[LSB_LED]
                            ;
                            ; ************  Decimal to Binary  ********************************
                            ;
169E 80E30F         DECBIN_BX:       AND BL,0FH           ; BX ASCII Decimal ---> BX Binary
16A1 80E70F                          AND BH,0FH
16A4 02FF                            ADD BH,BH
16A6 02DF                            ADD BL,BH            ; BL=BL+(2*BH)
16A8 02FF                            ADD BH,BH            ; BH=2*(2*BH))
16AA 02FF                            ADD BH,BH            ; BH=2*(2*(2*BH))
16AC 02DF                            ADD BL,BH            ; BL=BL+(2*BH)+2*(2*(2*BH))
16AE B700                            MOV BH,0             ;    =BL+10*BH
16B0 891E1E07                        MOV WORD PTR [BINARY_LED],BX
16B4 C3                              RET
                            ;
                            ; ************  LED ---> VIEW_TABLE  ***************************
                            ;
16B5 BE1000         LED_VIEW_TBL:    MOV SI,VIEW_CHANNEL  ;
16B8 B700                            MOV BH,0             ;
16BA 8A1E2407                        MOV BL,[CONV_NO]     ;
16BE 8A268507                        MOV AH,[MSB_LED]     ;
16C2 8820                            MOV [SI][BX],AH      ;    Last Channel Memory Ni Ireru
16C4 A08407                          MOV AL,[LSB_LED]     ;
16C7 884008                          MOV [SI][BX+8],AL    ;
16CA C3                              RET
                            ;
                            ; ************  IF KEYIN THEN GOTO BASE_ROUTINE  *****************
                            ;
16CB A08907         IF_KEY_GO_BASE:  MOV AL,[KEY_DATA]
16CE 3C00                            CMP AL,TIMER_OUT_CODE
16D0 7404                            JZ TIMER_ON
16D2 5A                              POP DX
16D3 E93D01                          JMP BASE_ROUTINE
16D6 C3             TIMER_ON:        RET
                            ;
                            ; ************  SCAN Mode Up Channel Search  ********************
                            ;
16D7 E8A4FF         DW_SCAN_SEARCH:  CALL VIEW_TBL_LED
16DA E8B9FF                          CALL LED_BIN_BX
16DD E833FF                          CALL CONV_BIT_AL
16E0 BE8001                          MOV SI,BASIC_AUTHO
16E3 FECB           URI:             DEC BL
16E5 80FB00                          CMP BL,0
16E8 7503                            JNZ URI1
16EA BB6300                          MOV BX,99
16ED 8AE0           URI1:            MOV AH,AL
16EF 2220                            AND AH,[SI][BX]
16F1 74F0                            JZ URI
16F3 E96200                          JMP UD_CONV_DISP
                            ;
                            ; ************  PCFC Mode Up Channel Search  ********************
                            ;
16F6 E885FF         DW_PCFC_SEARCH:  CALL VIEW_TBL_LED
16F9 E89AFF                          CALL LED_BIN_BX
16FC E814FF                          CALL CONV_BIT_AL
16FF BE0001                          MOV SI,PC_FC_LIST
1702 FECB           UKI:             DEC BL
1704 80FB00                          CMP BL,0
1707 7503                            JNZ UKI1
1709 BB6300                          MOV BX,99
170C 8AE0           UKI1:            MOV AH,AL
170E 2220                            AND AH,[SI][BX]
1710 22A08000                        AND AH,[SI+128][BX]
1714 74EC                            JZ UKI
1716 E93F00                          JMP UD_CONV_DISP
                            ;
                            ; ************  PCFC Mode Up Channel Search  ********************
                            ;
1719 E862FF         UP_PCFC_SEARCH:  CALL VIEW_TBL_LED
171C E877FF                          CALL LED_BIN_BX
171F E8F1FE                          CALL CONV_BIT_AL
1722 BE0001                          MOV SI,PC_FC_LIST
1725 FEC3           UMI:             INC BL
1727 80FB64                          CMP BL,100
172A 7203                            JC UMI1
172C BB0100                          MOV BX,1
172F 8AE0           UMI1:            MOV AH,AL
1731 2220                            AND AH,[SI][BX]
1733 22A08000                        AND AH,[SI+128][BX]
1737 74EC                            JZ UMI
1739 E91C00                          JMP UD_CONV_DISP
                            ;
                            ; ************  SCAN Mode Up Channel Search  ********************
                            ;
```

```
173C E83FFF     UP_SCAN_SEARCH: CALL VIEW_TBL_LED
173F E854FF                     CALL LED_BIN_BX
1742 E8CEFE                     CALL CONV_BIT_AL
1745 BE8001                     MOV SI,BASIC_AUTHO
1748 FEC3       UKA:            INC BL
174A 80FB64                     CMP BL,100
174D 7203                       JC UKA1
174F BB0100                     MOV BX,1
1752 8AE0       UKA1:           MOV AH,AL
1754 2220                       AND AH,[SI][BX]
1756 74F0                       JZ UKA
                ;
1758 E8CEFE     UD_CONV_DISP:   CALL EVENT_TO_BASIC
175B E80A00                     CALL BINDEC_LED
175E E854FF                     CALL LED_VIEW_TBL
1761 E847FD                     CALL SPU_LED_DISP
1764 E841FB                     CALL GO_CONVERTER
1767 C3                         RET
                ;
1768 B700       BINDEC_LED:     MOV BH,0
176A 80FB0A     HITOMI:         CMP BL,10
176D 7207                       JC MAKO
176F 80EB0A                     SUB BL,10
1772 FEC7                       INC BH
1774 EBF4                       JMP HITOMI
1776 81CB3030   MAKO:           OR BX,3030H
177A 881E8407                   MOV [LSB_LED],BL
177E 883E8507                   MOV [MSB_LED],BH
1782 C3                         RET
                ; ************  SC/FC/PC  Mode Wo AX ni Set Suru  ****************
1783 E84DFE     SCFCPC_MODE_AX: CALL SC_MODE_KAI
1786 7404                       JZ SAORI_FCPC
1788 B84353                     MOV AX,ASCII_SC                 ; [ SCAN Mode ]
178B C3                         RET
                ;
178C E82FFE     SAORI_FCPC:     CALL PC_CODE_0_KAI
178F 7504                       JNZ SAORI_PC
                ;
1791 B84346                     MOV AX,ASCII_FC                 ; [ FC Mode ]
1794 C3                         RET
                ;
1795 B84350     SAORI_PC:       MOV AX,ASCII_PC                 ; [ PC Mode ]
1798 C3                         RET

                ;------------------------------------------------------------------------------
                ;
                ;               Key Operation
                ;
                ;------------------------------------------------------------------------------
1799 8A0E8907   KEY_OPERATION:  MOV CL,[KEY_DATA]
179D B700                       MOV BH,0
179F 8A1E2807                   MOV BL,[IC_BYTE]
17A3 02DB                       ADD BL,BL
17A5 BE9003                     MOV SI,JUMP_ADDRESS
17A8 8B00                       MOV AX,[SI][BX]
17AA 3B061C07                   CMP AX,[INIT_POINT]     ; Hagime Wa ON/OFF Key Shika Uketukenai Yo
17AE 7419                       JZ OP_INITIAL
17B0 80F913                     CMP CL,ONOFF_KEY_CODE
17B3 7503                       JNZ OP_NORMAL_KEY
17B5 E97401                     JMP OP_SPU_OFF  ; SPU Wo OFF Surundane
                ;
17B8 50         OP_NORMAL_KEY:  PUSH AX         ; ON/OFF Key Igai no Operation
17B9 C3                         RET
                ;
                ; TOSHINO-OS-TOSHINO-OS-TOSHINO-OS-TOSHINO-OS-TOSHINO-OS-TOSHINO-OS-TOSHINO-OS-TOSHINO-OS-TOSHINO-OS-TOSHI
                ;
17BA 58         NEXT_CONTINUE:  POP AX
17BB B700       NEXT_OS:        MOV BH,0
17BD 8A1E2807                   MOV BL,[IC_BYTE]
17C1 02DB                       ADD BL,BL
17C3 BE9003                     MOV SI,JUMP_ADDRESS
17C6 8900                       MOV [BX][SI],AX
17C8 C3         RETURN_OS:      RET
                ;---------------------------------------------------------------
                ;
                ;               SPU  Initial Off Mode
                ;
                ;---------------------------------------------;
17C9 8A0E8907   OP_INITIAL:     MOV CL,[KEY_DATA]               ;
17CD 80F913                     CMP CL,ONOFF_KEY_CODE           ;   SPU  OFF
17D0 7511                       JNZ MP_100_CK_001               ;     []
17D2 E854FE                     CALL EVENT_TO_BASIC             ;   SPU  ON
17D5 E88EFC                     CALL SPU_VIEW_DISP              ;
                                                                ;
17D8 E8CDFA                     CALL GO_CONVERTER               ;
                                                                ;
17DB E8D6FB     WAKEARI_DE_ON:  CALL SPU_RELAY_ON               ;       !!
                                                                ;
17DE A11A07                     MOV AX,[BASE_POINT]             ;
17E1 EBD8                       JMP NEXT_OS                     ;
                ;                                               ;;
                ; *********************************************  ;;
                ;                                               ;;
17E3 80F911     MP_100_CK_001:  CMP CL,EVENT_KEY_CODE           ;;
17E6 7524                       JNZ MP_100_CK_002               ;;
17E8 B430                       MOV AH,30H                      ;;
17EA E8ADF8                     CALL CONV_SW_FLAG               ;;
```

```
17ED 7402                              JZ CONV_SW_OK_YO            ;;
17EF B431          CONV_SW_NG_YO:      MOV AH,31H                  ;;
17F1 A02A07        CONV_SW_OK_YO:      MOV AL,[DEVICE_NO]          ;;
17F4 0C30                              OR AL,30H                   ;;
17F6 88268507                          MOV [MSB_LED],AH            ;;
17FA A28407                            MOV [LSB_LED],AL            ;;
17FD A02407                            MOV AL,[CONV_NO]            ;;
1800 0C30                              OR AL,30H                   ;;
1802 FEC0                              INC AL                      ;;
1804 A28607                            MOV [HSB_LED],AL            ;;
1807 E84FFD                            CALL SPU_LED_FLAST          ;;
180A EB8C                              JMP RETURN_OS               ;;
180C 80F917        MP_100_CK_002:      CMP CL,SEND_KEY_CODE        ;;
180F 75B7                              JNZ RETURN_OS               ;;
                   ;;;;;;;;;;;;;;;     CALL SPECIAL_SPU_1          ;;
1811 EBB5                              JMP RETURN_OS               ;;
                   ;--------------------------------------------------;;
                   ;
                   ;                   Base Routine
                   ;
                   ;------------------------------------------------------------
1813 A08907        BASE_ROUTINE:       MOV AL,[KEY_DATA]
1816 E8EBF8                            CALL KAZUKO
1819 7334                              JNC RANDOM_ACCESS
181B 3C10                              CMP AL,PLUS_KEY_CODE
181D 7503                              JNZ BASE1
181F E92401                            JMP UP_CHANNEL_OP
1822 3C11          BASE1:              CMP AL,EVENT_KEY_CODE
1824 7503                              JNZ BASE2
1826 E94703                            JMP EVENT_KEY_OP
1829 3C12          BASE2:              CMP AL,AUTHO_KEY_CODE
182B 7503                              JNZ BASE3
182D E99A01                            JMP AUTHO_KEY_OP
1830 3C14          BASE3:              CMP AL,MINUS_KEY_CODE
1832 7503                              JNZ BASE4
1834 E9A701                            JMP DOWN_CH_OP
1837 3C15          BASE4:              CMP AL,SCAN_KEY_CODE
1839 7503                              JNZ BASE5
183B E91502                            JMP SCAN_KEY_OP
183E 3C16          BASE5:              CMP AL,CLEAR_KEY_CODE
1840 7503                              JNZ BASE6
1842 E99C02                            JMP CLEAR_KEY_OP
1845 3C17          BASE6:              CMP AL,SEND_KEY_CODE
1847 7503                              JNZ BASE7
1849 E9AB02                            JMP SEND_KEY_OP
184C E98400        BASE7:              JMP NEXT_END     ; Zoooooooooooooooooooooooooooooooooooooo
                   ;------------------------------------------------------------------------
                   ;
                   ;                   Random Access Routine
                   ;
                   ;------------------------------------------------------------------------
184F B700          RANDOM_ACCESS:      MOV BH,0
1851 8A1E2807                          MOV BL,[IC_BYTE]
1855 8BF3                              MOV SI,BX
1857 E86406                            CALL KEY_BUFF_ADRS
185A 8800                              MOV [BX][SI],AL
                   ;
185C A28507                            MOV [MSB_LED],AL
185F B088                              MOV AL,88H                          ; LSB = "_"
1861 A28407                            MOV [LSB_LED],AL
1864 E87EFC                            CALL SPU_LED_DISFL
1867 E8E8FD                            CALL TIMER_5_SEC
                   ;
186A E840FF                            CALL NEXT_CONTINUE                  ; [[[ Key Input Wait ]]]
                   ;
186D A08907                            MOV AL,[KEY_DATA]
1870 E891F8                            CALL KAZUKO
1873 7264                              JC RANDOM_OUT
1875 B700                              MOV BH,0             ;
1877 8A1E2807                          MOV BL,[IC_BYTE]     ;
187B 8BF3                              MOV SI,BX            ;
187D E83E06                            CALL KEY_BUFF_ADRS   ;    AH = [ 1st KEY  ]
1880 8A20                              MOV AH,[SI][BX]      ;    AL = [ KEY_DATA ]
                   ;
1882 A28407                            MOV [LSB_LED],AL     ;   LED Display
1885 88268507                          MOV [MSB_LED],AH     ;
1889 E83206                            CALL KEY_BUFF_ADRS   ;
188C 894004                            MOV [SI][BX+4],AX    ;
188F E819FC                            CALL SPU_LED_DISP    ;
                                                            ;
1892 E801FE                            CALL LED_BIN_BX
1895 E819FD                            CALL AUTHO_KAI
1898 747D                              JZ WT_NO_WT_END
                   ;
189A E836FD                        CALL SC_MODE_KAI
189D 7528                          JNZ TUNE_SURU
189F E81CFD                        CALL PC_CODE_0_KAI
18A2 7426                          JZ TUNE_SURU
                   ;
18A4 E8EFFD                        CALL LED_BIN_BX.      ; PC Mode Daga PC-Map Hi Aruka
```

```
18A7 E869FD                            CALL CONV_BIT_AL
18AA BE0001                            MOV SI,PC_PC_LIST
18AD 2200                              AND AL,[SI][BX]
18AF 7519                              JNZ TUNE_SURU
                    ;
18B1 E87305                            CALL ANGO_INPUT        ;
18B4 E82E06                            CALL ANGO_BIN_DX       ;
18B7 E821FD                            CALL PC_CODE_ADRS      ;
18BA 3B10                              CMP DX,[SI][BX]        ;
18BC 7524                              JNZ MSGERR_WT_END      ; IF  PC_CODE <> Input Code Then PC_Control
18BE E8FD05                            CALL KEY_BUFF_ADRS     ;
18C1 8B4004                            MOV AX,[SI][BX+4]      ;
18C4 A38407                            MOV [LSB_LED],AX       ;
18C7 E8E1F8                            CALL SPU_LED_DISP
                    ;
18CA E85CFD         TUNE_SURU:         CALL EVENT_TO_BASIC
                    ;
18CD E8E5FD                            CALL LED_VIEW_TBL
                    ;
18D0 E81CF9                            CALL RUN_CONVERTER
                    ;
18D3 A11A07         NEXT_END:          MOV AX,[BASE_POINT]
18D6 E9E2FE                            JMP NEXT_OS
                    ;
18D9 3C16           RANDOM_OUT:        CMP AL,CLEAR_KEY_CODE
18DB 7585                              JNZ MSGERR_WT_END
18DD E8B6FB                            CALL SPU_VIEW_DISP
18E0 EBF1                              JMP NEXT_END
                    ;
18E2 B87245         MSGERR_WT_END:     MOV AX,ASCII_ER
18E5 E8BCFB         MSG_WT_END:        CALL SPU_LED_AX
18E8 E858FD         WAIT_END:          CALL TIMER_1_SEC
                    ;
18EB E8CCFE         IF_TIMEOUT_END:    CALL NEXT_CONTINUE
                    ;
18EE A08907                            MOV AL,[KEY_DATA]
18F1 3C00                              CMP AL,TIMER_OUT_CODE
18F3 7403                              JZ RANDOM_MODORI
18F5 E918FF                            JMP BASE_ROUTINE
                    ;
18F8 A08007         RANDOM_MODORI:     MOV AL,[NOW_EVENT]             ;
18FB 84062E07                          TEST AL,[CONV_NO_BIT]          ;
18FF 7505                              JNZ EVENT_MODORI               ;
1901 E892FB                            CALL SPU_VIEW_DISP             ;
1904 EBCD                              JMP NEXT_END                   ;
1906 BE3000         EVENT_MODORI:      MOV SI,EVENT_CHANNEL           ;
1909 03362407                          ADD SI,[CONV_NO]               ;
190D 8B1C                              MOV BX,[SI]                    ;
190F E856FE                            CALL BINDEC_LED                ;
1912 E896FB                            CALL SPU_LED_DISP              ;
1915 EBBC                              JMP NEXT_END                   ;
                    ;
                    ;
1917 E82CFD         WT_NO_WT_END:      CALL TIMER_1_SEC
                    ;
191A E89DFE                            CALL NEXT_CONTINUE
                    ;
191D A08907                            MOV AL,[KEY_DATA]
1920 3C00                              CMP AL,TIMER_OUT_CODE
1922 7403                              JZ MSG_NO_WT_END
1924 E9ECFE                            JMP BASE_ROUTINE
1927 B8DCD4         MSG_NO_WT_END:     MOV AX,ASCII_NO      ; 1 Sec.  "No"
192A EBB9                              JMP MSG_WT_END



                    ;
                    ;-------------------------------------------------------------------------------
                    ;
                    ;                  SPU  OFF Key  Operation
                    ;
                    ;-------------------------------------------------------------------------------
192C E8AAFA         OP_SPU_OFF:        CALL SPU_RELAY_OFF
192F E862FA                            CALL SPU_CLEAR_DISP
1932 E8EEFA                            CALL EVENT_LED_OFF
                    ; ************
1935 A11C07                            MOV AX,[INIT_POINT]
1938 E880FE                            CALL NEXT_OS         ; Korewa Tannaru Junbideari Mada OS niwamodorar
193B E8ACF9                            CALL STP_CONVERTER
193E 7203                              JC MAKI
                    ;
1940 E842F8                            CALL CONV_P_OFF_CMD
                    ;
1943 E982FE         MAKI:              JMP RETURN_OS        ; Modoru Junbiwa Shitearunode Return




                    ;-------------------------------------------------------------------------------
                    ;
                    ;                  UP Channel Change
                    ;
                    ;-------------------------------------------------------------------------------
1946 E8CAFC         UP_CHANNEL_OP:     CALL CONV_BIT_AL
1949 22060E00                          AND AL,[SCAN_MODE_FLAG]
194D 7433                              JZ UP_PCFC
                    ;
194F E8EAFD         UP_SCAN:           CALL UP_SCAN_SEARCH
1952 E8EAFC                            CALL TIMER_05_SEC
                    ;
```

```
1955 E862FE                   CALL NEXT_CONTINUE
                    ;
1958 A08907                   MOV AL,[KEY_DATA]
195B 3C00                     CMP AL,TIMER_OUT_CODE
195D 7559                     JNZ UP_DOWN_EXIT          ; U/D Sugu Hanashita
                    ;
195F E814FA         YUKO:     CALL SPU_STATUS_REQ
1962 E8E0FC                   CALL TIMER_UD_SEC
                    ;
1965 E852FE                   CALL NEXT_CONTINUE
                    ;
1968 A08907                   MOV AL,[KEY_DATA]
196B 3C1C                     CMP AL,KEY_PUSH_CODE
196D 7548                     JNZ UP_DOWN_EXIT          ; Key Release or Another Ke
196F E8CAFD                   CALL UP_SCAN_SEARCH
1972 E88EFC                   CALL TIMER_02_SEC
                    ;
1975 E842FE                   CALL NEXT_CONTINUE
                    ;
1978 A08907                   MOV AL,[KEY_DATA]
197B 3C00                     CMP AL,TIMER_OUT_CODE
197D 74E0                     JZ YUKO
197F E93500                   JMP UP_DOWN_EXIT          ; Another Key

                    ; ************ PC-FC Mode *************************************
1982 E862FC         UP_PCFC:  CALL PCFC_MAP_ARUKA
1985 7240                     JC UP_NO_MAP
                    ;
1987 E88FFD                   CALL UP_PCFC_SEARCH
198A E882FC                   CALL TIMER_05_SEC
                    ;
198D E82AFE                   CALL NEXT_CONTINUE
                    ;
1990 A08907                   MOV AL,[KEY_DATA]
1993 3C00                     CMP AL,TIMER_OUT_CODE
1995 7520                     JNZ UP_DOWN_EXIT
                    ;
1997 E8DCF9         YASUKO:   CALL SPU_STATUS_REQ
199A E8A8FC                   CALL TIMER_UD_SEC
                    ;
199D E81AFE                   CALL NEXT_CONTINUE
                    ;
19A0 A08907                   MOV AL,[KEY_DATA]
19A3 3C1C                     CMP AL,KEY_PUSH_CODE
19A5 7510                     JNZ UP_DOWN_EXIT
19A7 E86FFD                   CALL UP_PCFC_SEARCH
19AA E886FC                   CALL TIMER_02_SEC
                    ;
19AD E80AFE                   CALL NEXT_CONTINUE
                    ;
19B0 A08907                   MOV AL,[KEY_DATA]
19B3 3C00                     CMP AL,TIMER_OUT_CODE
19B5 74E0                     JZ YASUKO
                    ;
                    ;
19B7 A08907         UP_DOWN_EXIT:   MOV AL,[KEY_DATA]
19BA 3C00                     CMP AL,TIMER_OUT_CODE
19BC 7506                     JNZ MIKA
19BE E8D5FA                   CALL SPU_VIEW_DISP
19C1 E82BF8                   CALL RUN_CONVERTER
19C4 E94CFE         MIKA:     JMP BASE_ROUTINE
                    ;
19C7 E95DFF         UP_NO_MAP:      JMP MSG_NO_WT_END

                    ;-----------------------------------------------------------------------
                    ;
                    ;             Adding Channels to the FC/PC List
                    ;
                    ;-----------------------------------------------------------------
19CA E881FC         AUTHO_KEY_OP:   CALL VIEW_TBL_LED
19CD E8C6FC                   CALL LED_BIN_BX
19D0 BE0001                   MOV SI,PC_FC_LIST
19D3 E83DFC                   CALL CONV_BIT_AL
19D6 0800                     OR [SI][BX],AL
19D8 B86441                   MOV AX,ASCII_AD
19DB E907FF                   JMP MSG_WT_END
                    ;-----------------------------------------------------------------
                    ;
                    ;             Down ChanneL Change
                    ;
                    ;-----------------------------------------------------------------
19DE E832FC         DOWN_CH_OP:     CALL CONV_BIT_AL
19E1 22060E00                 AND AL,[SCAN_MODE_FLAG]
19E5 7432                     JZ DW_PCFC
                    ;
19E7 E8EDFC         DW_SCAN:  CALL DW_SCAN_SEARCH
19EA E852FC                   CALL TIMER_05_SEC
                    ;
19ED E8CAFD                   CALL NEXT_CONTINUE
                    ;
19F0 A08907                   MOV AL,[KEY_DATA]
```

```
19F3 3C00                               CMP AL,TIMER_OUT_CODE
19F5 7520                               JNZ DOWN_EXIT
                 ;
19F7 E87CF9      EIKO:                  CALL SPU_STATUS_REQ
19FA E843FC                             CALL TIMER_UD_SEC
                 ;
19FD E8BAFD                             CALL NEXT_CONTINUE
                 ;
1A00 A08907                             MOV AL,[KEY_DATA]
1A03 3C1C                               CMP AL,KEY_PUSH_CODE
1A05 7510                               JNZ DOWN_EXIT
1A07 E8CDFC                             CALL DW_SCAN_SEARCH
1A0A E826FC                             CALL TIMER_02_SEC
                 ;
1A0D E8AAFD                             CALL NEXT_CONTINUE
                 ;
1A10 A08907                             MOV AL,[KEY_DATA]
1A13 3C00                               CMP AL,TIMER_OUT_CODE
1A15 74E0                               JZ EIKO
1A17 EB9E        DOWN_EXIT:             JMP UP_DOWN_EXIT
                 ; ************         PC-FC Mode  ****************************************
1A19 E8CBFB      DW_PCFC:               CALL PCFC_MAP_ARUKA
1A1C 7232                               JC DW_NO_MAP
                 ;
1A1E E8D5FC                             CALL DW_PCFC_SEARCH
1A21 E81BFC                             CALL TIMER_05_SEC
                 ;
1A24 E893FD                             CALL NEXT_CONTINUE
                 ;
1A27 A08907                             MOV AL,[KEY_DATA]
1A2A 3C00                               CMP AL,TIMER_OUT_CODE
1A2C 75E9                               JNZ DOWN_EXIT
                 ;
1A2E E845F9      KEIKO:                 CALL SPU_STATUS_REQ
1A31 E811FC                             CALL TIMER_UD_SEC
                 ;
1A34 E883FD                             CALL NEXT_CONTINUE
                 ;
1A37 A08907                             MOV AL,[KEY_DATA]
1A3A 3C1C                               CMP AL,KEY_PUSH_CODE
1A3C 75D9                               JNZ DOWN_EXIT
1A3E E885FC                             CALL DW_PCFC_SEARCH
1A41 E8EFFB                             CALL TIMER_02_SEC
                 ;
1A44 E873FD                             CALL NEXT_CONTINUE
                 ;
1A47 A08907                             MOV AL,[KEY_DATA]
1A4A 3C00                               CMP AL,TIMER_OUT_CODE
1A4C 74E0                               JZ KEIKO
1A4E EBC7                               JMP DOWN_EXIT
                 ;
1A50 E9D4FE      DW_NO_MAP:             JMP MSG_NO_WT_END
                 ;------------------------------------------------------------------------
                 ;
                 ;                      SCAN  Key Operation
                 ;
                 ;------------------------------------------------------------------------
1A53 E82DFD      SCAN_KEY_OP:           CALL SCFCPC_MODE_AX
1A56 E848FA                             CALL SPU_LED_AX
1A59 E8F6FB                             CALL TIMER_5_SEC
                 ;
1A5C E858FD                             CALL NEXT_CONTINUE
                 ;
1A5F A08907                             MOV AL,[KEY_DATA]
1A62 3C00                               CMP AL,TIMER_OUT_CODE
1A64 7503                               JNZ SCAN_AFTER
1A66 E98FFE                             JMP RANDOM_MODORI
                 ;
1A69 3C15        SCAN_AFTER:            CMP AL,SCAN_KEY_CODE
1A6B 7539                               JNZ SCAN_ANOTHER
                 ; ***********************************************************
1A6D E84EFB      SCAN_SCAN:             CALL PC_CODE_0_KAI
1A70 7410                               JZ SC_FC_PC_XCHG
                 ;
1A72 E88203                             CALL ANGO_INPUT
1A75 E86D04                             CALL ANGO_BIN_DX
1A78 E860FB                             CALL PC_CODE_ADRS
1A7B 3B10                               CMP DX,[SI][BX]
1A7D 7403                               JZ SC_FC_PC_XCHG       ; IF  PC_CODE <> Input Code Then PC_Error
                 ;
1A7F E960FE                             JMP MSGERR_WT_END
                 ;
1A82 E88EFB      SC_FC_PC_XCHG:         CALL CONV_BIT_AL
1A85 30060E00                           XOR [SCAN_MODE_FLAG],AL
1A89 22060E00                           AND AL,[SCAN_MODE_FLAG]
1A8D 7406                               JZ EMI_TO_FCPC
```

```
1A8F B84353          EMI_TO_SCAN:      MOV AX,ASCII_SC
1A92 E950FE                            JMP MSG_WT_END
1A95 E826FB          EMI_TO_FCPC:      CALL PC_CODE_0_KAI
1A98 7506                              JNZ EMI_TO_PC
1A9A B84346          EMI_TO_FC:        MOV AX,ASCII_FC
1A9D E945FE                            JMP MSG_WT_END
1AA0 B84350          EMI_TO_PC:        MOV AX,ASCII_PC
1AA3 E93FFE                            JMP MSG_WT_END
                     ;
                     ;
                     ;
1AA6 3C12            SCAN_ANOTHER:     CMP AL,AUTHO_KEY_CODE
1AA8 7403                              JZ PC_CODE_XCHG
1AAA E966FD                            JMP BASE_ROUTINE
                     ;
                     ;                 IF PC_CODE = 0 THEN "NEW" ELSE ANSHO-KEY-IN
                     ;
1AAD E80EFB          PC_CODE_XCHG:     CALL PC_CODE_0_KAI
1AB0 740D                              JZ NEW_PC_CODE
                     ;
1AB2 E87203                            CALL ANGO_INPUT
1AB5 E82D04                            CALL ANGO_BIN_DX
1AB8 E820FB                            CALL PC_CODE_ADRS
1ABB 3B10                              CMP DX,[SI][BX]
1ABD 751F                              JNZ PC_CODE_ERR        ; IF  PC_CODE <> Input Code Then PC_Erro
                     ;
1ABF E8CE02          NEW_PC_CODE:      CALL ANGO_TOUROKU
1AC2 E87AFB                            CALL TIMER_05_SEC
                     ;
1AC5 E8F2FC                            CALL NEXT_CONTINUE
                     ;
1AC8 E85304                            CALL ANGO_DISPLAY
1ACB 7303                              JNC NEW_PC_SET
1ACD E912FE                            JMP MSGERR_WT_END
                     ;
1AD0 E81204          NEW_PC_SET:       CALL ANGO_BIN_DX
1AD3 E805FB                            CALL PC_CODE_ADRS
1AD6 8910                              MOV [SI][BX],DX
                     ;
1AD8 B85541                            MOV AX,ASCII_AU
1ADB E907FE                            JMP MSG_WT_END
                     ;
                     ;
1ADE E901FE          PC_CODE_ERR:      JMP MSGERR_WT_END
                     ;---------------------------------------------------------------------------
                     ;
                     ;                 Deleting Channels from the FC/PC List
                     ;
                     ;---------------------------------------------------------------------------
1AE1 E89AFB          CLEAR_KEY_OP:     CALL VIEW_TBL_LED
1AE4 E8AFFB                            CALL LED_BIN_BX
1AE7 BE0001                            MOV SI,PC_FC_LIST
1AEA E826FB                            CALL CONV_BIT_AL
1AED 34FF                              XOR AL,0FFH
1AEF 2000                              AND [SI][BX],AL
                     ;
1AF1 B84564                            MOV AX,ASCII_DE
1AF4 E9EEFD                            JMP MSG_WT_END
                     ;---------------------------------------------------------
                     ;
                     ;                 Send Key Function
                     ;
                     ;---------------------------------------------------------
1AF7 B84553          SEND_KEY_OP:      MOV AX,ASCII_SE
1AFA E8A7F9                            CALL SPU_LED_AX
                     ;
1AFD E813FB                            CALL CONV_BIT_AL
1B00 22063008                          AND AL,[SEND_ENABLE]
1B04 7503                              JNZ SEND_KYOKA
1B06 E90EFE                            JMP WT_NO_WT_END
                     ;
1B09 E846FB          SEND_KYOKA:       CALL TIMER_5_SEC
                     ;
1B0C E8ABFC                            CALL NEXT_CONTINUE
                     ;
1B0F A08907                            MOV AL,[KEY_DATA]
1B12 E8EFF5                            CALL KAZUKO
1B15 7303                              JNC SETUKO
1B17 E98FFD                            JMP RANDOM_OUT
1B1A A28407          SETUKO:           MOV [LSB_LED],AL
1B1D 8A1E3308                          MOV BL,[SEND_INDEX]
1B21 80FB80                            CMP BL,SEND_MAX
1B24 7203                              JC TAMIKO
1B26 E9EEFD          TAMI:             JMP WT_NO_WT_END
1B29 B420            TAMIKO:           MOV AH,20H
1B2B 88268507                          MOV [MSB_LED],AH
1B2F E88C03                            CALL KEY_BUFF_ADRS
1B32 A08907                            MOV AL,[KEY_DATA]
1B35 8800                              MOV [SI][BX],AL
1B37 E8A8F9                            CALL SPU_LED_DISFL
1B3A E815FB                            CALL TIMER_5_SEC
                     ;
1B3D E87AFC                            CALL NEXT_CONTINUE
```

```
                          ;
1B40 A08907                                   MOV AL,[KEY_DATA]
1B43 3C16                                     CMP AL,CLEAR_KEY_CODE
1B45 74B0                                     JZ SEND_KEY_OP
1B47 3C12                                     CMP AL,AUTHO_KEY_CODE
1B49 75D8                                     JNZ TAMI
                          ;
1B4B E87003                                   CALL KEY_BUFF_ADRS
1B4E 8A00                                     MOV AL,[SI][BX]
1B50 BE3508                                   MOV SI,SEND_DATA_BUFF
1B53 B700                                     MOV BH,0
1B55 8A1E3308                                 MOV BL,[SEND_INDEX]
1B59 8A262807                                 MOV AH,[IC_BYTE]
1B5D 886001                                   MOV [SI][BX+1],AH
1B60 884002                                   MOV [SI][BX+2],AL
1B63 80C302                                   ADD BL,2
1B66 881E3308                                 MOV [SEND_INDEX],BL
                          ;
1B6A B85541                                   MOV AX,ASCII_AU
1B6D E975FD                                   JMP MSG_WT_END

                          ;-----------------------------------------------------------
                          ;
                          ;                   Event Key Operation
                          ;
                          ;-----------------------------------------------------------
1B70 E84BFA               EVENT_KEY_OP:       CALL PC_CODE_0_KAI
1B73 7410                                     JZ EV_PC_OK_YO
                          ;
1B75 E8AF02                                   CALL ANGO_INPUT          ; PC Code Input
1B78 E86A03                                   CALL ANGO_BIN_DX
1B7B E85DFA                                   CALL PC_CODE_ADRS
1B7E 3B10                                     CMP DX,[SI][BX]
1B80 7403                                     JZ EV_PC_OK_YO
1B82 E95DFD               EVENT_ERR:          JMP MSGERR_WT_END
                          ;
1B85                      EV_PC_OK_YO:                                 ; Event Enable ?
1B85 B87250                                   MOV AX,ASCII_PR
1B88 E819F9                                   CALL SPU_LED_AX
1B8B E888FA                                   CALL TIMER_1_SEC
                          ;
1B8E E829FC                                   CALL NEXT_CONTINUE
                          ;
1B91 E86601                                   CALL YOYAKU_SEARCH
1B94 7203                                     JC Y_HAJIME
1B96 E9C600                                   JMP FORCED_EVENT
                          ;
1B99 B87250               Y_HAJIME:           MOV AX,ASCII_PR
1B9C E805F9                                   CALL SPU_LED_AX
1B9F E8B6FA                                   CALL TIMER_10_SEC
                          ;
1BA2 E815FC                                   CALL NEXT_CONTINUE
                          ;
1BA5 A08907                                   MOV AL,[KEY_DATA]
1BA8 E91100                                   JMP EVENT_1ST_KEY
                          ;
1BAB E8AAFA               EVENT_KEY_WAIT:     CALL TIMER_10_SEC
                          ;
1BAE E809FC                                   CALL NEXT_CONTINUE
                          ;
1BB1 A08907                                   MOV AL,[KEY_DATA]
1BB4 3C12                                     CMP AL,AUTHO_KEY_CODE
1BB6 742D                                     JZ EVENT_AUTHO
1BB8 3C16                                     CMP AL,CLEAR_KEY_CODE
1BBA 7432                                     JZ EVENT_CLEAR
1BBC 3C10                 EVENT_1ST_KEY:      CMP AL,PLUS_KEY_CODE
1BBE 7441                                     JZ EVENT_PLUS
1BC0 3C14                                     CMP AL,MINUS_KEY_CODE
1BC2 7443                                     JZ EVENT_MINUS
1BC4 3C00                                     CMP AL,TIMER_OUT_CODE
1BC6 740B                                     JZ EVENT_T_OUT
1BC8 3C11                                     CMP AL,EVENT_KEY_CODE
1BCA 740A                                     JZ EVENT_EVENT
1BCC E835F5                                   CALL KAZUKO
1BCF 733E                                     JNC RANDOM_YOYAKU
1BD1 EBAF                                     JMP EVENT_ERR
                          ;
1BD3 E922FD               EVENT_T_OUT:        JMP RANDOM_MODORI
                          ;
1BD6 E850FA               EVENT_EVENT:        CALL EVENT_TO_BASIC
1BD9 E8A2FA                                   CALL VIEW_TBL_LED
1BDC E810F6                                   CALL RUN_CONVERTER
1BDF E8C9F8                                   CALL SPU_LED_DISP
1BE2 E9EEFC                                   JMP NEXT_END
                          ;
1BE5 E88600               EVENT_AUTHO:        CALL KEIYAKU             ; Pay Channel Shinki Keiyaku
1BE8 B85541                                   MOV AX,ASCII_AU
1BEB E90800                                   JMP EVENT_MSG
                          ;
1BEE E8CB00               EVENT_CLEAR:        CALL KAIYAKU
```

```
1BF1 7319                            JNC EVENT_NO
1BF3 884564                          MOV AX,ASCII_DE
1BF6 E8ABF8        EVENT_MSG:        CALL SPU_LED_AX
1BF9 E84AFA                          CALL TIMER_1_SEC
                   ;
1BFC E8BBFB                          CALL NEXT_CONTINUE
                   ;
1BFF EB84                            JMP EV_PC_OK_YO
                   ;
1C01 E80A01        EVENT_PLUS:       CALL UP_YOYAKU
1C04 E90300                          JMP EVENT_UD
1C07 E84E01        EVENT_MINUS:      CALL DOWN_YOYAKU
1C0A 7353          EVENT_UD:         JNC FORCED_EVENT
1C0C E918FD        EVENT_NO:         JMP MSG_NO_WT_END
                   ;
1C0F B700          RANDOM_YOYAKU:    MOV BH,0
1C11 8A1E2807                        MOV BL,[IC_BYTE]
1C15 8BF3                            MOV SI,BX
1C17 E8A402                          CALL KEY_BUFF_ADRS
1C1A 8800                            MOV [BX][SI],AL
                   ;
1C1C A28507                          MOV [MSB_LED],AL
1C1F B088                            MOV AL,88H                       ; LSB = "_"
1C21 A28407                          MOV [LSB_LED],AL
1C24 E8F8F8                          CALL SPU_LED_FLASH
1C27 E828FA                          CALL TIMER_5_SEC
                   ;
1C2A E88DFB                          CALL NEXT_CONTINUE               ; [[[ Key Input Wait ]]]
                   ;
1C2D A08907                          MOV AL,[KEY_DATA]
1C30 E8D1F4                          CALL KAZUKO
1C33 7249                            JC IRG_YOYAKU
1C35 B700                            MOV BH,0             ;
1C37 8A1E2807                        MOV BL,[IC_BYTE]     ;
1C3B 8BF3                            MOV SI,BX
1C3D E87E02                          CALL KEY_BUFF_ADRS   ;    AH = [ 1st KEY  ]
1C40 8A20                            MOV AH,[SI][BX]      ;    AL = [ KEY_DATA ]
                   ;
1C42 A28407                          MOV [LSB_LED],AL     ;   LED Display
1C45 88268507                        MOV [MSB_LED],AH     ;
1C49 E87202                          CALL KEY_BUFF_ADRS   ;
1C4C 894004                          MOV [SI][BX+4],AX    ;
1C4F E8CDF8                          CALL SPU_LED_FLASH   ;
1C52 E841FA                          CALL LED_BIN_BX
                   ;
1C55 8B362807                        MOV SI,[IC_BYTE]
1C59 81C6000A                        ADD SI,HELP
1C5D 881C                            MOV [SI],BL
                   ;
1C5F E83000        FORCED_EVENT:     CALL EV_FREQ_ADRS
1C62 833C00                          CMP WORD PTR [SI],0
1C65 7417                            JZ IRG_YOYAKU        ; Housou Sareteimasen
1C67 833C01                          CMP WORD PTR [SI],1  ;
1C6A 740C                            JZ EVENT_RT1
                   ;
1C6C E86D00                          CALL PAY_CH_MIRU     ; [[[ Pay Channel Tuning ]]]
1C6F E839F8                          CALL SPU_LED_DISP    ; [[[ Pay ]]]
1C72 E80E01                          CALL EVENT_BIN_TBL
1C75 E933FF                          JMP EVENT_KEY_WAIT
                   ;
1C78 E8A4F8        EVENT_RT1:        CALL SPU_LED_FLASH
1C7B E92DFF                          JMP EVENT_KEY_WAIT
                   ;
1C7E E996FC        IRG_YOYAKU:       JMP WT_NO_WT_END
                   ;
                   ; ************       SI = ES_EVENT_TIMER + [CONV_NO] * 128 + Channel
                   ;
1C81 8B362407      ES_PAY_STATUS:    MOV SI,[CONV_NO]
1C85 B107                            MOV CL,7
1C87 D3C6                            ROL SI,CL
1C89 81C60006                        ADD SI,ES_EVENT_TIMER            ; Timer Address
1C8D 03361E07                        ADD SI,[BINARY_LED]              ; Channel
1C91 C3                              RET
                   ;
1C92 BE0009        EV_FREQ_ADRS:     MOV SI,EVENT_NO_FREQ
1C95 03361E07                        ADD SI,[BINARY_LED]
1C99 03361E07                        ADD SI,[BINARY_LED]
1C9D C3                              RET
                   ;
1C9E 8B362807      KEIYAKU:          MOV SI,[IC_BYTE]
1CA2 81C6000A                        ADD SI,HELP
1CA6 8A1C                            MOV BL,[SI]
1CA8 B700                            MOV BH,0
1CAA 891E1E07                        MOV [BINARY_LED],BX
1CAE E8D0FF                          CALL ES_PAY_STATUS
1CB1 268024F8                        AND BYTE PTR ES:[SI],0F8H
1CB5 A02A07                          MOV AL,[DEVICE_NO]
1CB8 260804                          OR ES:[SI],AL
1CBB C3                              RET
1CBC 8B362807      KAIYAKU:          MOV SI,[IC_BYTE]
```

```
1CC0 81C6000A                          ADD SI,HELP
1CC4 8A1C                              MOV BL,[SI]
1CC6 B700                              MOV BH,0
1CC8 891E1E07                          MOV [BINARY_LED],BX
1CCC E882FF                            CALL ES_PAY_STATUS
1CCF 26803CF8                          CMP BYTE PTR ES:[SI],0F8H
1CD3 7306                              JNC KAIYAKU_ERR
1CD5 268024F8                          AND BYTE PTR ES:[SI],0F8H
1CD9 F9                                STC
1CDA C3                                RET
1CDB C3                 KAIYAKU_ERR:   RET
                        ;
1CDC E8A2FF             PAY_CH_MIRU:   CALL ES_PAY_STATUS
1CDF B480                              MOV AH,80H
1CE1 26803CF8                          CMP BYTE PTR ES:[SI],0F8H
1CE5 7202                              JC HATU
1CE7 B4C0                              MOV AH,0C0H
                        ;
1CE9 0A262E07           HATU:          OR AH,[CONV_NO_BIT]
1CED 802680073F                        AND BYTE PTR [NOW_EVENT],3FH
1CF2 08268007                          OR [NOW_EVENT],AH
1CF6 E8F6F4                            CALL RUN_CONVERTER
1CF9 C3                                RET
                        ;
1CFA BE000A             YOYAKU_SEARCH: MOV SI,HELP
1CFD 03362807                          ADD SI,[IC_BYTE]
1D01 B700                              MOV BH,0
1D03 8A1C                              MOV BL,[SI]
1D05 83FB00                            CMP BX,0
1D08 740F                              JZ UP_WAKEARI
1D0A 4B                                DEC BX
1D0B E90B00                            JMP UP_WAKEARI
                        ;
1D0E BE000A             UP_YOYAKU:     MOV SI,HELP
1D11 03362807                          ADD SI,[IC_BYTE]
1D15 B700                              MOV BH,0
1D17 8A1C                              MOV BL,[SI]
1D19 8B362407           UP_WAKEARI:    MOV SI,[CONV_NO]
1D1D B107                              MOV CL,7
1D1F D3C6                              ROL SI,CL
1D21 81C60006                          ADD SI,ES_EVENT_TIMER
1D25 B164                              MOV CL,100
1D27 43                 UYL:           INC BX
1D28 83FB64                            CMP BX,100
1D2B 7203                              JC UYJ
1D2D BB0100                            MOV BX,1
1D30 26F60007           UYJ:           TEST BYTE PTR ES:[SI][BX],7
1D34 7506                              JNZ UD_Y_RET
1D36 FEC9                              DEC CL
1D38 75ED                              JNZ UYL
1D3A F9                                STC
1D3B C3                                RET
                        ;
1D3C 891E1E07           UD_Y_RET:      MOV [BINARY_LED],BX
1D40 E825FA                            CALL BINDEC_LED
                        ;
1D43 BE3000                            MOV SI,EVENT_CHANNEL
1D46 03362407                          ADD SI,[CONV_NO]
1D4A 881C                              MOV [SI],BL
                        ;
1D4C 8B362807                          MOV SI,[IC_BYTE]
1D50 81C6000A                          ADD SI,HELP
1D54 881C                              MOV [SI],BL
1D56 F8                                CLC
1D57 C3                                RET
                        ;

1D58 BE000A             DOWN_YOYAKU:   MOV SI,HELP
1D5B 03362807                          ADD SI,[IC_BYTE]
1D5F 8A1C                              MOV BL,[SI]
1D61 B700                              MOV BH,0
1D63 8B362407                          MOV SI,[CONV_NO]
1D67 B107                              MOV CL,7
1D69 D3C6                              ROL SI,CL
1D6B 81C60006                          ADD SI,ES_EVENT_TIMER
1D6F B164                              MOV CL,100
1D71 4B                 DYL:           DEC BX
1D72 7503                              JNZ DYJ
1D74 BB6300                            MOV BX,99
1D77 26F60007           DYJ:           TEST BYTE PTR ES:[SI][BX],7
1D7B 75BF                              JNZ UD_Y_RET
1D7D FEC9                              DEC CL
1D7F 75F0                              JNZ DYL
1D81 F9                                STC
1D82 C3                                RET
                        ;
1D83 A01E07             EVENT_BIN_TBL: MOV AL,[BINARY_LED]
1D86 BE3000                            MOV SI,EVENT_CHANNEL
1D89 03362407                          ADD SI,[CONV_NO]
1D8D 8804                              MOV [SI],AL
```

```
1D8F C3                                 RET
                ;
                ;
                ;-------------------------------------------------
                ;
                ;                       Another  Subroutines
                ;
                ;-------------------------------------------------
                ;

1D90 58         ANGO_TOUROKU:           POP AX
1D91 BE0004                             MOV SI,NEXT_GO_ADRS
1D94 B700                               MOV BH,0
1D96 8A1E2807                           MOV BL,[IC_BYTE]
1D9A 02DB                               ADD BL,BL
1D9C 8900                               MOV [SI][BX],AX
                ;
1D9E B89CD4     ANGO_1_10:              MOV AX,ASCII_NU
1DA1 E800F7                             CALL SPU_LED_AX
1DA4 E881F8                             CALL TIMER_10_SEC
                ;
1DA7 E810FA                             CALL NEXT_CONTINUE
                ;
1DAA E8FC00                             CALL ANGO_SUB
1DAD 7307                               JNC ANGO_1_20
1DAF 3C16                               CMP AL,CLEAR_KEY_CODE
1DB1 7571                               JNZ ANGO_ERR
1DB3 E942FB                             JMP RANDOM_MODORI
1DB6 8800       ANGO_1_20:              MOV [SI][BX],AL
1DB8 8A00       ANGO_1_21:              MOV AL,[SI][BX]
1DBA A28407                             MOV [LSB_LED],AL
1DBD B420                               MOV AH,20H
1DBF E80E01                             CALL ANGO_SUB1
                ;
1DC2 E8F5F9                             CALL NEXT_CONTINUE
                ;
1DC5 E8E100                             CALL ANGO_SUB
1DC8 7306                               JNC ANGO_1_30
1DCA 3C16                               CMP AL,CLEAR_KEY_CODE
1DCC 7556                               JNZ ANGO_ERR
1DCE EBCE                               JMP ANGO_1_10
1DD0 884001     ANGO_1_30:              MOV [SI][BX+1],AL
1DD3 8A4001     ANGO_1_31:              MOV AL,[SI][BX+1]
1DD6 A28407                             MOV [LSB_LED],AL
1DD9 8A20                               MOV AH,[SI][BX]
1DDB E8F200                             CALL ANGO_SUB1
                ;
1DDE E8D9F9                             CALL NEXT_CONTINUE
                ;
1DE1 E8C500                             CALL ANGO_SUB
1DE4 7306                               JNC ANGO_1_40
1DE6 3C16                               CMP AL,CLEAR_KEY_CODE
1DE8 75E9                               JNZ ANGO_1_31
1DEA EBCC                               JMP ANGO_1_21
1DEC 884002     ANGO_1_40:              MOV [SI][BX+2],AL
1DEF 8A4002     ANGO_1_41:              MOV AL,[SI][BX+2]
1DF2 A28407                             MOV [LSB_LED],AL
1DF5 8A6001                             MOV AH,[SI][BX+1]
1DF8 E8D500                             CALL ANGO_SUB1
                ;
1DFB E8BCF9                             CALL NEXT_CONTINUE
                ;
1DFE E8A800                             CALL ANGO_SUB
1E01 7306                               JNC ANGO_1_RET
1E03 3C16                               CMP AL,CLEAR_KEY_CODE
1E05 751D                               JNZ ANGO_ERR
1E07 EBCA                               JMP ANGO_1_31
1E09 884003     ANGO_1_RET:             MOV [SI][BX+3],AL
1E0C A28407                             MOV [LSB_LED],AL
1E0F 8A6002                             MOV AH,[SI][BX+2]
1E12 E8B800                             CALL ANGO_SUB1
                ;
1E15 BE0004                             MOV SI,NEXT_GO_ADRS
1E18 B700                               MOV BH,0
1E1A 8A1E2807                           MOV BL,[IC_BYTE]
1E1E 02DB                               ADD BL,BL
1E20 8B00                               MOV AX,[SI][BX]
1E22 50                                 PUSH AX
1E23 C3                                 RET
                ;
                ;
                ;
1E24 E9BBFA     ANGO_ERR:               JMP MSGERR_WT_END
                ;
                ;
                ;
1E27 58         ANGO_INPUT:             POP AX
1E28 BE0004                             MOV SI,NEXT_GO_ADRS
1E2B B700                               MOV BH,0
```

```
1E2D 8A1E2807                        MOV BL,[IC_BYTE]
1E31 02D8                            ADD BL,BL
1E33 8900                            MOV [SI][BX],AX
                     ;
1E35 B8B6B6          ANGO_2_10:      MOV AX,0B6B6H
1E38 E869F6                          CALL SPU_LED_AX
1E3B E81AF8                          CALL TIMER_10_SEC
                     ;
1E3E E879F9                          CALL NEXT_CONTINUE
                     ;
1E41 E86500          ANGO_2_11:      CALL ANGO_SUB
1E44 7307                            JNC ANGO_2_20
1E46 3C16                            CMP AL,CLEAR_KEY_CODE
1E48 75DA                            JNZ ANGO_ERR
1E4A E9ABFA                          JMP RANDOM_MODORI
1E4D 8800            ANGO_2_20:      MOV [SI][BX],AL
1E4F B8B6B6          ANGO_2_21:      MOV AX,86B6H
1E52 E88900                          CALL ANGO_SUB2
                     ;
1E55 E862F9                          CALL NEXT_CONTINUE
                     ;
1E58 E84E00                          CALL ANGO_SUB
1E5B 7306                            JNC ANGO_2_30
1E5D 3C16                            CMP AL,CLEAR_KEY_CODE
1E5F 75C3                            JNZ ANGO_ERR
1E61 EBD2                            JMP ANGO_2_10
1E63 884001          ANGO_2_30:      MOV [SI][BX+1],AL
1E66 B88620          ANGO_2_31:      MOV AX,20B6H
1E69 E87200                          CALL ANGO_SUB2
                     ;
1E6C E84BF9                          CALL NEXT_CONTINUE
                     ;
1E6F E83700                          CALL ANGO_SUB
1E72 7306                            JNC ANGO_2_40
1E74 3C16                            CMP AL,CLEAR_KEY_CODE
1E76 75AC                            JNZ ANGO_ERR
1E78 EBD5                            JMP ANGO_2_21
1E7A 884002          ANGO_2_40:      MOV [SI][BX+2],AL
1E7D B88620          ANGO_2_41:      MOV AX,2086H
1E80 E85B00                          CALL ANGO_SUB2
                     ;
1E83 E834F9                          CALL NEXT_CONTINUE
                     ;
1E86 E82000                          CALL ANGO_SUB
1E89 7306                            JNC ANGO_2_RET
1E8B 3C16                            CMP AL,CLEAR_KEY_CODE
1E8D 7595                            JNZ ANGO_ERR
1E8F EBD5                            JMP ANGO_2_31
1E91 884003          ANGO_2_RET:     MOV [SI][BX+3],AL
1E94 B82020                          MOV AX,2020H
1E97 E84400                          CALL ANGO_SUB2
                     ;
1E9A BE0004                          MOV SI,NEXT_GO_ADRS
1E9D B700                            MOV BH,0
1E9F 8A1E2807                        MOV BL,[IC_BYTE]
1EA3 02DB                            ADD BL,BL
1EA5 8B00                            MOV AX,[SI][BX]
1EA7 50                              PUSH AX
1EA8 C3                              RET
                     ;
                     ;
                     ;
1EA9 A08907          ANGO_SUB:       MOV AL,[KEY_DATA]
1EAC E855F2                          CALL KAZUKO
1EAF 730D                            JNC KEY_BUFF_ADRS
1EB1 3C00                            CMP AL,TIMER_OUT_CODE
1EB3 7504                            JNZ KAORU
1EB5 58                              POP AX
1EB6 E93FFA                          JMP RANDOM_MODORI
1EB9 E80200          KAORU:          CALL KEY_BUFF_ADRS
1EBC F9                              STC
1EBD C3                              RET
                     ;
1EBE BE0010          KEY_BUFF_ADRS:  MOV SI,KEY_DATA_STACK
1EC1 B700                            MOV BH,0
1EC3 8A1E2807                        MOV BL,[IC_BYTE]
1EC7 03DB                            ADD BX,BX
1EC9 03DB                            ADD BX,BX
1ECB 03DB                            ADD BX,BX
1ECD 03DB                            ADD BX,BX
1ECF C3                              RET
                     ;
1ED0 88268507        ANGO_SUB1:      MOV [MSB_LED],AH
1ED4 E8BDF4                          CALL SPU_CLEAR_DISP
1ED7 E8D1F5                          CALL SPU_LED_DISP
1EDA E87BF7                          CALL TIMER_10_SEC
1EDD C3                              RET
                     ;
1EDE E8C3F5          ANGO_SUB2:      CALL SPU_LED_AX
1EE1 E874F7                          CALL TIMER_10_SEC
1EE4 C3                              RET
```

```
                    ;
1EE5 E8D6FF         ANGO_BIN_DX:      CALL KEY_BUFF_ADRS
1EE8 B500                             MOV CH,0
1EEA 8AF5                             MOV DH,CH
1EEC 8A10                             MOV DL,[SI][BX]        ; DX = #1
1EEE 80E20F                           AND DL,0FH
1EF1 E81F00                           CALL MULTI_10_DX       ; DX = #1*10
1EF4 8A4801                           MOV CL,[SI+1][BX]
1EF7 80E10F                           AND CL,0FH
1EFA 03D1                             ADD DX,CX              ; DX = #1*10+#2
1EFC E81400                           CALL MULTI_10_DX       ; DX =(#1*10+#2)*10
1EFF 8A4802                           MOV CL,[SI+2][BX]
1F02 80E10F                           AND CL,0FH
1F05 03D1                             ADD DX,CX              ; DX = (#1*10+#2)*10+#3
1F07 E80900                           CALL MULTI_10_DX       ; DX =((#1*10+#2)*10+#3)*10
1F0A 8A4803                           MOV CL,[SI+3][BX]
1F0D 80E10F                           AND CL,0FH
1F10 03D1                             ADD DX,CX              ; DX =((#1*10+#2)*10+#3)*10+#4
1F12 C3                               RET
                    ;
1F13 03D2           MULTI_10_DX:      ADD DX,DX       ; *2
1F15 8BC2                             MOV AX,DX
1F17 03C0                             ADD AX,AX       ; *2*2    = *4
1F19 03C0                             ADD AX,AX       ; *2*2*2  = *8
1F1B 03D0                             ADD DX,AX       ; *2 + *8 = *10
1F1D C3                               RET
                    ;
                    ; ************  Key In Shita Angou Wo Display Suru  *************
                    ;
1F1E 58             ANGO_DISPLAY:     POP AX
1F1F BE0004                           MOV SI,NEXT_GO_ADRS
1F22 B700                             MOV BH,0
1F24 8A1E2807                         MOV BL,[IC_BYTE]
1F28 02DB                             ADD BL,BL
1F2A 8900                             MOV [SI][BX],AX
                    ;
1F2C E88FFF                           CALL KEY_BUFF_ADRS
1F2F C6400700                         MOV BYTE PTR [SI][BX+7],0
                    ;
1F33 B85541         ANGO_AU_WT_LP:    MOV AX,ASCII_AU
1F36 E86BF5                           CALL SPU_LED_AX
1F39 E80AF7                           CALL TIMER_1_SEC
                    ;
1F3C E87BF8                           CALL NEXT_CONTINUE
                    ;
1F3F A08907                           MOV AL,[KEY_DATA]
1F42 3C12                             CMP AL,AUTHO_KEY_CODE
1F44 7476                             JZ ANGO_NINTEI
1F46 3C16                             CMP AL,CLEAR_KEY_CODE
1F48 7462                             JZ ANGO_NO_AUTHO
1F4A E871FF                           CALL KEY_BUFF_ADRS
1F4D FE4007                           INC BYTE PTR [SI][BX+7]
1F50 B020                             MOV AL,20H
1F52 A28507                           MOV [MSB_LED],AL
1F55 8A00                             MOV AL,[SI][BX]
1F57 A28407                           MOV [LSB_LED],AL
1F5A E84EF5                           CALL SPU_LED_DISP
1F5D E8E6F6         ANGO_DISP_LP:     CALL TIMER_1_SEC
                    ;
1F60 E857F8                           CALL NEXT_CONTINUE
                    ;
1F63 A08907                           MOV AL,[KEY_DATA]
1F66 3C12                             CMP AL,AUTHO_KEY_CODE
1F68 7452                             JZ ANGO_NINTEI
1F6A 3C16                             CMP AL,CLEAR_KEY_CODE
1F6C 743E                             JZ ANGO_NO_AUTHO
1F6E E84DFF                           CALL KEY_BUFF_ADRS
1F71 8A6007                           MOV AH,[SI][BX+7]
1F74 80E403                           AND AH,3
1F77 0ADC                             OR BL,AH
1F79 8A40FF                           MOV AL,[SI][BX-1]
1F7C A28507                           MOV [MSB_LED],AL
1F7F 8A00                             MOV AL,[SI][BX]
1F81 A28407                           MOV [LSB_LED],AL
1F84 E80DF4                           CALL SPU_CLEAR_DISP
1F87 E821F5                           CALL SPU_LED_DISP
                    ;
1F8A E831FF                           CALL KEY_BUFF_ADRS
1F8D FE4007                           INC BYTE PTR [SI][BX+7]
1F90 8A6007                           MOV AH,[SI][BX+7]
1F93 80FC96                           CMP AH,150
1F96 7314                             JNC ANGO_NO_AUTHO
1F98 80E403                           AND AH,3
1F9B 75C0                             JNZ ANGO_DISP_LP
1F9D E8A6F6         AUGO_AU_RETRY:    CALL TIMER_1_SEC
                    ;
1FA0 E817F8                           CALL NEXT_CONTINUE
                    ;
1FA3 A08907                           MOV AL,[KEY_DATA]
1FA6 3C12                             CMP AL,AUTHO_KEY_CODE
1FA8 7412                             JZ ANGO_NINTEI
```

```
1FAA EB87                           JMP ANGO_AU_WT_LP
                    ;
1FAC BE0004     ANGO_NO_AUTHO:      MOV SI,NEXT_GO_ADRS
1FAF B700                           MOV BH,0
1FB1 8A1E2807                       MOV BL,[IC_BYTE]
1FB5 02DB                           ADD BL,BL
1FB7 8B00                           MOV AX,[SI][BX]
1FB9 50                             PUSH AX
1FBA F9                             STC
1FBB C3                             RET
                    ;
1FBC BE0004     ANGO_NINTEI:        MOV SI,NEXT_GO_ADRS
1FBF B700                           MOV BH,0
1FC1 8A1E2807                       MOV BL,[IC_BYTE]
1FC5 02DB                           ADD BL,BL
1FC7 8B00                           MOV AX,[SI][BX]
1FC9 50                             PUSH AX
1FCA F8                             CLC
1FCB C3                             RET
                    ;
                    ;
                    ;
1FCC 3C88       PAY_GROUP_1:        CMP AL,88H
1FCE 7406                           JZ PAY_PROG_START
1FD0 3C8A                           CMP AL,8AH
1FD2 7478                           JZ PAY_PROG_STOP
1FD4 F8                             CLC
1FD5 C3                             RET
                    ;
1FD6 8A4405     PAY_PROG_START:     MOV AL,[SI+5]     ; Channel
1FD9 B400                           MOV AH,0
1FDB 8B5406                         MOV DX,[SI+6]     ; DX = Freq. Data
1FDE BB0009                         MOV BX,EVENT_NO_FREQ
1FE1 03D8                           ADD BX,AX
1FE3 03D8                           ADD BX,AX         ; BX = Freq. Table Address
1FE5 8917                           MOV [BX],DX       ; Frequency Set
                    ;
1FE7 BA0000                         MOV DX,0
1FEA BB0006                         MOV BX,ES_EVENT_TIMER
1FED 03D8                           ADD BX,AX
                    ;
1FEF 83FA06     EV_F_ST_CK:         CMP DX,6
1FF2 7356                           JNC P_P_START_RET
                    ;
1FF4 26F60707                       TEST BYTE PTR ES:[BX],7
1FF8 7449                           JZ NEXT_EV_ST
                    ;
1FFA 50                             PUSH AX           ; Channel
1FFB 53                             PUSH BX           ; N th Converter  Event Timer Address
1FFC 52                             PUSH DX           ; Drop No.

1FFD A31E07                         MOV [BINARY_LED],AX
2000 88162407                       MOV [CONV_NO],DL
2004 268A07                         MOV AL,ES:[BX]
2007 2407                           AND AL,7
2009 7502                           JNZ DEV_OK
200B B002                           MOV AL,2
                    ;
200D A22A07     DEV_OK:             MOV [DEVICE_NO],AL
2010 02C0                           ADD AL,AL
2012 02C0                           ADD AL,AL
2014 02C0                           ADD AL,AL         ; AL * 8
2016 02D0                           ADD DL,AL
2018 88162807                       MOV [IC_BYTE],DL
201C E81AF0                         CALL CONV_TO_DROP
201F E884F0                         CALL ID_DROP_DEVICE
2022 E88FF3                         CALL SPU_RELAY_ON
2025 8B1E1E07                       MOV BX,[BINARY_LED]
2029 E83CF7                         CALL BINDEC_LED
                    ;
202C BE8003                         MOV SI,JUMP_ADDRESS
202F 03362807                       ADD SI,[IC_BYTE]
2033 03362807                       ADD SI,[IC_BYTE]
2037 8B161A07                       MOV DX,[BASE_POINT]
203B 8914                           MOV [SI],DX
                    ;
203D E81FFC                         CALL FORCED_EVENT
                    ;
2040 5A                             POP DX
2041 5B                             POP BX
2042 58                             POP AX
2043 42         NEXT_EV_ST:         INC DX
2044 81C38000                       ADD BX,128
2048 EBA5                           JMP EV_F_ST_CK
                    ;
204A F8         P_P_START_RET:      CLC
204B C3                             RET
                    ;
204C 90         PAY_PROG_STOP:      NOP
204D F8         PAY_GROUP_2:        CLC
```

```
204E C3          RET
;
;
;
                 GLOBAL      POWER_DET_CMD
                 GLOBAL      LOAD_FROM_DROP
                 GLOBAL      LOAD_TO_DROP
                 GLOBAL      SPU_STATUS_REQ
                 GLOBAL      ID_DROP_DEVICE
                 GLOBAL      IC_DROP_DEVICE
                 GLOBAL      CONV_SW_BIT_AL
                 GLOBAL      DROP_BIT_AL
                 GLOBAL      SPU_RELAY_OFF
                 GLOBAL      SPU_CLEAR_DISP
                 GLOBAL      EVENT_LED_OFF
                 GLOBAL      DROP_MAP_SET
                 GLOBAL      KEY_OPERATION
                 GLOBAL      CONV_TO_DROP
                 GLOBAL      DROP_TO_CONV
                 GLOBAL      BINDEC_LED
                 GLOBAL      LED_VIEW_TBL
                 GLOBAL      SPU_LED_DISP
                 GLOBAL      RUN_CONVERTER
                 GLOBAL      WAKEARI_DE_ON
                 GLOBAL      OP_SPU_OFF
                 GLOBAL      OP_INITIAL
                 GLOBAL      BASE_ROUTINE
                 GLOBAL      JUMP_ADRS_INIT
                 GLOBAL      JUMP_ADRS_INIZ
                 GLOBAL      DEVICE_MAP_SET
                 GLOBAL      PAY_GROUP_1
                 GLOBAL      PAY_GROUP_2
;
;
;
                 EXTRN SPECIAL_SPU_1

Errors=     0
```

What is claimed is:

1. A cable television system for transmitting via a cable network television signals from a head end to a plurality of subscriber premises, and other signals between the head end and the plurality of subscriber premises, comprising:

polling signal means associated with the head end for applying polling signals to the cable network;

external control unit means located at a plurality of remote locations, each location being adjacent but external to a subset of the subscriber premises, for receiving the television signals and the polling signals from the cable network, each external control unit means having an address;

a plurality of drop cables connected to each external control unit means, each drop cable conducting a selected portion of the television signal from the external control unit means to a respective one of the subscriber premises associated with that external control unit means;

subscriber processing unit means connected to each drop cable at the subscriber premises for allowing the subscriber to apply to the drop cable a control signal indicative of information to be transmitted to said external control unit means, including information indicating the portion of the television signal which that subscriber wishes to select and information for transmission to the head end;

control signal processing means associated with the external control unit for receiving and storing the information indicated by the control signals applied to all of the drop cables associated with that external control unit means and for applying to each drop cable the portion of the television signal indicated by the television signal selection information received via the drop cable;

polling signal processing means associated with each external control unit means for processing the received polling signals and for responding thereto by applying to the cable network for transmission to the head end a response signal communicative solely of whether or not said external control unit means has information to transmit to the head end; and means associated with said polling signal means for, responsive to receipt from said external control unit means of a response signal communicative of a desire by said external control unit means to transmit information to the head end, applying additional polling signals to the cable network for determining the address of said external control unit means desiring to communicate.

2. The cable television system defined in claim 1, further comprising:

means associated with the head end for applying a request signal to the cable network responsive to receipt from said external control unit means of a response signal communicative of a desire by said external control unit means to transmit information to the head end; and request signal processing means associated with said external control unit means for receiving the request signal and for responding thereto by transmitting to the head end the information received and stored by said associated control signal processing means.

3. The cable television system defined in claim 2, wherein the polling and request signals include address signal data indicative of the external control unit means to which the polling and request signals are to be transmitted, and wherein said external control unit means further comprises:

means for producing address signal information which uniquely identifies said external control unit means; and means for comparing received address signal data to the address signal information and for causing said polling signal processing means and said request signal processing means to respond to received polling and request signals if the received address signal data bear a predetermined relationship to the address signal information.

4. A cable television system for transmitting television signals via a cable network from a head end to a plurality of remote locations, each remote location being adjacent but external to a selected set of subscriber premises, comprising:

external control unit means at each of the remote locations for receiving the television signals from the cable network;

a plurality of drop cables connected to at least one external control unit means, each drop cable conducting a selected portion of the television signal from the external control unit means to a respective one of the subscriber premises associated with that external control unit means;

subscriber device means connected to the drop cable at the subscriber premises for applying to the drop cable a service request signal communicative solely of a request by the subscriber device means to communicate with the external control unit means; and drop polling means associated with the external control unit means for sensing in a predetermined order on each drop cable the presence of the service request signal to enable the associated external control unit means to rapidly locate a drop cable on which a subscriber device means is requesting to communicate with the external control unit means; wherein:

said service request signal has a duration at least as long as the time needed for said drop polling means to sense all of said plurality of drop cables in said predetermined order.

5. The cable television system of claim 4, further comprising:

device polling means associated with the external control unit means, said device polling means being responsive to the drop polling means sensing the service request signal on a drop cable for applying a first control signal to that drop cable, the first control signal including data indicative of a subscriber device means address;

address means associated with each subscriber device means for producing address signal information which uniquely identifies the subscriber device means on the drop cable to which the subscriber device means is connected;

transmitter means associated with each subscriber device means for applying to its associated drop cable a second control signal indicative of data to be transmitted to the external control unit means; and means associated with each subscriber device means for receiving the first control signal, for comparing the received address signal data to the associated address signal information, and for enabling said transmitter means associated with said subscriber device means to transmit the second control signal if the received address signal data bear a predetermined relationship to the associated address signal information.

6. The cable television system of claim 5, wherein:

a plurality of subscriber device means are connected to one drop cable; and the device polling means includes means for applying to that drop cable a plurality of first control signals, each first control signal including address data indicative of a different one of the subscriber devices connected to that drop cable.

7. The cable television system of claim 6, wherein at least one of the subscriber device means is a subscriber processing unit means for allowing the subscriber to apply to the drop cable and communicate to the external control unit means second control signals indicative of the portion of the television signal which that subscriber wishes to select.

* * * * *